(12) United States Patent
Mihajlovic

(10) Patent No.: US 7,446,440 B2
(45) Date of Patent: Nov. 4, 2008

(54) PERMANENT MAGNET FLUX MODULE RECIPROCATING ENGINE AND METHOD

(76) Inventor: Miodrag Mihajlovic, 111 E. 14th St., #253, New York City, NY (US) 10003

( * ) Notice: Subject to any disclaimer, the term of this patent is extended or adjusted under 35 U.S.C. 154(b) by 435 days.

(21) Appl. No.: 11/346,404

(22) Filed: Feb. 2, 2006

(65) Prior Publication Data

US 2006/0273666 A1    Dec. 7, 2006

Related U.S. Application Data

(60) Provisional application No. 60/649,585, filed on Feb. 3, 2005.

(51) Int. Cl.
*H02K 33/00* (2006.01)
(52) U.S. Cl. ............... 310/28; 310/15; 310/20; 310/24
(58) Field of Classification Search .......... 310/15, 310/17, 20, 24, 27–28, 80
See application file for complete search history.

(56) References Cited

U.S. PATENT DOCUMENTS

| | | | |
|---|---|---|---|
| 322,296 A | 7/1885 | Knabe, Jr. | |
| 3,484,629 A | 12/1969 | Kunz | |
| 4,019,103 A | 4/1977 | Davis et al. | |
| 4,359,673 A | 11/1982 | Bross, Jr. et al. | |
| 4,404,503 A | 9/1983 | Ward et al. | |
| 4,507,579 A | 3/1985 | Turner | |
| 4,631,455 A * | 12/1986 | Taishoff | 318/37 |
| 4,877,983 A | 10/1989 | Johnson | |
| 4,937,481 A | 6/1990 | Vitale | |
| 5,036,930 A * | 8/1991 | Bisel et al. | 180/65.1 |
| 5,057,724 A | 10/1991 | Patton | |
| 5,219,034 A * | 6/1993 | Wortham | 180/65.3 |
| 5,457,349 A * | 10/1995 | Gifford | 310/24 |
| 5,886,442 A | 3/1999 | Ogino et al. | |
| 6,552,450 B2 | 4/2003 | Harty et al. | |
| 6,747,376 B2 | 6/2004 | Hashimoto et al. | |
| 6,803,682 B1 | 10/2004 | Thirunarayan et al. | |
| 2004/0183387 A1 | 9/2004 | Moe | |

* cited by examiner

*Primary Examiner*—Thanh Lam
(74) *Attorney, Agent, or Firm*—Laurence A. Greenberg; Werner H. Stemer; Ralph E. Locher

(57) ABSTRACT

A permanent magnet reciprocating engine and method are provided wherein a first field plate having magnetic fields of two polarities interact with the magnetic field of a magnet located on a piston plate. The first field plate is moved to alternately bring the magnetic field of a first polarity and the magnetic field of a second polarity into alignment with the magnetic field of the piston plate, thus alternately attracting and repelling the piston plate to the field plate. The piston plate is connected to a piston rod, which reciprocates along an axis as a result of the alternately attractive and repulsive forces exerted on the piston plate by the field plate. A translation mechanism, such as a crankshaft, translates the linear motion of the piston rod along the axis into rotary motion that can be harnessed as power.

35 Claims, 108 Drawing Sheets

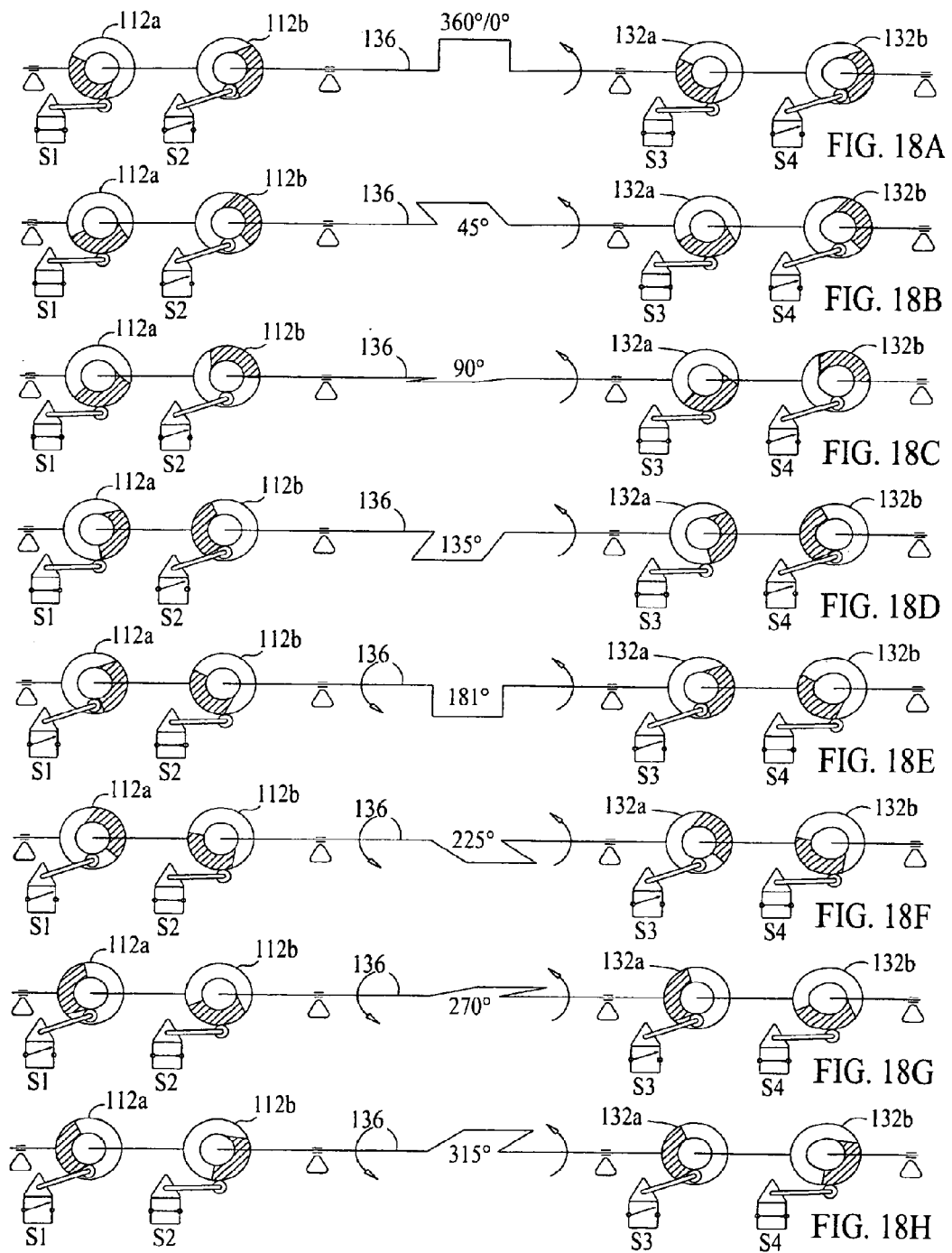

NdFeB Magnetic Characteristics:

| GRADE* | RESIDUAL INDUCTION Br BrmT (KG) | COERCIVE FORCE bHc bHc KA/m (KOe) | INTRINSIC COERCIVE FORCE iHc KA/m (KOe) | MAX. ENERGY PRODUCT (BH)max KJ/m3 (KOe) | MAX. OPERATION TEMP. C |
|---|---|---|---|---|---|
| N33 | 1130-1170 (11.3-11.7) | >= 836 (>=10.5) | >= 955 (>=12) | 247-263 (31-33) | 80 |
| N35* | 1130-1170 (11.3-11.7) | >= 868 (>=10.9) | >= 955 (>=12) | 263-287 (33-36) | 80 |
| N38* | 1210-1250 12.1-12.5 | >= 899 (>=11.3) | >= 955 (>=12) | 287-310 (36-39) | 80 |
| N40* | 1250-1280 (12.5-12.8) | >= 923 (>=11.6) | >= 955 (>=12) | 318-342 (38-41) | 80 |
| N42* | 1280-1320 (12.8-13.2) | >= 923 (>=11.6) | >= 955 (>=12) | 318-342 (40-43) | 80 |
| N45* | 1320-1380 (13.2-13.8) | >= 876 (>=11.0) | >= 955 (>=12) | 342-366 (43-46) | 80 |
| N48 | 1380-1420 (13.8-14.2) | >= 835 (>=10.5) | >= 876 (>=11) | 366-390 (46-49) | 80 |
| 33H | 1130-1170 (11.3-11.7) | >= 836 (>=10.5) | >= 1353 (>=17) | 247-271 (31-34) | 120 |
| 35H* | 1170-1210 (11.7-12.10) | >= 868 (>=10.9) | >= 1353 (>=17) | 263-287 (33-36) | 120 |
| 38H* | 1210-1250 (12.1-12.5) | >= 899 (>=11.3) | >= 1353 (>=17) | 287-310 (36-39) | 120 |
| 40H* | 1240-1280 (12.4-12.8) | >= 923 (>=11.6) | >= 1353 (>=17) | 302-326 (38-41) | 120 |
| 42H* | 1280-1320 (12.8-13.2) | >= 955 (>=12.0) | >= 1353 (>=17) | 318-342 (40-43) | 120 |
| 33SH | 1130-1170 (11.3-11.7) | >= 844 (>=10.6) | >= 1592 (>=20) | 247-272 (31-34) | 150 |
| 35SH* | 1170-1210 (11.7-12.1) | >= 876 (>=11.0) | >= 1582 (>=20) | 263-287 (33-36) | 150 |
| 38SH* | 1210-1250 (12.1-12.5) | >= 907 (>=11.4) | >= 1592 (>=20) | 287-310 (36-39) | 150 |
| 40SH* | 1240-1280 (12.4-12.8) | >= 939 (>=11.8) | >= 1592 (>=20) | 302-326 (38-41) | 150 |
| 28UH | 1020-1080 (10.2-10.8) | >= 764 (>=9.6) | >= 1990 (>=25) | 207-231 (26-29) | 180 |
| 30UH | 1080-1130 (10.8-11.3) | >= 812 (>=10.2) | >= 1990 (>=25) | 223-247 (28-31) | 180 |
| 33UH | 1130-1170 (11.3-11.7) | >= 852 (>=10.7) | >= 1990 (>=25) | 247-271 (31-34) | 180 |
| 28EH | 1040-1090 (10.4-10.9) | >= 780 (>=9.8) | >= 2388 (>=30) | 207-231 (26-29) | 200 |
| 30EH | 1080-1130 (10.8-11.3) | >= 812 (>=10.2) | >= 2388 (>=30) | 223-247 (28-31) | 200 |

FIG. 38

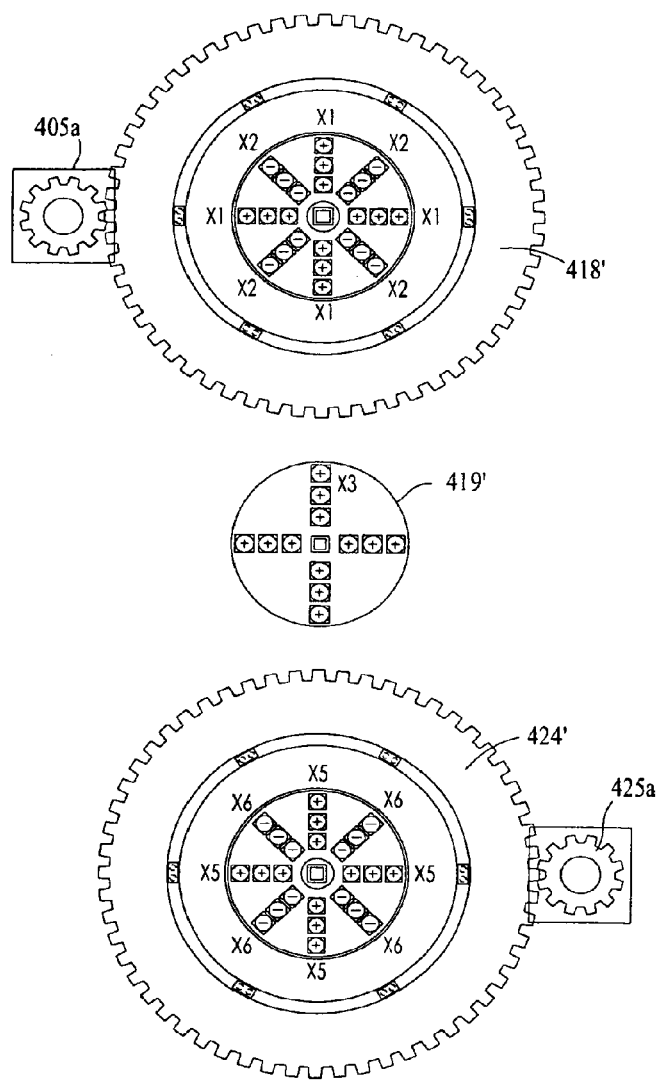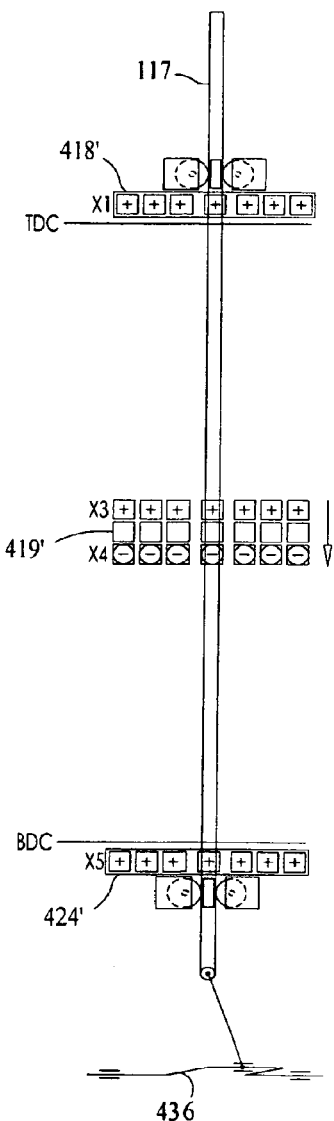
FIG. 52A
FIG. 52B

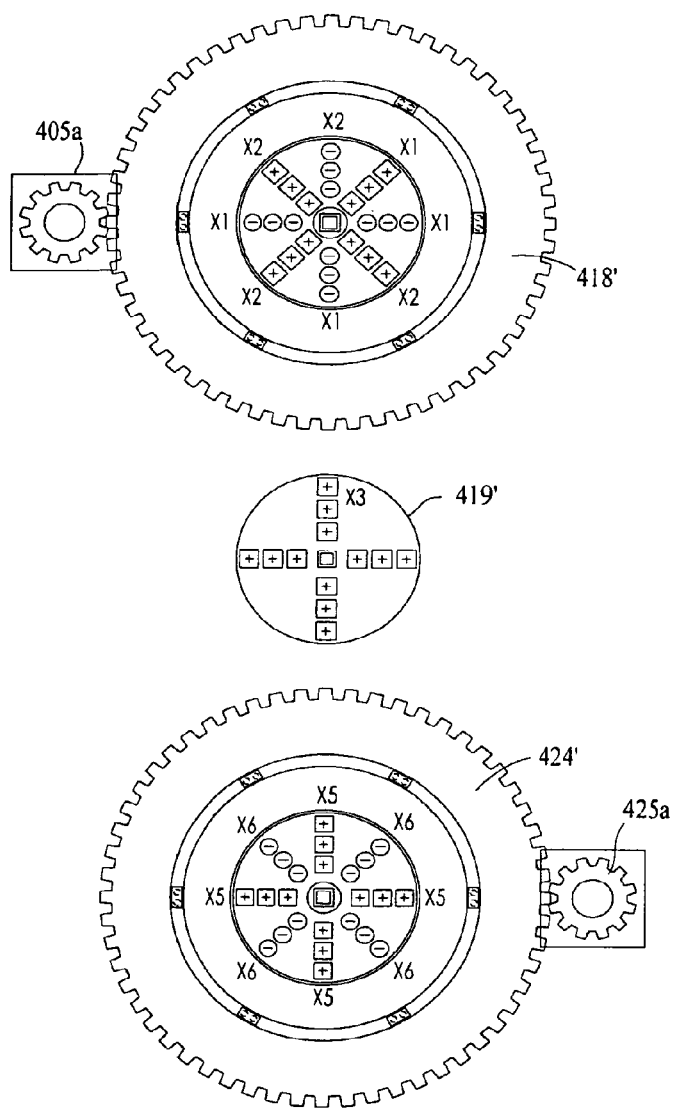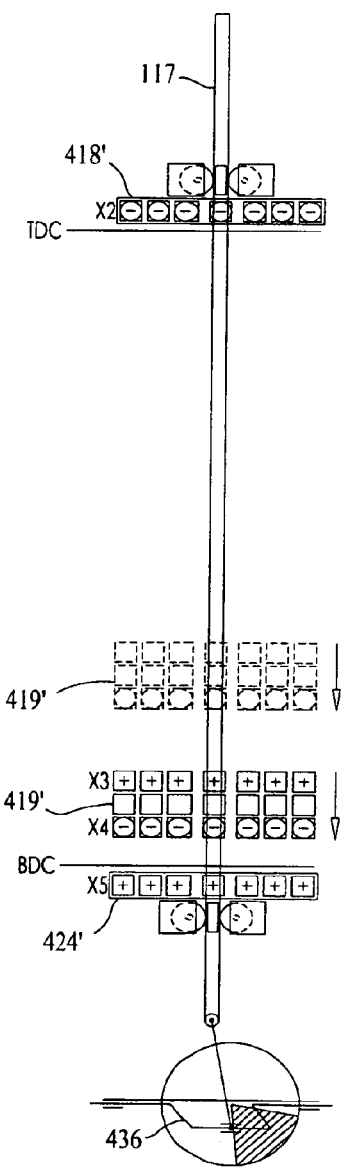
FIG. 53A
FIG. 53B

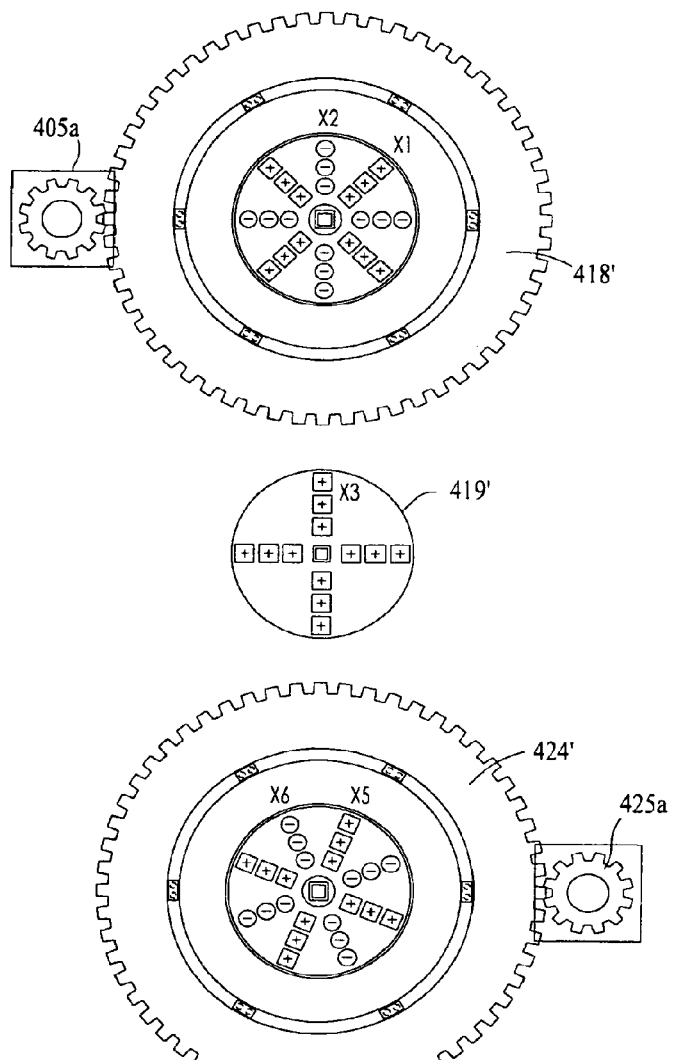
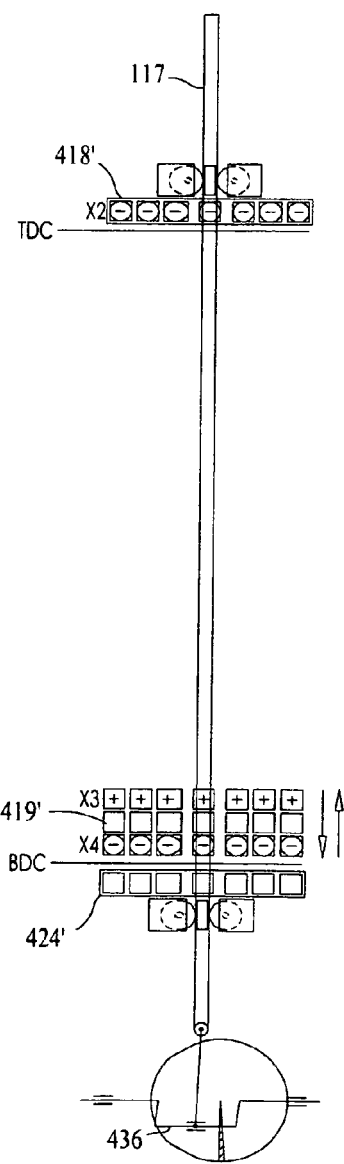
FIG. 54A
FIG. 54B

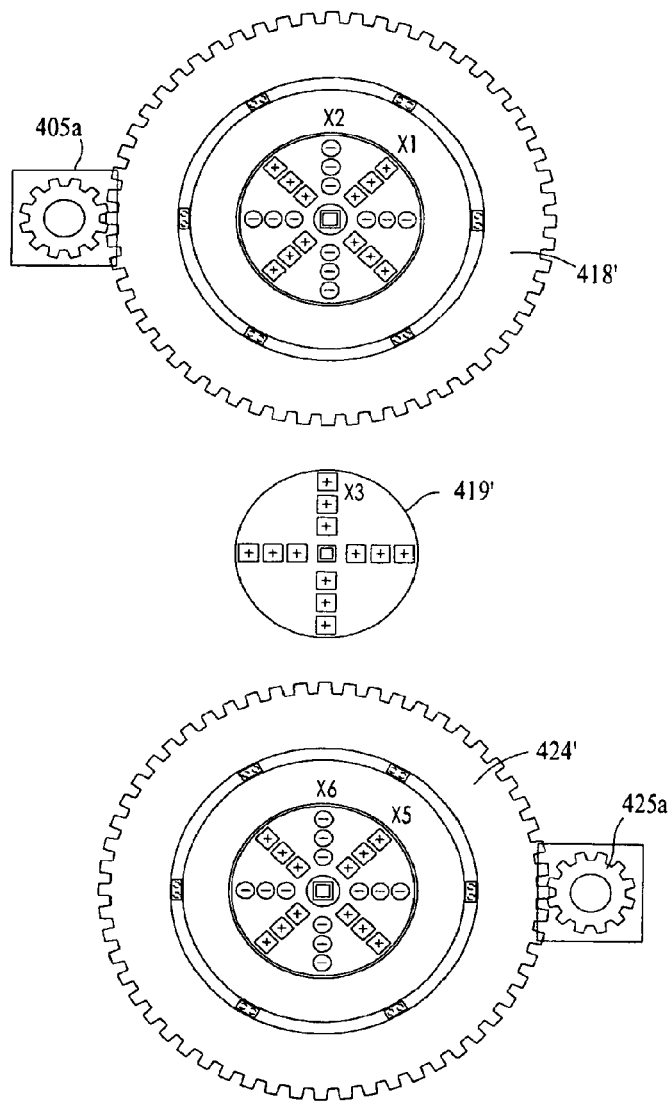
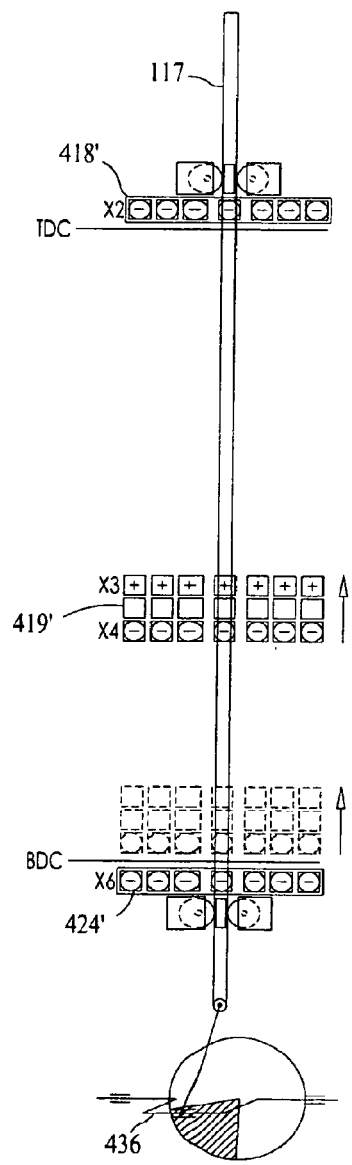
FIG. 55A
FIG. 55B

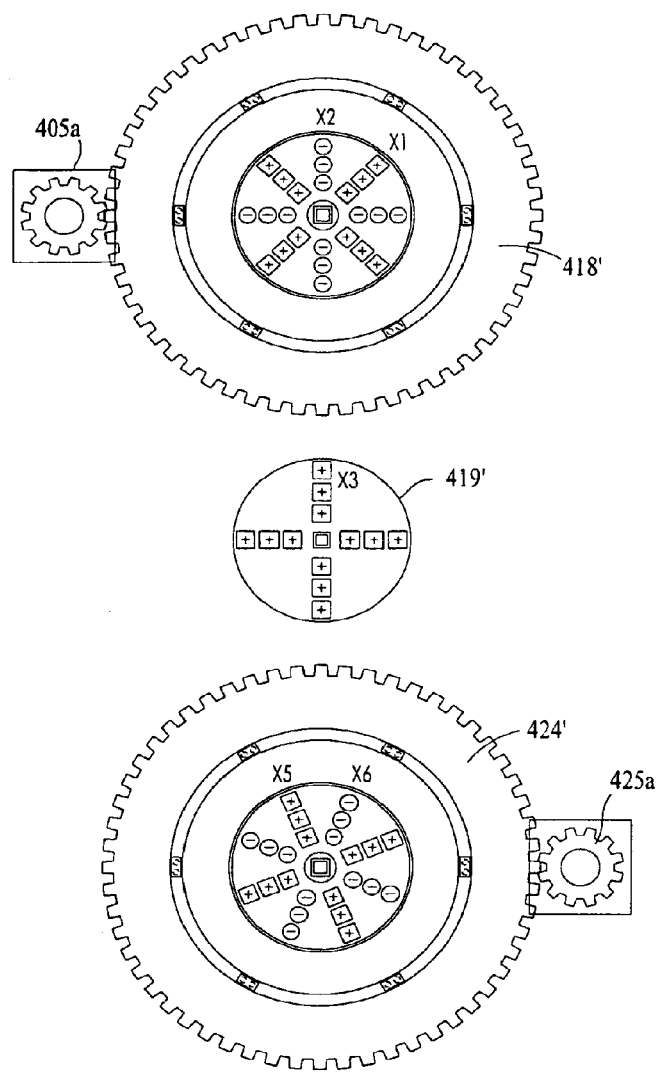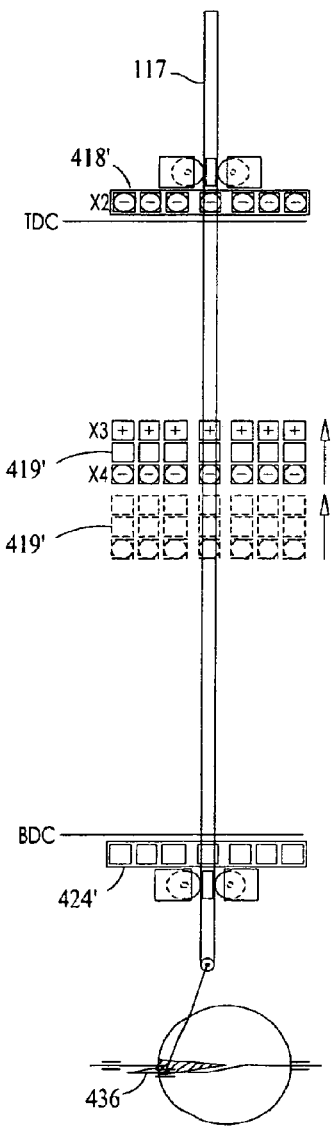
FIG. 56A
FIG. 56B

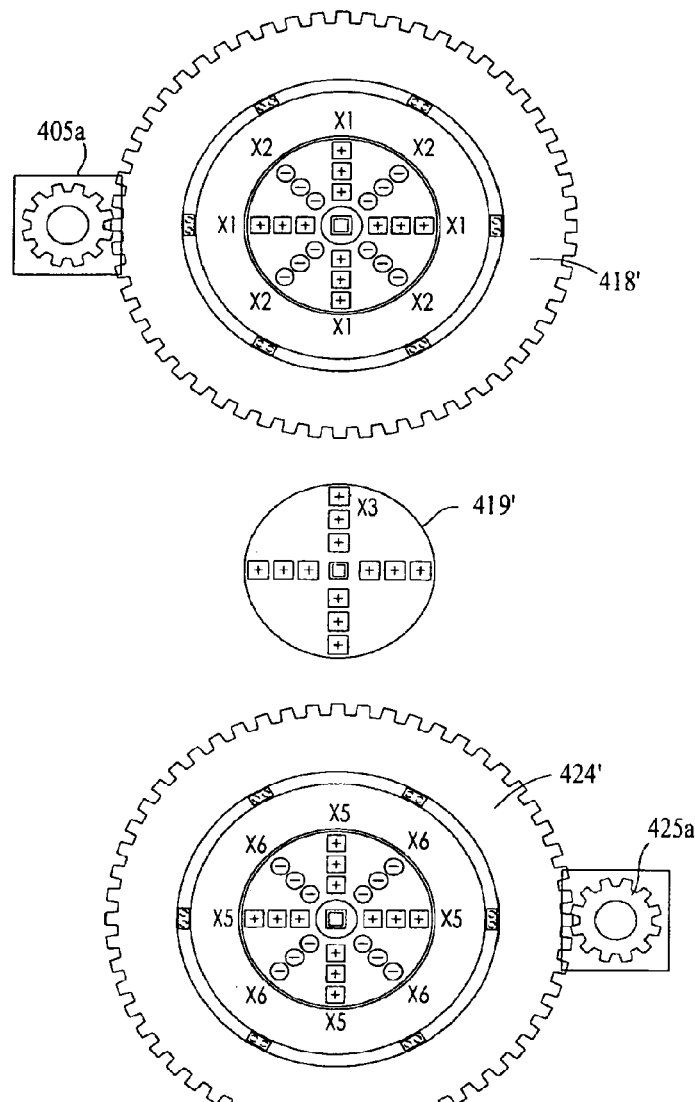
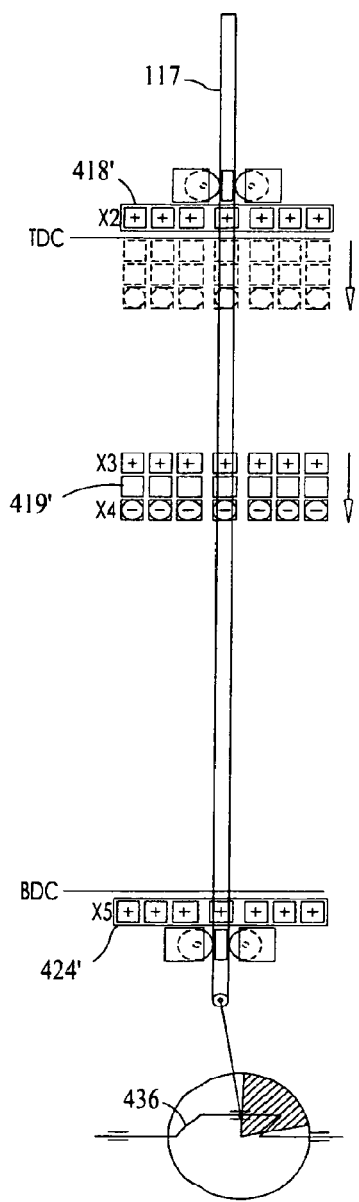
FIG. 59A
FIG. 59B

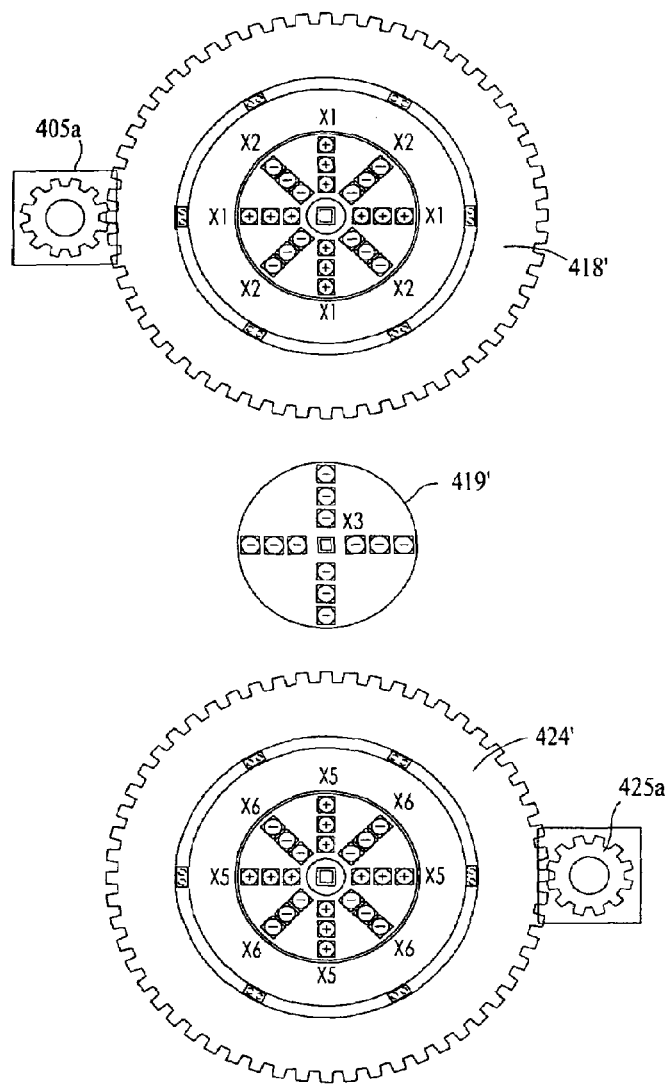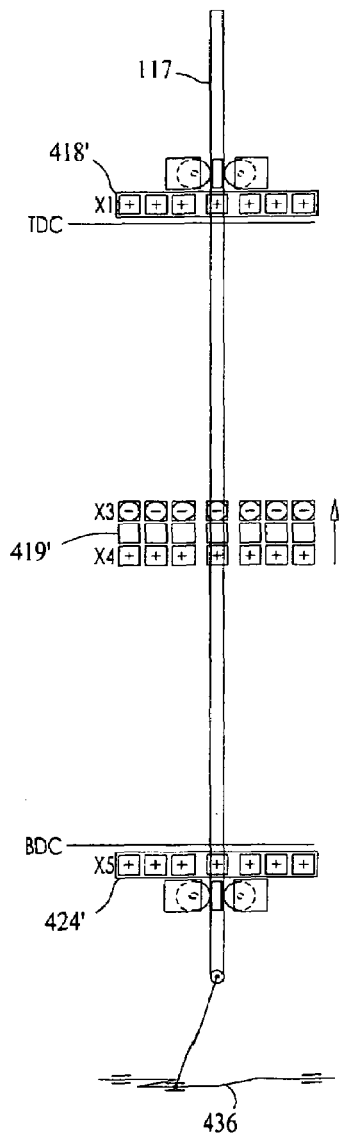
FIG. 61A
FIG. 61B

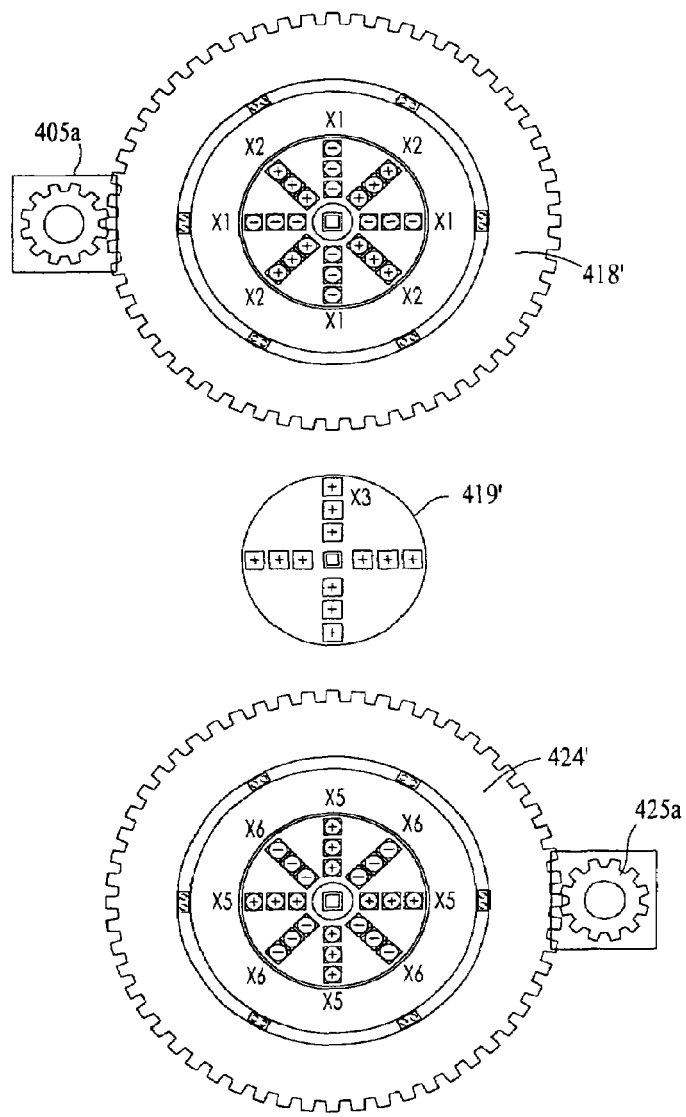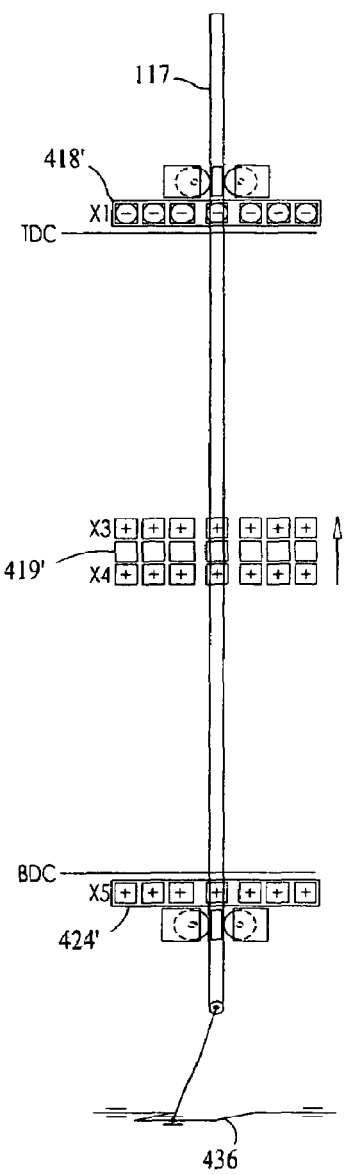
FIG. 62A
FIG. 62B

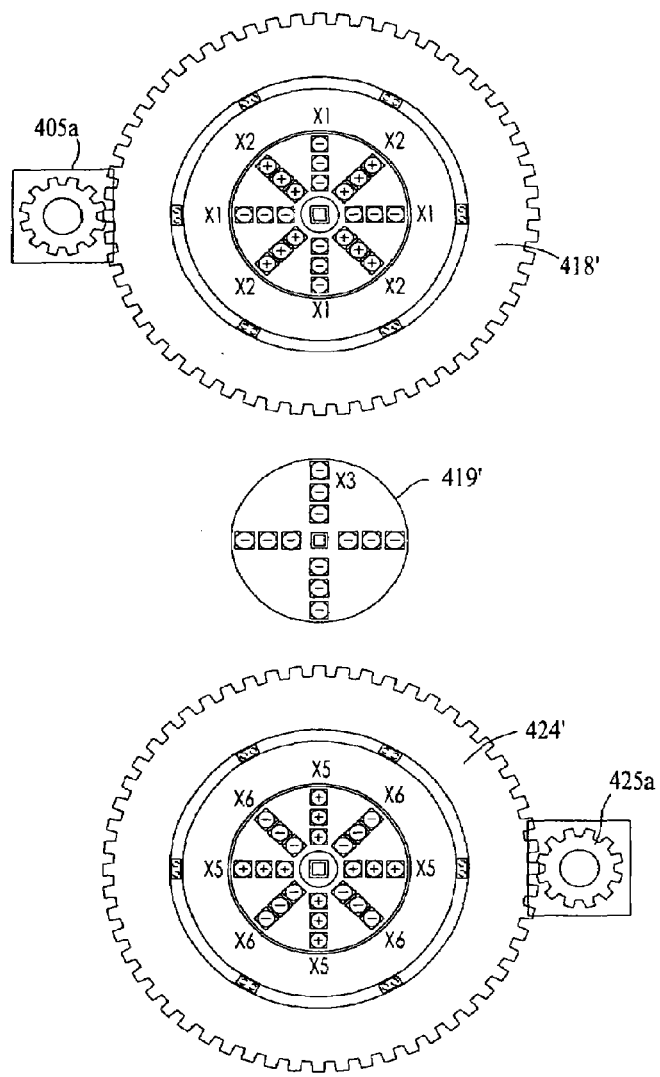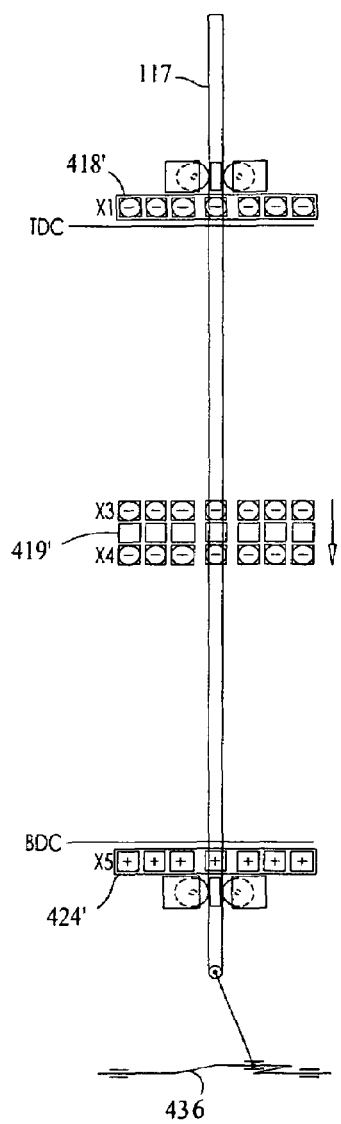
FIG. 63A
FIG. 63B

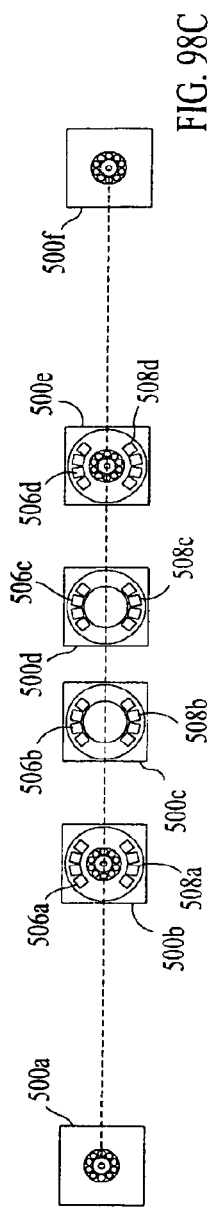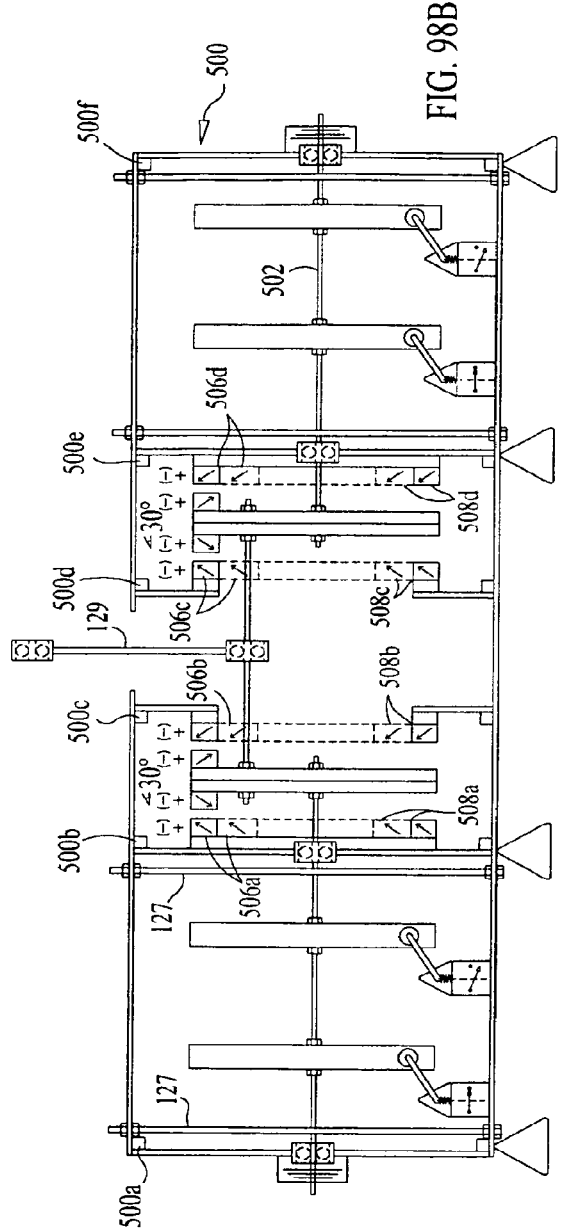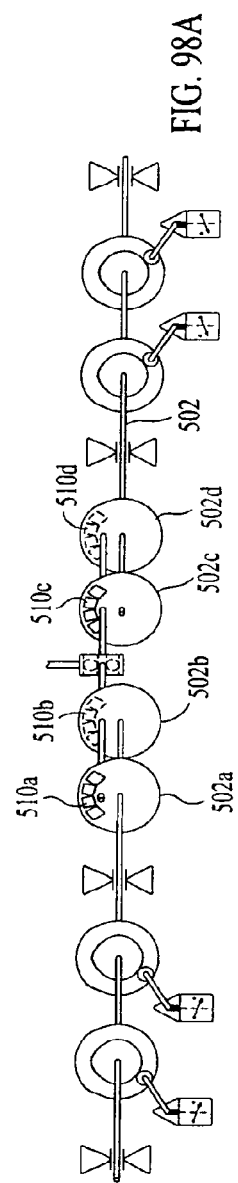
FIG. 98C
FIG. 98B
FIG. 98A

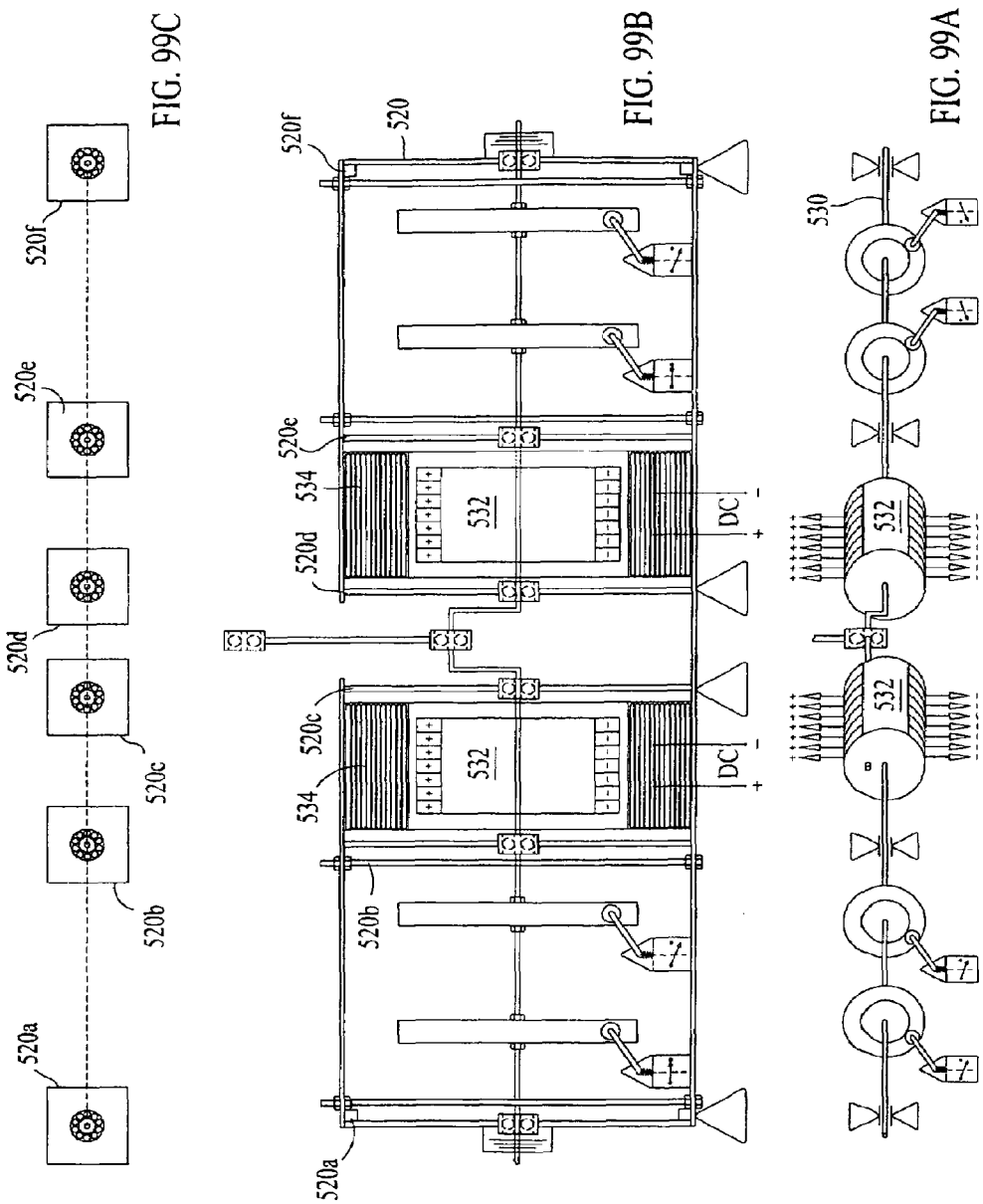

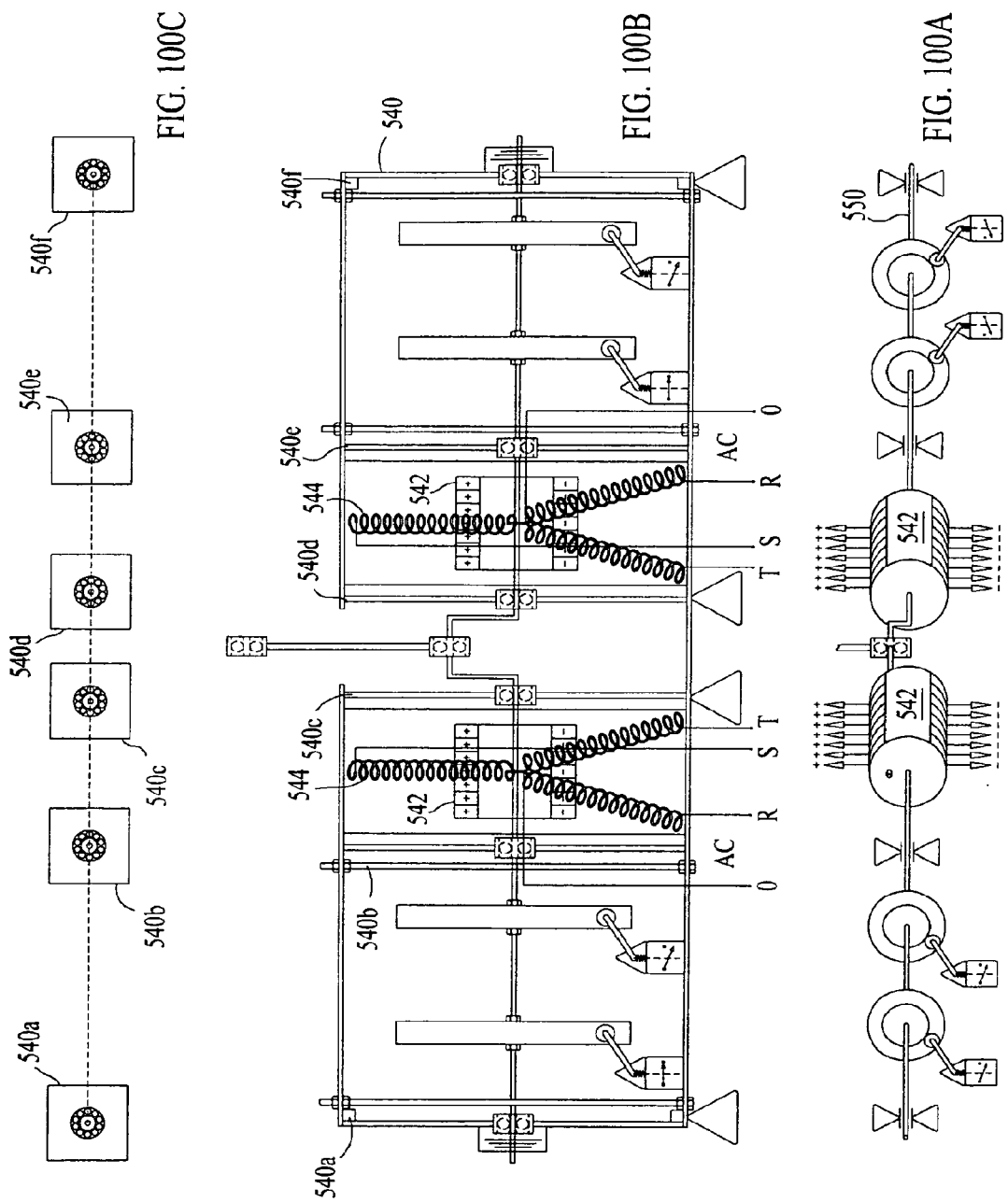

PERMANENT MAGNET FLUX MODULE RECIPROCATING ENGINE AND METHOD

CROSS-REFERENCE TO RELATED APPLICATION

The present application claims priority from provisional patent application Ser. No. 60/649,585, filed on Feb. 3, 2005, entitled PERMANENT MAGNET FLUX FUSION MODULE RECIPROCATING ENGINE AND METHOD.

BACKGROUND OF THE INVENTION

1. Field of the Invention

The invention relates to an engine apparatus and methods for producing work at an output, and more particularly relates to an engine apparatus operated by permanent magnets.

2. Description of the Related Art

Engines have been available that create power from the combustion of fossil fuels. However, fossil fuels are becoming scarce, and the burning of fossil fuels has hazardous consequences for the environment. As such, there is needed is an engine using a standard piston stroke, linear motion, that is converted into a rotary motion, without internal combustion and/or fossil fuels.

U.S. Pat. No. 6,552,450 to Harty et al ("the '450 patent") discloses a reciprocating engine having at least one cylinder forming an inner chamber, at least one piston reciprocatingly movable in the inner chamber of the at least one cylinder, and a unit for reciprocatingly moving the at least one piston in the at least one cylinder, the reciprocatingly moving unit including magnet elements with at least one electromagnet connected with the cylinder and at least another electromagnet connected with the piston, so that when a polarity of the magnet elements is changed, a magnetic interaction of the electromagnets with one another causes the reciprocating movement of the piston. In the '450 patent, the piston is connected with means for converting its reciprocating movement into a rotary movement. The '450 patent discloses that such converting means can include a connecting rod and a crankshaft. Additionally, the '450 patent includes a control device for switching a polarity of the electromagnets. The '450 patent does not utilize permanent magnets. Further, the '450 patent does not move the plates that interact with the piston plate, in order to align magnets of the desired polarities with the fixed polarities of the magnets on the piston.

What is needed is a reciprocating engine that utilizes magnets, the polarities of which are fixed, such that the plates that interact with the piston plate are, themselves, moved, in order to align the desired magnetic polarities on the plates with magnetic polarities on the piston plate.

SUMMARY OF THE INVENTION

It is accordingly an object of the invention to provide a Permanent Magnet Flux Module Reciprocating Engine And Method, which overcomes the above-mentioned disadvantages of the heretofore-known devices and methods of this general type and which A permanent magnet reciprocating engine and method are provided wherein a first field plate having magnetic fields of two polarities interact with the magnetic field of a magnet located on a piston plate. The first field plate is moved to alternately bring the magnetic field of a first polarity and the magnetic field of a second polarity into alignment with the magnetic field of the piston plate, thus alternately attracting and repelling the piston plate to the field plate. The piston plate is connected to a piston rod, which reciprocates along an axis as a result of the alternately attractive and repulsive forces exerted on the piston plate by the field plate. A translation mechanism, such as a crankshaft, translates the linear motion of the piston rod along the axis into rotary motion that can be harnessed as power.

In one particular embodiment, the piston plate is located between two permanent magnet field plates, the movement of which are coordinated to amplify the attractive and repulsive forces on the piston plate located therebetween.

Various drive mechanisms are described, any of which can be used to move the magnetic field plates of the instant invention.

Other features which are considered as characteristic for the invention are set forth in the appended claims.

Although the invention is illustrated and described herein as embodied in a Permanent Magnet Flux Module Reciprocating Engine And Method, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

The present invention and its many features and advantages will be more apparent after reading the following detailed description which refers to the accompanying drawings illustrate the working parts of this invention. Like reference numerals refer to like items throughout the drawing.

FIGS. 18A-18H are representative schematic drawings showing the interaction of a plurality of cams and switches at various points of rotation of a crankshaft, in connection with one particular embodiment of the instant invention.

FIG. 38 is a table of the magnetic characteristics of commonly used or available rare-earth permanent magnets, including NdFeB magnets.

FIGS. 52A, 53A, 54A, 55A, 56A, 57A, 58A, 59A, and 60A are partial exploded views of a plate arrangement, shown at particular points in a 360° cycle of operation of an engine including a rotating double acting module, in accordance with one particular embodiment of the instant invention.

FIGS. 52B, 53B, 54B, 55B, 56B, 57B, 58B, 59B, and 60B are partial side plan views, showing the relative alignments and positions of the magnetic plates in their operable arrangement at the particular points in the cycle of FIGS. 52A, 53A, 54A, 55A, 56A, 57A, 58A, 59A, and 60A, respectively.

FIGS. 61A, 62A, and 63A are partial exploded views of a reciprocating plate arrangement for a rotating double acting module in accordance with certain particular embodiments of the instant invention.

FIGS. 61B, 62B, and 63B are partial side plan views, in their operable arrangement, of the magnetically interacting portions of the reciprocating plate arrangement of FIGS. 61A, 62A, and 63A, respectively.

FIG. 98A is a partial schematic view of a magnetic crankshaft assembly in accordance with one particular embodiment of the instant invention.

FIG. 98B is a partial cutaway view of a magnetic assisted crankshaft assembly and housing.

FIG. 98C is a schematic exploded view of the bearing plates in a crankshaft housing, as shown in FIG. 98B.

FIG. 99A is a partial schematic view of a magnetic crankshaft assembly in accordance with one particular embodiment of the instant invention.

FIG. 99B is a partial cutaway view of a crankshaft assembly and housing with an incorporated power dynamo apparatus.

FIG. 99C is a schematic exploded view of the bearing plates in a crankshaft housing, as shown in FIG. 99B.

FIG. 100A is a partial schematic view of a magnetic crankshaft assembly in accordance with one particular embodiment of the instant invention.

FIG. 100B is a partial cutaway view of a crankshaft assembly and housing with an incorporated power dynamo apparatus.

FIG. 100C is a schematic exploded view of the bearing plates in a crankshaft housing, as shown in FIG. 100B.

DESCRIPTION OF THE PREFERRED EMBODIMENTS

Figure 1:
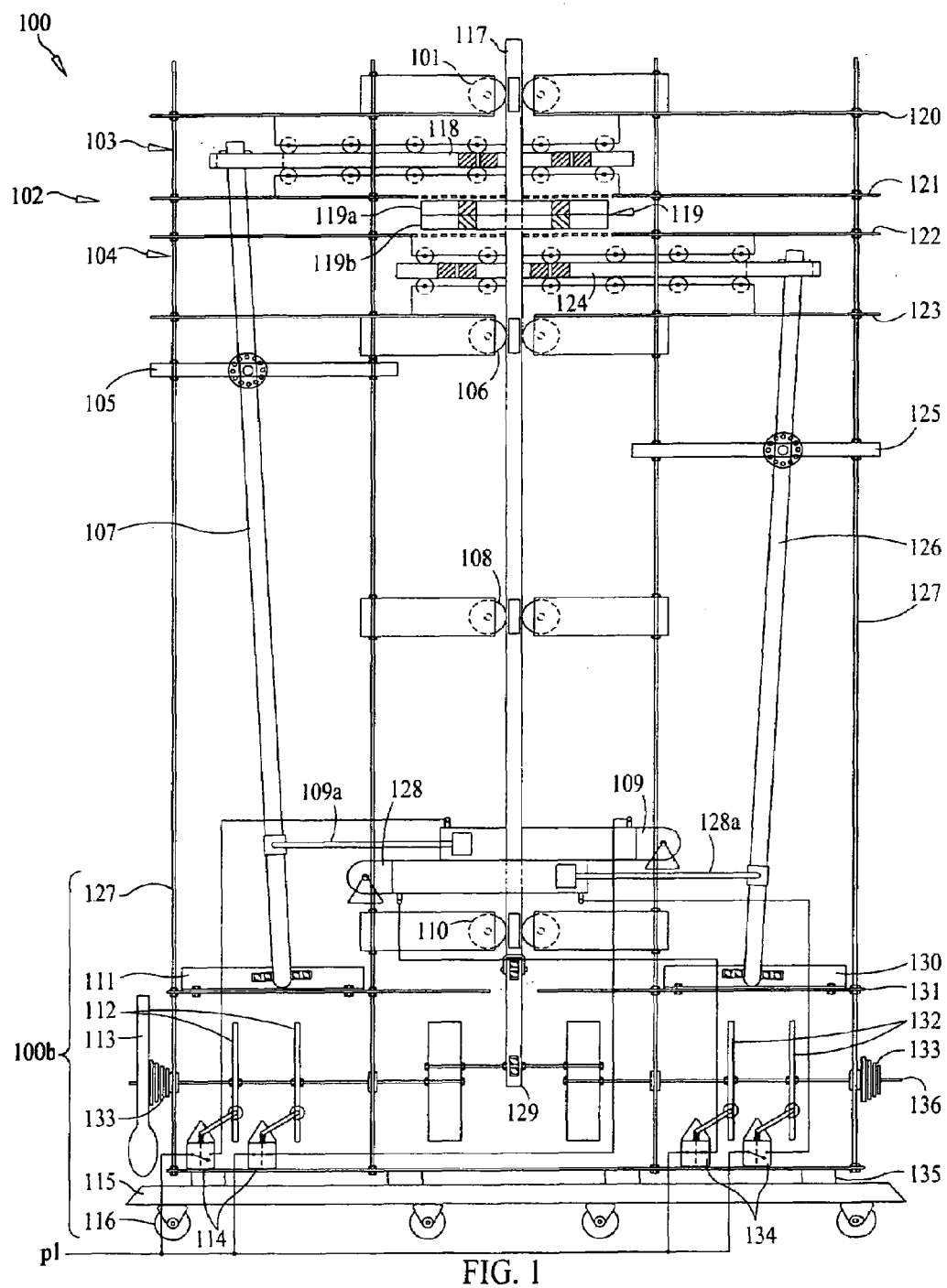
FIGS. 1 and 2 are partial schematic views of a permanent magnet reciprocating engine, taken from the front and side, respectively, in accordance with one particular embodiment of the present invention.

Referring now to the drawings, wherein like reference numerals refer to like elements, there will be described several embodiments of a reciprocating engine apparatus propelled by at least one permanent magnet module, and a permanent magnet module for use therein.

For purposes of understanding the magnet module, a brief discussion of certain magnetic principals used in the operation and/or fabrication of the magnetic module, will be described, as background. For example, it is known that, with magnetic materials, like-poles repel, while unlike-poles attract. In describing the present invention, a first pole of the magnet will be referred to as the (+) pole of the magnet and the second pole of the magnet, will be referred to as the (−) pole. Thus, in the current naming convention, for example, all (+) poles of the magnets represent a magnet's North pole, while all (−) poles represent a magnet's South pole.

Under such a principle represented by the above naming convention, it can be seen that there are four (4) possible conditions that can occur when two strong permanent magnets are brought into close proximity. These conditions are represented in the following Table 1.

TABLE 1

| First Magnet Pole | Second Magnet Pole | Resulting Condition |
|---|---|---|
| + | − | Strong Attractive Force |
| − | + | Strong Attractive Force |
| − | − | Strong Repulsive Force |
| + | + | Strong Repulsive Force |

As can be seen from Table 1, the field forces created by the magnetic fluxes of two permanent magnets interacting with each other, can result in strong attractive or strong repulsive forces. For example, in the first two conditions of Table 1, the opposing magnet poles try to "fuse" with each other, thus resulting in the instant invention additionally being called a mechanical "flux fusion" engine. The last two conditions of Table 2 would, as a result of the two like poles "fusion" together, strongly repel each other. Additionally, it is important to note that the field from each magnet is relatively localized. For example, with a rectangular magnet with a square cross-section, embedded in a material such that the magnetic field from only one of its poles is free to interact with a similarly located other magnet, the field from the magnet is roughly conical or frusto-conical, with the larger end of the cone emanating from the magnet, and the smaller end of the cone being located further from the magnet. Thus, magnetic field is relatively localized based on the distance from the surface of the magnet (i.e., the further away, the smaller the field, envisioned as the point of the inverted cone). Using the above principles, the present invention relates to a permanent magnet propelled, reciprocating mechanism, as will be described in connection with the attached drawings.

As will become clear from a description of the operation of the present invention, any type of permanently charged rare-earth magnets may be used in the present invention. However, there has been developed a variety of types of inexpensive, long lasting permanent magnets. These magnets include a variety of rare earth materials combined to form magnets. One such permanent rare earth magnet that is preferred for use with the present invention is a Neodymium Iron Boron (NdFeB) magnet. Known varieties of the NdFeB magnet include the NdFeB 35, NdFeB 45 and NdFeB 50. Another permanent rare earth magnet that can be used with the present invention is a Samarium Cobalt (SmCo) magnet. Other varieties of permanent magnets can be used as drive source magnets in the present invention. Note that such magnets, although referred to as "permanent", do have limited lifetimes, will deplete in the course of time and will, periodically, require replacement or recharging. A table disclosing the magnetic properties of certain materials is included as FIG. 38. Although all rare-magnets may be considered for use in the instant invention, those marked with an "*" in FIG. 38 have been given special consideration.

More particularly, the instant invention takes advantage of the principles of Table 1, to provide a permanent magnet driven reciprocating engine, powered by an arrangement of magnetic field plate(s) interacting with a magnetic piston plate, and performing work. As will be shown, such permanent magnet driven reciprocating engines are disclosed herein as including permanent magnet flux modules. Modules can be used singly, or a plurality of modules can be used in combination to produce greater amounts of work. See FIGS. 20, 48, 49, 70 and 71. At its most basic, the permanent magnet flux module includes at least one permanent magnetic plate interacting with a magnetic piston plate. In its simplest form, the permanent magnetic plate could be a double-pole magnet.

For example, referring to FIGS. 1-4, there is shown one particular embodiment of a permanent magnet flux module that can be used with the various embodiments of the present invention. In the embodiment shown, the permanent magnet sliding double acting module 102 includes first and second sliding field plates, with a third or piston field plate disposed therebetween. More particularly, upper sliding field plate includes at least one permanent magnet on its lower surface. In this embodiment, and all of the embodiments to follow, such magnet can be one or more double-pole, permanent magnet(s) including both a (+) North and a (−) South pole, or two or more single-pole oriented permanent magnets, having at least one with a (+) North pole and one with a (−) South pole, and/or combinations thereof.

Similarly, in the embodiment of FIGS. 1-4, the permanent magnet flux module or sliding double acting module 102 includes a lower sliding field plate, which includes at least one permanent magnet on its upper face. As with the upper sliding field plate, the lower sliding field plate can include one or more double-pole permanent magnet, or two or more single-pole oriented permanent magnets having different poles, or some combination of the above.

The embodiment of FIGS. 1-4, further includes a piston field plate, which includes at least one magnet on each of the upper surface and the lower surface, permitting the magnets of each side of the piston field plate to interact with the magnets on the upper and lower sliding field plates. Further, in the instant embodiment, the piston field plate only moves up and down, along an axis 'A' through the sliding field plates perpendicular (e.g., +/− a few degrees) to the plane in which the plates slide. In such embodiment, the piston field plate does not rotate about the axis A.

For purposes of explanation, when it is stated in the instant application that a part includes "at least one magnet" or "at least one permanent magnet" on a surface, it is understood that the at least one magnet can be one or more double-pole, permanent magnet(s) including both a (+) North and a (−) South pole, or two or more single-pole oriented permanent magnets, having at least one with a (+) North pole and one with a (−) South pole, and/or combinations thereof.

It is important to note that any engine embodiment disclosed below, could use a type of permanent magnet flux module other than that described in the particular embodiment, and still be within the scope of the instant invention. For example, in another embodiment of the instant invention, in place of the sliding double acting module 102 described in connection with FIG. 1, a sliding single acting module could be chosen which includes only one sliding magnetic field plate (i.e., either the upper sliding field plate or the lower sliding field plate) interacting with the piston field plate. As in the above-described module, one surface of the sliding magnetic field plate can include at least one permanent magnet. Additionally, the piston field plate would include at least one magnet, but only on the surface facing the magnetic surface of the sliding field plate. Additionally, in the instant embodiment, the piston field plate would move up and down along an axis perpendicular to the surface of the sliding magnetic field plate, but would not rotate about that axis.

Another possible permanent magnet flux module that can be used with the instant invention could be a rotating double acting module including two rotating (rather than sliding) magnetic field plates with a non-rotating piston field plate located therebetween. Similar to the embodiment of FIG. 1, an upper rotating field plate would include at least one permanent magnet on its lower surface, while a lower rotating field plate would include at least one permanent magnet on its upper surface. The non-rotating piston field plate would then, include at least one magnet on each of its upper and lower surfaces.

A further embodiment of a permanent magnet flux module that can be used in place of the permanent magnet flux module 102 described in connection with FIG. 1, would be a rotating single acting module including only one rotating magnetic field plate (i.e., either the upper rotating field plate or the lower rotating field plate) interacting with a piston field plate that moves along an axis perpendicular to the surface of the rotating field plate, but does not rotate around that axis. As in the above-described module, one surface of the rotating magnetic field plate would include at least one permanent magnet and the piston field plate would include at least one magnet on the surface facing the magnetic surface of the rotating field plate.

Although, particular exemplary embodiments will be described herebelow, the invention is not so limited, as various elements of the embodiments can be mixed, matched, and modularly expanded, as well as other modifications could be made, all of which would still be within the spirit of Applicant's invention.

Additionally, note that throughout the various embodiments, like reference numerals will refer to like elements. As such, certain elements of one embodiment that have been described in connection with a previous embodiment, will be referenced by the same reference number in both embodiments, and will not be described again.

Pneumatic-Mechanical Actuation

Referring now to FIGS. 1-4, there is shown a permanent magnet driven reciprocating engine 100 in accordance with one particular embodiment of the present invention. The permanent magnet driven reciprocating engine 100, is powered by an arrangement of magnetic plate modules, which take advantage of the principles of Table 1, to slide relative to each other, in the course of which, they perform work. The engine 100 includes an upper drive portion 102 (a portion of which is shown more particularly in FIG. 3) and a lower translation portion 100b (shown more particularly in FIG. 4). The two portions 102 and 100b are connected together via a series of levers and rods, as will be explained more particularly in connection with the embodiment of FIGS. 1 and 2. The magnetic module 102 of the engine 100 is operated so as to drive a piston rod or shaft 117 along an axis, which, in turn, drives a crankshaft 136.

The permanent magnet module 100 includes an upper drive section 102 including at least two sliding, magnetic field plates (i.e., top and bottom magnetic field plates 118 and 124, respectively) and a magnetic piston plate 119 sandwiched in between the top and bottom magnetic field plates 118, 124. In the presently described embodiment, the top, bottom and magnetic piston plates 118, 124 and 119 are roughly rectangular in shape, and include flat or substantially flat, top and bottom surfaces. The plates 118, 124 and 119 are disposed so that their respective planar surfaces are parallel or substantially parallel with respect to each other.

Figure 2:
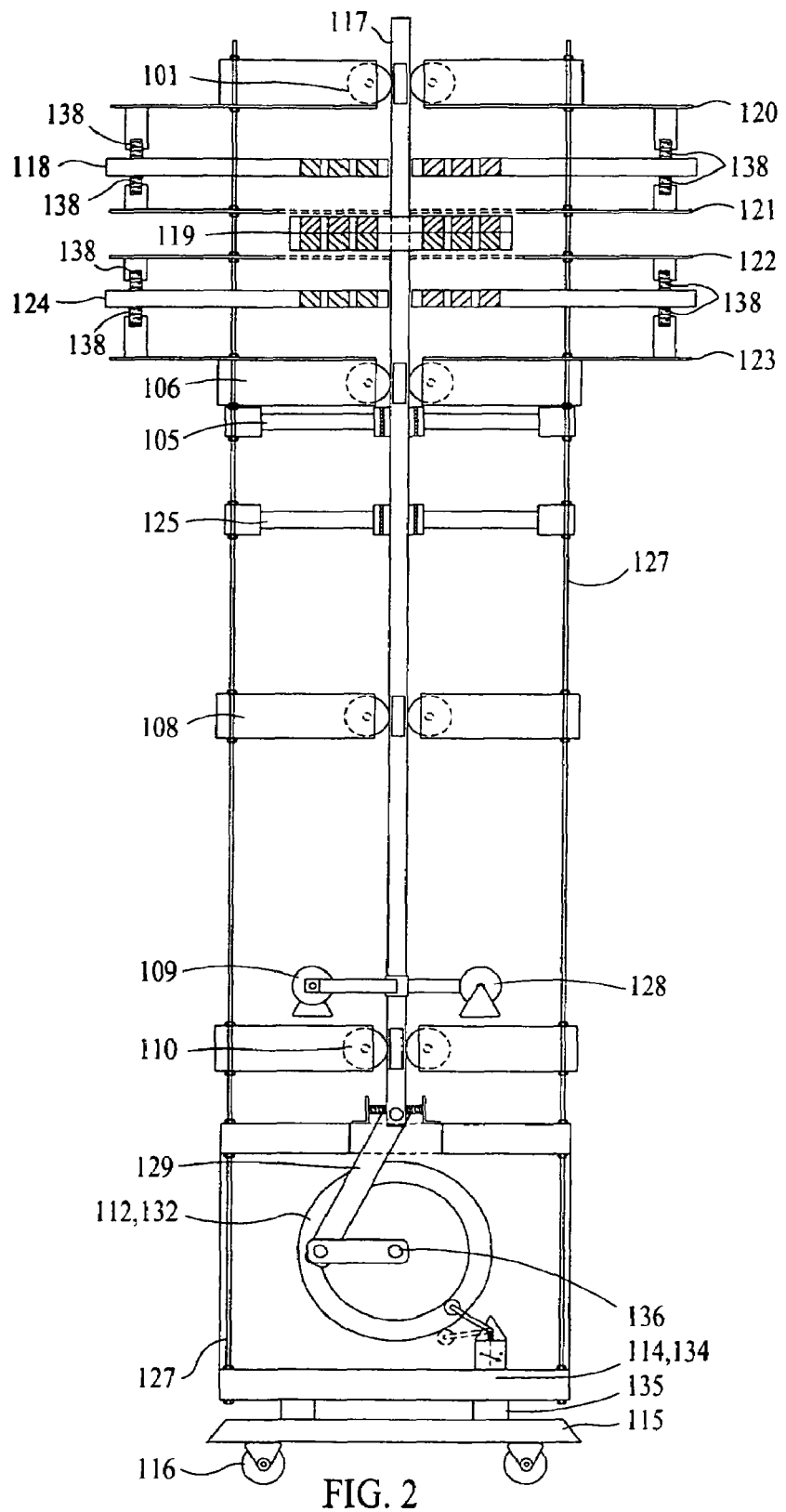
Figure 3:
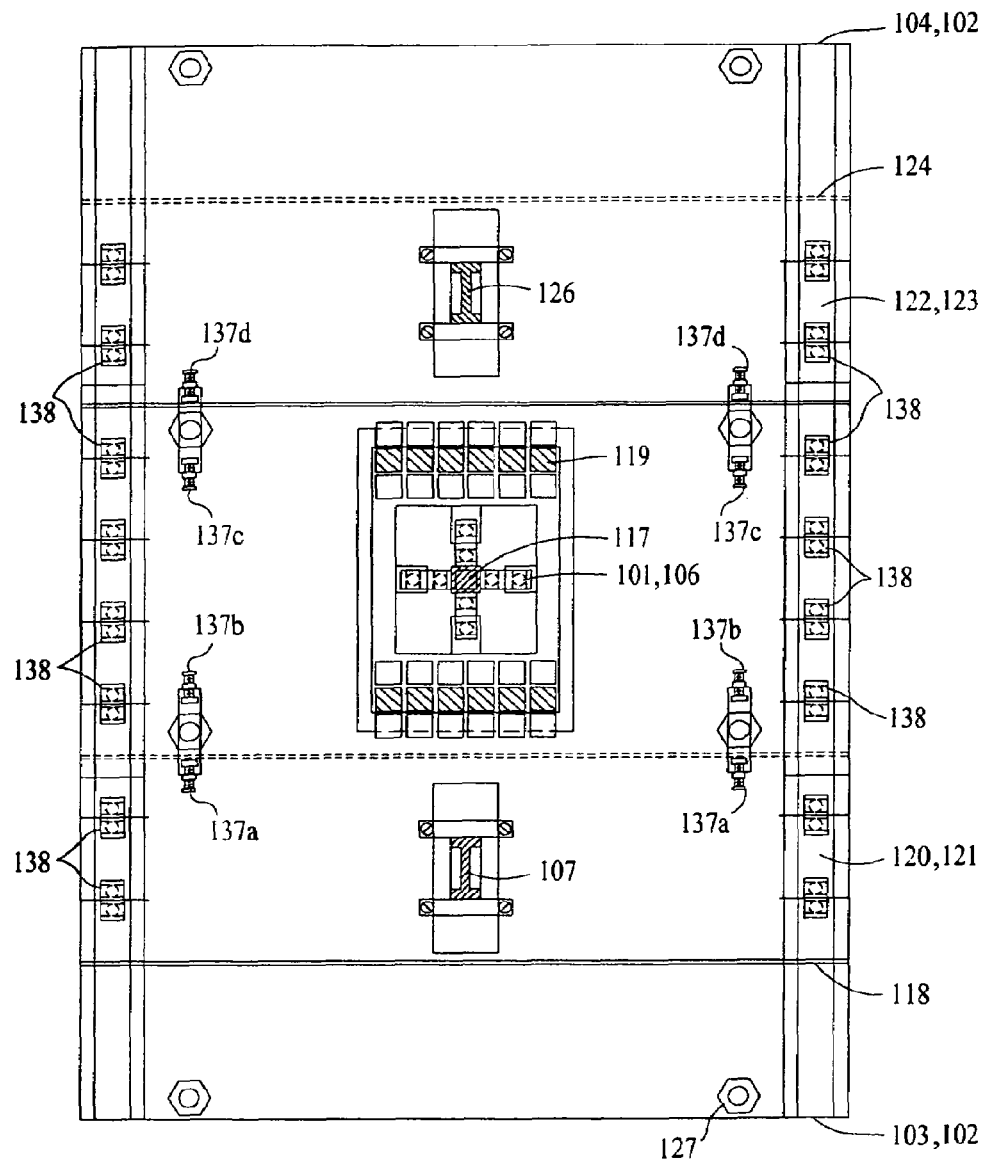
FIG. 3 is a representative view taken from the top of the sliding double acting module of the permanent magnet reciprocating engine of FIG. 1.

As shown more particularly in FIGS. 1-3, the top and bottom magnetic field plates 118, 124, are each supported by a frame assembly, 103, 104, respectively. The top magnetic field plate holder includes a top bearing holder plate 120 and a lower bearing holder plate 121, as shown in FIGS. 1, 2 and 3. In one preferred embodiment of the present invention, the top and lower bearing holder plates 120 and 121, include high speed roller bearings, mounted thereon, to interact with the top magnetic field plate 118, in order to facilitate the sliding of that magnetic field plate 118, as will be described more fully herebelow.

Additionally, the top and lower bearing holder plates 120 and 121 can be made of any suitable non-magnetic material. In one example of the presently described embodiment, the top and lower bearing holder plates 120 and 121 are made of aluminum plates and the roller bearings are mounted below the top bearing holder plate 120 and above the lower bearing holder plate 121. Additionally, any suitable number of roller bearings may be provided. In one particular example, the roller bearings are mounted on each of two edges of the top and lower bearing holder plates 120, 121, parallel to each other, as shown more particularly in FIGS. 1 and 2, in order to engage the edges of the magnetic field plate 118 in a row parallel to the direction of motion of the magnetic block 118 to permit the magnetic field plate 118 to slide more easily. Further, the roller bearings additionally restrict the direction of movement of the magnetic field plate 118, limiting its motion to prevent up and down motion. In one particular embodiment shown in FIGS. 1-3, each row includes six roller bearings 138.

Figures 5A, 5B:
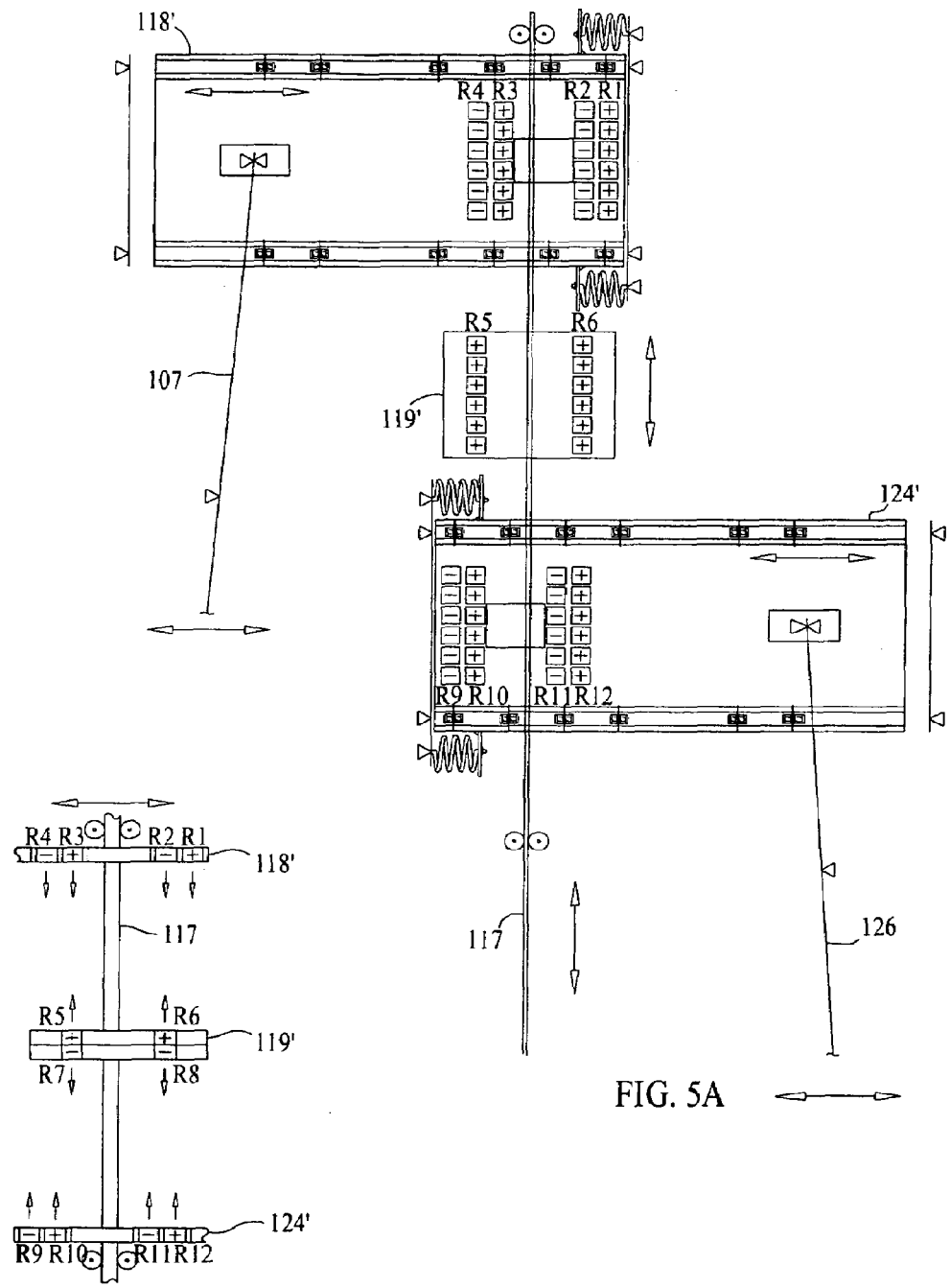
FIGS. 5A is a partial exploded view of a reciprocating plate arrangement of a sliding double acting module in accordance with one particular embodiment of the instant invention.
FIG. 5B is a partial side plan view, in its operable arrangement, of the magnetically interacting portions of the reciprocating plate arrangement of FIG. 5A.
Figures 5C, 5D:
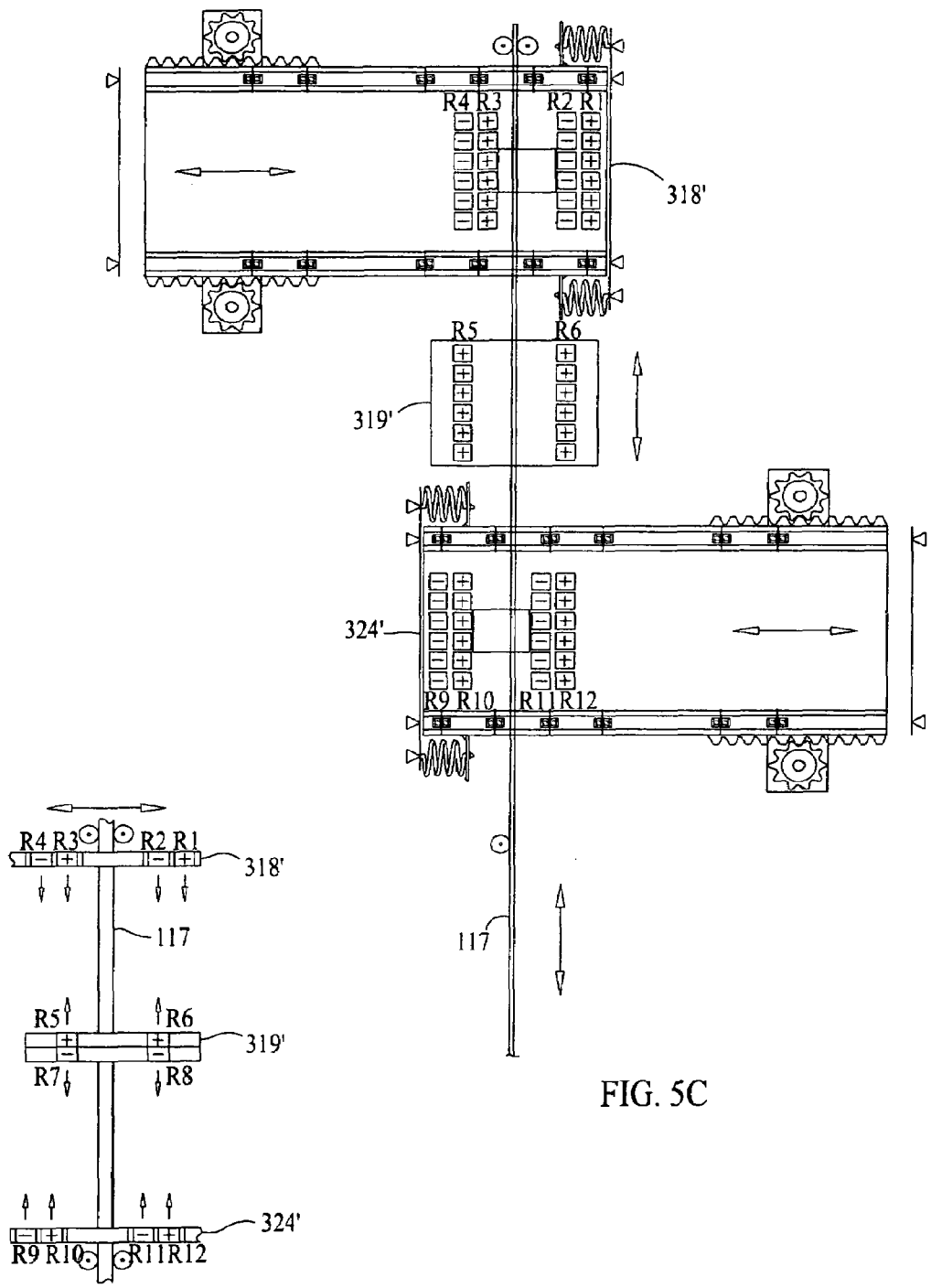
FIGS. 5C is a partial exploded view of a reciprocating plate arrangement of a sliding double acting module in accordance with one particular embodiment of the instant invention.
FIG. 5D is a partial side plan view, in its operable arrangement, of the magnetically interacting portions of the reciprocating plate arrangement of FIG. 5C.

Referring more particularly to FIGS. 5A and 5B, the magnetic field plate 118', in accordance with the principles of the present invention, is made up of a plurality of permanently charged magnets installed in a particular configuration, as will be described more particularly herebelow. In the present particular embodiment, the magnetic field plate 118' includes a supporting member, such as an aluminum plate, onto which several rows of magnets have been mounted. In the particular embodiment shown in FIGS. 5A and 5B, four rows of six (4×6) permanently charged magnets are installed on a support plate in the single polarity orientation, in order to make up the magnetic field plate 118'. Note that this is not meant to be limiting, it can be seen from the principles of the invention, that instead of the two rows of magnets shown on each side of the piston opening on the field plates, a greater number of rows of alternating polarities may be included on each field plate on each side of the piston opening. As such, the drive mechanism would just move each plate to align each row, in turn, with a row on the piston plate, prior to reversing the plate direction. The above expansion could additionally be made to an embodiment of the present invention wherein the field plates are rotated.

Referring back to FIGS. 1-5B, the lower frame assembly 104 for the bottom magnetic block plate 124 is made similarly to that of the upper frame assembly 103. As with the upper frame assembly 103, the lower frame assembly includes and upper bearing holder plate 122 and a lower bearing holder plate 123, both including high speed roller bearings mounted thereto in rows, in order to facilitate the sliding of the magnetic block plate 124. Similarly, the lower magnetic field plate 124 includes a base plate upon which permanent magnets are mounted. In the embodiment in which the upper magnetic block plate 118 includes four rows of six magnets each (4×6), the bottom magnetic block plate 124 would additionally include four rows of six magnets each, arranged as will be discussed below.

As shown more particularly in FIGS. 1 and 2, the upper and lower frame assemblies 103 and 104 are oriented such that the planes containing the magnet bearing surfaces of the magnetic field plates 118 and 124 are arranged facing each other and substantially parallel to each other.

As mentioned above, the magnetic drive section 102 of the engine 100 additionally includes a magnetic piston plate 119 disposed between the upper and bottom magnetic field plates 118 and 124. In the present preferred embodiment, as shown more particularly in FIG. 5, each of the magnetic field plates 118, 124 include four rows of six permanent magnets each and the magnetic piston plate 119 is configured to include two rows of six permanent magnets (2×6) on each side of the magnetic piston plate 119. Note that in each "row" of magnets of the magnetic piston plate, as well as the magnetic field plates, the magnets are aligned by like polarity. As such, the magnetic piston plate 119 has a magnetic surface facing each of the magnetic surfaces of the magnetic field plates 118, 124 and in a plane substantially parallel thereto. As will be discussed more completely in connection with a later described embodiment, once the system is balanced, it is the interaction of the sliding magnetic field plates 118, 124 with the magnetic piston plate 119 that causes the magnetic piston plate 119 to move up and down between the sliding magnetic field plates 118, 124 and, resultantly, drive the engine 100.

It is important to note that, in the above-described magnetic flux module, there are various combinations in which the four rows of six (4×6) magnets on the sliding field plates, and four rows of six (4×6) magnets can be arranged on the piston plate, with two rows on each of the upper and lower planar surfaces, in order to achieve the desired result. In the instant application the figures show sixteen possible combinations of magnetic plates that could be used in the above embodiment, however, other combinations not illustrated in the figures may be used. Table 2 outlines the sixteen magnetic configurations illustrated in the figures, for each of the rows of magnets R1-R12, by polarity.

TABLE 2

Figure 19A:
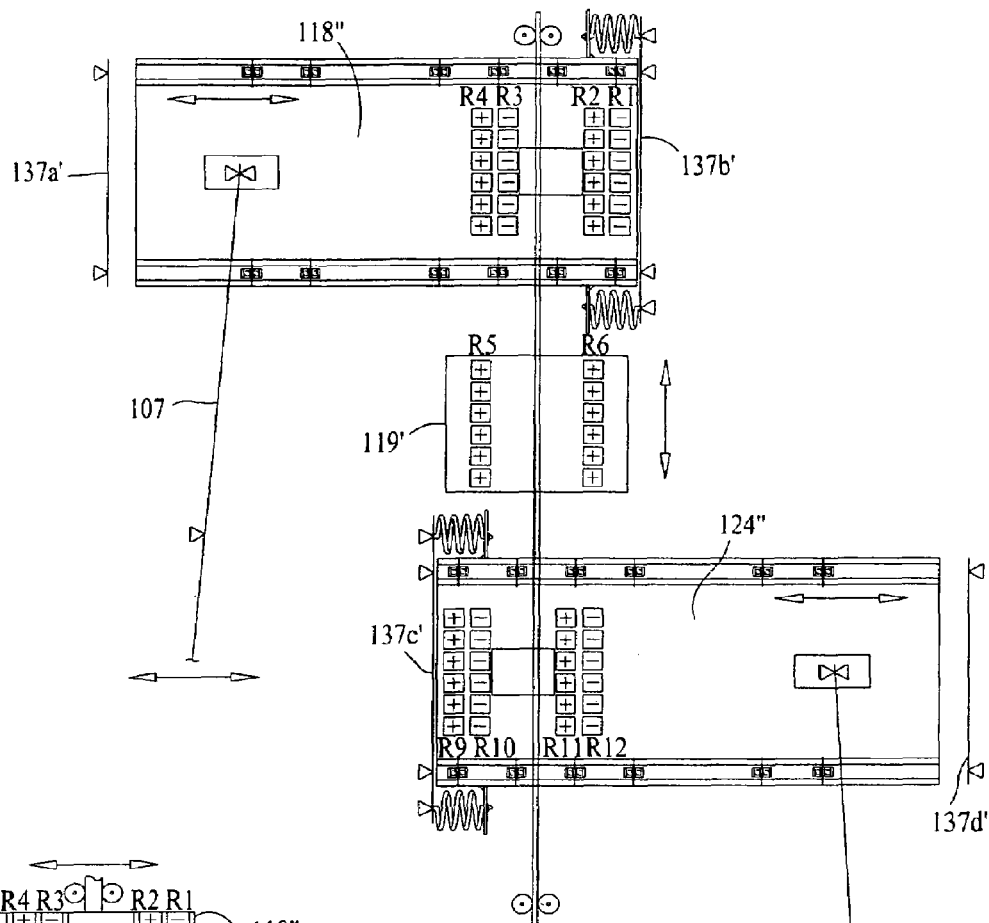
FIG. 19A is a partial exploded view of a reciprocating plate arrangement of a sliding double acting module in accordance with one particular embodiment of the instant invention.
Figure 19B:
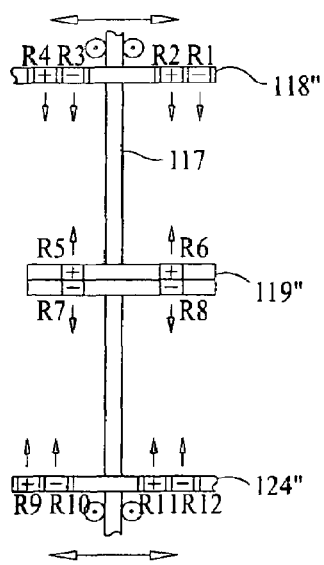
FIG. 19B is a partial side plan view, in its operable arrangement, of the magnetically interacting portions of the reciprocating plate arrangement of FIG. 19A.
Figures 19C, 19D:
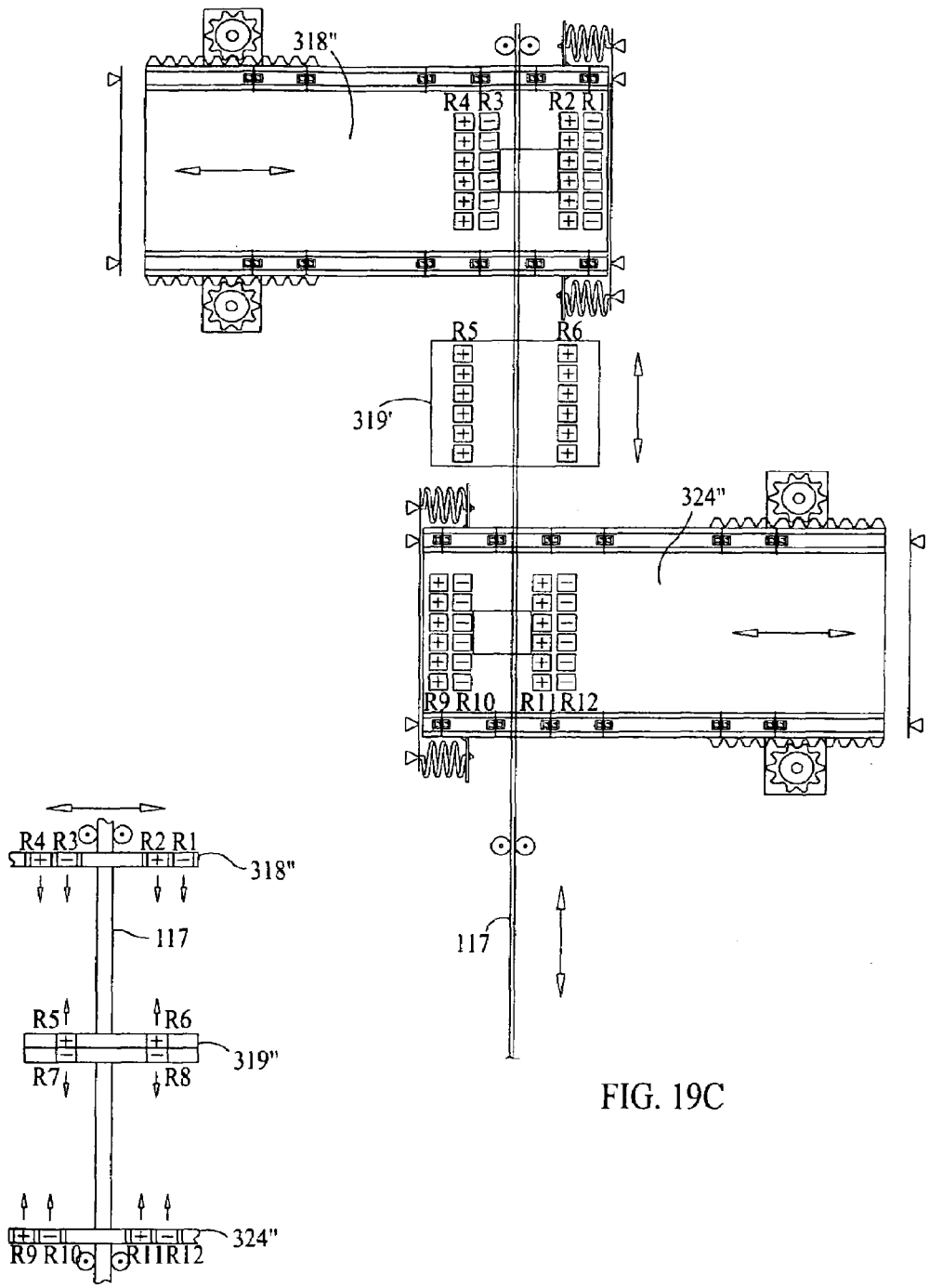
FIGS. 19C is a partial exploded view of a reciprocating plate arrangement of a sliding double acting module in accordance with one particular embodiment of the instant invention.
FIG. 19D is a partial side plan view, in its operable arrangement, of the magnetically interacting portions of the reciprocating plate arrangement of FIG. 19C.
Figures 39A, 39B:
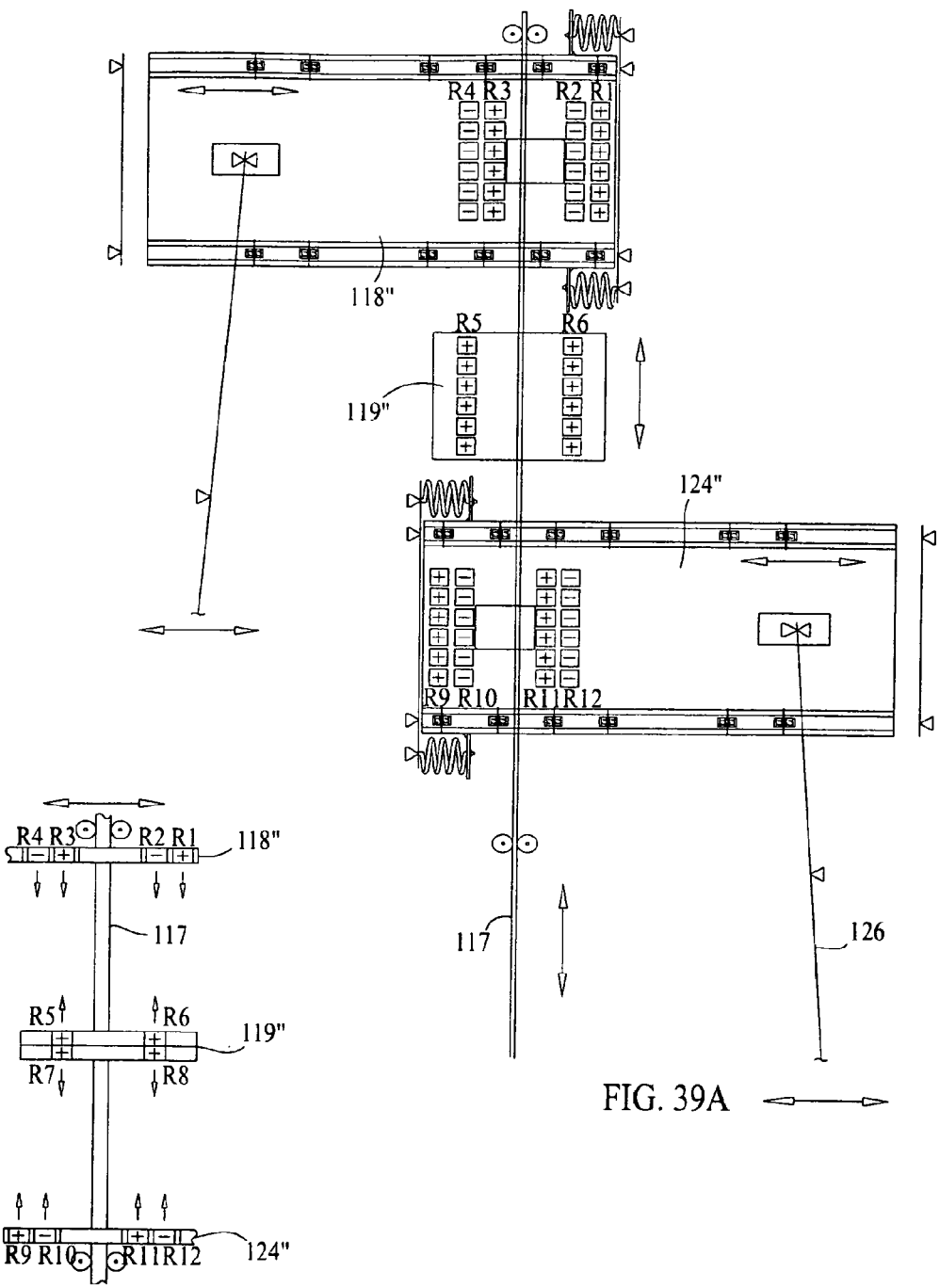
FIGS. 39A is a partial exploded view of a reciprocating plate arrangement of a sliding double acting module in accordance with one particular embodiment of the instant invention.
FIG. 39B is a partial side plan view, in its operable arrangement, of the magnetically interacting portions of the reciprocating plate arrangement of FIG. 39A.
Figures 39C, 39D:
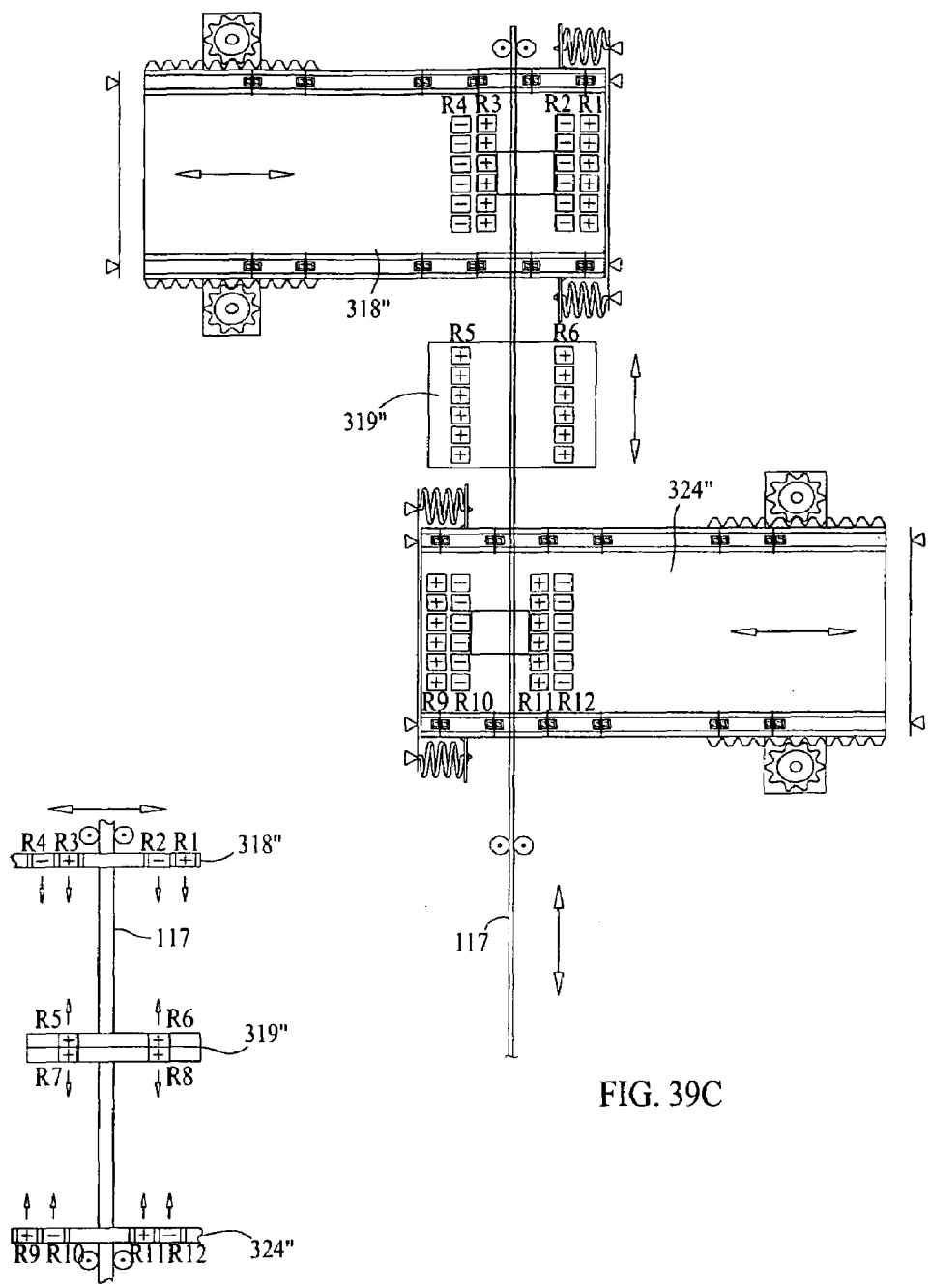
FIG. 39C is a partial exploded view of a reciprocating plate arrangement of a sliding double acting module in accordance with one particular embodiment of the instant invention.
FIG. 39D is a partial side plan view, in its operable arrangement, of the magnetically interacting portions of the reciprocating plate arrangement of FIG. 39C.
Figure 40A:
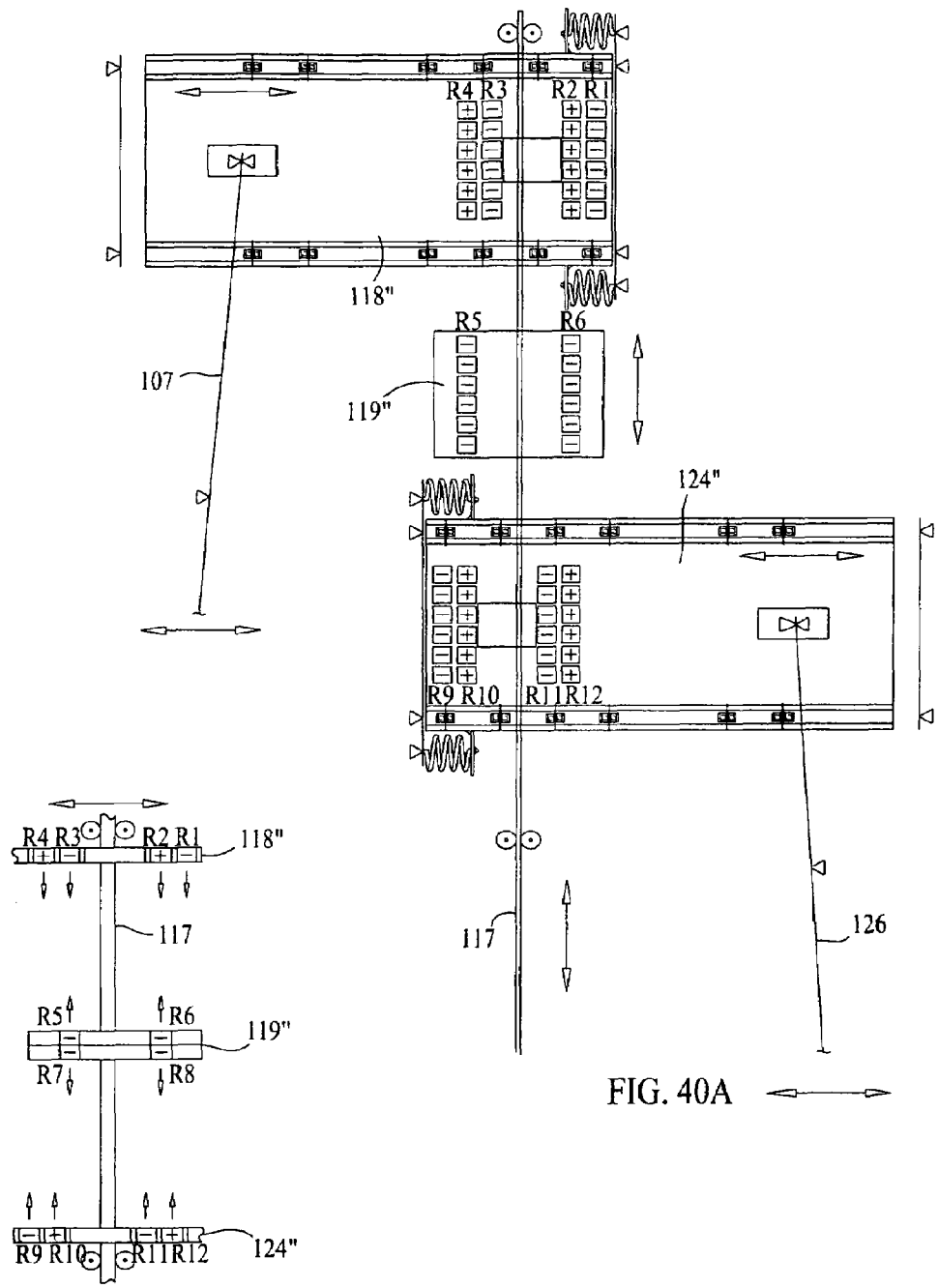
FIG. 40A is a partial exploded view of a reciprocating plate arrangement of a sliding double acting module in accordance with one particular embodiment of the instant invention.
Figure 40B:
FIG. 40B is a partial side plan view, in its operable arrangement, of the magnetically interacting portions of the reciprocating plate arrangement of FIG. 40A.
Figures 40C, 40D:
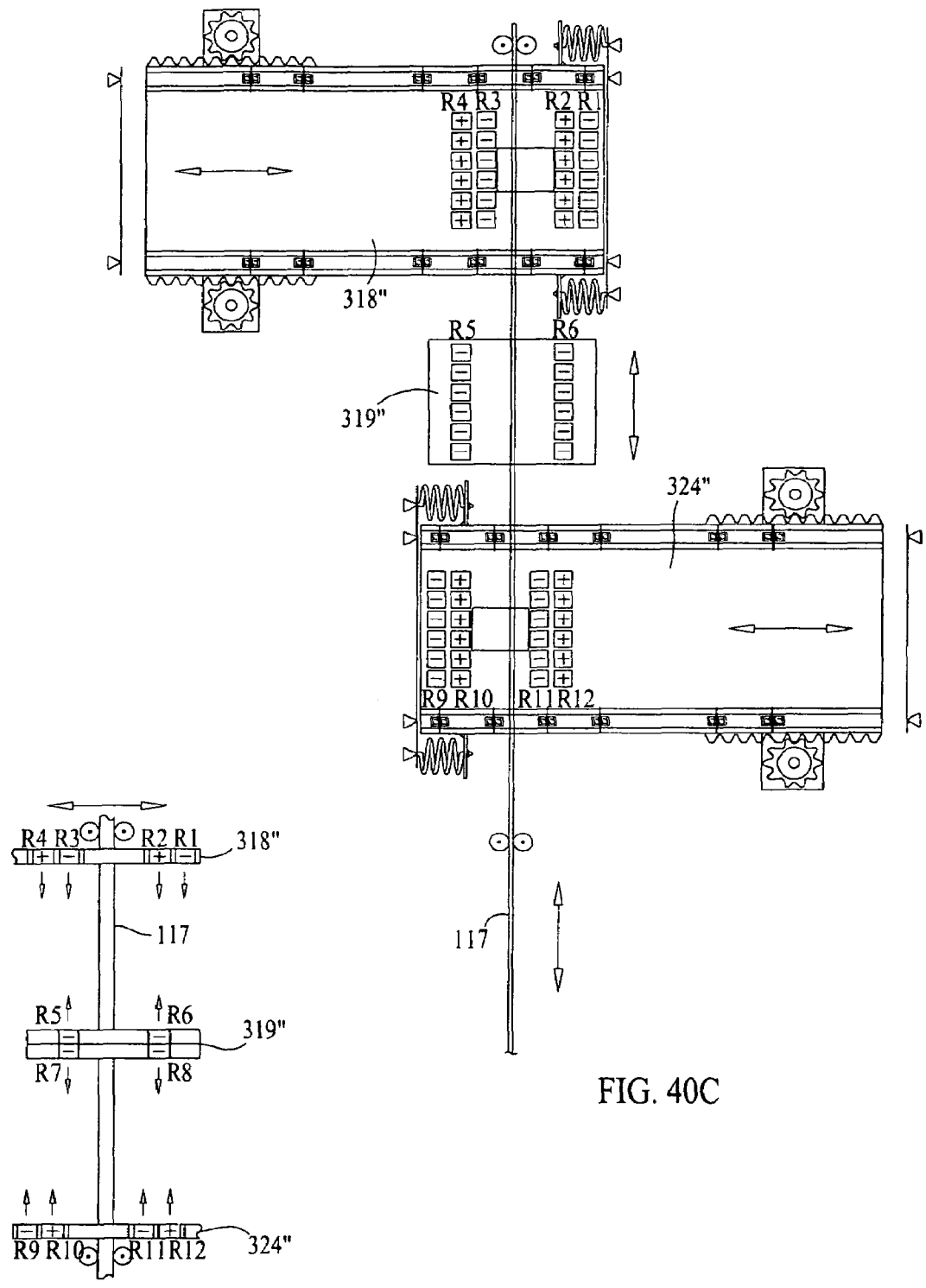
FIG. 40C is a partial exploded view of a reciprocating plate arrangement of a sliding double acting module in accordance with one particular embodiment of the instant invention.
FIG. 40D is a partial side plan view, in its operable arrangement, of the magnetically interacting portions of the reciprocating plate arrangement of FIG. 40C.
Figures 41A, 41B:
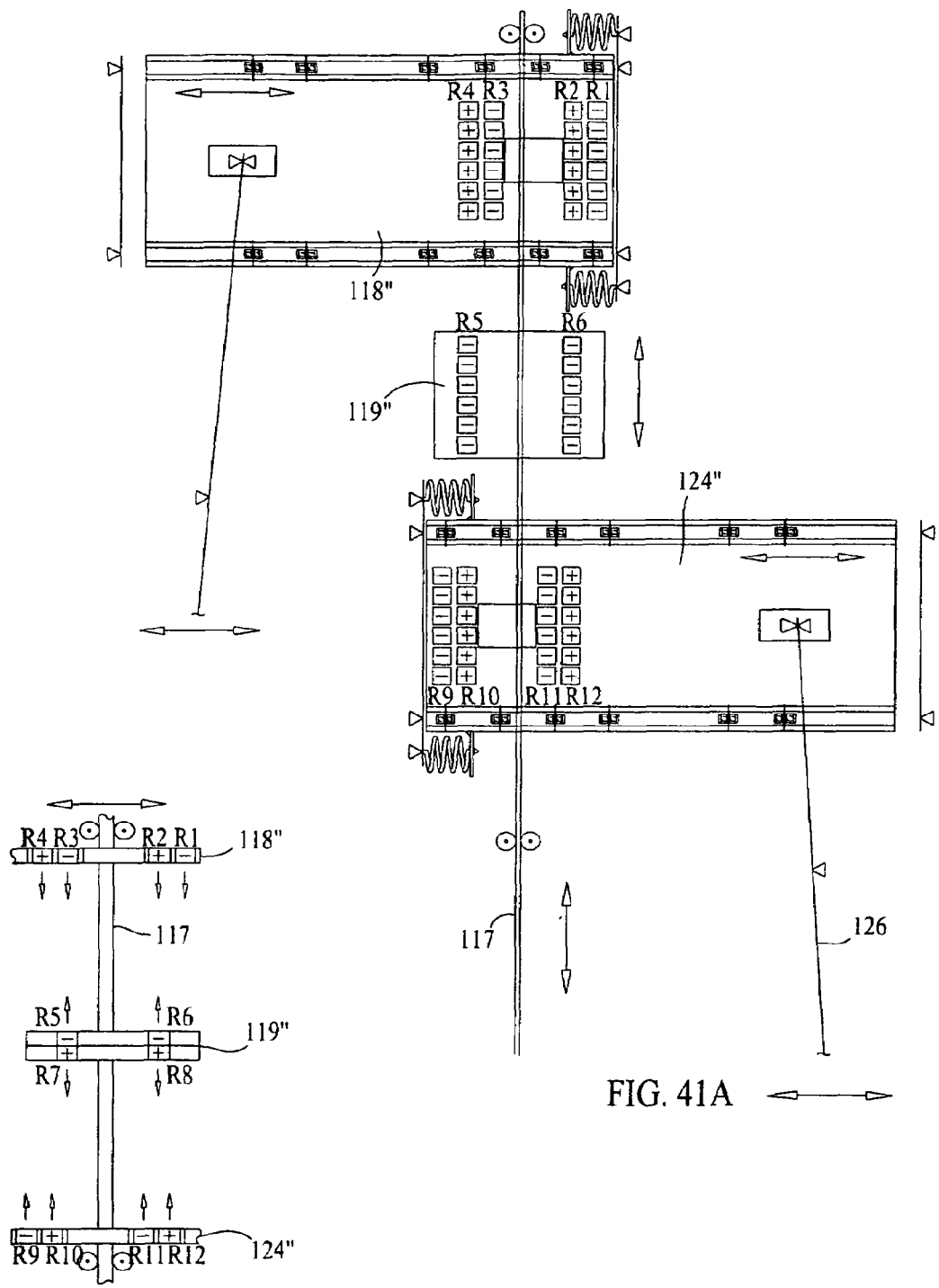
FIG. 41A is a partial exploded view of a reciprocating plate arrangement of a sliding double acting module in accordance with one particular embodiment of the instant invention.
FIG. 41B is a partial side plan view, in its operable arrangement, of the magnetically interacting portions of the reciprocating plate arrangement of FIG. 41A.
Figures 41C, 41D:
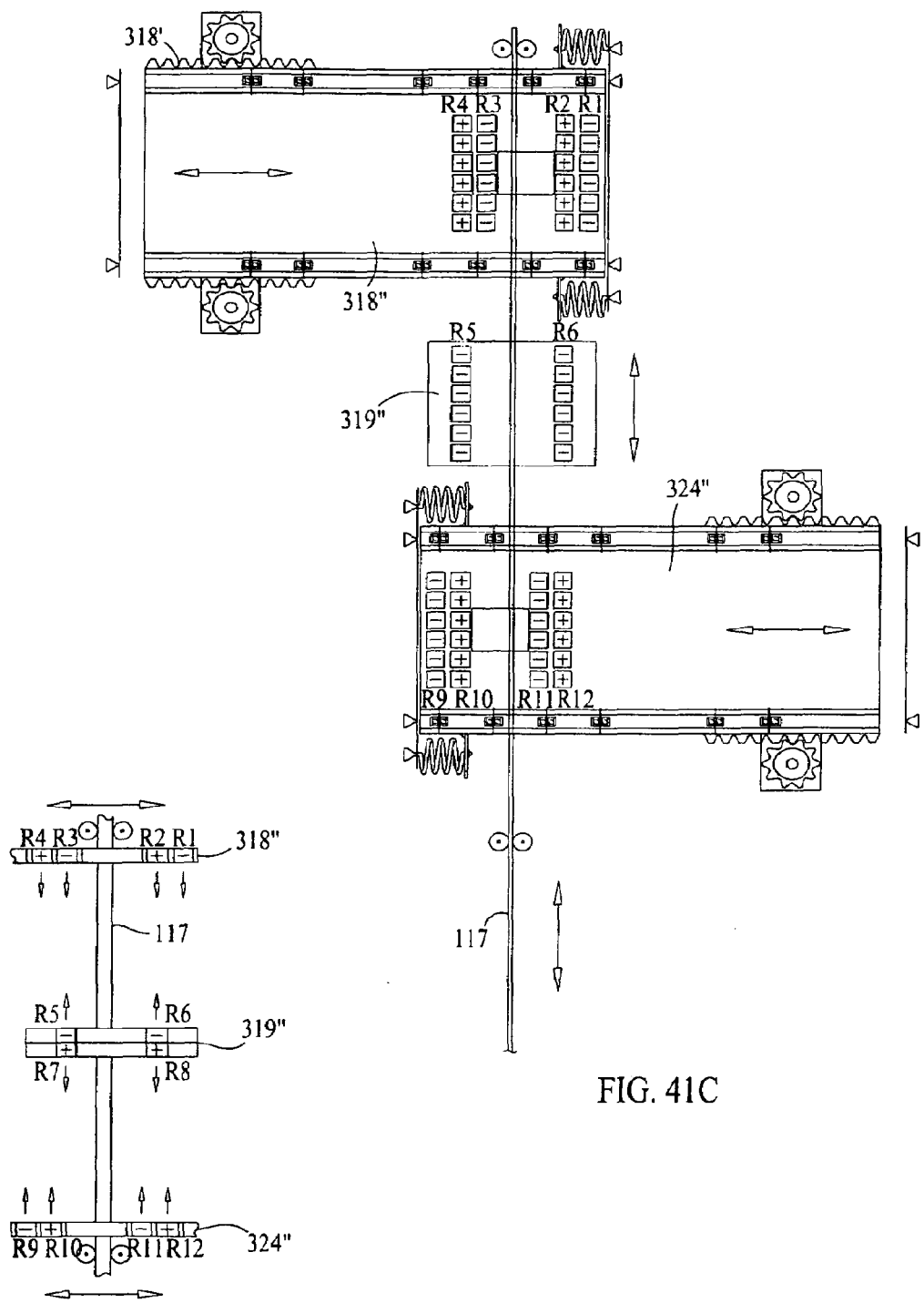
FIGS. 41C is a partial exploded view of a reciprocating plate arrangement of a sliding double acting module in accordance with one particular embodiment of the instant invention.
FIG. 41D is a partial side plan view, in its operable arrangement, of the magnetically interacting portions of the reciprocating plate arrangement of FIG. 41C.
Figure 42:
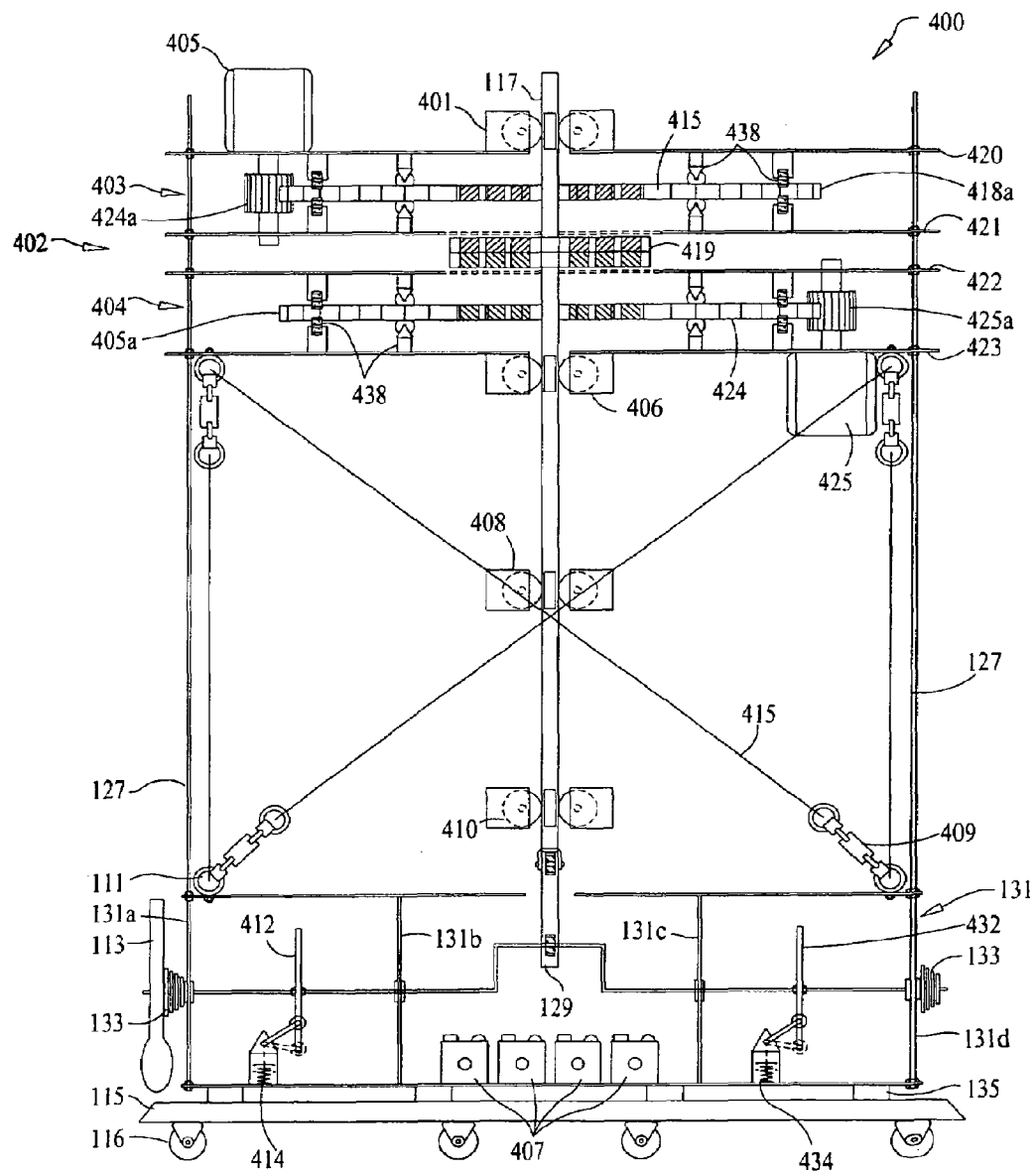
FIGS. 42 and 43 are partial schematic views of a permanent magnet reciprocating engine, taken from the front and side, respectively, in accordance with another particular embodiment of the present invention.
Figure 43:
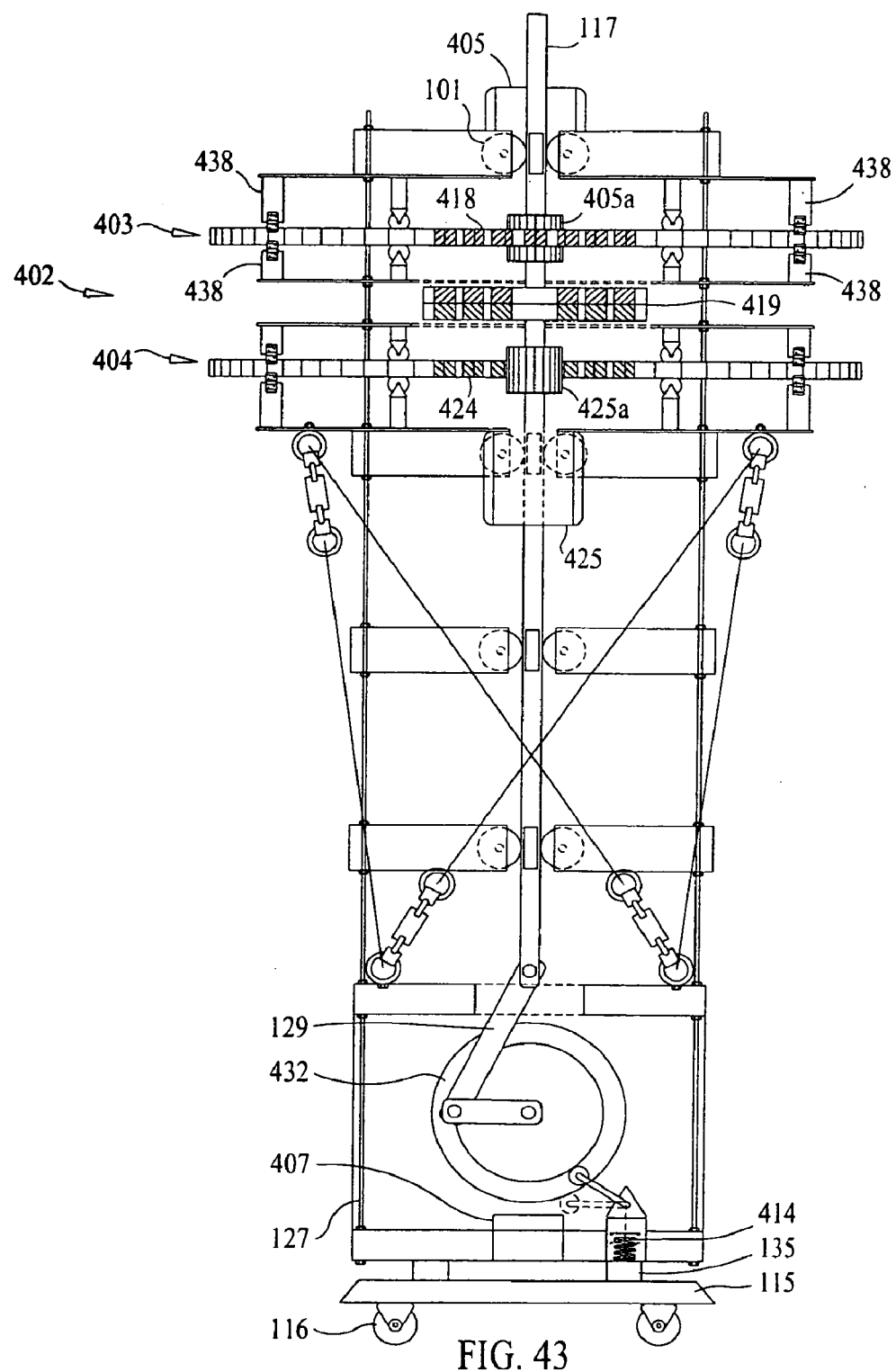
Figure 44:
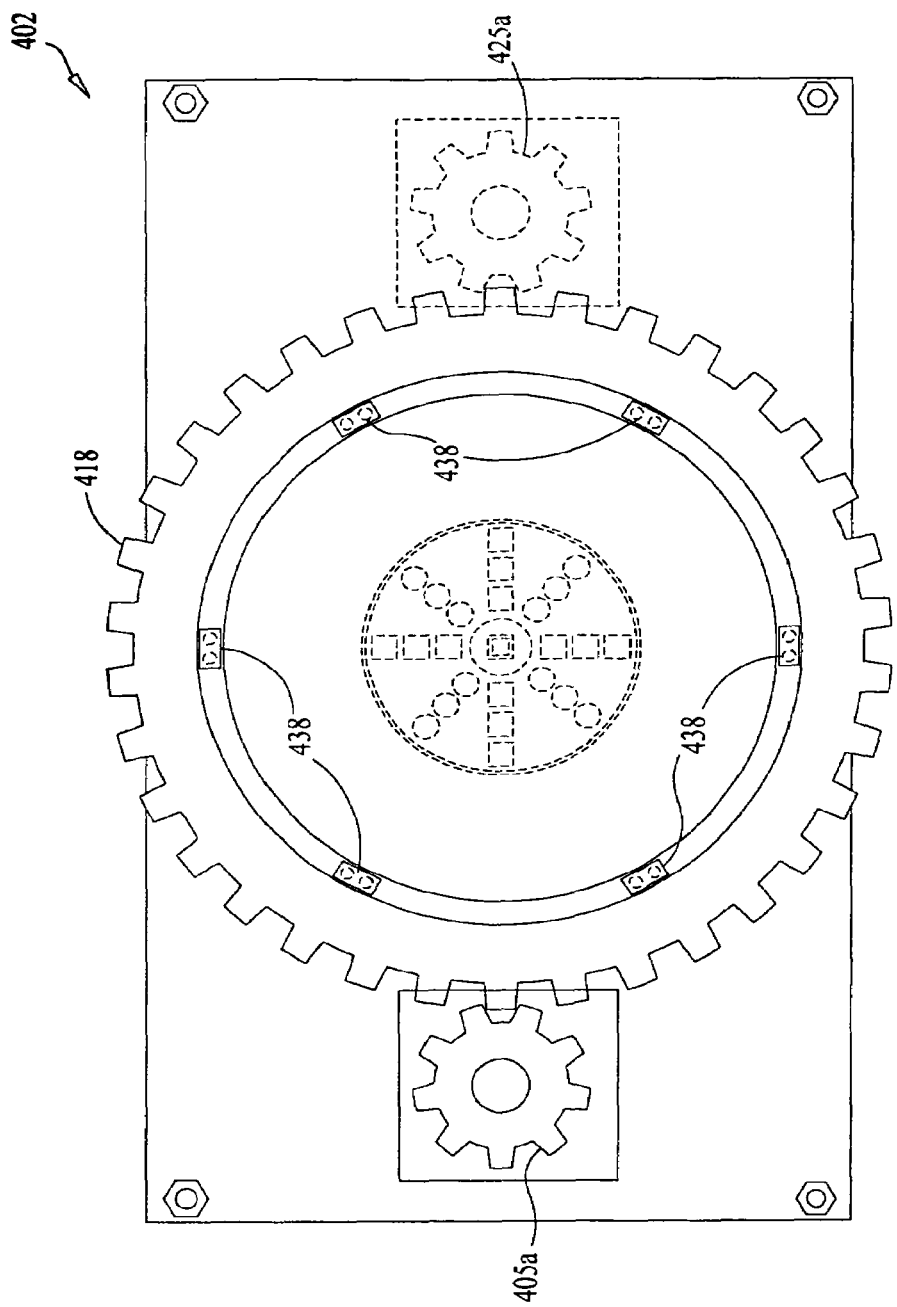
FIG. 44 is a representative view taken from the top of the sliding double acting module of the permanent magnet reciprocating engine of FIG. 42.
Figure 45:
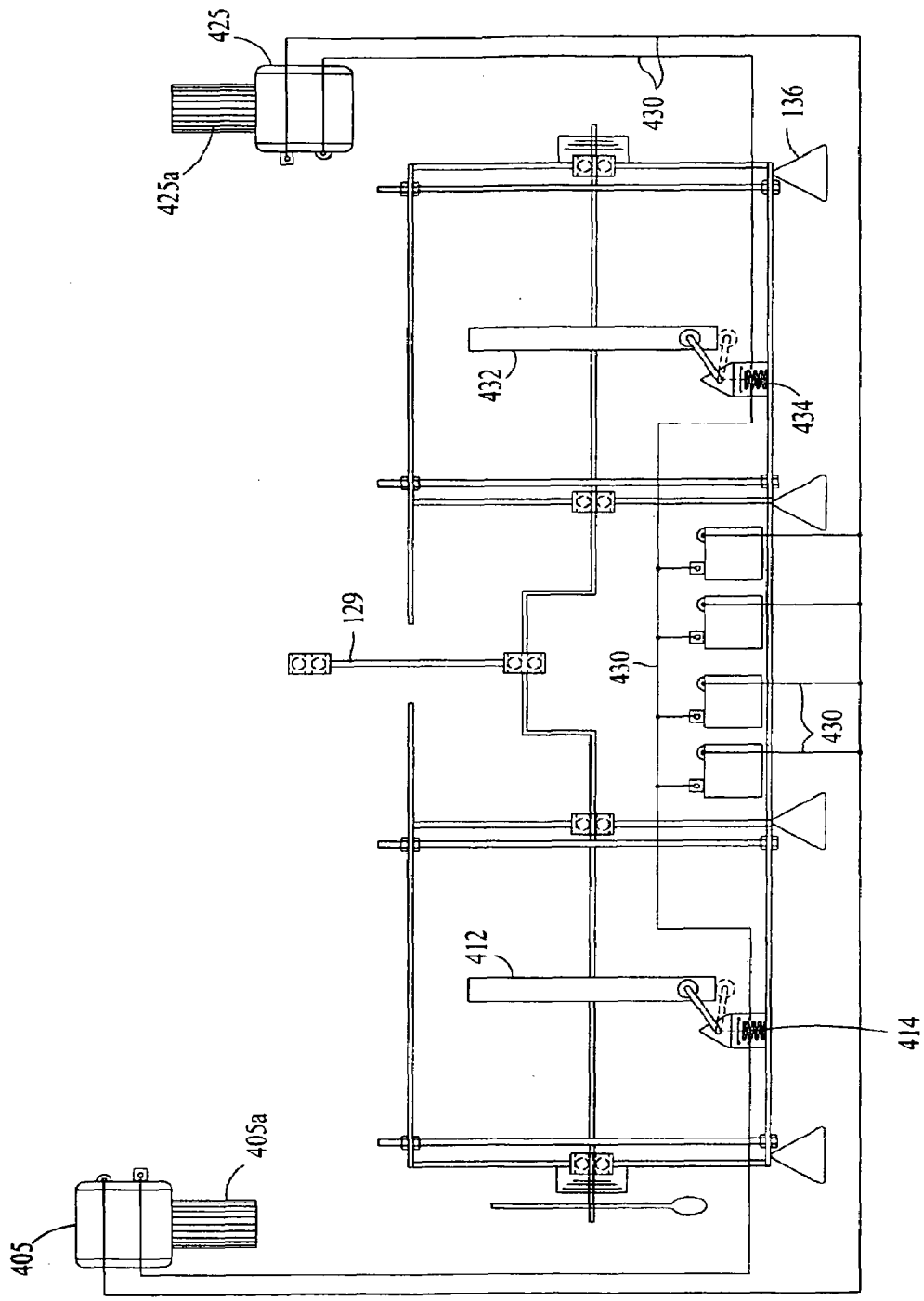
FIG. 45 is a partial cutaway schematic representation of the drive portion of a permanent magnet reciprocating engine in accordance with one particular embodiment of the present invention.
Figure 46:
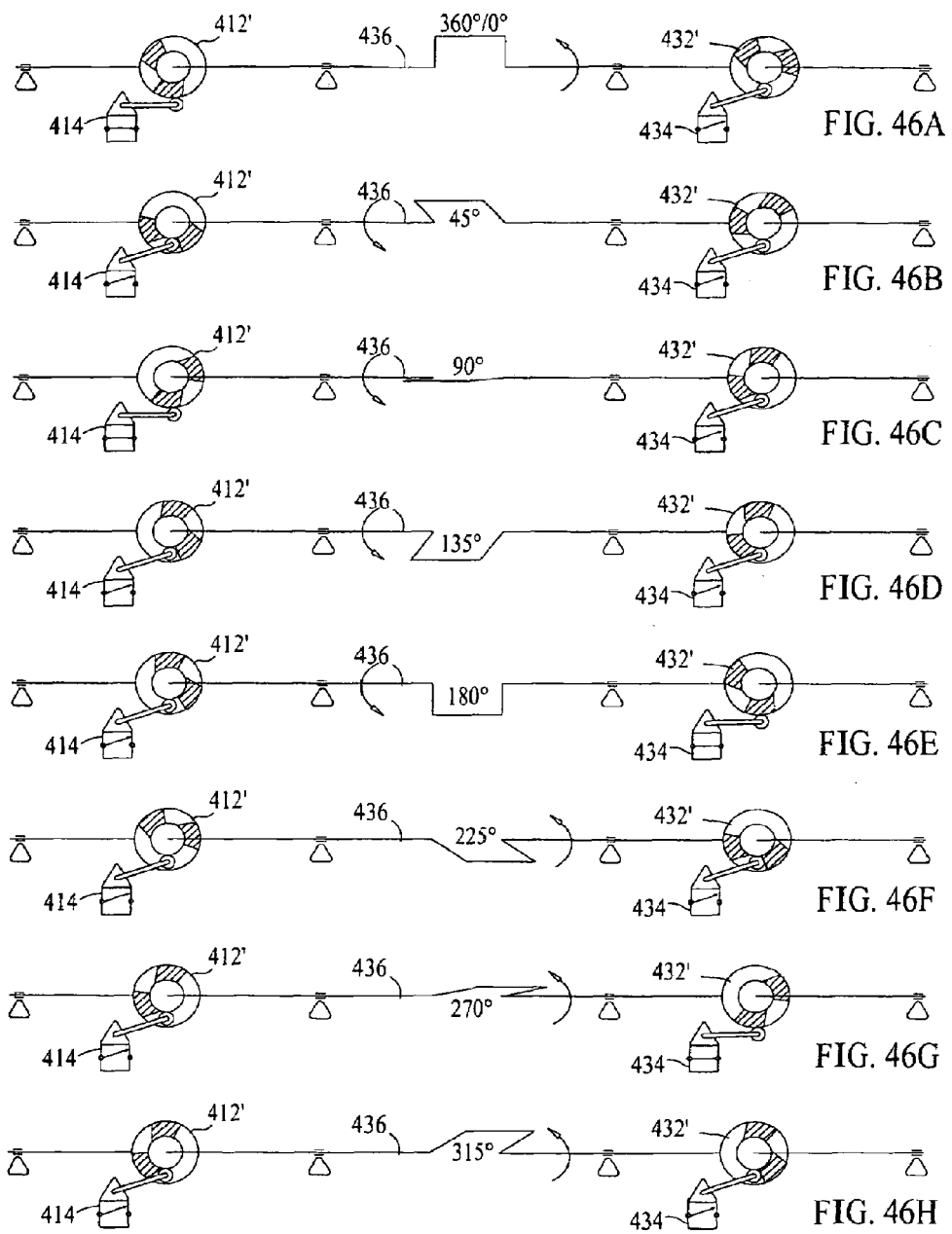
FIGS. 46A-46H are representative schematic drawings showing the interaction of a plurality of cams and switches at various points of rotation of a crankshaft, in connection with one particular embodiment of the instant invention.
Figures 85A, 85B:
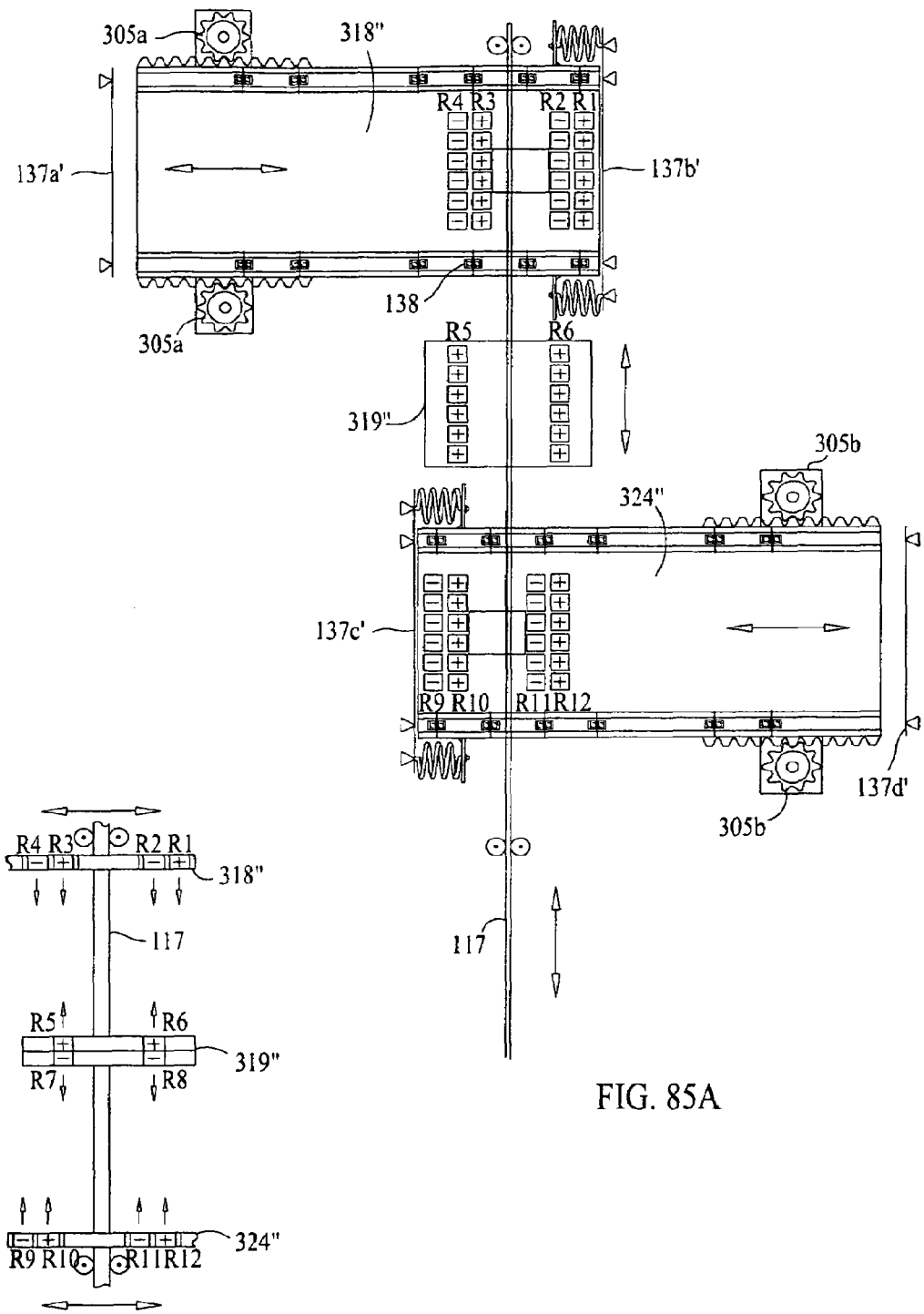
FIGS. 85A, 86A, 87A, 88A, 89A, 90A, 91A, 92A, 93A, 94A, 95A, 96A, 97A are partial exploded views of a reciprocating plate arrangement of a sliding double acting module in accordance with certain particular embodiments of the instant invention.
FIGS. 85B, 86B, 87B, 88B, 89B, 90B, 91B, 92B, 93B, 94B, 95B, 96B, 97B are partial side plan views, in their operable arrangement, of the magnetically interacting portions of the reciprocating plate arrangements of FIGS. 85A, 86A, 87A, 88A, 89A, 90A, 91A, 92A, 93A, 94A, 95A, 96A, 97A, respectively.
Figures 86A, 86B:
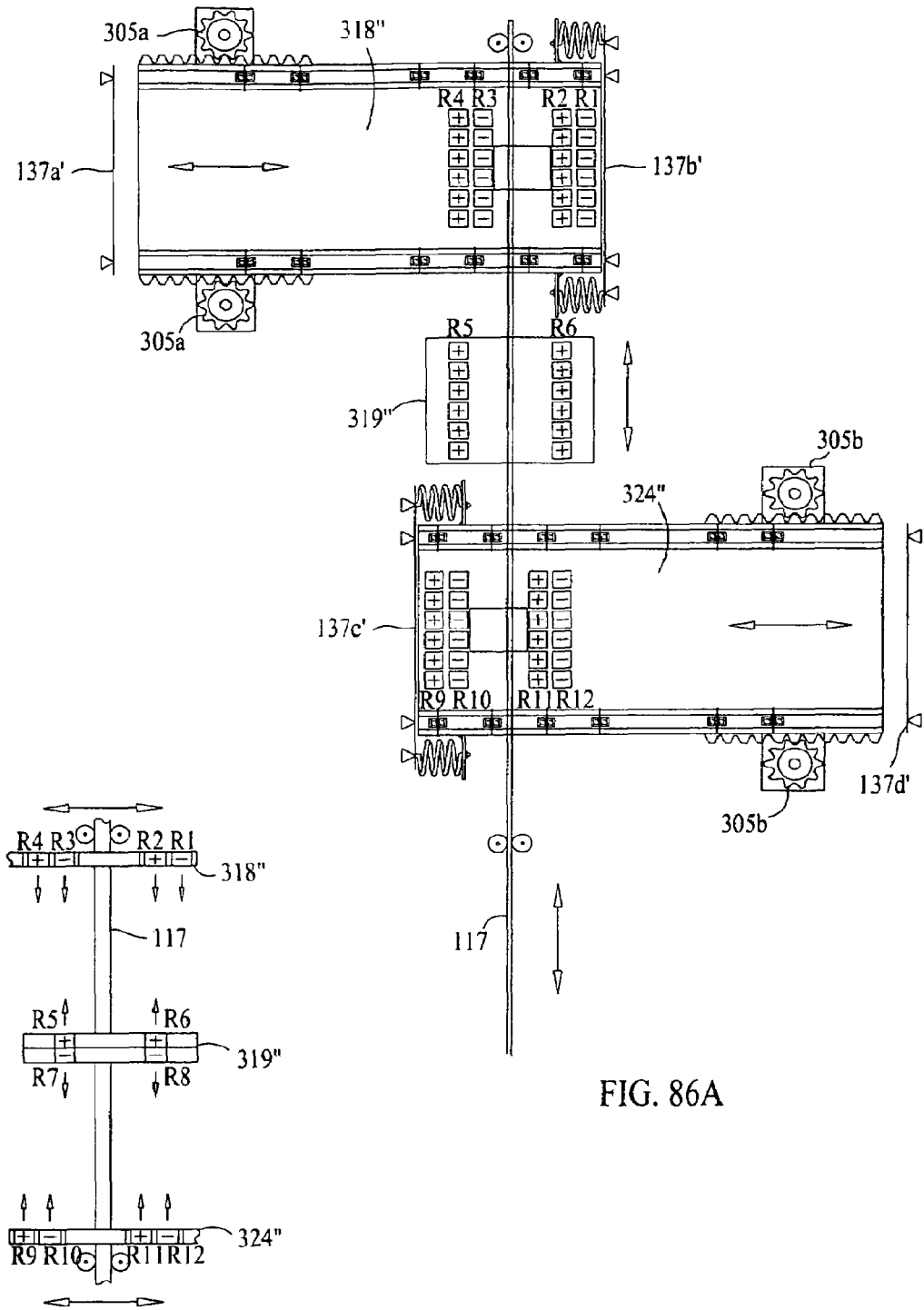
Figures 87A, 87B:
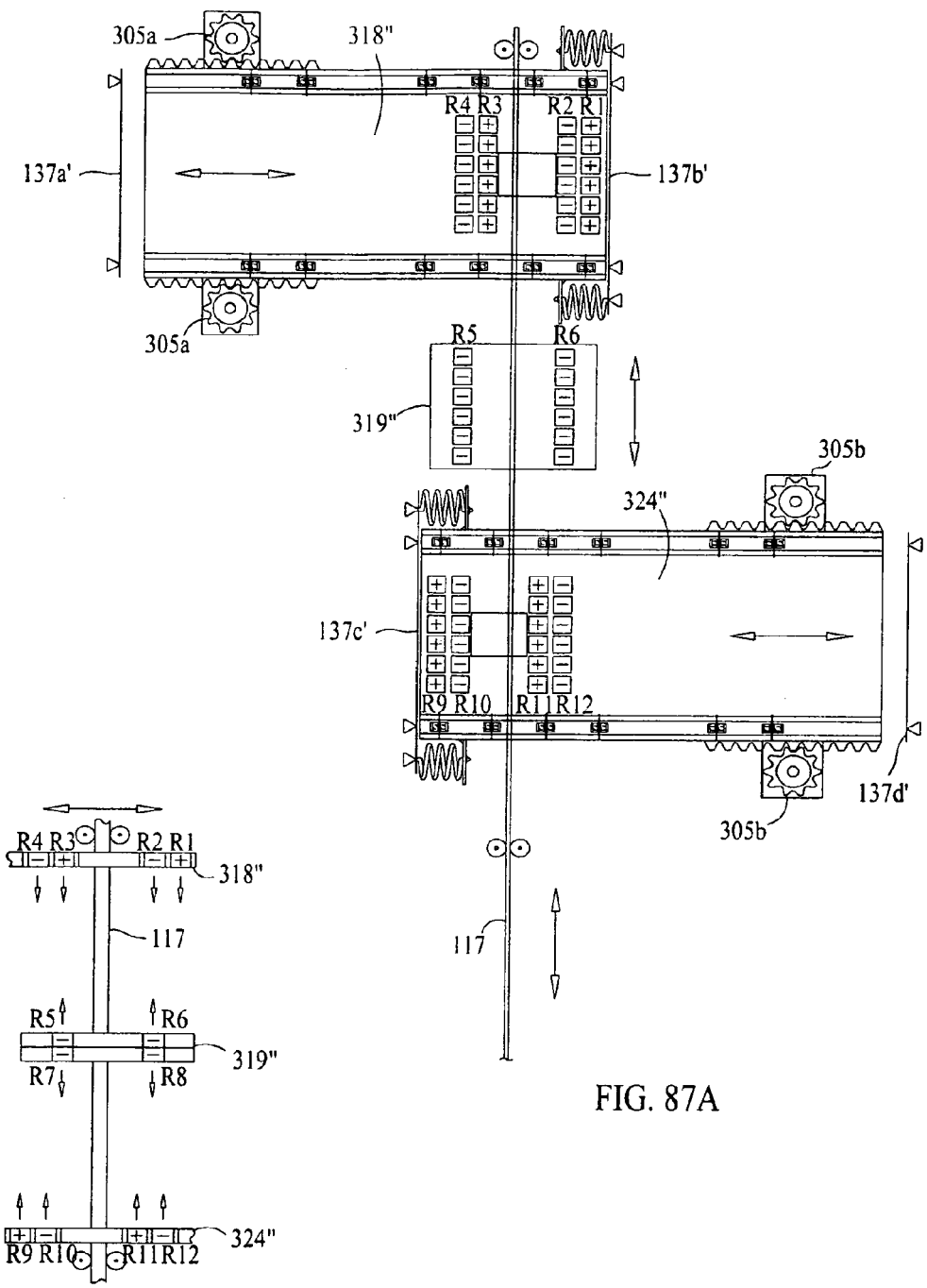
Figures 88A, 88B:
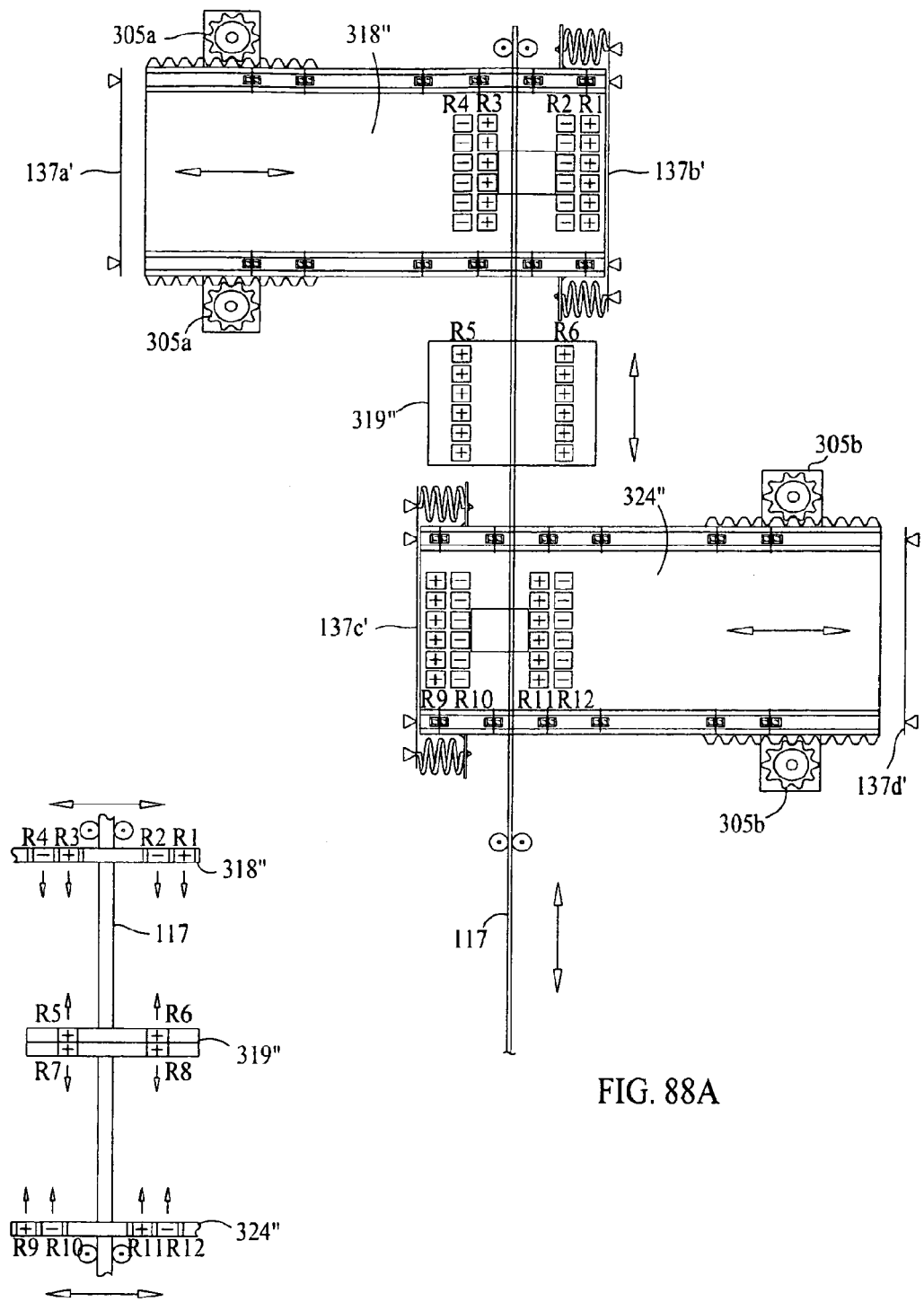
Figures 89A, 89B:
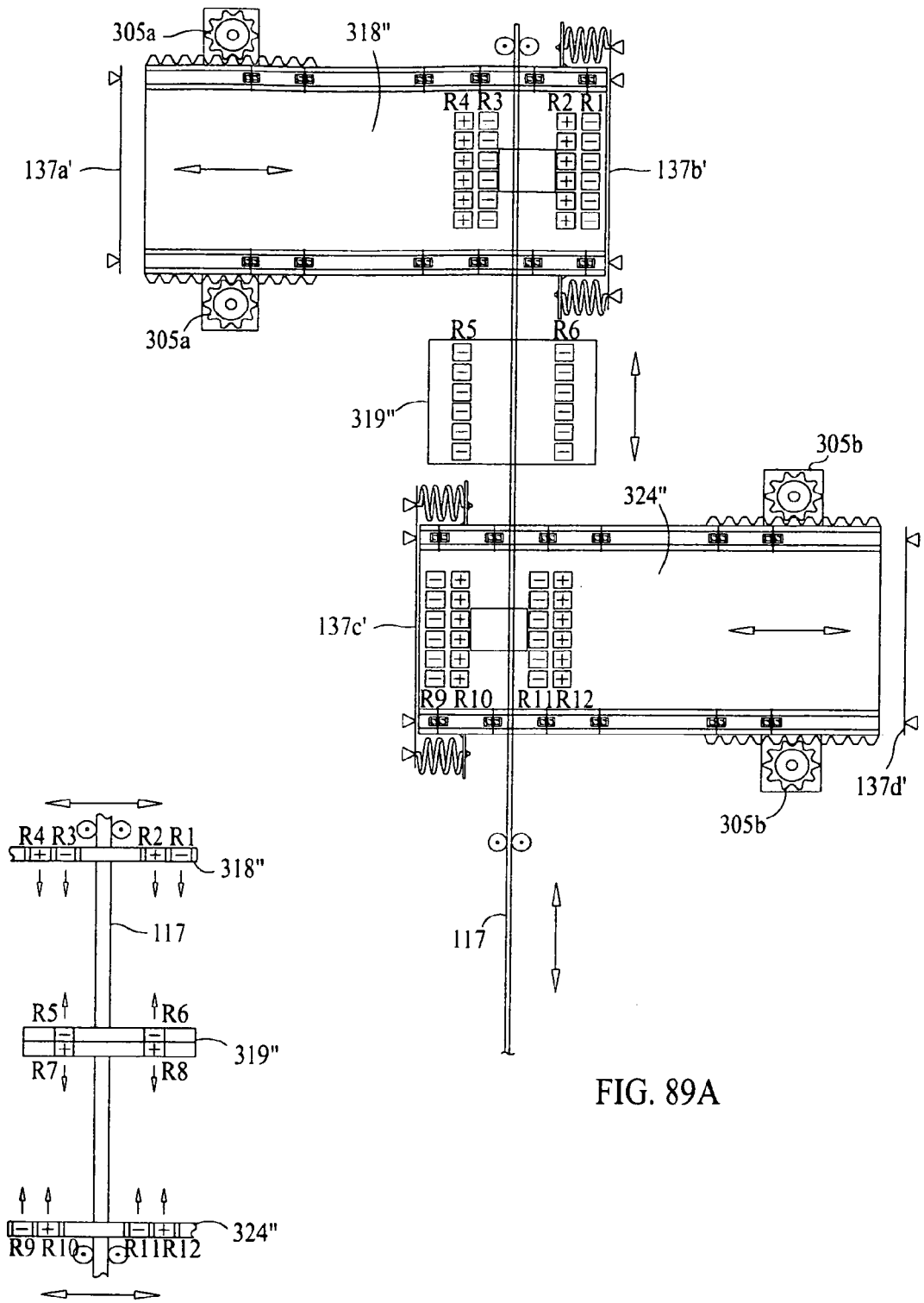
Figures 90A, 90B:
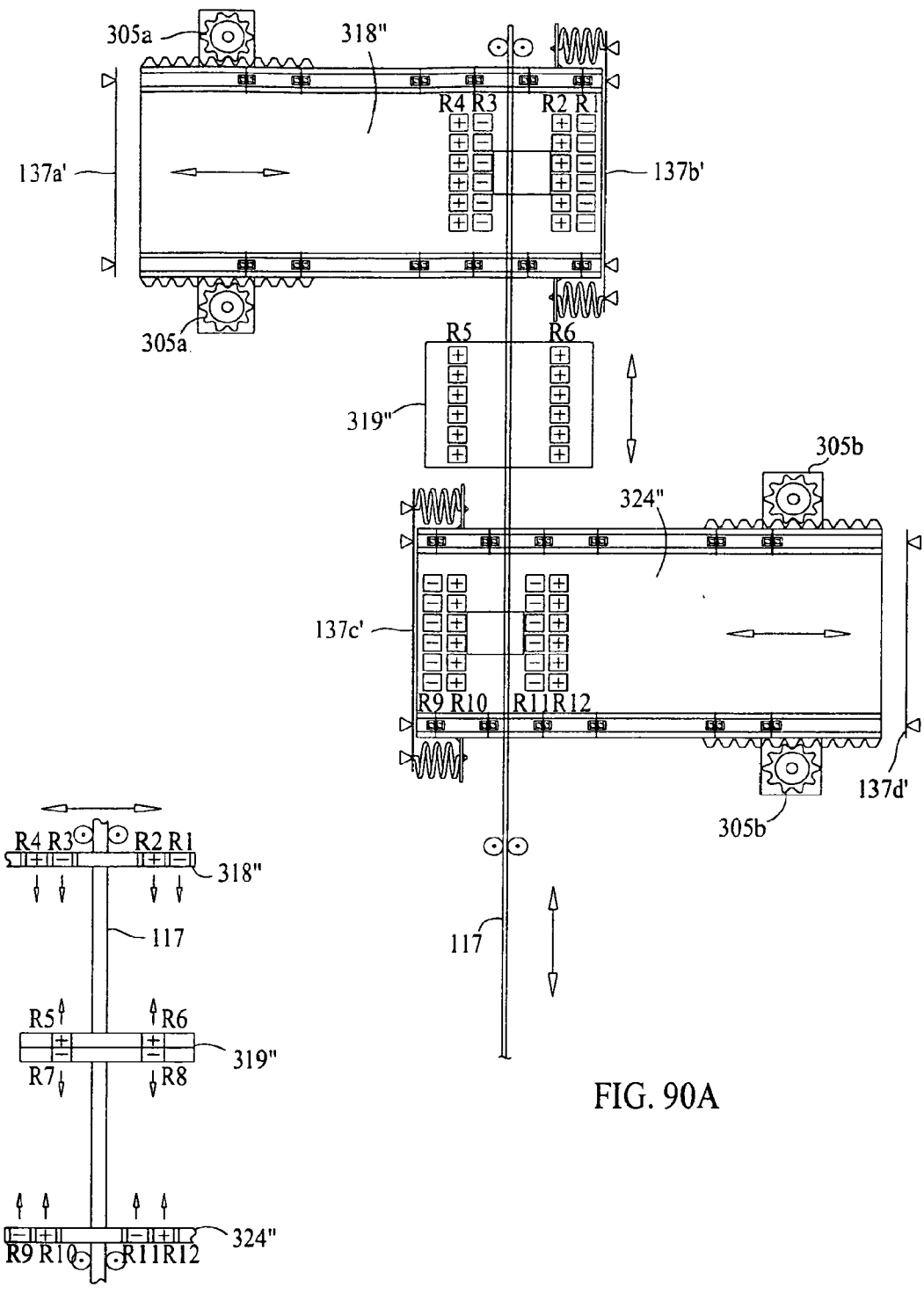
Figures 91A, 91B:
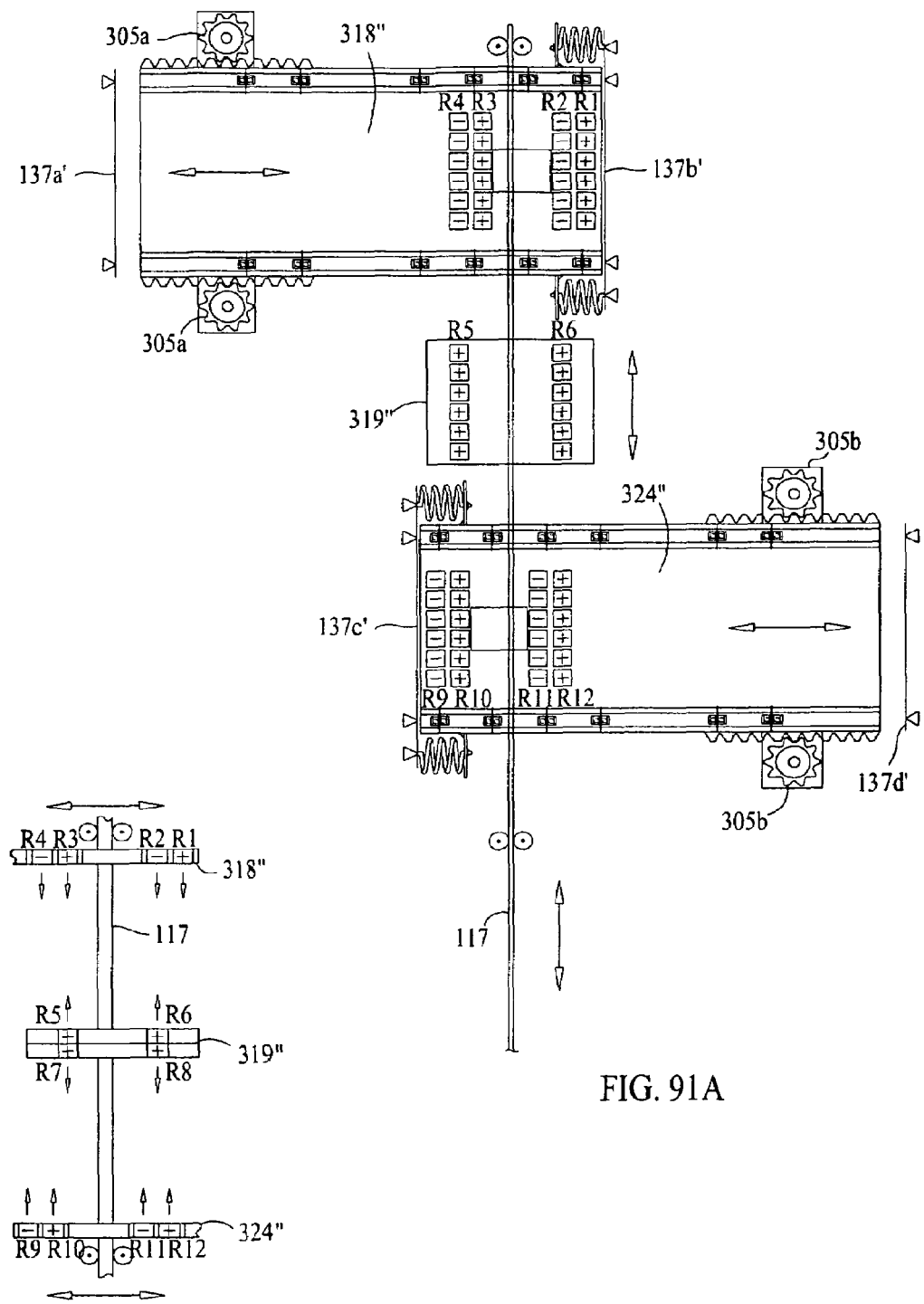
Figures 92A, 92B:
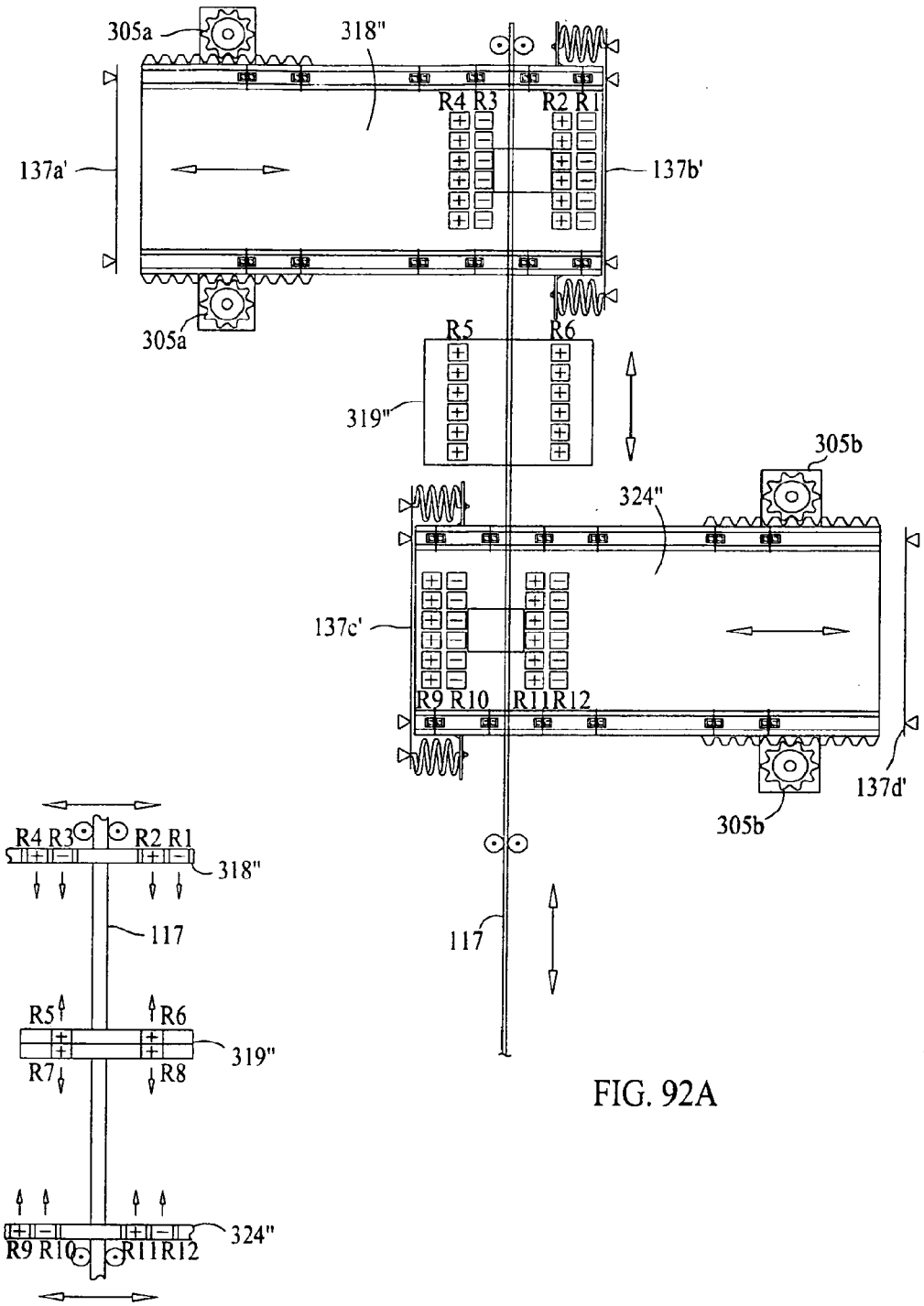
Figures 93A, 93B:
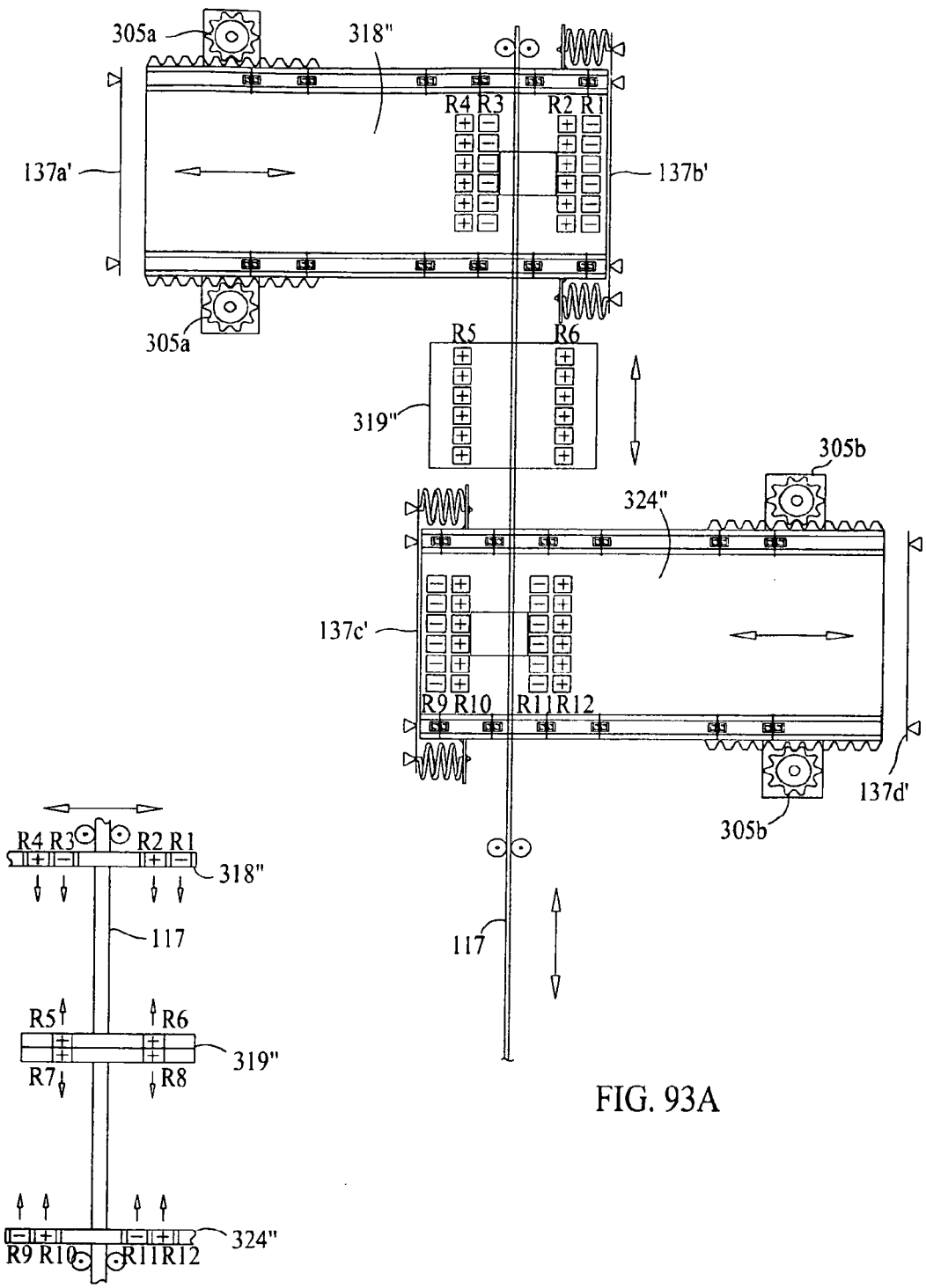
Figures 94A, 94B:
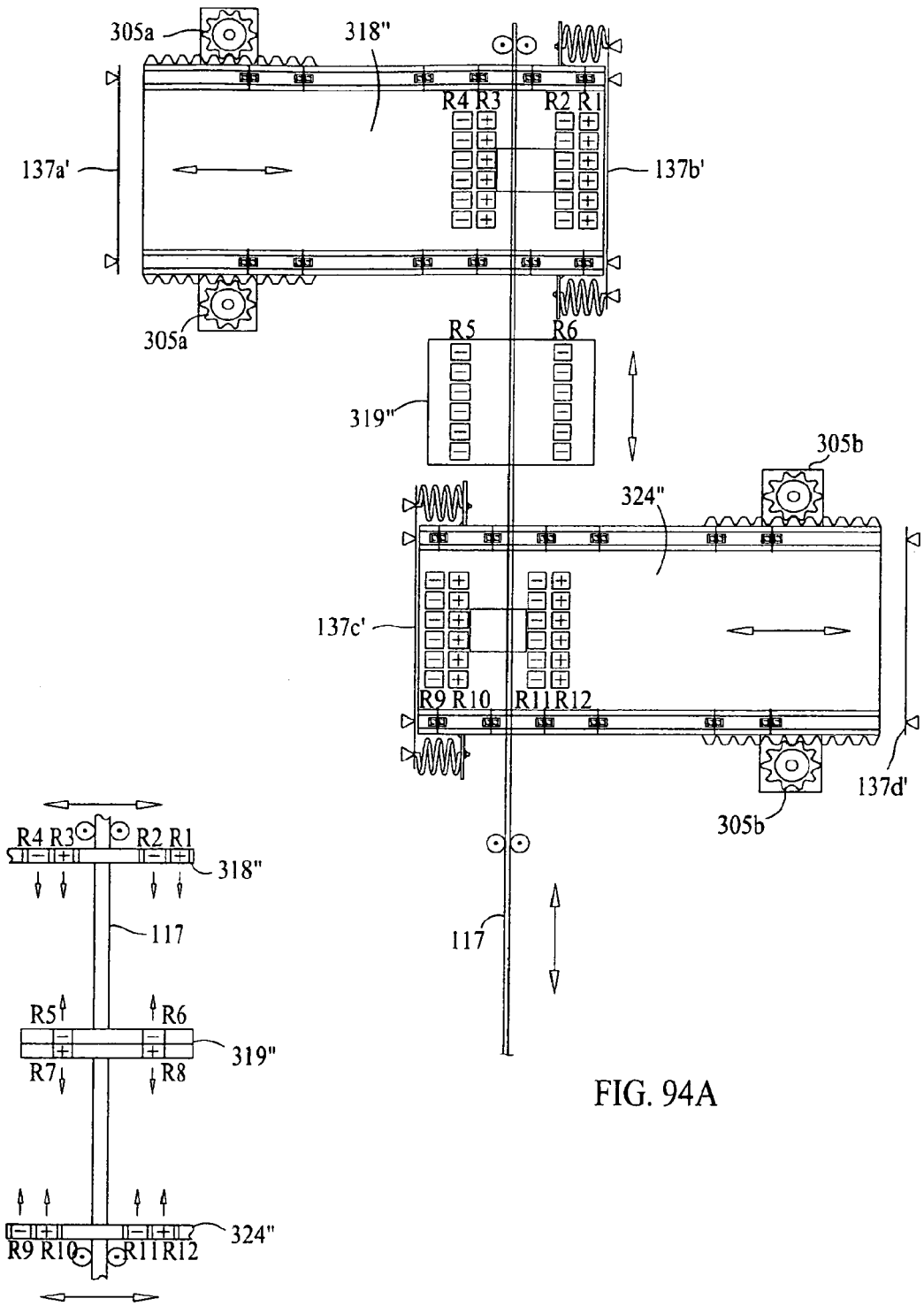
Figure 95A:
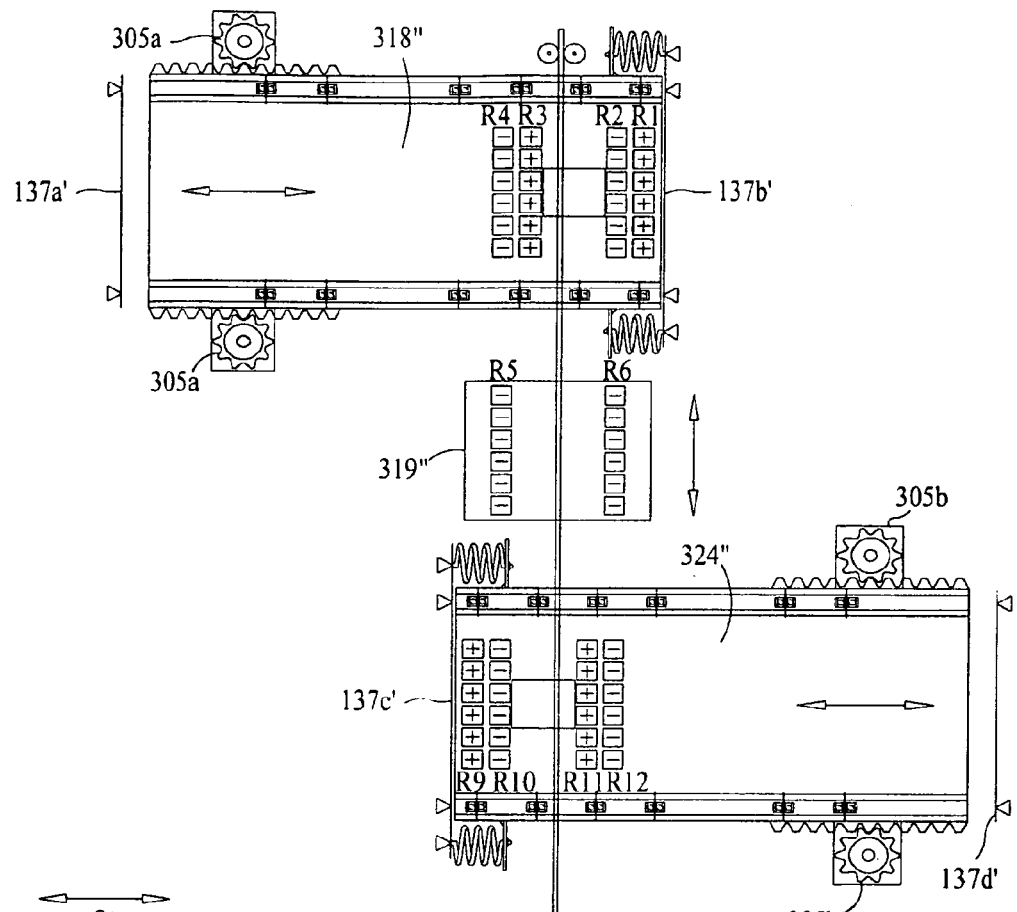
Figure 95B:
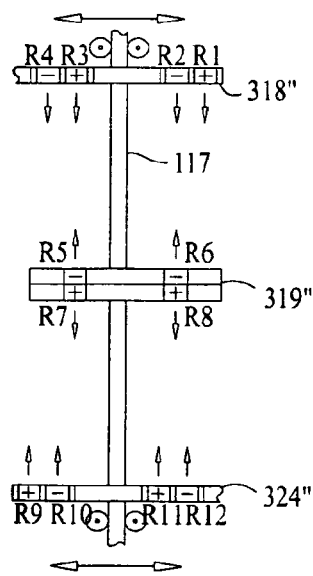
Figures 96A, 96B:
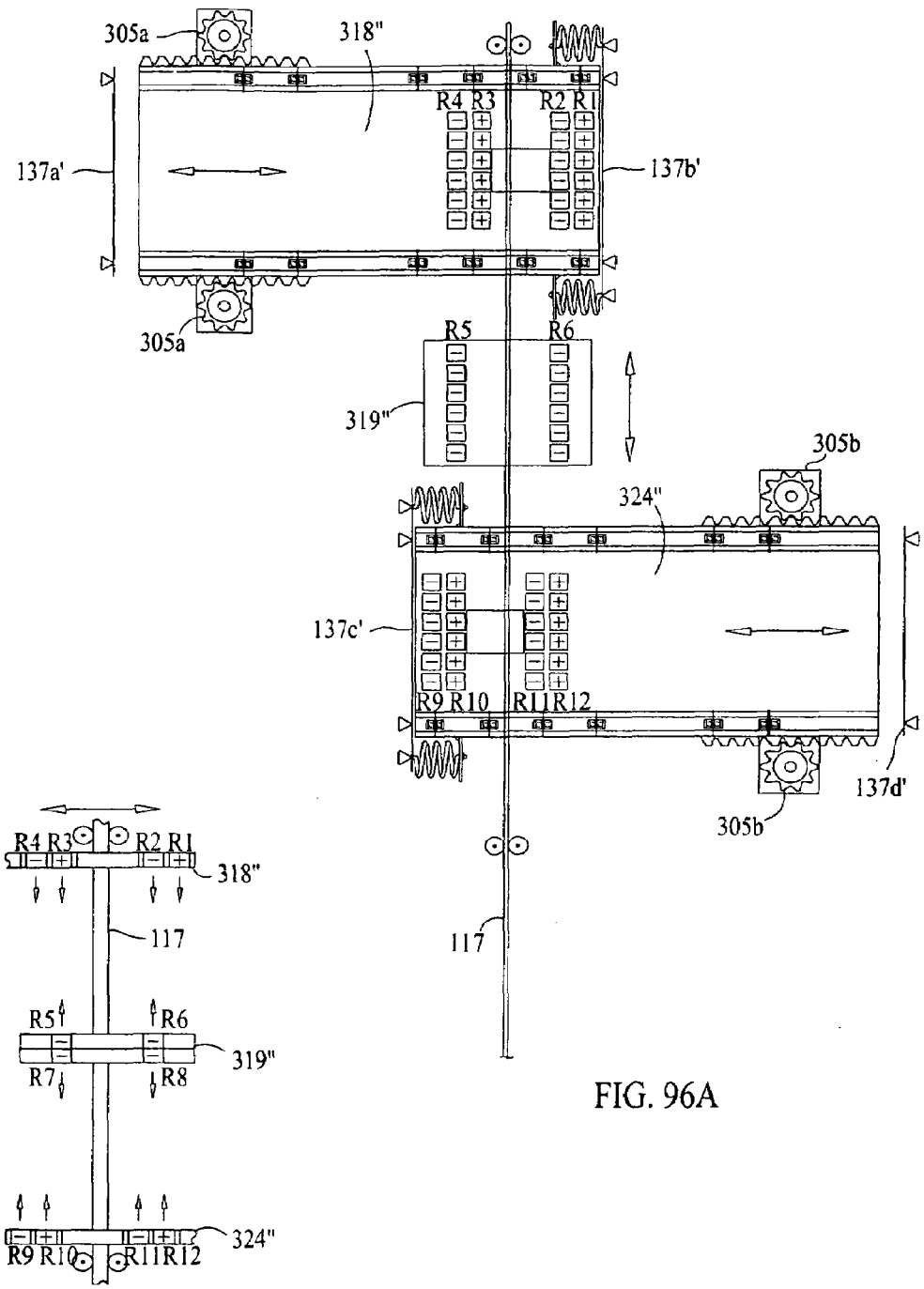
Figures 97A, 97B:
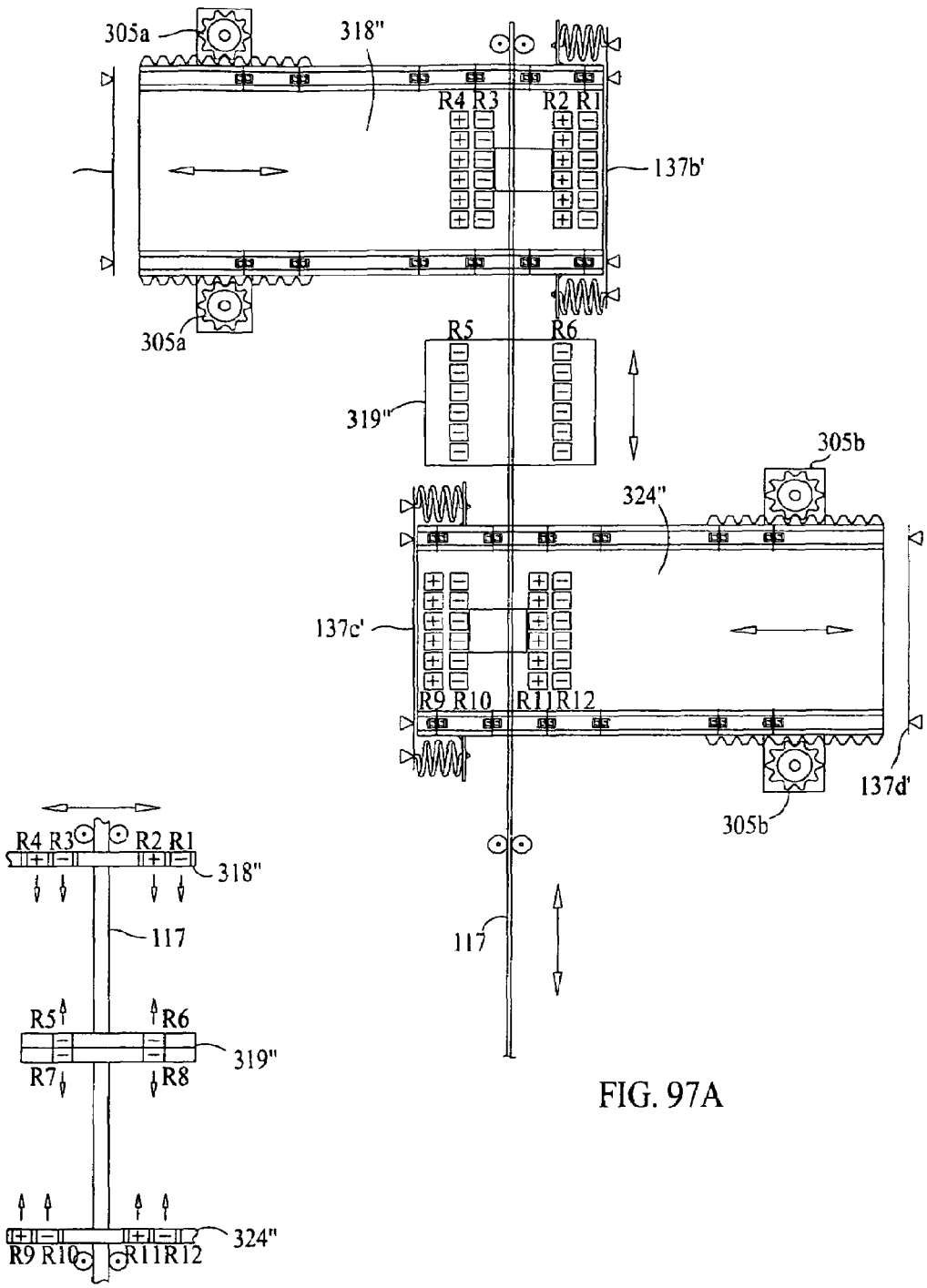

| FIG. No(s). | Upper Sliding Plate, Lower Surface | | | | Piston Plate, Upper Surface | | Piston Plate, Lower Surface | | Lower Sliding Plate, Upper Surface | | | |
|---|---|---|---|---|---|---|---|---|---|---|---|---|
| | R1 | R2 | R3 | R4 | R5 | R6 | R7 | R8 | R9 | R10 | R11 | R12 |
| FIGS. 5, 85 | + | − | + | − | + | + | − | − | − | + | − | + |
| FIG. 25 | + | − | + | − | + | + | − | − | + | − | + | − |
| FIGS. 19, 86 | − | + | − | + | + | + | − | − | + | − | + | − |
| FIG. 90 | − | + | − | + | + | + | − | − | − | + | − | + |
| FIG. 91 | + | − | + | − | + | + | + | + | − | + | − | + |
| FIGS. 39, 88 | + | − | + | − | + | + | + | + | + | − | + | − |
| FIG. 92 | − | + | − | + | + | + | + | + | + | − | + | − |
| FIG. 93 | − | + | − | + | + | + | + | + | − | + | − | + |
| FIG. 94 | + | − | + | − | − | − | + | + | − | + | − | + |
| FIG. 95 | + | − | + | − | − | − | + | + | + | − | + | − |
| FIG. 72 | − | + | − | + | − | − | + | + | + | − | + | − |
| FIGS. 41, 89 | − | + | − | + | − | − | + | + | − | + | − | + |
| FIG. 96 | + | − | + | − | − | − | − | − | − | + | − | + |
| FIG. 87 | + | − | + | − | − | − | − | − | + | − | + | − |
| FIG. 97 | − | + | − | + | − | − | − | − | + | − | + | − |
| FIG. 40 | − | + | − | + | − | − | − | − | − | + | − | + |

Note that, once arranged, unlike the use of certain electromagnets wherein the polarities can be changed, the polarities of the permanent magnets in the defined rows are fixed, and do not change. Thus, in the instant invention, in order to change the alignment of the fixed polarity magnetic rows on the field plates, relative to the fixed polarity magnetic rows on the piston plate, the field plates, themselves, are moved.

Additionally, although the present embodiment uses 72 single-pole oriented magnets, more or fewer magnets can be used. For example, for added power, multiples of 72 magnets could be used in the instant invention. Additionally, it can be appreciated that double-pole magnets could be used to implement certain versions of the invention disclosed in Table 2, thus, also reducing the number of magnets used. In one preferred embodiment of the instant invention, each of the magnets is a single-pole oriented NdFeB permanent magnet 1"×1"×½" in size. However, other rare-earth magnets and/or sizes may be used.

Figure 6:
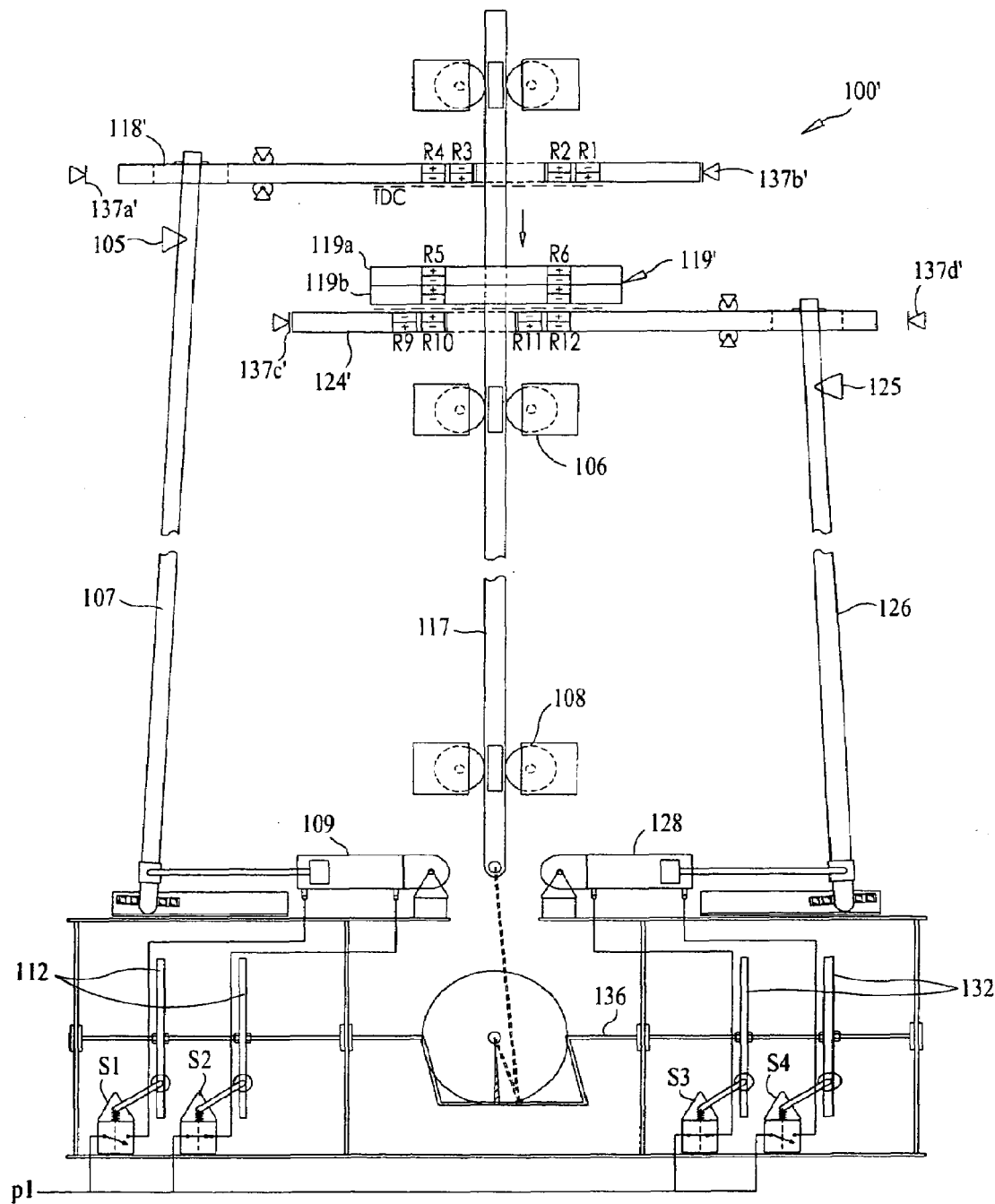
FIGS. 6-17 are simplified partial front schematic views of a permanent magnet reciprocating engine in accordance with one particular embodiment of the present invention shown at particular points of time during the cycle of operation through 360° rotation of a crankshaft.

Note that, "single-pole oriented magnet" is meant to refer in the instant application to magnets embedded in a material such that the field from only a single pole of the magnet is used to interact with the field of another magnet it has been found that using magnets oriented in this manner intensifies the field from the interacting pole of the magnet. As such, in the embodiments described, when discussing a "row of magnets" having a "(+) polarity" or "(−) polarity", it is usually meant that each magnet of the row is placed in a plate, which is usually non-magnetic, such that the desired pole is exposed and the other pole is embedded in the material, and does not, itself, interact with a magnet on a corresponding plate. See, for example, FIG. 6, showing the rows R1-R12, each comprising a single-pole oriented magnet wherein one pole of each magnet is embedded in the plates 118', 119', 124' such that it does not interact with another magnet. It has additionally been found that when mounting the magnets in a plate, in the "single-pole orientation", the use of a further plate of magnetic material backing (i.e., capping) the non-interacting pole of the embedded magnet intensifies the field of the interacting pole of the magnet. For example, in the embodiments described, wherein magnets are embedded in a plate, the surface of the plate proximal to the non-interacting pole of the magnet would be topped by, for example, an iron plate (not shown in the drawings). In one particular embodiment, when using a 0.5 inch magnet embedded in a non-magnetic material, such as aluminum, plastic or carbon-fiber, a 0.75 inch iron backer plate may be mounted to the side of the plate containing the non-interacting poles of the magnets to concentrate and intensify the field of the interacting poles of the magnets.

Referring back to FIGS. 1-4, piston field plate 119 is attached to a long piston rod 117, as shown in FIGS. 1-3. The piston rod 117 is mounted relative to the system so as to move the magnetic piston plate 119 up and down along an axis (i.e., reciprocating linearly along an axis), perpendicular to the direction of travel of the sliding magnetic field plates 118, 124. Piston rod 117 may be made out of any suitable non-magnetic material. Additionally, the piston rod 117 must be mounted to the magnetic piston plate 119, in such a way as to not interfere with the sliding of the magnetic field plates 118 and 124. In one particular embodiment, the piston rod 117 is made from aluminum, so as to not interact magnetically with any of the magnetic plates. Additionally, the piston rod 117 may be made in any working configuration, but in one particular embodiment of the present invention, is configured with a square cross section. The piston rod 117 of the present embodiment extends through the entire engine 100, from the top section 102 to the bottom section 100b.

For example, the top bearing holder plate 120 and lower bearing holder plate 123 both include a small square opening, through which the piston rod 117 can pass. However, the lower bearing holder plate 121 and top bearing holder plate 122 both include a much larger opening therethrough, to permit the magnetic piston plate 119 to interact with the upper and lower magnetic field plates 118, 124.

If desired, as shown more particularly in FIGS. 1-3, the piston rod 117 may be retained in place at the upper section 102 of the engine 100, by a piston rod retaining assembly 101. The piston rod retaining assembly 101 includes four roller bearing wheels retained by a supporting frame and positioned crosswise to each other, with the piston rod 117 therebetween. In one embodiment, the frame and/or supports are preferably made of a non-magnetic material, such as aluminum.

The top piston rod retaining assembly 101 is used to center and maintain the piston rod 117, and to facilitate its easy gliding movement in an up and down manner. Note that in an embodiment wherein the piston rod 117 has a square cross section, one roller bearing of the top piston rod retaining assembly 101 is positioned to contact each flat face of the piston rod 117.

To further center and maintain the piston rod 117, a middle piston rod retaining assembly 106, may optionally be provided. Like the top piston rod retaining assembly 101, the middle piston rod retaining assembly 106 can include four roller bearing wheels retained by a frame or bracket and positioned crosswise to each other, with the piston rod 117 therebetween. Additionally retaining assemblies, such as lower piston rod retaining assemblies 108 and 110 may optionally be provided to center and maintain piston rod 117. The retaining assemblies are, preferably, configured as described in connection with the top piston rod retaining assembly 101, but may be otherwise configured.

In the lower section 100b of the engine 100, the piston rod 117 moves up and down along an axis A through the center of the piston rod retaining assembly 101, causing the crankshaft 136, to rotate. The reciprocating piston rod 117 moves up and down through the center of the engine 100 maintaining the piston field plate 119 between the sliding magnetic field plates 118, 124. The attractive and repulsive forces between the piston field plate 119 and upper and lower sliding magnetic field plates 118, 124 result in the piston rod 117 moving linearly within the engine 100. Additionally, choosing a strong, lightweight material for the piston rod 117 helps reduce resistance to the motion of the piston rod 117. Further, the piston field plate 119 is centered by the piston rod 117, so as to not move in any direction other than the predefined linear motion from top dead center (TDC) to bottom dead center (BDC) of its cycle (i.e., stroke), or vice versa. Additionally the piston field plate 119 never touches the upper or lower magnetic field plates 118, 124, because of a preset clearance between the TDC position of the piston field plate 119 and the upper sliding magnetic field plate 118, and between the BDC position of the piston field plate 119 and the lower sliding magnetic field plate 124. Such clearance is important to maintain the attractive and repulsive figures, but is adjustable. In one particular embodiment of the instant invention, in a flux fusion module using NdFeB 50 permanent magnets, the TDC-BDC distance is between 150 and 200 mm.

The upper and lower sliding magnetic field plates 118, 124 are moved by the top and bottom actuating levers 107 and 126, in order to create the attractive and repulsive forces between the piston field plate 119 and the upper and lower sliding magnetic field plates 118, 124. The top and bottom magnetic field plates 118, 124 are disposed so that they each can, independently, slide in a path that is perpendicular to that of the motion of the piston field plate 119.

In one particular preferred embodiment of the invention, the body of the magnetic piston plate 119 is an aluminum or carbon-fiber plate, the upper and lower planar surfaces of which are lined with permanent magnets oriented in opposite polarities (e.g., the upper surface has North (+) polarity while the lower surface has South (−) polarity, or, if desired, vice versa). Alternately, based on the mounting of the magnets on the magnetic block plates 118, 124, the magnetic piston plate 119 can have both the top and bottom sides both configured with magnets of the same polarity (e.g., the upper surface has North (+) polarity and the lower surface has North (+) polarity, or, if desired, both surfaces having South (−) polarity). Then, in the presently described embodiment, the planar surfaces on the top and bottom magnetic field plates 118, 124, which face the magnetic piston plate 119 would be lined with permanent magnets which alternate between South (−) and North (+) polarities, as needed, to provide the desired reciprocating motion.

As can be seen by the discussion of basic magnetic principles in connection with Table 1, above, with magnets arranged as described, as the top and bottom magnetic field plates 118, 124 slide with respect to the magnetic piston plate 119, they alternate between two positions, an "attraction" position and a "repulsion" position.

In the attraction position, the magnets on a respective magnetic field plate 118 or 124 aligned with the magnets on the magnetic piston plate 119 have an opposite polarity to those on the correspondingly aligned surface of the magnetic piston plate 119. As such, the magnetic piston plate 119 is attracted to the particular plate 118 or 124 that is in the attraction position.

In the repulsion position, the magnets on a respective magnetic field plate 118 or 124 aligned with the magnets on the magnetic piston plate 119 have the same polarity as those on the correspondingly aligned surface of the magnetic piston plate 119. As such, the magnetic piston plate 119 is repulsed from the particular plate 118 or 124 that is in the repulsion position.

If desired, the system can be balanced such that, while one of the magnetic field plates 118 or 124 is in the attraction mode, relative to the magnetic piston plate 119, the other magnetic field plate 118 or 124 is in the repulsion position. In such a case, the magnetic piston plate 119 is both attracted to a first magnetic field plate 118 or 124 in an attraction mode, while, simultaneously, being repulsed by the other magnetic field plate 118 or 124, in a repulsion mode.

In this way, the reciprocating motion of magnetic piston plate 119 is driven, alternately, by the changing attractive and repulsive forces generated by the top and bottom magnetic field plates 118 or 124, as they slide relative to the moving magnetic piston plate 119. The sliding motion of the top and bottom magnetic field plates 118 and 124 is coordinated so that the reciprocating motion of the magnetic piston plate 119 is as smooth and efficient as possible.

In addition to the piston rod 117, connected to the piston magnetic block 119, the engine 100 includes a top plate-actuating lever 107 and a bottom plate-actuating lever 126, which additionally connect the top section 102 to the bottom section 100b. The top plate-actuating lever 107 is connected at its top end to the top magnetic field plate 118, and at its bottom end to a pneumatic actuator 109a contained in the bottom section 100b. The top plate-actuating lever 107 is additionally fixed, via a leverage point or pivot point 105, to the frame of the engine 100. Top plate actuating lever 107 acts as a lever that, when driven by a pneumatic actuator 109, causes the top magnetic field plate 118 to slide between the high speed rollers of the upper and lower bearing holder plates 120 and 121 of the top section 102. The movement need not be large. For example, in one particular embodiment of the instant invention, the lever 107 need move only about 32 mm to the left and to the right of the pivot point 105, in order to effectively move the plate 118 and provide the desired result. The left/right movement of each plate 118, 124 may be limited by a mechanism, such as the end stop pairs, shown more particularly in FIG. 3. More particularly, in the embodiment of FIG. 3, a pair of small fingers mounted on each of the plates 118, 124 between the end stop pairs 137a, 137b and 137c, 137d, respectively, can be precisely set to limit the travel of each plate 118, 124, as desired. For example, a pair of end stops 137a is located proximal to a pair of end stops 137b. A pair of finger projections is mounted at one side of the plate 118 between each end stop pair 137a-137b. If the distance between each end stop pair 137a-137b is set to be about 32 mm, then the movement of the plate 118 will be restricted to about 32 mm, based on the finger projection moving between and contacting the end stops 137a and 137b, when in the far left and far right end positions, respectively. The same would be true of lower plate 124 and the end stop pairs 137c and 137d.

Similarly, the bottom plate-actuating lever 126 is connected at its top end to the bottom magnetic field plate 124, and at its bottom end to a pneumatic actuator 128a contained in the bottom section 100b. The bottom plate-actuating lever 126 is additionally fixed, via a leverage point or pivot point 125, to the frame of the engine 100. When driven by the pneumatic actuator 128, the bottom plate actuating lever 126 causes the bottom magnetic field plate 124 to slide between the high speed rollers of the upper and lower bearing holder plates 122 and 123 of the top section 102. In one particular embodiment of the instant invention, the lever 126 only needs to move about 30-32 mm to the left and to the right of the pivot point 125, in order to effectively move the plate 124 and provide the desired result.

In one particular embodiment, the pneumatic cylinder 109 represents a left positioned, double-acting (i.e., two ports) pneumatic air operated piston ram including a centering row, for locating the top plate-actuating lever 107 at a center position, pending its left/right movement during 360° rotation of the crankshaft 136. Similarly, in that particular embodiment, the pneumatic cylinder 128 represents a right positioned, double-sided pneumatic air operated piston ram including a centering row, for locating the bottom plate-actuating lever 126 at a center position, pending its left/right movement during 360° rotation of the crankshaft 136. In one embodiment of the instant invention, the stroke of the pneumatic cylinders 109, 128 is chosen to be 12".

It can be seen from the figures that the placement of the leverage points 105 and 125, and the length of the top and bottom actuating levers 107 and 126, additionally help determine the amount of movement experienced by the sliding magnetic field plates 118 and 124. For example, the longer the lever, the easier it is to slide the field plates 118, 124 within the module 102 during the engine's work stroke. However, in the instant embodiment, the use of pneumatic piston rams permits the lever length, and correspondingly the engine size, to be reduced. Rather, in response to the cam pairs 112 and 132 activating the air switches S1, S2, S3, S4, the left/right ram movement of the pneumatic cylinders 109, 128 cases the upper and lower magnetic field plates 118, 124 to glide easily left and right of the pivot points 105, 125.

In another particular example of the present invention, the system is planned so that the leading edge (i.e., the edge attached to one of the actuating levers 107, 126) of each magnetic field plate 118, 124, slides from a point 30-32 mm to the left of its leverage point 105 or 125 to a point 30-32 mm to the right of its leverage point 105 or 125. In order to obtain such movement, the leverage point is placed at a very particular location in the upper middle part of the apparatus 100. For example, in the above example, in order to balance the leverage forces, the leverage point is placed at a position based on the ratio of about 1:5 or 1:7.5, depending on the length of the specific actuating levers 107, 126. In operation, the magnetic field plate actuating levers 107, 126 are disposed so that motion of the bottom end in one direction will drive the top end in the opposite direction and thus cause a sideways sliding motion in its corresponding magnetic field plates 118, 124.

Referring back to FIGS. 1-4, it can be seen that, if desired, the lower ends of the top and bottom plate actuating levers 107 and 126 can be stabilized by the provision of sliding center guides 111 and 130, respectively. In one particular embodiment of the instant invention, the sliding center guides include four high-speed roller bearings and two L shaped profiles. The sliding center guides 111 and 130 maintain the bottom end of the actuating levers 107 and 126 in the center of the mechanism that is linked to the actuator arms 109a, 128a of the pneumatic cylinders 109, 128. Additionally, the sliding center guides 111 and 130 help reduce vibrations in the levers 107 and 126, thus reducing vibration in the engine 100.

Referring to FIGS. 1-4, the lower section 100b of the engine 100 includes a crankshaft housing 131, including therein a crankshaft 136, and a series of cams. In the particular embodiment shown in FIGS. 1-5, four cam wheels 112a, 112b, 132a, 132b are provided for controlling the engine 100. In one particular embodiment, the crankshaft housing is be made of a non-magnetic material, such as plastic, aluminum or carbon-fiber, and includes four main crankshaft holding bearings, 131a, 131b, 131c and 131d, shown more particularly in FIG. 4, to support the crankshaft.

Figure 4:
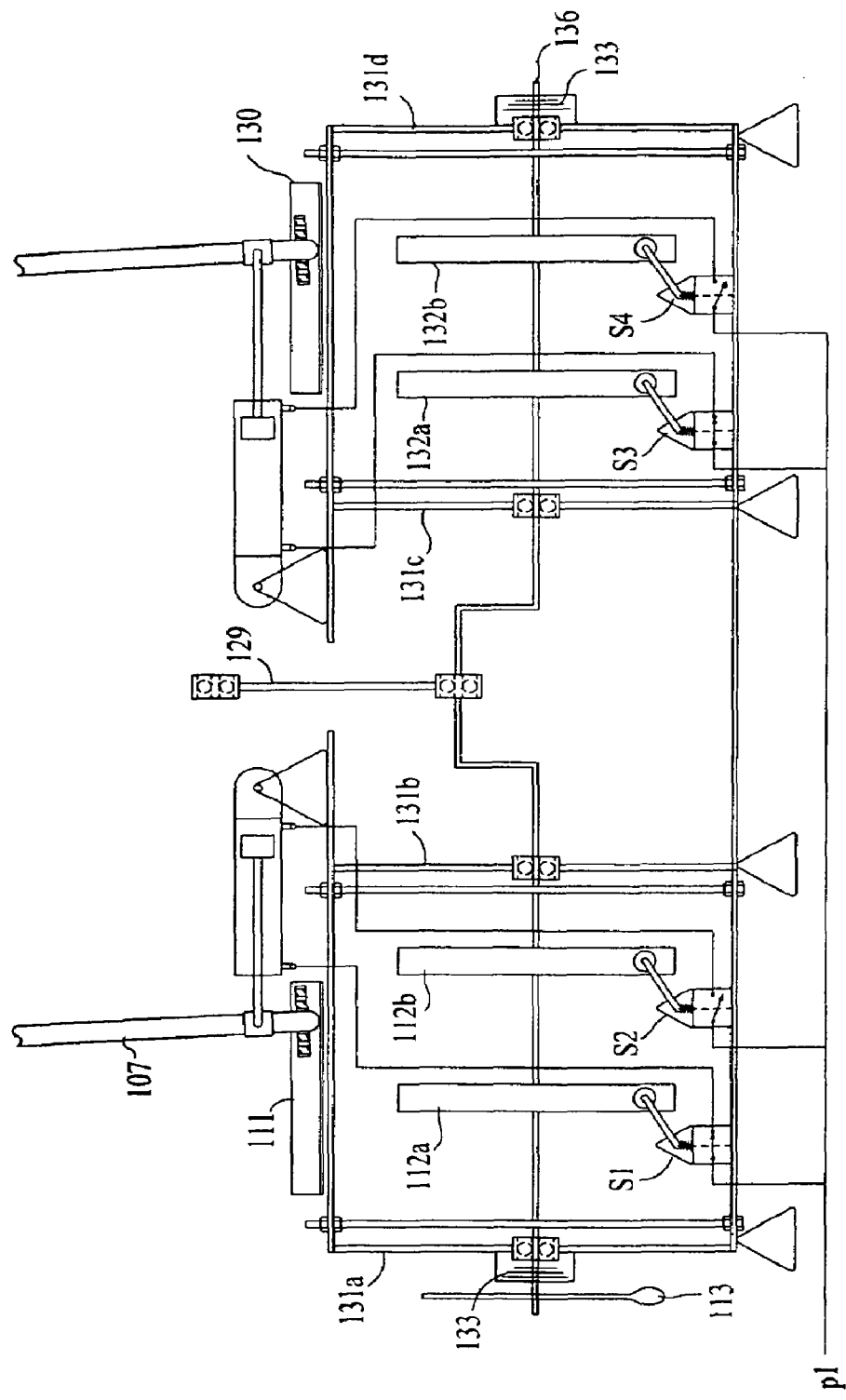
FIG. 4 is a partial cutaway schematic representation of the lower drive portion of a permanent magnet reciprocating engine in accordance with one particular embodiment of the present invention.

The crankshaft 136 is a simple crankshaft made up, in the instant embodiment shown in the figures, of two main shaft portions and a single crank pin. As shown more particularly in FIGS. 1 and 4, the four cams are mounted on the main shaft portions of the crankshaft 136, with one pair of cams 112, 132 fixedly mounted on each main shaft portion. The cam pairs 112, 132 rotate through the entire 360° rotation of the crankshaft. More particularly, as shown in FIG. 4, the cams 112a, 112b, 132a, 132b, are used to drive the air switches S1, S2, S3, S4, respectively. This is additionally shown in FIG. 1, wherein rotation of the cam pairs 112, 132 drive the air switches 114, 134, respectively. Profiles on the cams 112a, 112b, 132a, 132b, are used to time the activation of the air switches, S1, S2, S3, S4, and operate the pneumatic cylinders at precisely timed intervals. More particularly, the timing of the operation of the pneumatic cylinders is controlled by the profile of the cams, as mounted on the crankshaft 136, and thus, is synchronized by the rotation of the crankshaft 136. Note that, in the instant embodiment, compressed air from an external source (see p1 of FIG. 6), such as a compressor (not shown), would be provided in order to drive the pneumatic cylinders 109, 128, in response to actuation of the air switches S1, S2, S3, S4 by the cam pairs 112, 132.

Optionally, as in one particular embodiment shown in FIG. 1, a ratchet gear mechanism 133 is installed on one or both end(s) of the crankshaft to ensure one-way rotation of the crankshaft. Further, an optional flywheel 113 or counterbalance may be attached, as needed, to one end of the crankshaft, to better balance the clockwise rotation of the unit when using a simple crankshaft arrangement.

Additionally, as discussed above, the lower translation portion 100b of the engine 100 additionally includes pneumatic cylinders 109 and 128 connected to the levers 107 and 126, via the pneumatic cylinder actuators 109a and 128a, respectively. As will be described herebelow, the pneumatic cylinders 109, 128 pivot the levers 107, 126 to create an initial sliding movement of the magnetic block plates 118, 124.

Referring back to FIG. 1, the lower end of the piston rod 117 is connected to a crankshaft 136 in the crank pin, via a connecting rod 129, or some other mechanism that facilitates the rotation of the crankshaft, in response to the linear (up and down) motion of the piston rod 117. Such linear motion of the piston rod 117 is created by the alternating attraction and repulsion of the piston plate 119 to the magnetic field plates 118, 124. The connecting rod 129 of one particular embodiment is made of a non-magnetic material, such as aluminum, and includes two roller bearings, to facilitate movement thereof. A first roller bearing is connected to the piston rod 117, while the other roller bearing is attached to the crankshaft arm 136.

As noted above, the linear motion of the piston rod 117 is translated into rotary motion of the crankshaft 136 that, in turn, can be attached (through a gear-box or transmission or other suitable power transfer mechanism) to the equipment to be driven by the engine 100. In one particular example, a portion of the crankshaft 136 may extend outside the crankshaft assembly housing for connection to a generator.

The entire engine 100 can be held together, for example, by an assembly of threaded rods 127, nuts and washers, which are chosen so as to sustain the forces that occur during the operation of the engine 100. Additionally, the engine 100 may be mounted to a base plate 115, via optional shock absorber pairs 135. In one particular embodiment of the present invention, four pairs of shock absorbers 135 are used to hold the assembled apparatus to the base plate 115 and to absorb any vibration generated by the engine 100 during operation. More or fewer pairs of shock absorbers 135 may be used. The base plate 115 may additionally sit on wheels or roller casters 116 to enable the engine 100 to be moved, rotated or adjusted, during the assembly process. Additionally, the base 115 and/or crankshaft housing 131, may be made of a non-magnetic material, such as, aluminum, wood, plastic or carbon-fiber.

The operation of an engine 100 will now be described in connection with FIGS. 6-17. Note that in the instant example, although the magnetic poles have been arranged as shown in connection with FIGS. 5A-5B, this is for purpose of example, and not meant to be limiting. Rather, using the principles of Table 1, it can be seen from the discussion herein, that the instant invention can be adapted for use with any of the magnetic arrangements shown in Table 2, or another arrangement. For example, the plates 118', 119' and 124' of FIGS. 5A-5B, could be replaced by the plates 118'/118"/218/318'/318"', 119'/119"/219/319'/319"' and 124'/124"/224/324'/324" of FIGS. 19A-B, 25A-B, 39A-B, 40A-B, 41A-B, 72B and 85A-B, 86A-B, 87A-B, 88B, 89B, 90B, 91B, 92B, 93B, 94B, 95B, 96B and 97B.

For example, referring now to FIG. 6, there is shown an engine 100', configured similar to the engine 100 of FIGS. 1-4, wherein like parts are denoted by like item numbers. The engine 100' includes an upper sliding magnetic field plate 118', a lower sliding magnetic field plate 124', and a magnetic piston plate 119'. The magnetic rows aligned on each field plate could be any configuration set forth in Table 2, above. However, in the instant embodiment, the rows of permanent magnets aligned on the field plates are as shown in FIG. 5.

More particularly, as described in connection with FIG. 5, in the embodiment of FIGS. 6-17, the upper magnetic field plate 118' includes a first row (R1) of magnets wherein the (+) polarity is facing down, towards the magnetic piston plate 119'. As noted in connection with FIGS. 1-4, a row of magnets can have any desired number of magnets. However, in one particular embodiment of the invention, a row includes six magnets. Next to the first row of magnets on the upper sliding field block plate 118', the upper magnetic field force plate includes a second row (R2) of magnets wherein the (−) polarity is facing down towards the magnetic piston plate 119'. During movement of the upper sliding plate, the permanent magnets in rows R1 and R2 of the upper field block plate 118' will be brought into alignment with the permanent magnets in rows R5, R6 on the upper surface of the piston field plate 119', thus alternating between the attraction and repulsion mode, to cause the piston rod 117 to move up and down (push-pull effect), thus moving the crankshaft.

Similarly, as shown in FIG. 6, spaced apart from the first two rows of magnets on the upper sliding magnetic field plate 118', and on the other side of the plate from the piston rod axis A, are a third and fourth row of magnets, R3 and R4, respectively. The third row of magnets is aligned with its (+) polarity facing the upper surface of the piston magnetic field plate 119'. Similar to the orientation of the first two rows of magnets on the upper sliding magnetic field plate, the fourth row is located next to the third row with its (−) polarity side facing the upper surface of the magnetic piston plate 119'. In the embodiment shown in FIGS. 5-17, the upper surface of the magnetic piston plate includes two rows of permanent magnets R5 and R6 having the (+) polarity facing the upper field plate.

Similarly, in the embodiment of FIGS. 5-17, the lower sliding magnetic field plate 124' also includes four rows of magnets R9, R10, R11 and R12. In order to match the strength from top to bottom, if a row on the upper sliding plate 118' includes six magnets, in the present embodiment, a row of magnets on the lower sliding plate 124' and on the magnetic piston plate 119' will additionally include six magnets. It can be seen how the system can be balanced with other numbers of magnets comprising a row.

Additionally in embodiment shown in FIGS. 5-17, the first row of the lower sliding magnetic field plate 124', like that of the first row of the upper sliding magnetic field plate 118', will be oriented with the (+) polarity facing up towards the lower surface of the magnetic piston plate 119'. Next to the first row of magnets on the lower sliding plate B, the lower magnetic field force plate includes a second row of magnets wherein the (−) polarity is facing up towards the magnetic piston plate 119'. As shown in FIG. 6, spaced apart from the first two rows of magnets on the lower sliding magnetic field plate 124', and on the other side of the plate from the piston rod axis A, are a third and fourth row of magnets R9 and R10. The third row of magnets is aligned with its (+) polarity facing the magnetic piston plate 119'. Similar to the orientation of the first two rows of magnets on the lower sliding magnetic field plate, the fourth row is located next to the third row with its (+) polarity side facing up towards the magnetic piston plate 119'. The magnetic piston plate 119', as shown in FIG. 6, correspondingly includes two rows of (−) polarity permanent magnets on the lower surface thereof, each row on the piston field plate 119' aligned to interact with a pair of rows on the lower sliding magnetic field plate 124', to interact therewith.

Note that, to cause the magnetic piston plate 119' to move up and down on the piston rod 117, the upper and lower sliding magnetic field plates 118' and 124' only need to slide left or right by an amount equal to the width of the permanent magnetic field created by a single row on the sliding plates 118' and 124', in order to continue the cycle of repulsion/attraction relative to the magnetic piston plate 119'. Left and right end stop pairs 137' limit the travel of the upper and lower sliding magnetic field plates 118', 124' by abutting the edges of each plate 118', 124', as it slides between its far left and far right positions. Note, however, this is not meant to be limiting, as an end stop pair arrangement where fingers mounted on the plates 118, 124 limit the left/right movement of each plate can also be used, as described in connection with FIG. 3.

One exemplary full cycle of operation of the engine 100', illustrated through the resultant 360° of rotation of the crankshaft 136, will be described using FIGS. 6-17.

Referring now to FIG. 6, there is shown a first stage of the cycle for the engine 100' which occurs between 176° and 180° rotation of the crankshaft 136. In this first stage, the magnetic piston plate 119' is in linear motion, approaching the "bottom dead center" (BDC) position of its stroke (which occurs in the instant embodiment when the crankshaft is at 180° rotation). In this first stage, as a result of the attraction between the magnets in rows R7, R8 on the magnetic piston plate 119' and the rows R10, R12 on the lower magnetic field plate 124', the linear motion is being accelerated approaching the BDC. Simultaneously, the motion of the crankshaft 136 additionally rotates the cams 112a, 112b, 132a, 132b and the pistons 109, 128 position the lever arms 107, 126, as shown. Note that, at BDC, the upper sliding magnetic field plate 118' is located against the right end stop pair 137b', while the lower magnetic field plate abuts the left end stop pair 137c'. This is accomplished by a rotation of the cam pairs 112, 132 actuating the air switch pairs 114, 134. More particularly, in the instant embodiment, at BDC, the air switch S1 is OFF while the air switch S2 is ON, thus charging ram 109 with air through its right port keeping the arrangement stable. Simultaneously, at BDC, the air switch S3 is ON and the air switch S4 is OFF charging ram 128 with air through its left port. At this point, the piston 109 has finished its repositioning moment, moving the upper sliding magnetic field plate 118' into position for its own cycle, while, the pneumatic cylinder 128 and lower sliding magnetic field plate 124' is at the end of its cycle. The above portion of the cycle is referred to herein as the "Fourth Permanent Magnet Power Action", which refers to an attraction cycle, and in the instant embodiment, an attraction cycle resulting from the interaction between the (−) polarity rows R7, R8 on the piston plate 119 with the (+) polarity rows R12, R12 on the lower plate 124.

Figure 7:
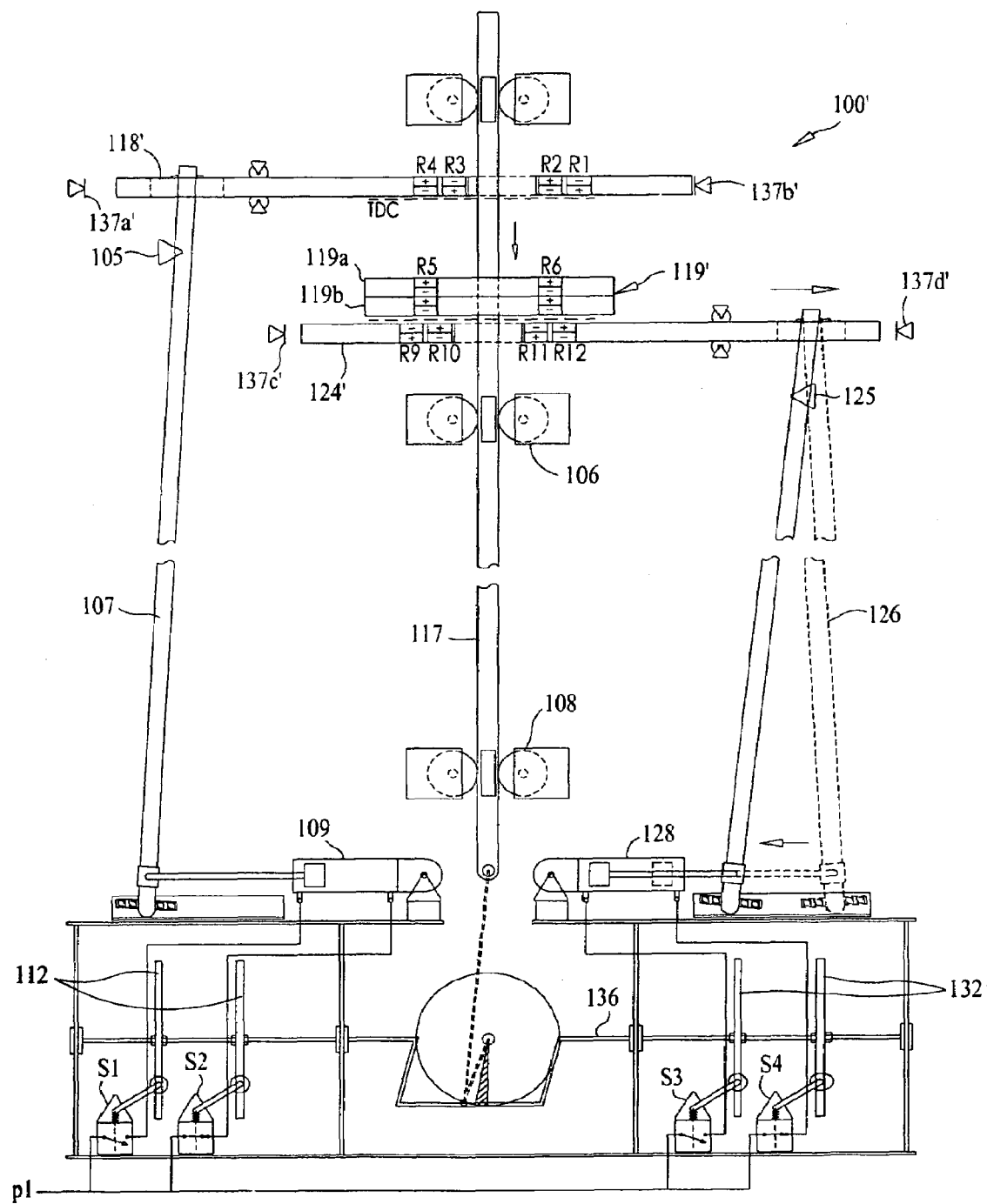

Referring now to FIG. 7, there is shown a second stage of operation of the present embodiment, which occurs from 181°-190° rotation of the crankshaft 136. In this second stage of operation, the pneumatic cylinder 128 is actuated so as to initiate movement of the lower sliding magnetic field plate 124'. During this stage, the magnetic piston plate 119' is starting from its BDC position and, while the lower plate 124' is repositioned from an attraction alignment to a repulsion alignment, the piston plate 119' moves very slowly, appearing to hardly move at all. Previously, the upper magnetic sliding plate 118' was positioned so that the magnet rows R2, R4 were aligned with the magnet rows R5, R6 on the magnetic piston plate 119'. As noted above in connection with stage 1, the upper sliding magnetic field plate 118', is held at the right stop 137b' by the pneumatic cylinder 109. At this time, the pneumatic cylinder 128, in combination with the actuating lever 126 pivoting about the pivot point 125, will move the lower sliding magnetic sliding field plate from the right end stop pair 137d' to the left end stop pair 137c'. In the instant embodiment, the lower magnetic field plate 124' is moved to about 32 mm right of the pivot point 125. In accordance with FIG. 18E, which is representative of what is happening at about 181° degrees rotation of the crankshaft 136, the air switch S4 is switched ON, while the air switch S3 is switched Off. This permits air inside the pneumatic cylinder 128 to move the actuating lever 126 from its left stop 137c' position to its right stop 137d' position. Further, with the air switch S1 OFF, and the air switch S2 ON, air inside the pneumatic cylinder 109 maintains the actuating lever 107 at the right stop 137b' position. Correspondingly, magnet rows R9, R11 on the lower sliding magnetic field plate 124' will be forced to interact with magnet rows R7, R8 of the magnetic piston plate 119', creating a magnetic field forces that repels the magnetic piston plate 119' causing linear movement of the piston rod 117. Note that in the instant embodiment, FIGS. 18A-18E show the cam and switch positions relative to counter-clockwise rotation of the crankshaft 136.

Figure 8:
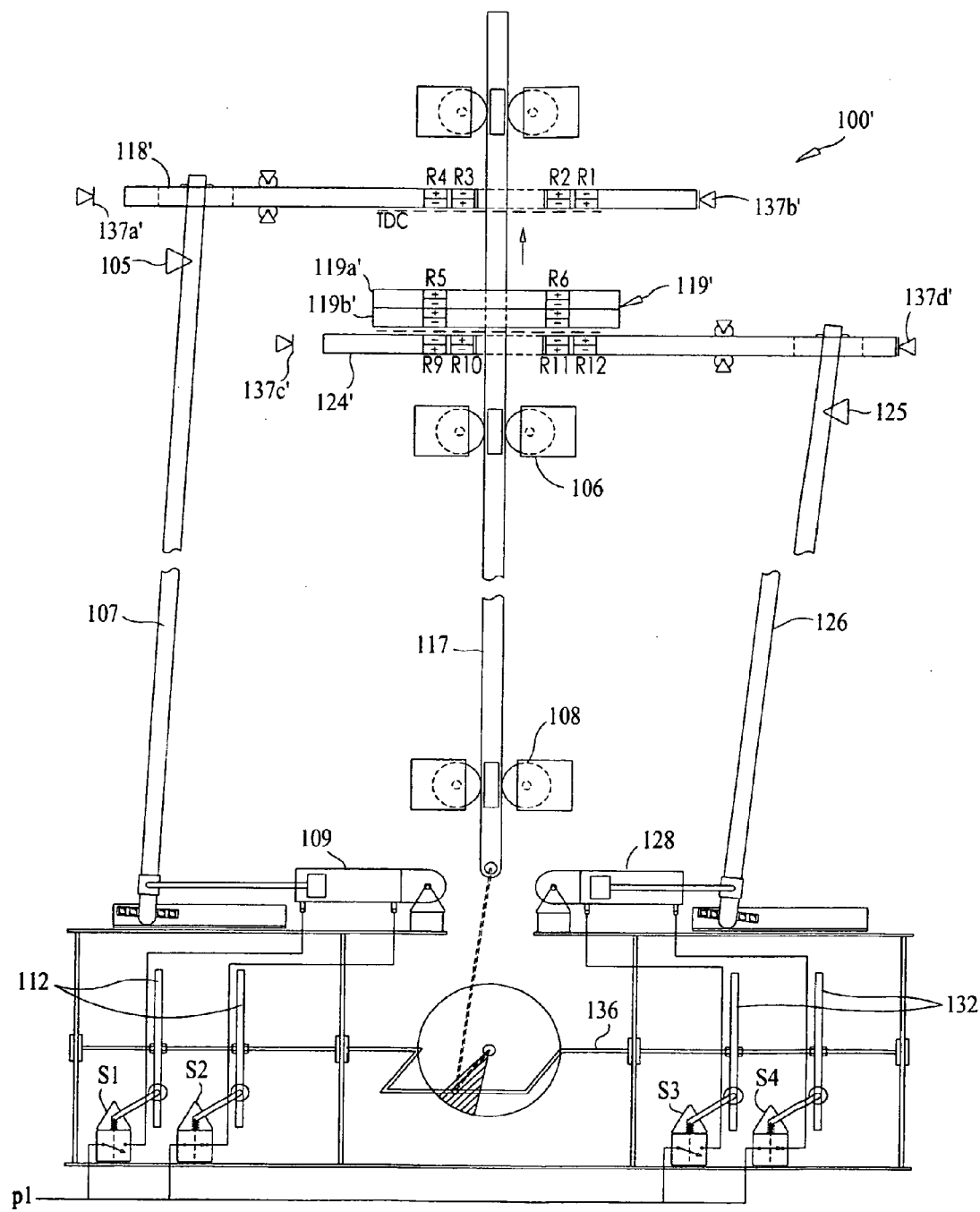

Referring now to FIG. 8, there is shown a third stage of operation of the present embodiment, which occurs from 191°-225° rotation of the crankshaft 136. Note that in the instant stage, the pneumatic cylinders 109, 128 maintain both the upper and lower sliding magnetic plates 118', 124' against the right stops 137b', 137d'. As stated in connection with the second stage, the strong repulsive force between the magnets in the rows R9, R11, on the upper surface of the lower sliding magnetic plate 124', and the magnets in the rows R7, R8 of the lower surface of the magnetic piston plate 119', will thrust the magnetic piston plate 119' away from the lower sliding magnetic plate 124', pushing it upwards and correspondingly, moving the piston rod 117, upwards, as well. This upwards movement of the piston rod 117, correspondingly, moves the crankshaft 136, clockwise, and further rotates the cams affixed thereto. The cam positions and switch states at about 225° at the end of this third stage are shown in FIG. 18F. The thrust created by the repulsive forces in this stage is strong enough to move magnetic piston plate 119' further up with its attachments for at least another 30° of clockwise rotation of the crankshaft 136. The above portion of the cycle is referred to herein as the "First Permanent Magnet Power Action", which refers to a repulsion cycle.

Figure 9:
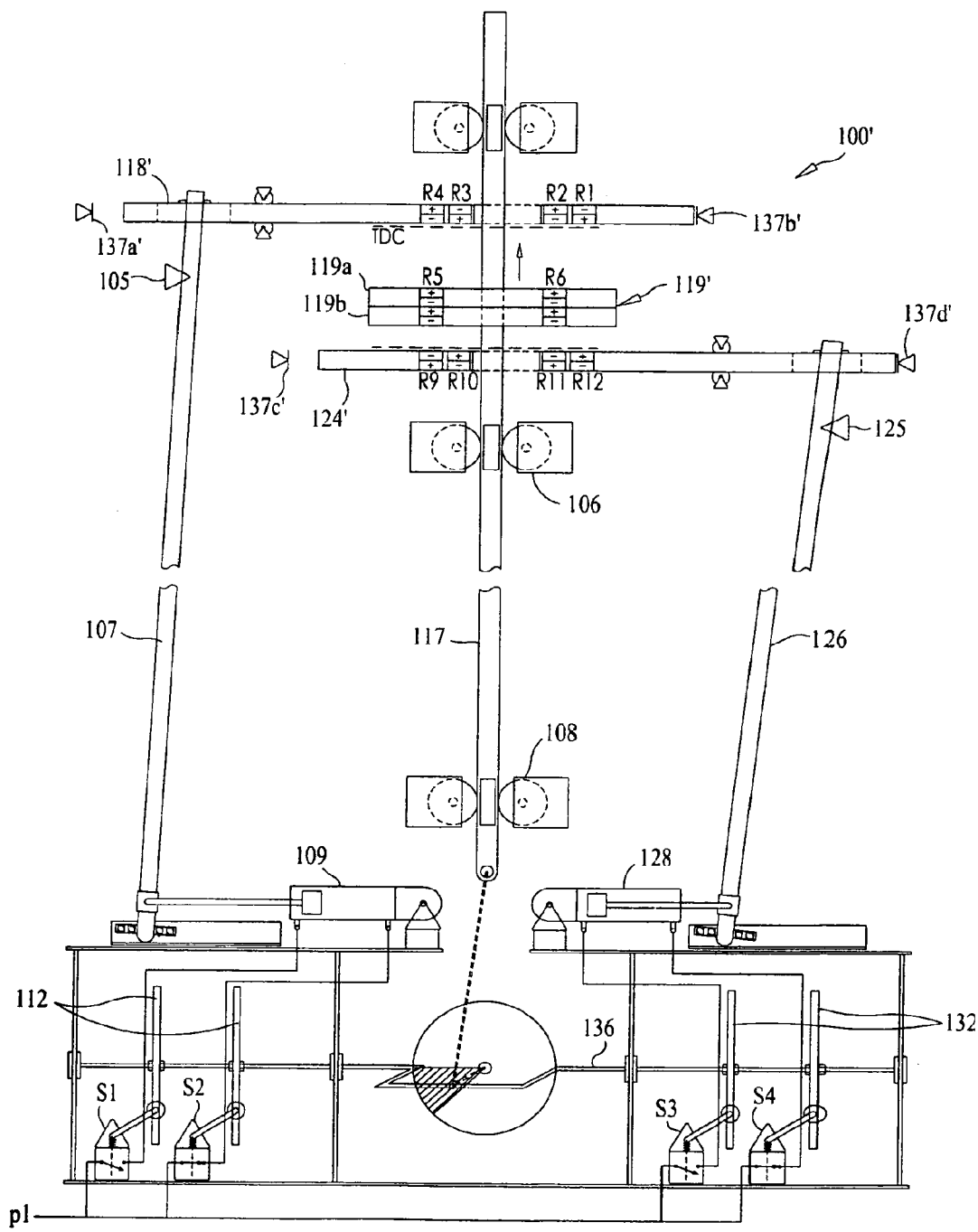

Referring now to FIG. 9, there is shown a fourth stage of operation of the present embodiment, which occurs from 226°-270° rotation of the crankshaft 136. In this stage, the thrust created in the second stage causes the piston 119' to continuously move upward and away from the lower magnetic field plate 124, correspondingly rotating the crankshaft 136 and attached cams 112a, 112b, 132a, 132b. As the crankshaft approaches 270° of rotation, the thrust created in stage three will grow weaker, while the attractive forces created by the position of the upper sliding magnetic field plate 118' relative to the piston plate 119' will start and grow stronger, thus accelerating the movement of the magnetic piston plate 119' towards the upper sliding magnetic field plate 118'. The air switch states through this stage results in the pneumatic cylinders 109, 128 maintaining both the upper and lower sliding magnetic plates 118', 124' against the right stops 137b', 137d'. The cam positions and switch states at about 270° rotation of the crankshaft 136 are shown in FIG. 18G.

Figure 10:
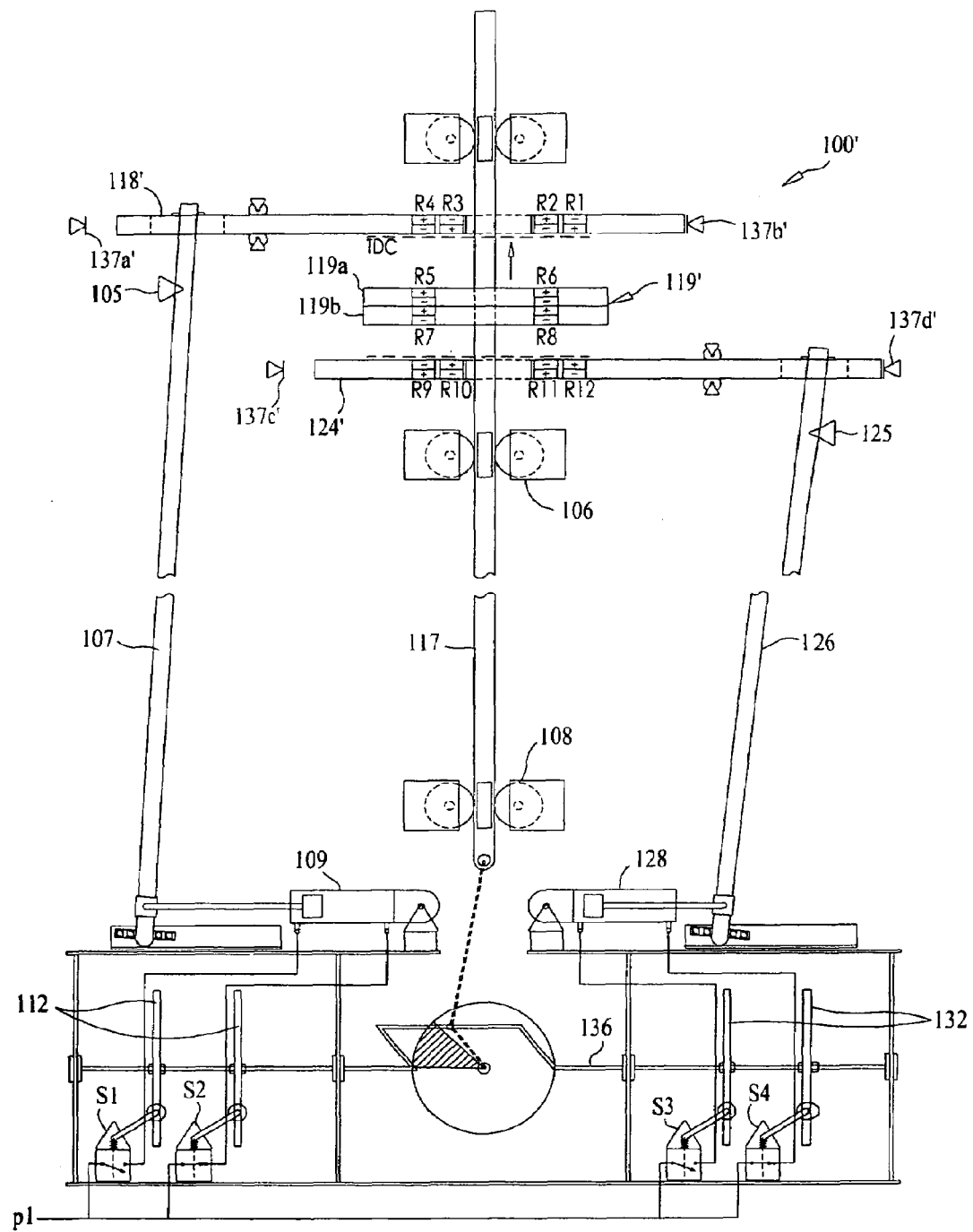

Referring now to FIG. 10, there is shown a fifth stage of operation of the present embodiment, which occurs from 271°-315° rotation of the crankshaft 136. The inertial movement created in stage four is sufficient to move the piston plate 119' past 270° of the crankshaft's clockwise rotation. Past 270°, the repulsive forces resulting from interaction between the lower sliding magnetic plate 124' and the magnetic piston plate 119' will no longer significantly influence the upwards linear movement of the piston rod 117. Instead, powerful attractive forces between the magnet rows R5, R6 on the upper surface of the piston plate 119' with the magnet rows R2, R4 on the lower surface of the upper sliding magnetic field plate 118' will take over, and continue to accelerate the movement of the piston plate 119' toward the upper sliding magnetic plate 118', correspondingly moving the crankshaft 136, clockwise. The air switch states through this stage results in the pneumatic cylinders 109, 128 continuing to maintain both the upper and lower sliding magnetic plates 118', 124' against the right stops 137b', 137d'.

Figure 11:
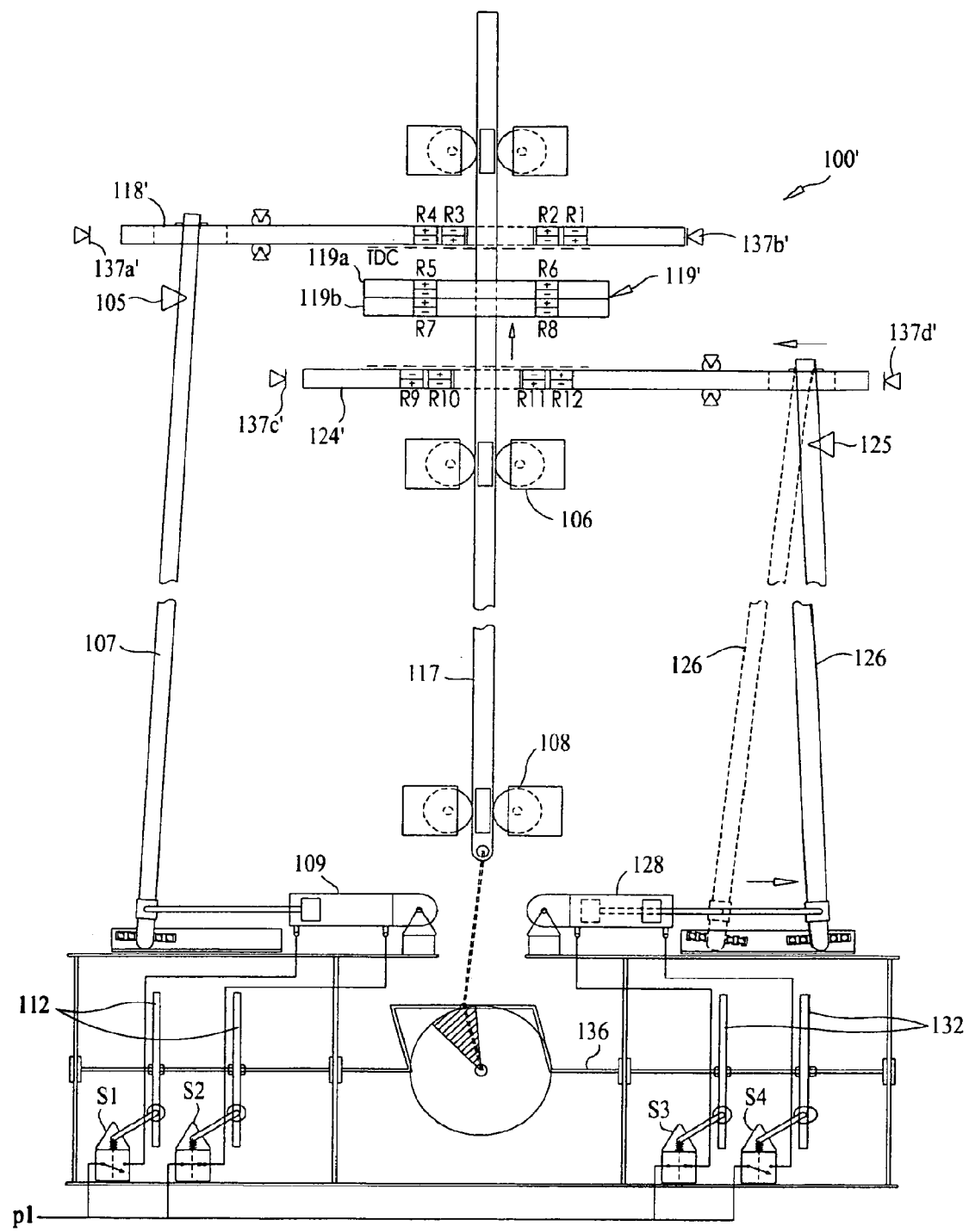

Referring now to FIG. 11, there is shown a sixth stage of operation of the present embodiment, which occurs from 316°-355° rotation of the crankshaft 136. Due to its previous placement, the upper sliding magnetic field plate 118' is already in a correct position to promote attraction between the magnet rows R2, R4 of the upper plate 118' and magnet rows R5 and R6 of the piston plate 119'. The attraction between the two plates 118', 119' grows stronger as the piston plate 119' approaches the upper plate 118'. At this point, a very powerful attraction exists between lower side of the upper plate 118' and the magnets on the upper surface of the piston plate 119', which will continue to pull the piston, and its attached piston rod 117, towards the upper plate 118'. In this stage, since the lower plate 124' has lost all of its magnetic influence over the piston plate 119', the cam 132a and 132b can actuate the activating lever 126, to move the lower plate 124' to the right end stop pair 137c' position. Note that the lower plate 124' can be moved as early as the point in the cycle where it does not significantly influence the movement of the piston plate 119', or as late in the cycle as, just prior to the need for its next interaction with the piston plate 119'. However, as can be seen from the figure, throughout the current stage, the upper sliding magnetic field plate 118' will be maintained in position against the right end stop pair 137b'.

The relative positions of the cams, and corresponding air switch states, through this stage are additionally shown in FIG. 18H. More particularly, at some point in this stage, in the present embodiment, the air switch S4 is OFF, and air switch S3 ON, thus causing the lever 126 to move the lower plate 124' from the right end stop pair 137d' to the left end stop pair 137c'. Air switch S1 is maintained OFF, while air switch S2 is on, thus retaining the upper plate 118' against the right end stop pair 137b'. The above portion of the cycle is referred to herein as the "Second Permanent Magnet Power Action", which refers to an attraction cycle.

Figure 12:
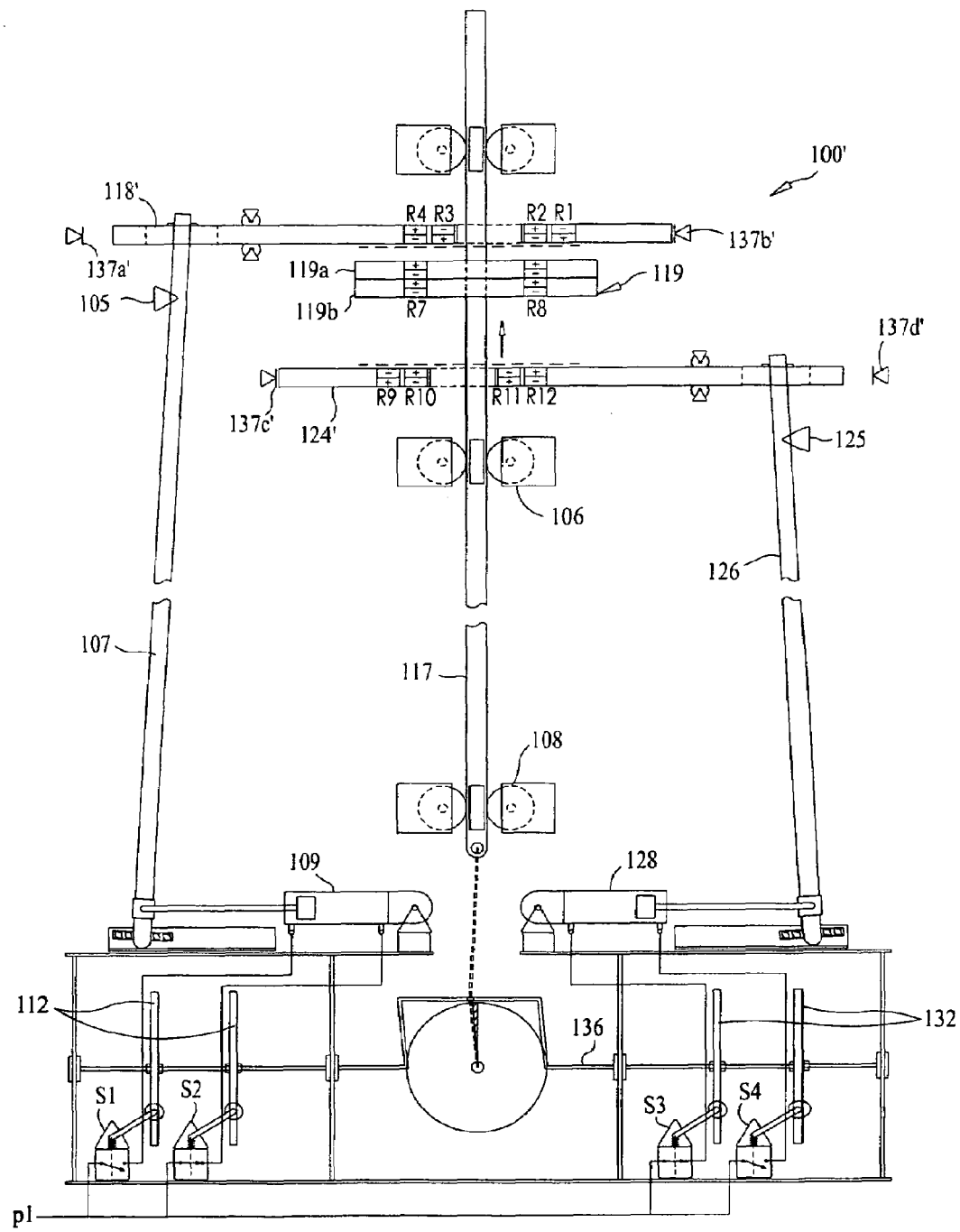

Referring now to FIG. 12, there is shown a seventh stage of operation of the present embodiment, which occurs from 356°-360° rotation of the crankshaft 136. During this cycle, the piston plate 119' reaches its "top dead center" [TDC], at the top of the stroke. During the final portion of its linear travel to the TDC (corresponding to the final 5 degrees of rotation of the crankshaft), the attractive forces between the magnet rows R5, R6 on the piston plate 119' and the magnet rows R2, R4 of the upper plate 118', draw the piston plate 119' to the TDC. The cycle is still in the "Second Permanent Magnet Power Action". At this time, the pneumatic cylinders 109, 128 and the activating levers 107, 126 are as shown in FIG. 12. Note that the lower plate 124' is now pre-positioned for the attraction portion of its cycle, which will occur between 75°-180° degrees of the crankshaft movement. The relative positions of the cams, and corresponding air switch states at 0°/360° rotation of the crankshaft are shown in FIG. 18A.

Figure 13:
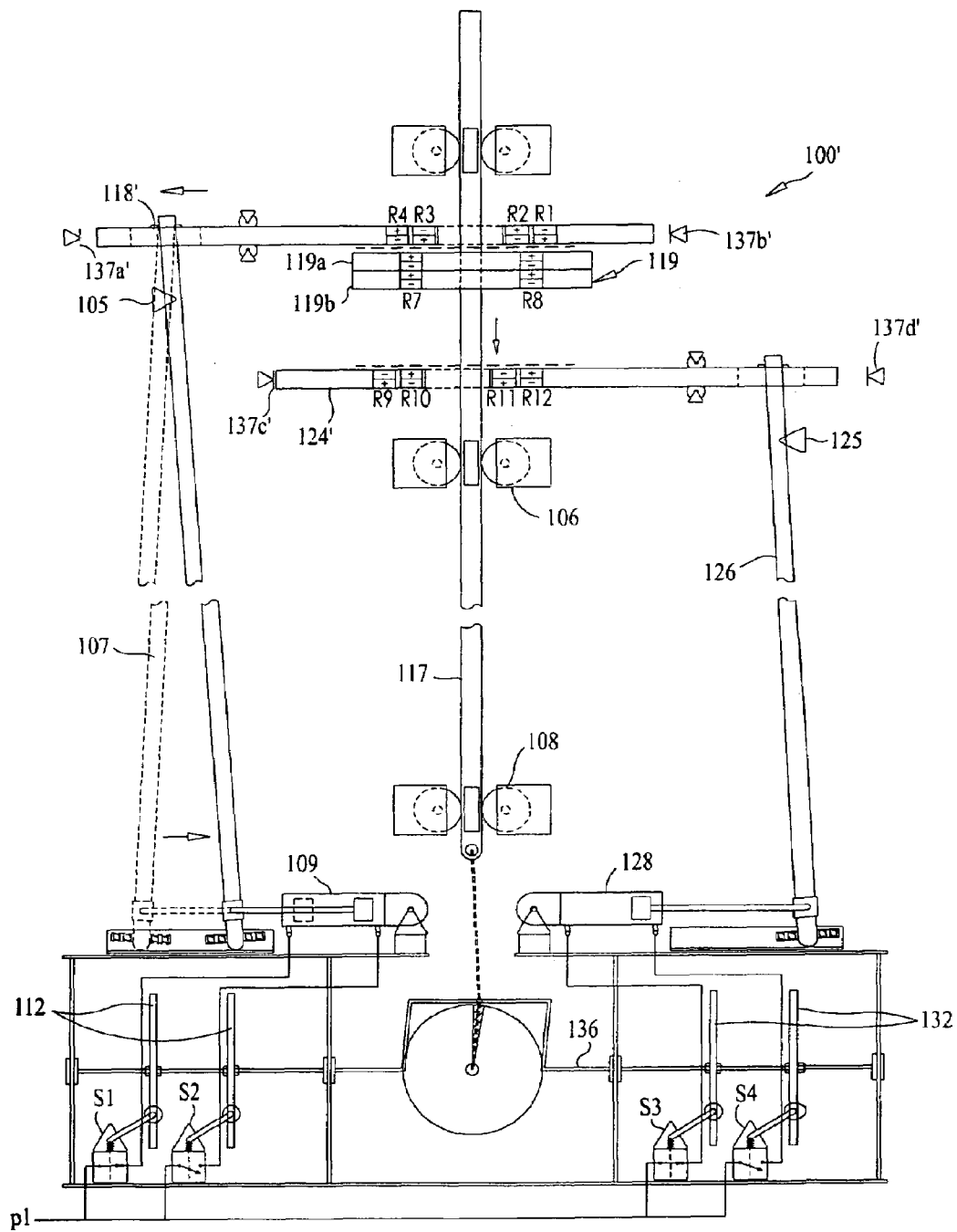

Referring now to FIG. 13, there is shown an eighth stage of operation of the present embodiment, which occurs from 001°-010° rotation of the crankshaft 136. This stage starts with the piston 119' in its TDC position, after which, the cams 112a, 112b, actuate air switches S1, S2 to actuate the pneumatic cylinder 109, resultantly, moving the activating lever 107 and causing the upper plate 118' to slide to its left end stop pair 137a'. The activating lever 107 will move the upper plate 118', over the pivot point 105, about 32 mm. With the change in position of the upper plate 118', magnet rows R1, R3 on the upper plate 118' will be forced to interact with the magnet rows R5, R6, on the piston plate, resulting in a strongly repulsive magnetic field forces that thrusts the piston plate 119' away from the upper plate 118'.

Figure 14:
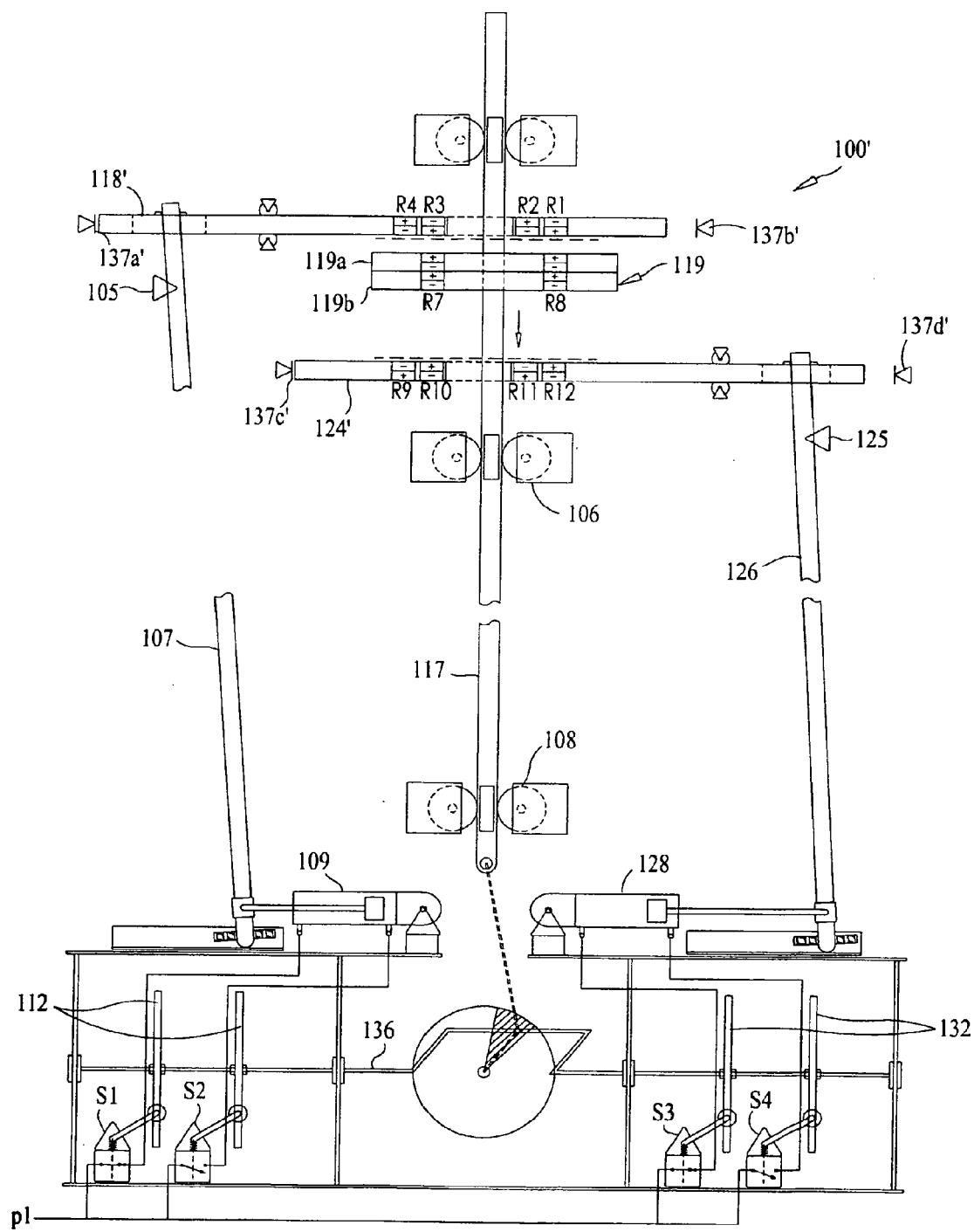

Referring now to FIG. 14, there is shown a ninth stage of operation of the present embodiment, which occurs from 011°-045° rotation of the crankshaft 136. With the levers 107, 126 and the upper and lower plates 118', 124' fixed by the current state of the pneumatic cylinders 109, 132, as shown, strong repulsion will thrust the piston plate 119' downwards, correspondingly moving the piston rod 117 and crankshaft 136. The relative positions of the cams, and corresponding air switch states at about 45° are shown in FIG. 18B. The above portion of the cycle is referred to herein as the "Third Permanent Magnet Power Action", which refers to a repulsion cycle.

Figure 15:
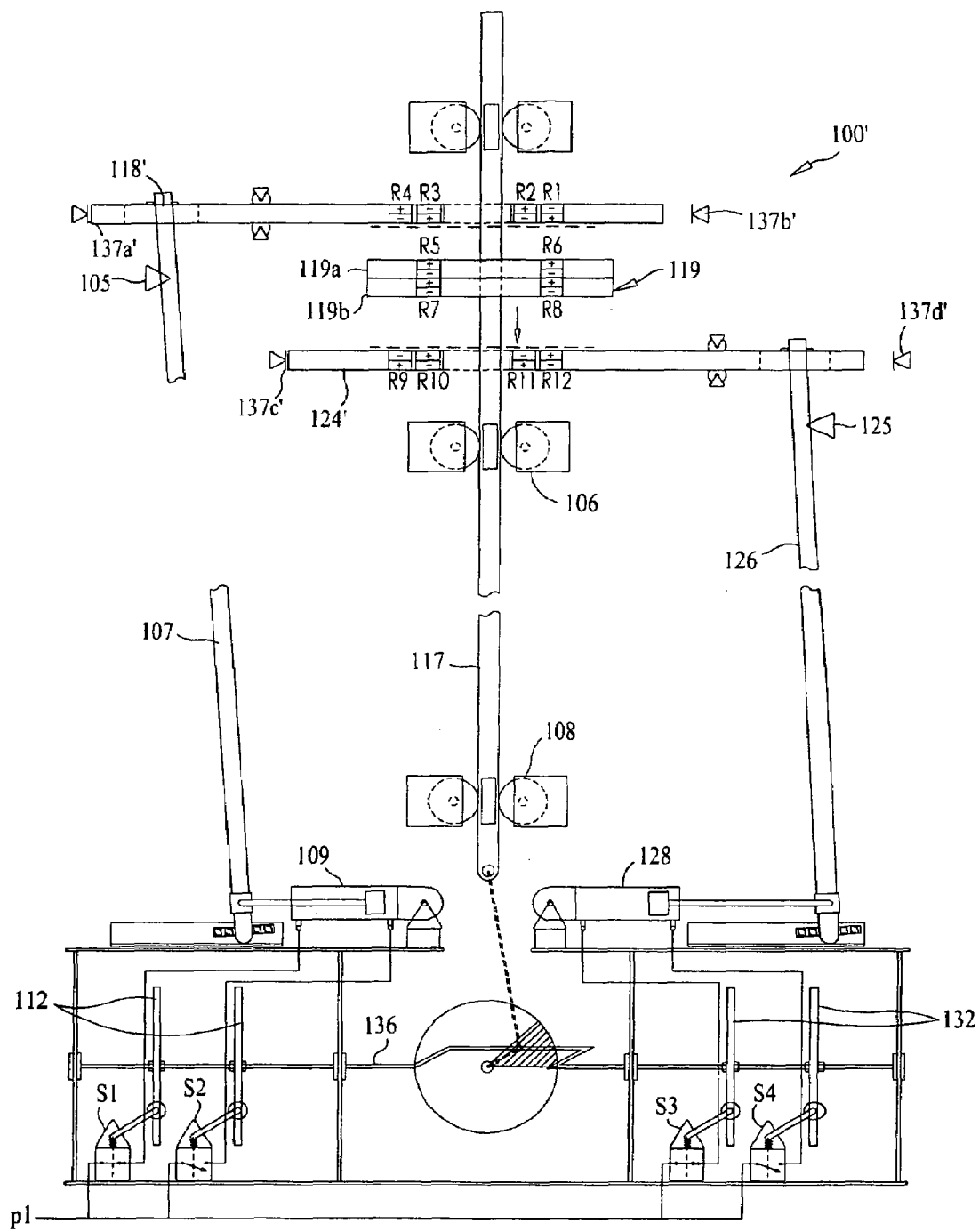

Referring now to FIG. 15, there is shown a tenth stage of operation of the present embodiment, which occurs from 46°-90° rotation of the crankshaft 136. The thrust created in the eighth and ninth stages, continues for at least another 30° of rotation of the crankshaft 136 (which is the translation of the downward linear movement of the piston rod 17). Approaching 90°, however, the repulsive force on the piston plate 119' from the upper plate 118' will grow weaker, while an attractive force from the lower plate 124' will begin to take hold on the piston plate 119', forcing the piston plate 119' downward. The relative positions of the cams, and corresponding air switch states at about 90° of this stage are shown in FIG. 18C.

Figure 16:
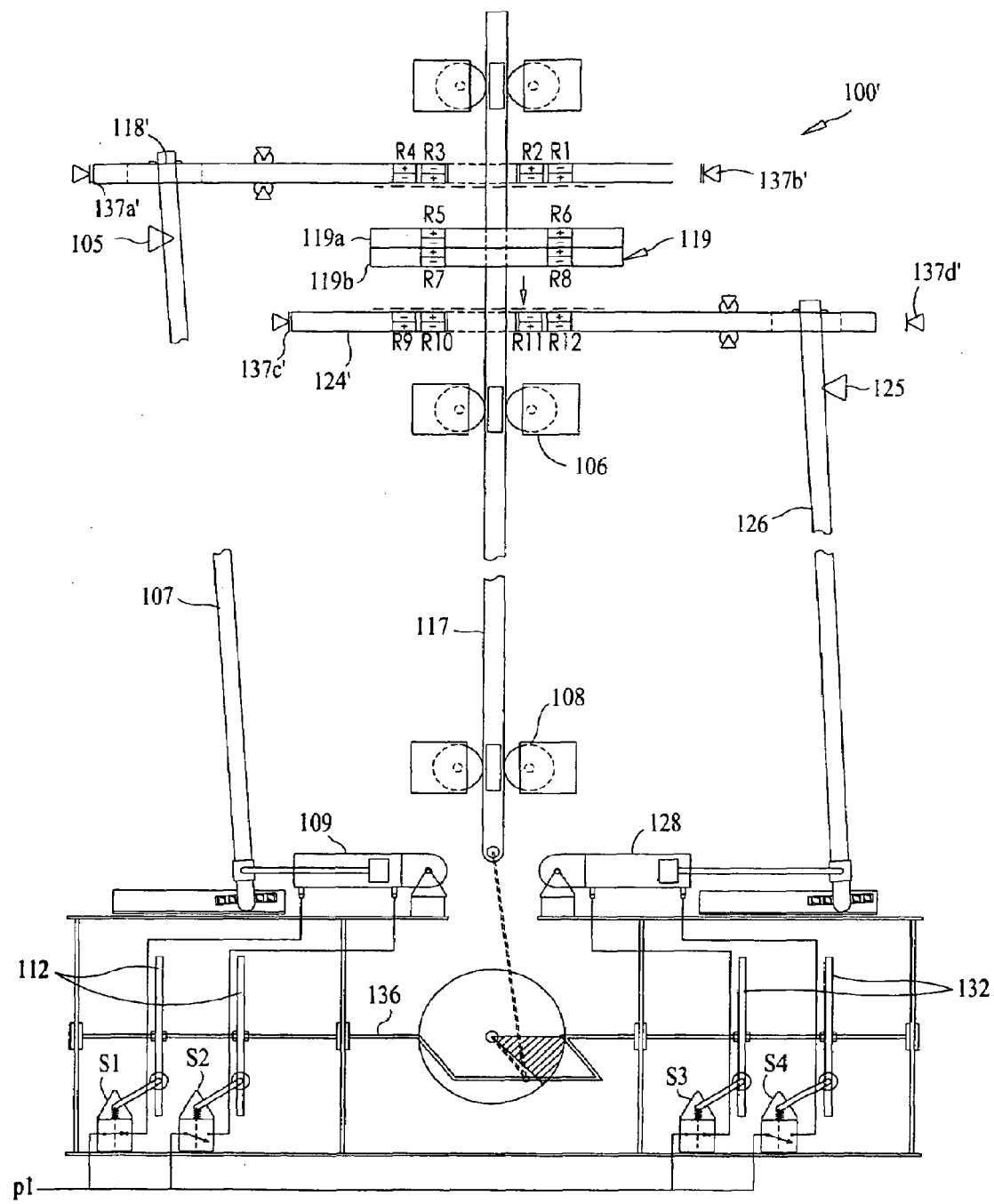

Referring now to FIG. 16, there is shown a eleventh stage of operation of the present embodiment, which occurs from 91°-135° rotation of the crankshaft 136. The inertial movement created in the ninth stage is sufficient to force the piston plate past the 90°-100° point of rotation the crankshaft 136. Past 100°, the effect of the upper plate 118' on the piston plate 119' will be negligent. However, the attractive forces between the magnet rows R7, R8 of the piston plate and R10, R12 of the lower plate 124' will take over, pulling the piston plate 119' downward towards the lower plate 124'. The attractive forces from the lower plate 124' will grow stronger with the approach of the piston plate 119'. The position of the upper and lower sliding magnetic field plates 118' and 124' remain unchanged through the current stage.

Figure 17:
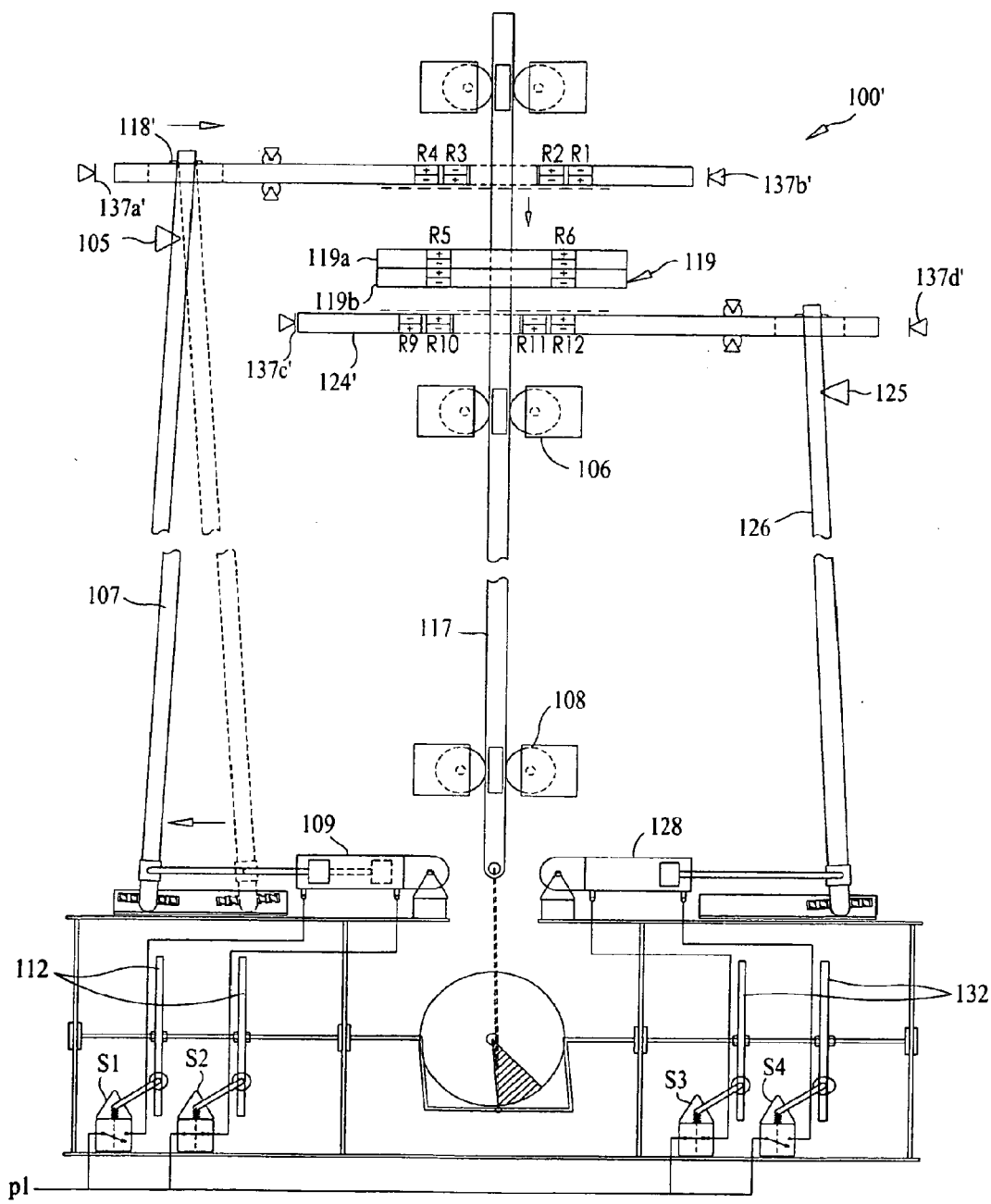

Referring now to FIG. 17, there is shown a twelfth stage of operation of the present embodiment, which occurs from 136°-175° rotation of the crankshaft 136. As the piston 119' approaches, the lower plate 124' is in the correct attractive position. As the piston plate 119' grows closer to the lower plate 124', the attraction between the two plates 119', 124' is great, further forcing the piston plate 119' downwards, and correspondingly moving the piston rod 117 and crankshaft 136. At the same time, since the upper plate 118' has lost all magnetic dominance over the piston plate 119' the cams 112a, 112b, trigger the air switches S1, S2, so as to actuate the pneumatic cylinder 109 and move the activating lever 107. Thus, the upper plate 118' is slowly moved from its left end stop pair 137a' to the right end stop pair 137b', where it will stay for about 180° more degrees of rotation of the crankshaft 136. After the transition, the positions of the cams and switches at about 175° rotation of the crankshaft is shown in FIG. 18D. After this stage, the cycle begins again with the first stage.

As can be seen herein, various points in the cycle trigger the pneumatic cylinders 109, 132, causing the upper and lower plates 118', 124' to move to a ready position. For example, in the above illustration of one possible cycle of the invention, the pneumatic cylinder 109 is actuated at a trigger point between 0°-10°, to move the upper plate 119' from the right end stop pair 137b' to the left end stop pair 137a', as shown in FIG. 13. Similarly, the pneumatic cylinder 128 is actuated at a trigger point between 180°-190°, to move the upper plate 119' from the left end stop pair 137c' to the right end stop pair 137d', as shown in FIG. 7. Additionally, the pneumatic cylinders 109', 128', help with breaking off the of the magnetic field force fusion in the attractive stage, in a fraction of a second, by repositioning the upper and lower field plates at the TDC and BDC. See FIGS. 11 and 17, respectively. As such, it can be seen that the pneumatic cylinders of the instant embodiment are useful to realign the upper and lower plates, relative to the piston plate, in order to create the desired attractive and repulsive forces.

Further, each pneumatic cylinder must have enough power to cause the activating lever 107, 126 to shear off the strong attractive forces that occur at the TDC and BDC, and to create a forceful exchange of magnetic field forces to initiate the next work stroke. Note that, providing a larger clearance between the sliding plates and the piston plate, results in the need for a less forceful pneumatic ram/cylinder (smaller unit), in order to break apart and/or fuse permanent magnet field forces together. However, a less forceful pneumatic ram results in a lower efficiency of the engine and a weaker power output on the crankshaft. Providing a smaller clearance between the sliding plates and the piston plate at the TDC and BDC, results in the need for a more forceful pneumatic ram (bigger unit) in order to break apart and/or fuse permanent magnet field forces together. This additionally results in a higher efficiency of apparatus and stronger power output on the crankshaft.

Figure 20A:
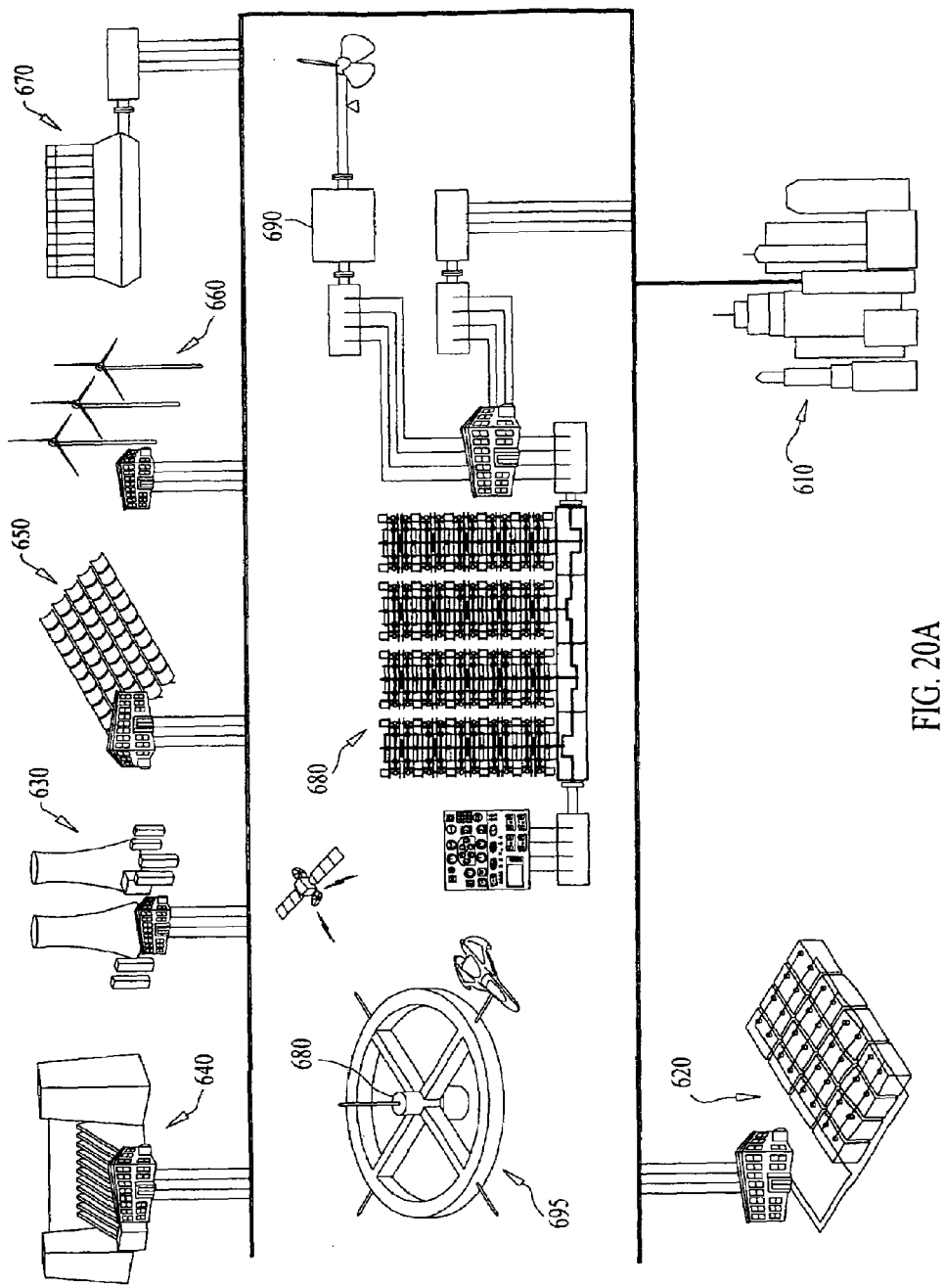
FIG. 20A is a schematic diagram showing a number of types of power generation systems, including the magnetic flux fusion power plant of one embodiment of the instant invention, which may be used terrestrially or in space.
Figure 20B:
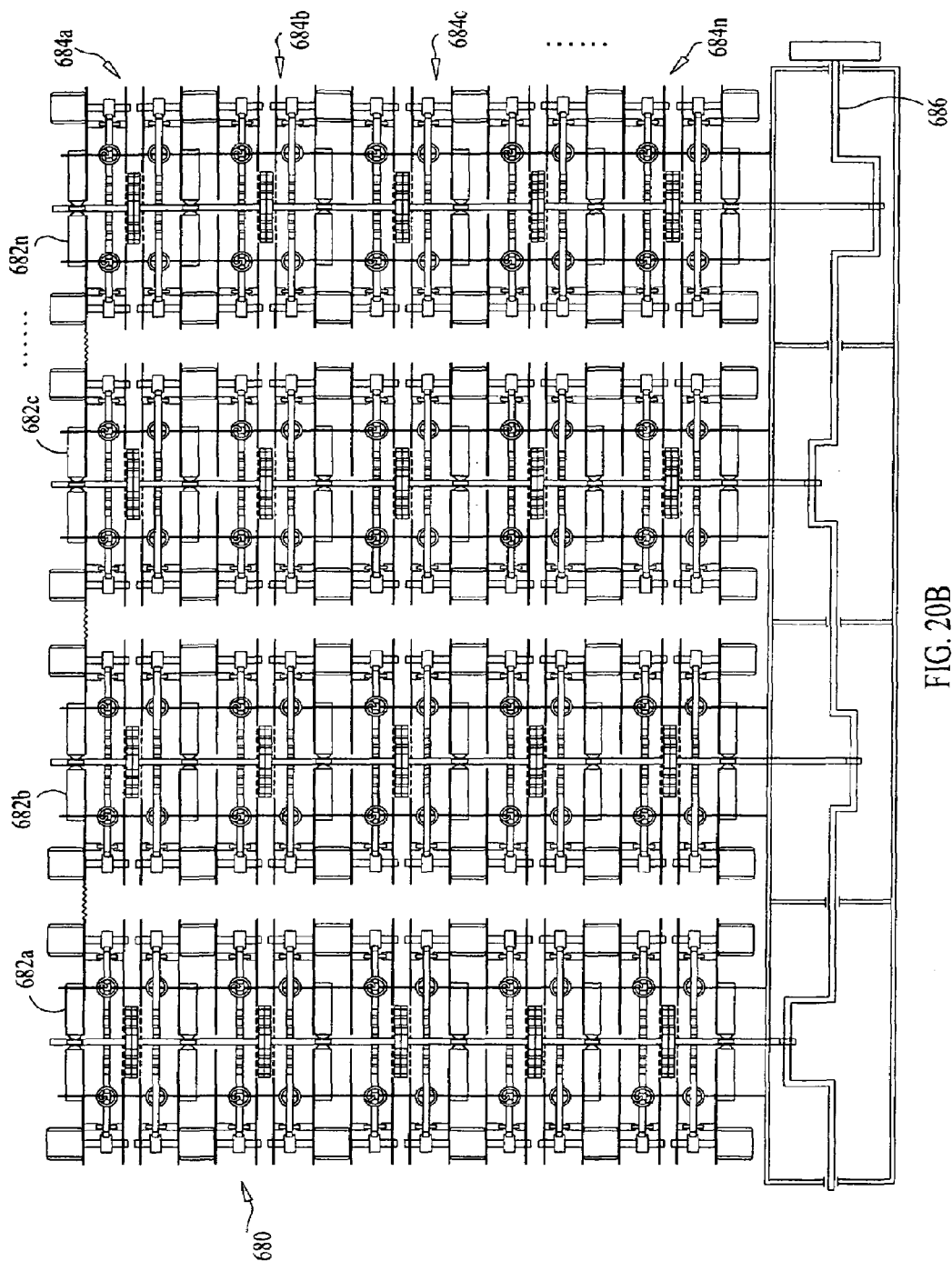
FIG. 20B is a side view of a multi-modular permanent magnet flux fusion engine in accordance with one embodiment of the present invention.
Figure 21:
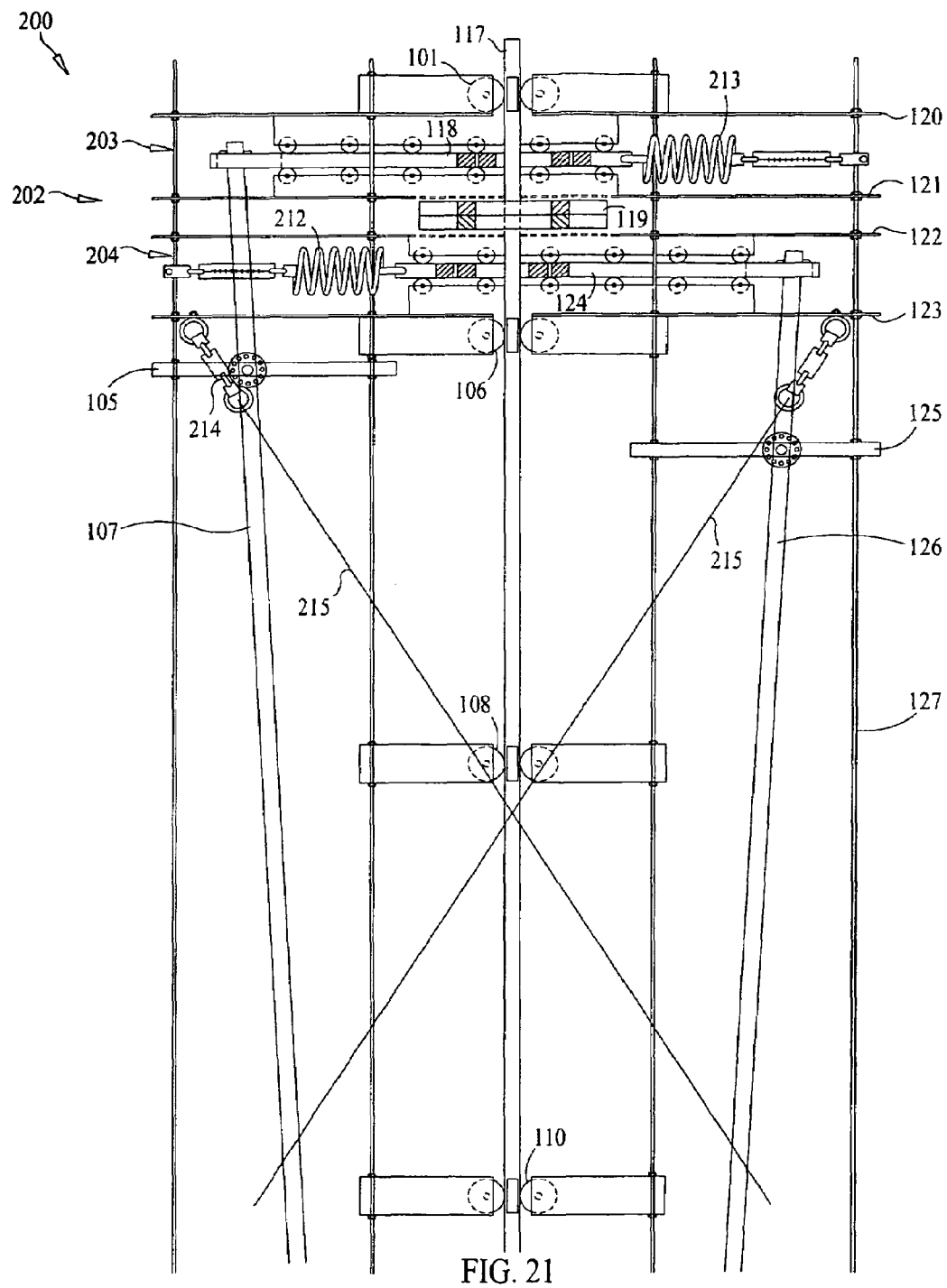
FIGS. 21 and 22 are partial schematic views of the top portion of a permanent magnet reciprocating engine, taken from the front and side, respectively, in accordance with one particular embodiment of the present invention.
Figure 22:
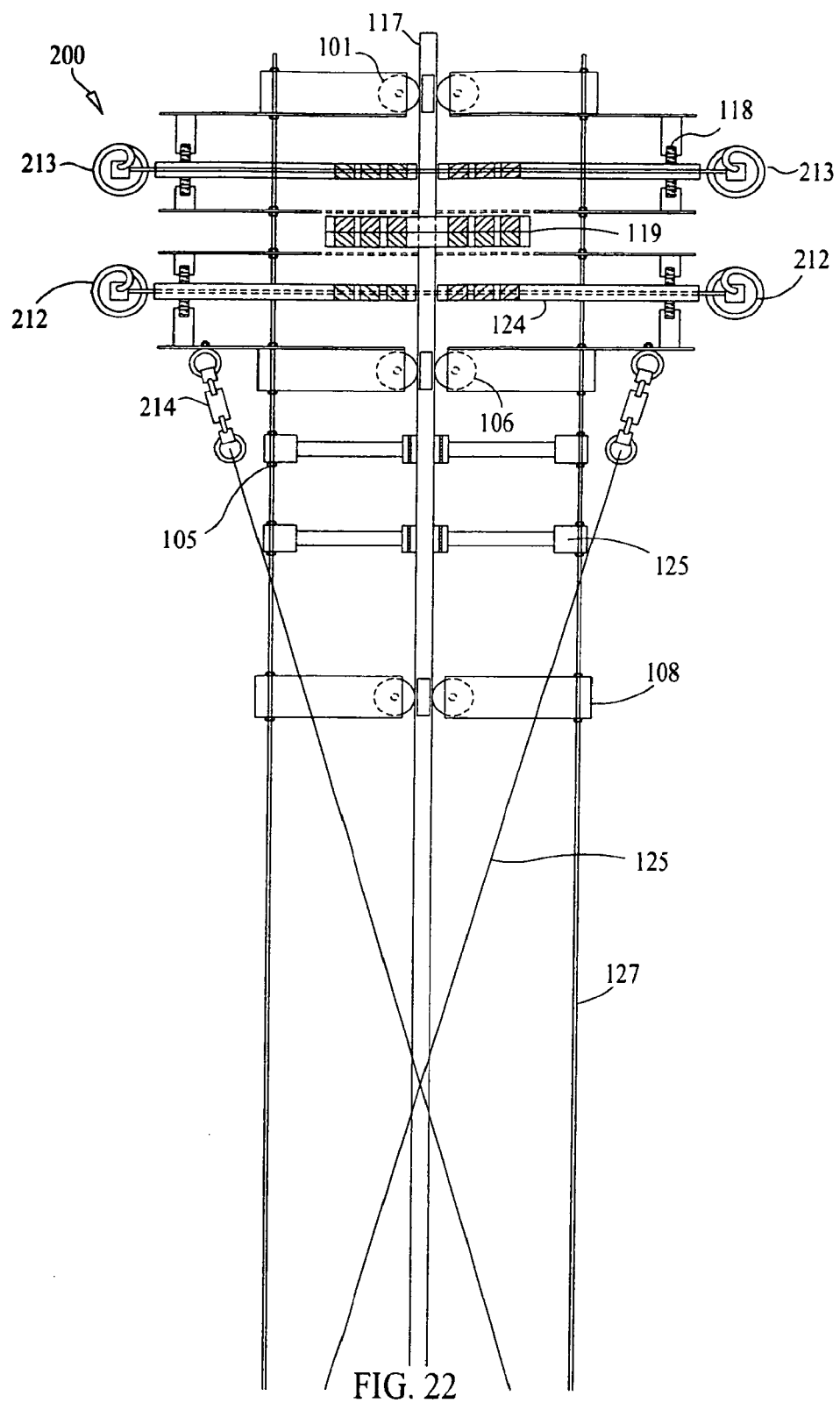

Referring now to FIG. 20A, existing power production methods utilize a variety of mechanisms to produce power that is either injected into the consumer power network 610, or into storage, such as in battery banks 620. Existing power production methods include, for example, nuclear/steam driven power generators 630, water turbine driven generators 640, solar panel powered generators 650, wind powered generators 660 and fossil fuel driven generators 670. From the principles and discussion herein, it can be seen how a permanent magnet driven flux fusion power plant 680 can be integrated with, or instead of, the existing power generators feeding the consumer network 610, power storage 620 and/or directly, such as providing direct power to the gear box 690 of a propulsion unit or motor shaft 690, etc. Permanent magnet driven flux fusion power plant 680 is additionally suitable for use in confined environments, such as in a ship or on a space station 695. Referring now to FIGS. 20A and 20B, such a multi-modular permanent magnet flux fusion engine 680 can provide ample power using multiple engines 682a-n connected in parallel and/or in series, made in accordance with the instant invention, with each engine optionally including multiple sliding and/or rotating flux modules 684a-n driving a single piston, and/or multiple modules driving a complex (i.e., multiple crank pin crankshaft 686) crankshaft engine.

Spring-Mechanical Actuation

Referring now to FIGS. 21-24, there is shown a permanent magnet driven reciprocating engine 200 in accordance with one particular embodiment of the present invention.

The permanent magnet driven reciprocating engine 200, additionally differs from the engine 100, in a number of respects. For example, the engine 200 includes a permanent magnet flux module 202 including upper and lower sliding magnetic plates 118 and 124, maintained between which is a magnetic piston plate 119. The magnetic piston plate 119 is carried on a piston rod 117, which is connected to the crank pin of a crankshaft 236, via the connecting rod 129, thus translating linear movement of the piston rod 117 into rotary movement of the crankshaft 236. As with the previous embodiment, magnets can be arranged on the upper and lower sliding magnetic field plates 118, 124 and the magnetic piston plate 119 in accordance with the different arrangements set forth in Table 2, above, or in some other desired combination that utilize the principles of Table 1 to produce the desired result.

However, unlike the above-described embodiment, in the present embodiment, the upper portion 203 of the module 202 additionally includes a right spring or spring pair 213, attached to the upper sliding magnetic field plate 118. Similarly, lower portion 204 of the module 202 includes a left spring or spring pair 212, attached to the lower sliding magnetic field plate 124. The springs 212, 213 may be coil springs attached between the frames of the module 202 and the upper and lower plates 118, 124. In one particular embodiment, the spring pair 213 includes two tension springs, while the spring pair 212 includes two compression springs. As will be described below, in connection with the bottom portion 200b of the engine 200, the springs 212, 213 assist the activating levers 107, 126 to move the plates, while helping to bias the levers 107, 126 along the cam grooves E, F in the left and right actuating drums 209, 228, respectively.

Figure 23:
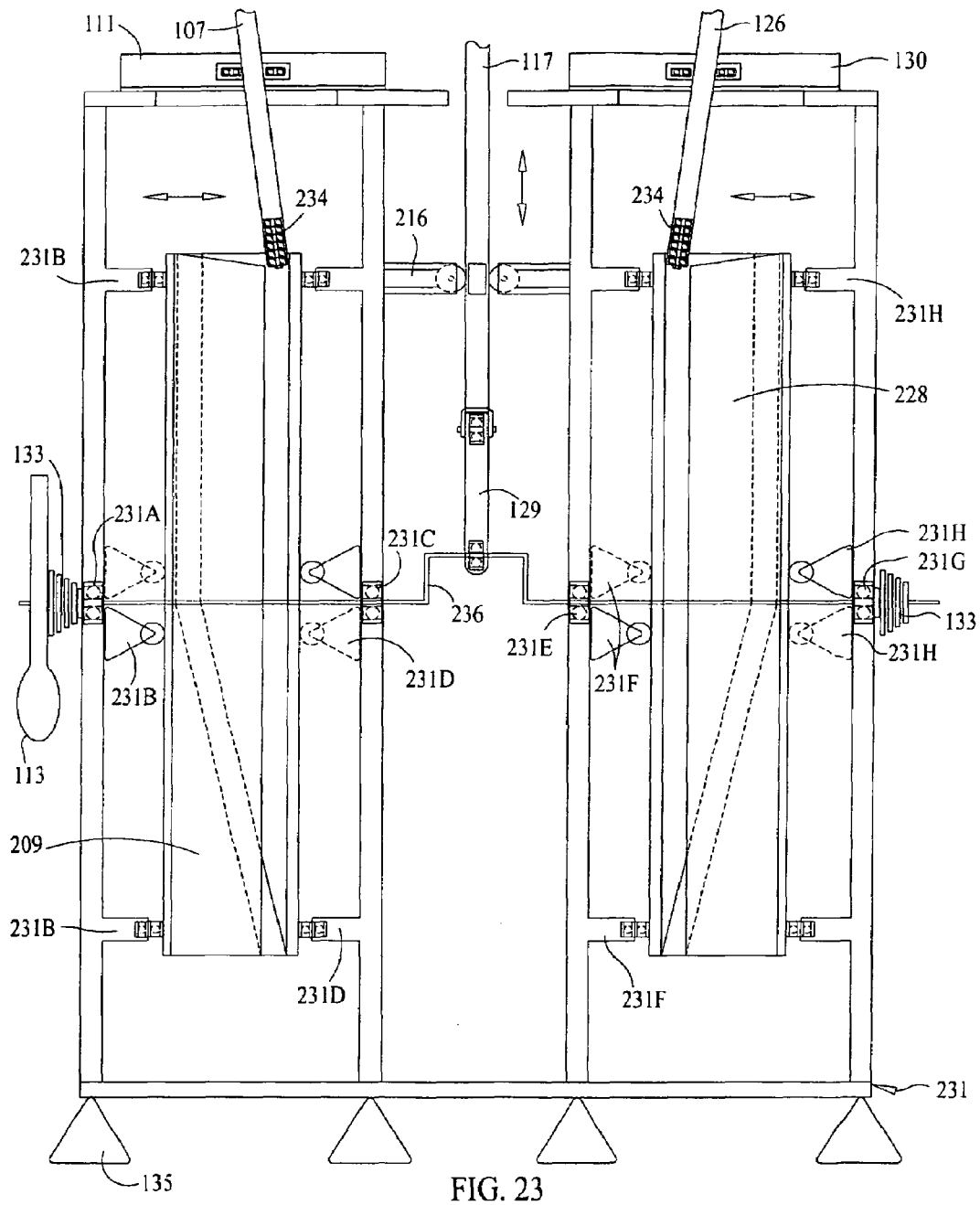
FIGS. 23 and 23A are a partial cutaway schematic representation of the lower drive portion of a permanent magnet reciprocating engine, taken from the front and side, respectively, in accordance with one particular embodiment of the present invention.
Figure 23A:
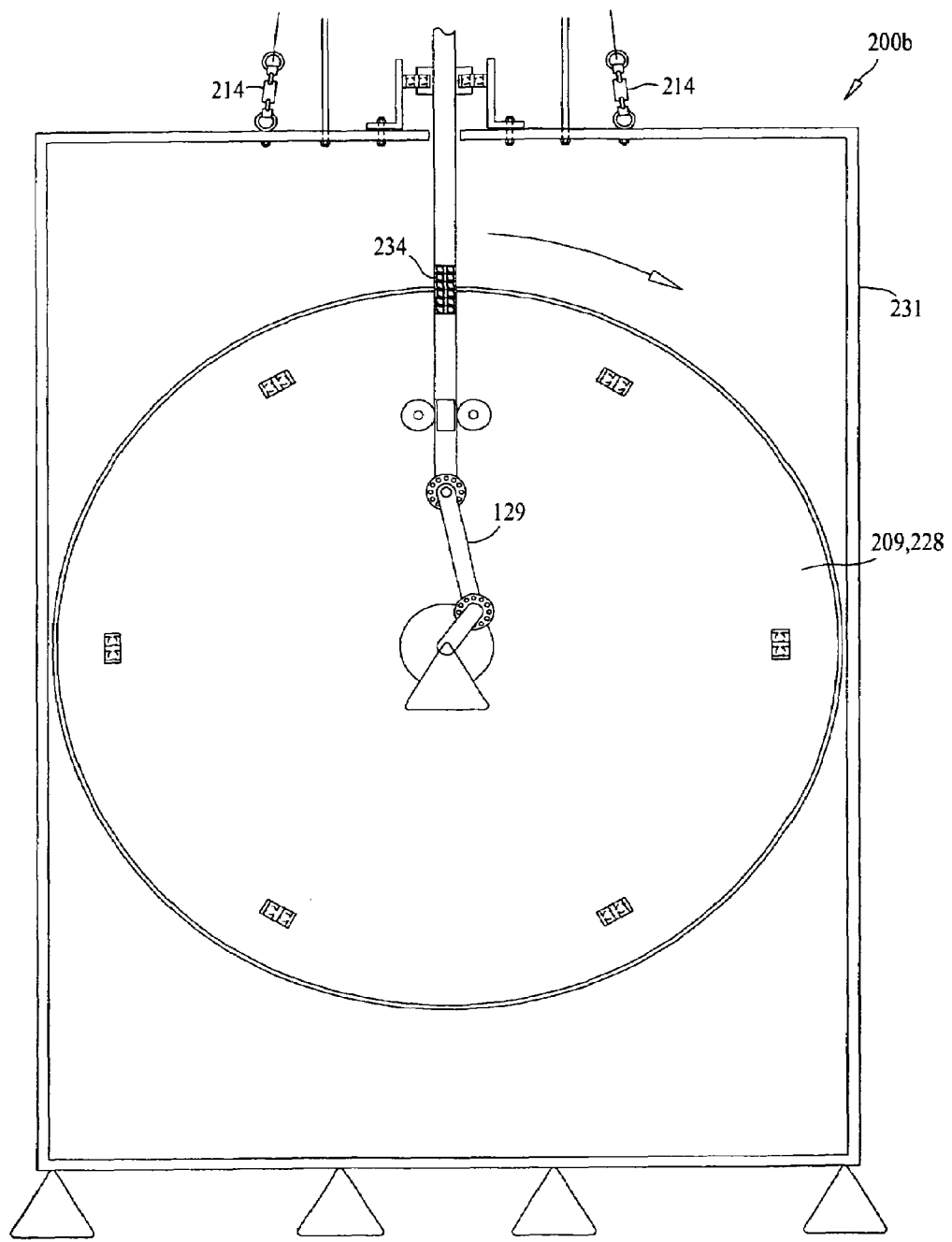
Figure 24:
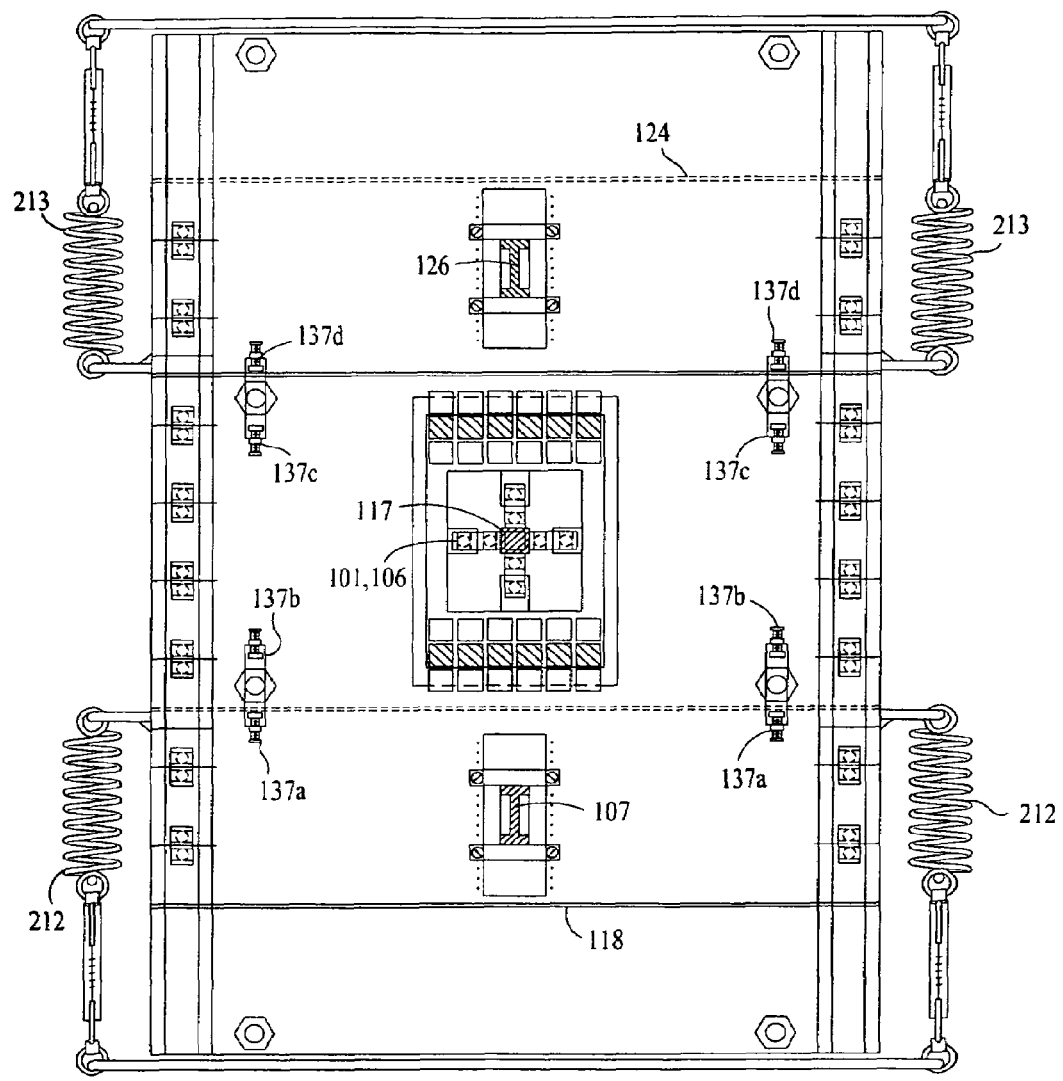
FIG. 24 is a representative view taken from the top of the sliding double acting module of the permanent magnet reciprocating engine of FIG. 21.

Referring now to FIGS. 21-24, and more particularly to FIGS. 23 and 23A, the present embodiment of the engine 200 includes a bottom portion 200b, including instead of pneumatic actuators 109. 128 of the previous embodiment, the left and right cam actuator rollers or drums 209, 228. Each of the cam drums 209, 228 includes a cam groove, E and F, respectively, on the surface of the cam drum 209, 228. Note that the cam grooves E, F shown in connection with the present embodiment are only one example of possible cam grooves that can be used to effectuate the instant invention. Rather, other cam grooves can be designed for different action of the sliding magnetic plates 118, 124, and/or for use with different magnetic combinations from Table 2.

The cam drums 209, 228 are fixedly mounted on the simple crankshaft 236, on either side of the crankshaft pin, such that the cam grooves E and F are correlated to each other, for each degree of rotation of the cam actuator rollers 209, 228. The crankshaft 236 and cam drums 209, 228 are all located with a crankshaft housing 231. Preferably, the crankshaft housing 231 is made from a suitable, non-magnetic material, such as aluminum, steel, wood, plastic or carbon fiber. However, it is desirable when choosing materials for all of the parts of the engine 200, to ensure that the assembly is not too heavy.

The crankshaft housing 231 of one particular embodiment includes therein, as shown in FIG. 23, four main crankshaft holding bearings 231a, 231c, 231e and 231g. Optionally, additional bearings may be included in the housing 231 to support the cam drums 209, 228. For example, as shown in FIG. 23, the crankshaft housing 231 additionally includes the support bearings 231b, 231d, 231f and 231h, which stabilize the cam drums 209, 228 and reduce swing and vibration during rotation. In the present embodiment, each of the support bearings 231b, 231d, 231f and 231h includes a set of six supporting roller bearings attached the housing 231.

In the engine 200, as with the engine 100, the upper and lower sliding magnetic field plates 118, 124, slide from side-to-side within the module, relative to the pivot points 105, 125, due to the pivoting of the activating levers 107, 126. However, unlike the engine 100, in the engine 200, the activating levers 107, 126 are driven by a the cam grooves E, F in the cam drums 209; 228. As such, referring back to FIG. 23, the drive portion 200a of the engine 200 additionally includes two roller bearing assemblies 234, one roller bearing assembly 234 being installed on the tip of each of the activating levers 107, 126. In one particular embodiment, the roller bearing assemblies 234 include six units of roller bearings. The roller bearing assemblies 234 serve as one of the linkages between the cam grooves E, F and the activating levers 107, 126, respectively. Further, the roller bearing assemblies 234 reduce the friction on the levers resulting from contact with the walls of the housing of the cam drums 209, 228 and the walls of the cam grooves E, F during rotation of the cam drums 209, 228. As with the previous embodiment, the engine 200 can include guide assemblies 111 and 130 to help maintain the loose bottom end of the levers 107, 126 centered and in contact with the cam grooves E, F.

As with the previous embodiment, ratchet gears 133 can, optionally, be provided on one or both ends of the crankshaft 236, to ensure unidirectional rotation of the crankshaft 236. Additionally, a further piston rod slide roller bearing 216 may be provided, in addition to roller bearings 101, 106, 108 and 110, to further support the piston rod 117, inside the crankshaft housing 231. In one particular embodiment, the bottom piston rod slide roller bearing 216 includes four roller bearing wheels positioned in the shape of a cross, to hold the square shaped piston rod 117, therebetween. The body of the roller bearing 216 may be made of a nonmagnetic material, such as aluminum.

Further, the engine 200 can be held together with INOX threaded rods 127, nuts, bolts, connectors etc. Additionally, if desired, steel cables 215 may be provided from top to bottom, all around the engines to stop any swinging motion of the engine 200, while in operation. In one particular embodiment, eight strands of steel cable are used. As shown more particularly in FIGS. 21, 22 and 24, the steel cables 215 can be connected at one end to the crankshaft housing 231. Further, if desired, tightening shackles 214 may be provided at the top portion 200a of the engine 200, to permit the cables 215 to be tightened, alternately, the cables 215 can be connected directly to the housing of the module 102. In the event that shackles 214 are provided, it would be preferable to provide on shackle for each of the cables 215. In one particular embodiment of the invention, wherein eight cables 215 are provided, eight shackles 214 would be, correspondingly, provided.

A full cycle of operation of the engine 200', illustrated through the resultant 360° of rotation of the crankshaft 236, will be described using FIGS. 25-37. The stages referenced in FIGS. 26-37 correlate to the degree of rotation of the crankshaft 236.

Figures 25A, 25B:
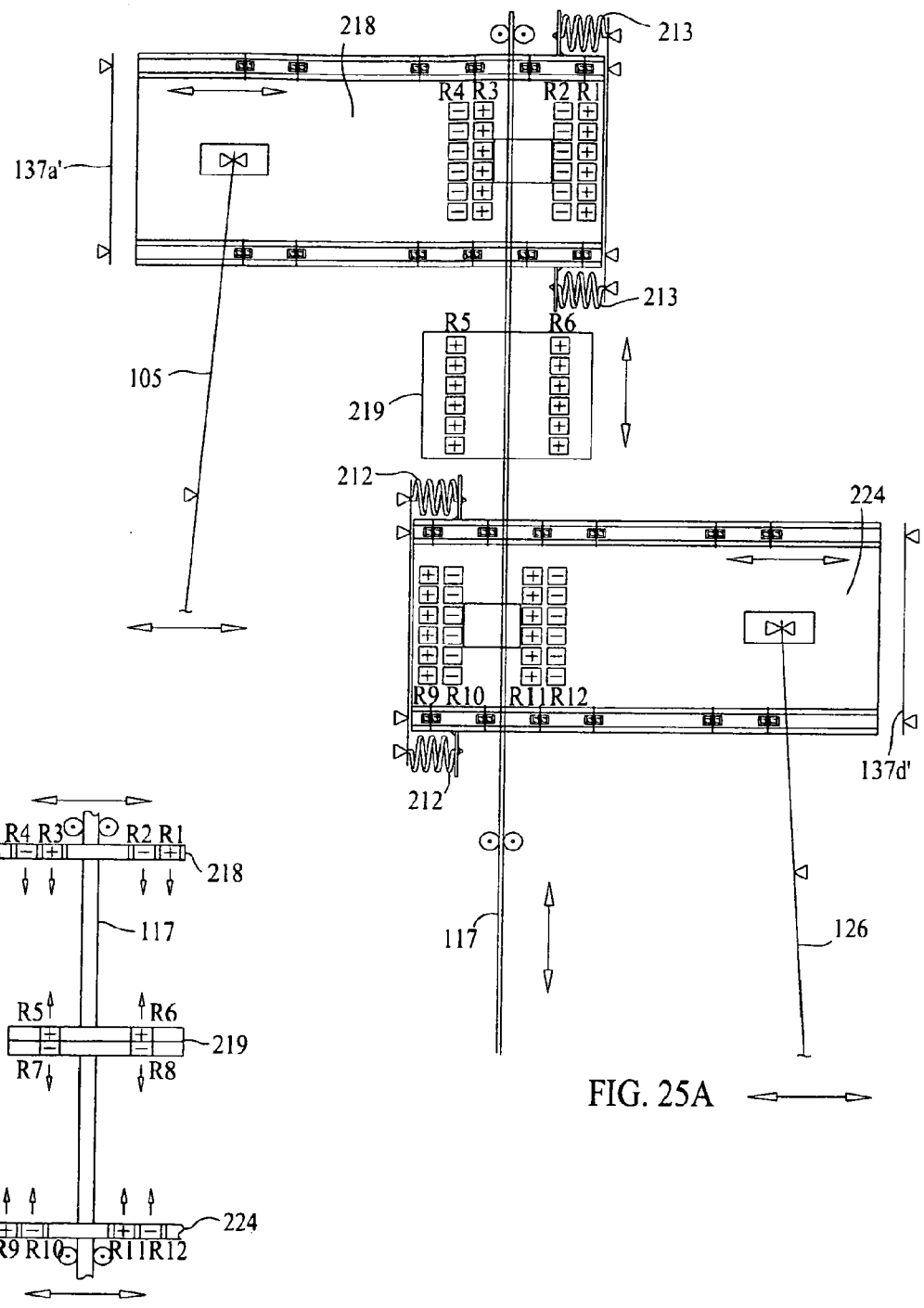
FIG. 25A is a partial exploded view of a reciprocating plate arrangement of a sliding double acting module in accordance with one particular embodiment of the instant invention.
FIG. 25B is a partial side plan view, in its operable arrangement, of the magnetically interacting portions of the reciprocating plate arrangement of FIG. 25A.
Figures 25C, 25D:
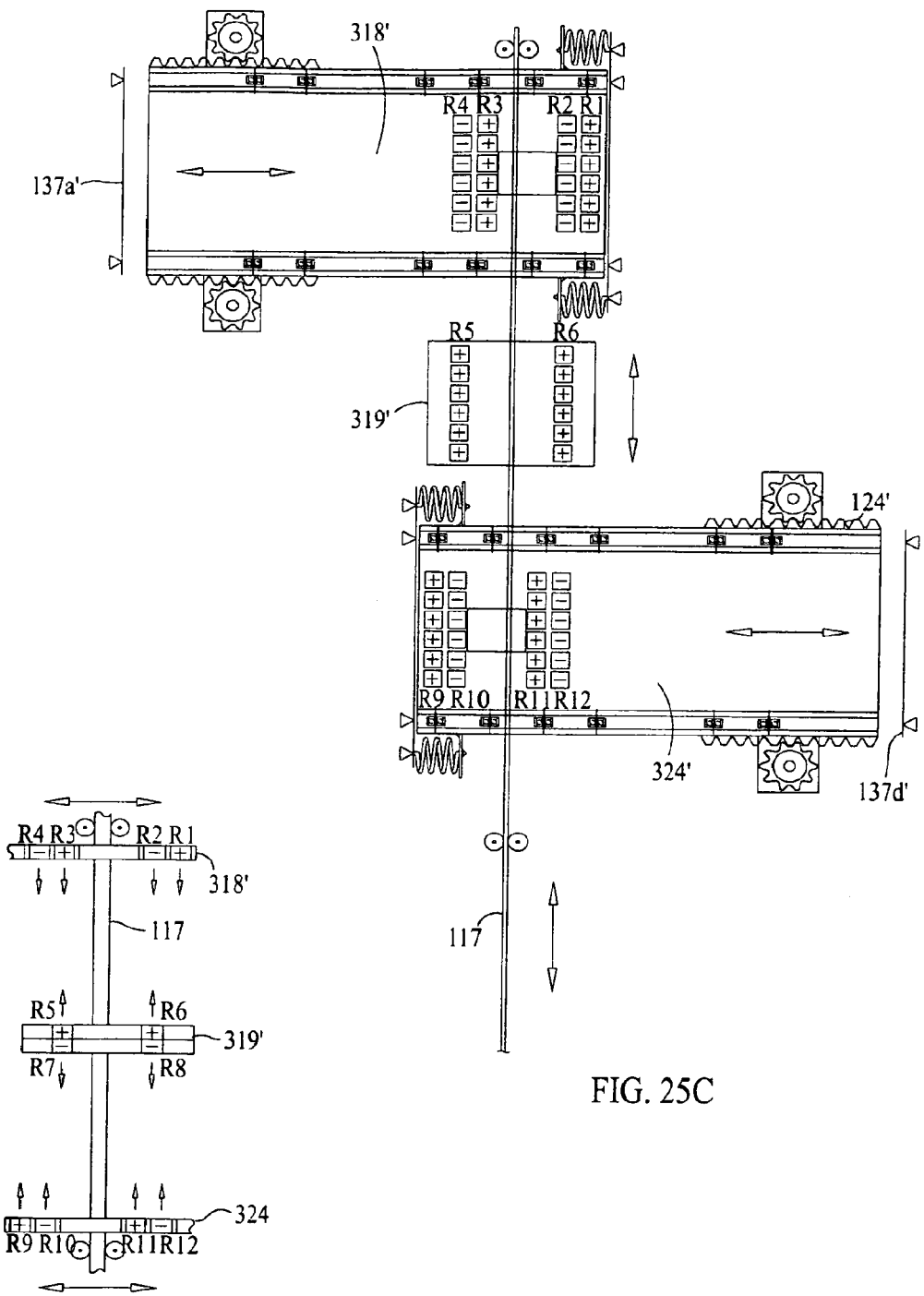
FIG. 25C is a partial exploded view of a reciprocating plate arrangement of a sliding double acting module in accordance with one particular embodiment of the instant invention.
FIG. 25D is a partial side plan view, in its operable arrangement, of the magnetically interacting portions of the reciprocating plate arrangement of FIG. 25C.

Referring now to FIG. 25, there is shown one particular arrangement of rows of permanent magnets, that can be used in connection with the engines 200; 200'. Note however, that the use of the magnet configuration of FIG. 25, in connection with describing the operation of the exemplary engine 200' in FIGS. 26-37, is not meant to be limiting. From the discussion herein, it can be seen how one could adapt the apparatus to be used with other magnet configurations, such as any of those in Table 2, or others, to make the instant invention. For example, the plates 218, 219 and 224 of FIGS. 25A-25B, could be replaced by the plates 118'/118"/318'/318", 119'/119"/319'/319" and 1241/12411/3241/324" of FIGS. 5A-B, 19A-B, 39A-B, 40A-B, 41A-B, 72B and 85A-B, 86A-B, 87A-B, 88B, 89B, 90B, 91B, 92B, 93B, 94B, 95B, 96B and 97B. However, for purposes of explanation, the cycle for the present embodiment will be described in connection with FIGS. 26-37, consistent with use of the plate configuration shown in FIG. 25 and defined in the entry for FIG. 25 in Table 2.

Figure 26:
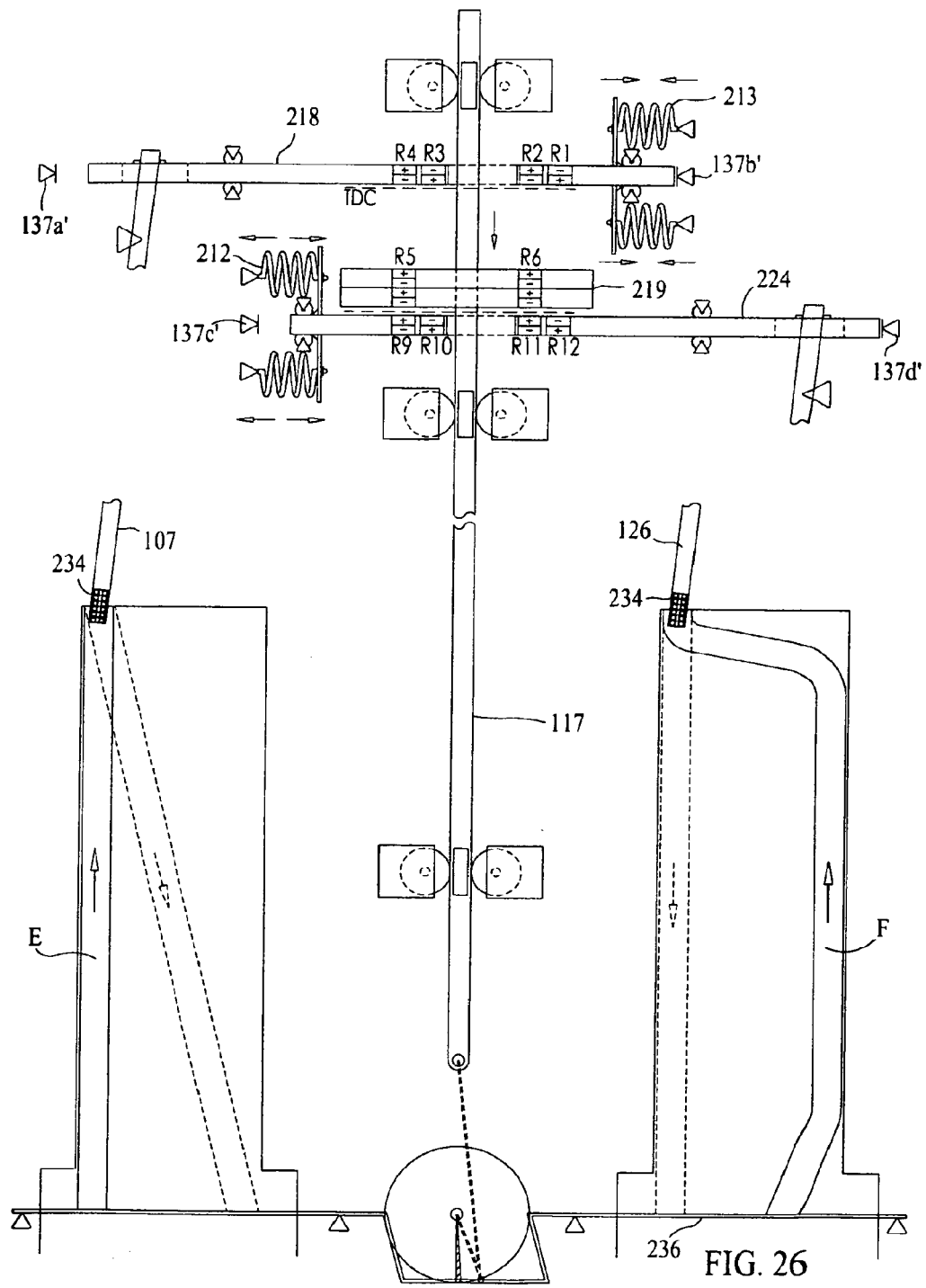
FIGS. 26-37 are simplified partial front schematic views of a permanent magnet reciprocating engine in accordance with one particular embodiment of the present invention shown at particular points of time during the cycle of operation through 360° rotation of a crankshaft.

Referring now to FIG. 26, there is shown a first stage of the cycle for the engine 200' which occurs between 176° and 180° rotation of the crankshaft 236. At the beginning of this first stage, the magnetic piston plate. 219 is in the state of linear movement approaching the "bottom dead center" (BDC), as a result of the "Fourth Permanent Magnet Power Action" attractive force between the (−) polarity magnet rows R7, R8 on the lower surface part of magnetic piston plate 219 and the (+) polarity magnet rows magnet rows R9, R11 on the upper surface of the lower sliding magnetic plate 224. Due to proximity of the two plates, and the arrangement of the polarities of the magnet rows, there is a strong attraction between the piston plate 219 and the lower plate 224 that accelerates the motion of the piston plate 219 towards the BDC. The motion of the piston plate 219, correspondingly moves the piston rod 117 and the crankshaft 236. As the crankshaft 236 moves, the cam drums 209, 228, rotate. In the present embodiment, rotation is performed in a clockwise (CW) direction, although it can be seen how the invention could be modified for the crankshaft 236 to rotate counter-clockwise (CCW).

As the cam drums 209, 228 rotate, the actuating levers, one end of which is biased into the cam grooves E, F, follow the cam grooves E, F. As such, during rotation of the cam drums 209, 228 in the first stage, the activating levers 107, 126 are positioned as shown in FIG. 26. Note that the cam grooves E and F include transitional periods ("transition"), wherein the orientation of the sliding plates are changed, as well as long periods wherein the orientation of the plates is maintained unchanged ("maintenance"). As can be seen from the profile of the cam groove E, in this first stage, the upper sliding plate 218 has just finished a long period of transition (demonstrated by the angled portion of the cam groove E, shown in dotted line), and is entering a long period of maintenance (demonstrated by the straight profile of the cam groove E). During the transition period, the upper sliding plate 218 moved into the proper alignment for the attraction portion of its cycle, i.e., abutting right end stop pair 137b', so as to align the (−) polarity magnet rows R2, R4 with the (+) polarity magnet rows R5, R6 on the piston plate 219. Additionally, as can be seen, the lower sliding plate 224, is at the end of a long maintenance period (demonstrated by the straight profile of the cam groove F, shown in dotted line) and will, at the end of this first stage, enter a period of transition (demonstrated by the first angled portion of the cam groove F).

While still in the maintenance position, the lower sliding plate 224 is maintained against the right end stop pair 137d', and the spring pair 213 is charged (i.e., the tension springs are stretched). Additionally, while the upper plate 218 abuts the right end stop pair 137b', the spring pair 212 is also charged (i.e., the compression springs are compressed).

Figure 27:
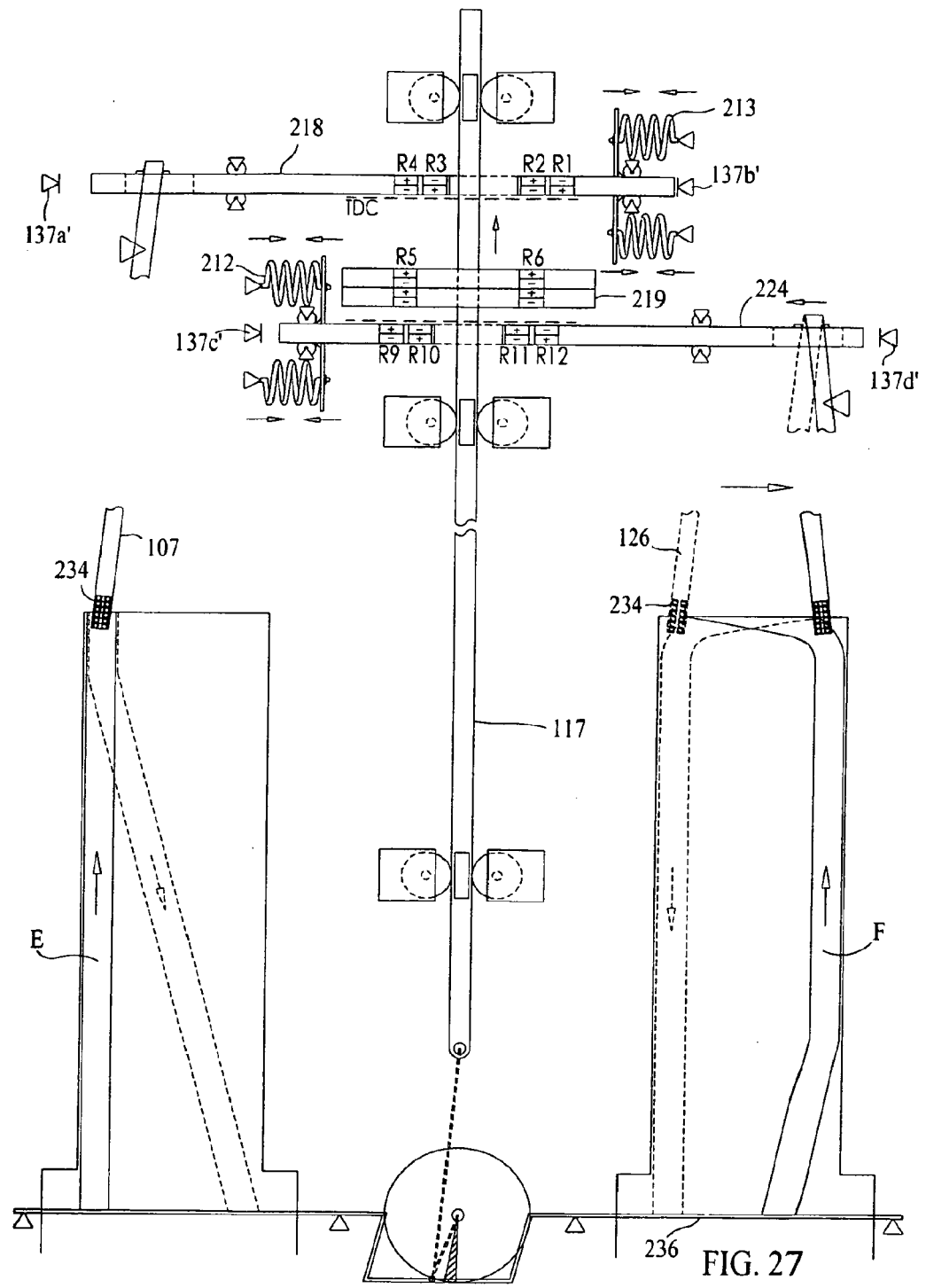

Referring now to FIG. 27, there is shown a second stage of operation of the present embodiment, which occurs from 181°-190° rotation of the crankshaft 236. In this second stage of operation, the piston plate 219 starts from BDC in its stroke. During this stage, the lower plate 224 transitions from the attraction stage to the repulsion stage, by transitioning (i.e., moving as a result of the lever 126 following the transition portion of the groove F) to realign its magnetic rows. During the transition, it may seem like the piston plate 219 is not moving through almost 7-10 degrees rotation of the crankshaft, in actuality, it does. In fact, it is the movement of the piston plate 219, that drives the crankshaft, and correspondingly, the cam drums 209, 228, through the transition. The cam groove E, during this stage, maintains the upper plate 218 against the right end stop pair 137b', while the cam groove F moves the lower plate 224 to a position against the left end stop pair 137c'. The discharging of the energy stored in the tension springs 213 assists the movement of the lower plate 224, while helping to bias the distal end of the activating lever 126 against the wall of the cam groove F during the transition. Additionally, the discharging of the spring pair 213 helps to break off, in a fraction of a second, the magnetic field flux at the BDC. As with the previous embodiments, in the instant embodiment, the lower sliding plate is moved from right to left, about 32 mm. Once the lower plate 224 is at rest against the left end stop pair 137c', the spring pair 213 is discharged, and the (−) polarity magnet rows R10, R12 are brought into alignment with the (−) polarity rows R7, R8 on the piston plate 119, starting a repulsion portion of the cycle.

Figure 28:
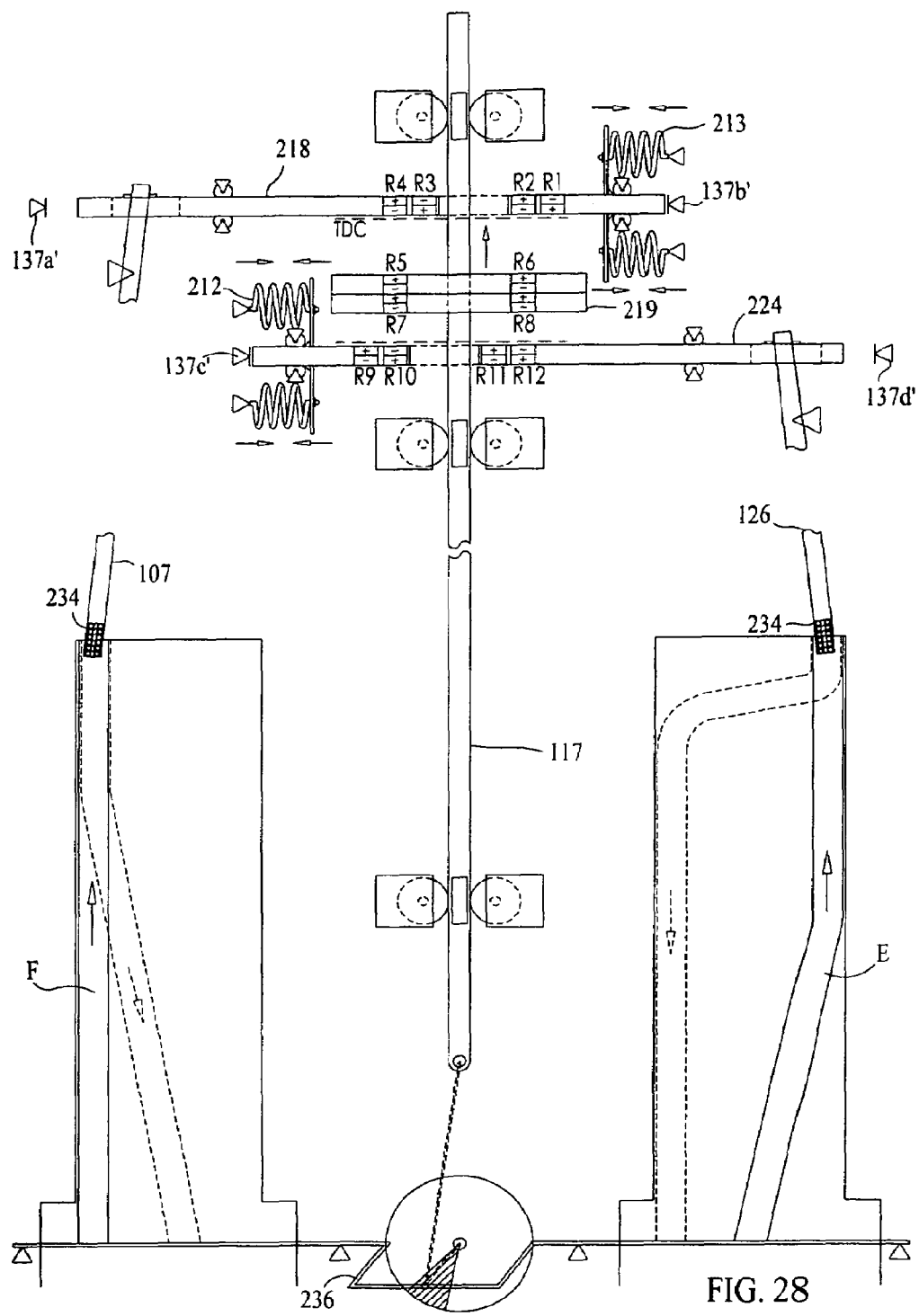

Referring now to FIG. 28, there is shown a third stage of operation of the present embodiment, which occurs from 191°-225° rotation of the crankshaft 236. Having moved in the last stage, the lower plate 224 exerts enters the "First Permanent Magnet Power Action" exerting a repulsive force on the piston plate 219, thrusting the piston plate 219 upwards towards the upper plate 218, due to the designed instability in the system. The movement upwards of the piston plate 219 will, correspondingly move the piston rod 117 and the crankshaft 236, which will maintain the movement of the of the cam drums 209, 228. This movement, due to the powerful repulsion of the piston plate 219, will advance the cycle for almost 100° of crankshaft rotation. As noted in connection with the second stage, the spring pair 213 is presently discharged, while the spring pair 212 is still charged.

Figure 29:
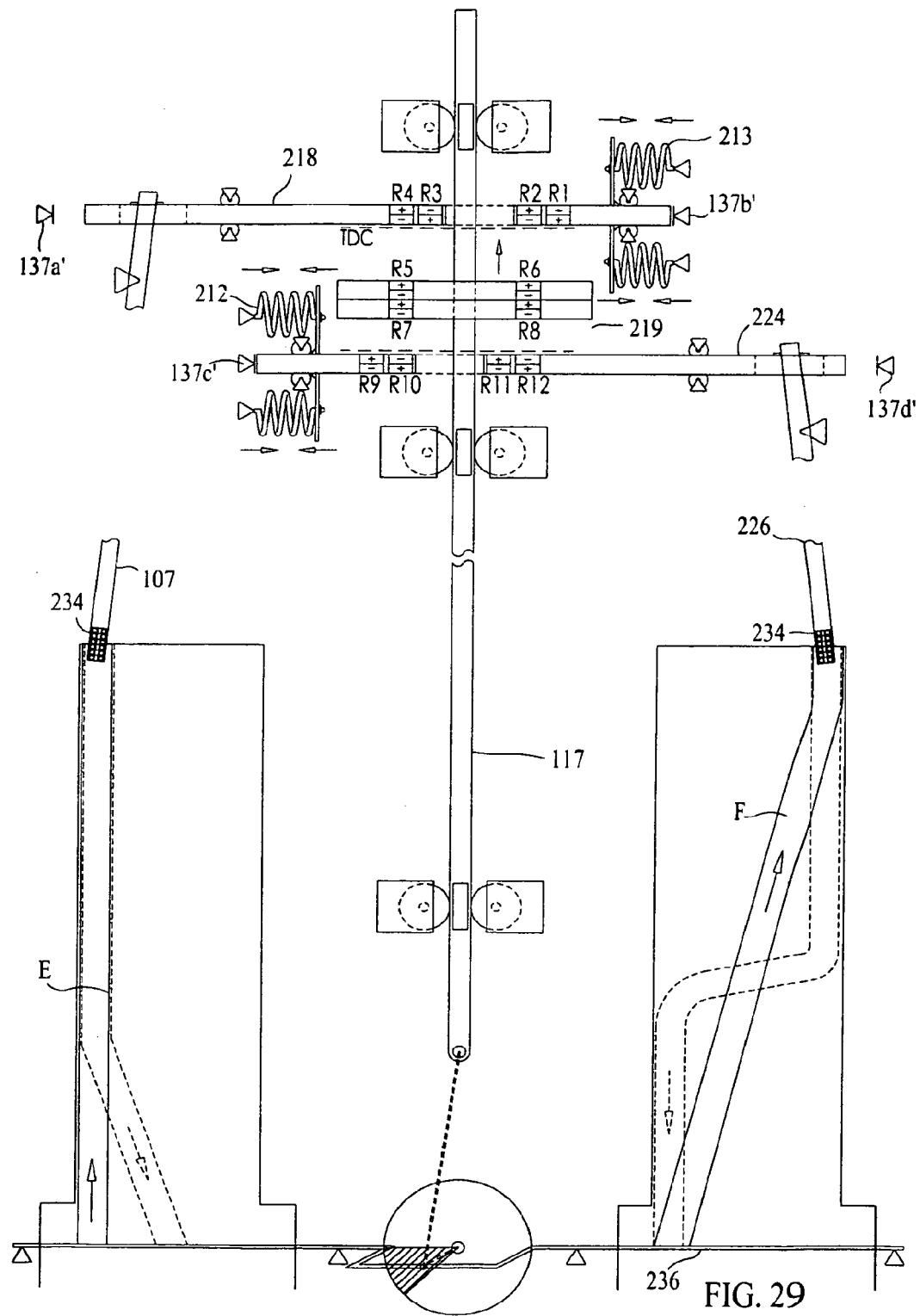

Referring now to FIG. 29, there is shown a fourth stage of operation of the present embodiment, which occurs from 226°-270° rotation of the crankshaft 236. The repulsive thrust created between the lower plate 224 and the piston plate 219 in the previous stage is strong enough to support movement of the piston plate 219, and correspondingly, the crankshaft, through at least another 30° of clockwise rotation. As the piston plate 219 approaches the end of this stage, at around 270° of CW rotation of the crankshaft 236, the thrust created by the repulsion occurring at the BDC will be weak. However, at this point, the piston plate 219 will enter the magnetic field created by the magnets in the upper plate, and this attraction will come into play, accelerating the movement of the piston plate 219, towards the upper plate 218.

Figure 30:
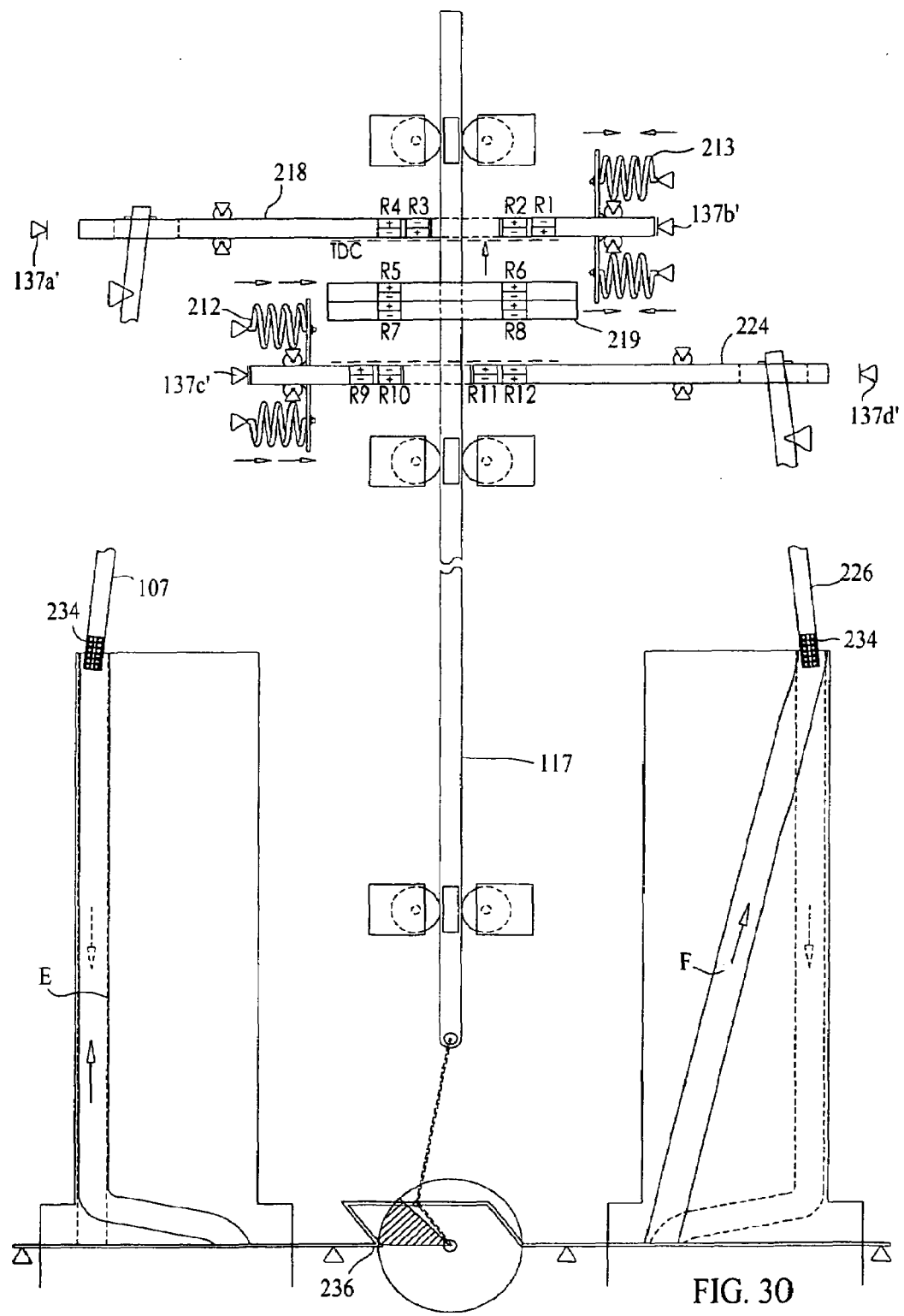

Referring now to FIG. 30, there is shown a fifth stage of operation of the present embodiment, which occurs from 271°-315° rotation of the crankshaft 236. In this stage, the inertial motion of the piston plate 219, created in stage four is sufficient to move the piston plate 219, and correspondingly, the crankshaft, past the 270° point of rotation. Beyond 270°, the prevalent force on the piston plate 219 will be an attractive force exerted by the upper plate 218 on the piston plate 219, thus pulling the piston plate upwards towards upper plate 218. Such attractive force results from the (−) polarity magnet rows R4, R2 on the lower surface of the upper plate 218, being aligned with the (+) polarity rows R5, R6 on the upper surface of the piston plate 219. Such alignment will cause the attractive forces to grow stronger as the piston plate 219 approaches the upper plate 218. Upper magnetic dominance of attraction will continue throughout this stage, and become stronger accelerating the piston plate 219, and correspondingly the crankshaft 236 and cam drum 228. After about the 315° point of rotation of the crankshaft 236, and the corresponding position of the piston plate 219, the magnetic field on the lower plate 224 will cease to contribute to the upward movement of the piston plate 219, and the cam follower portion of the activating lever 126 enters a transitional portion of the cam groove F, as shown.

Figure 31:
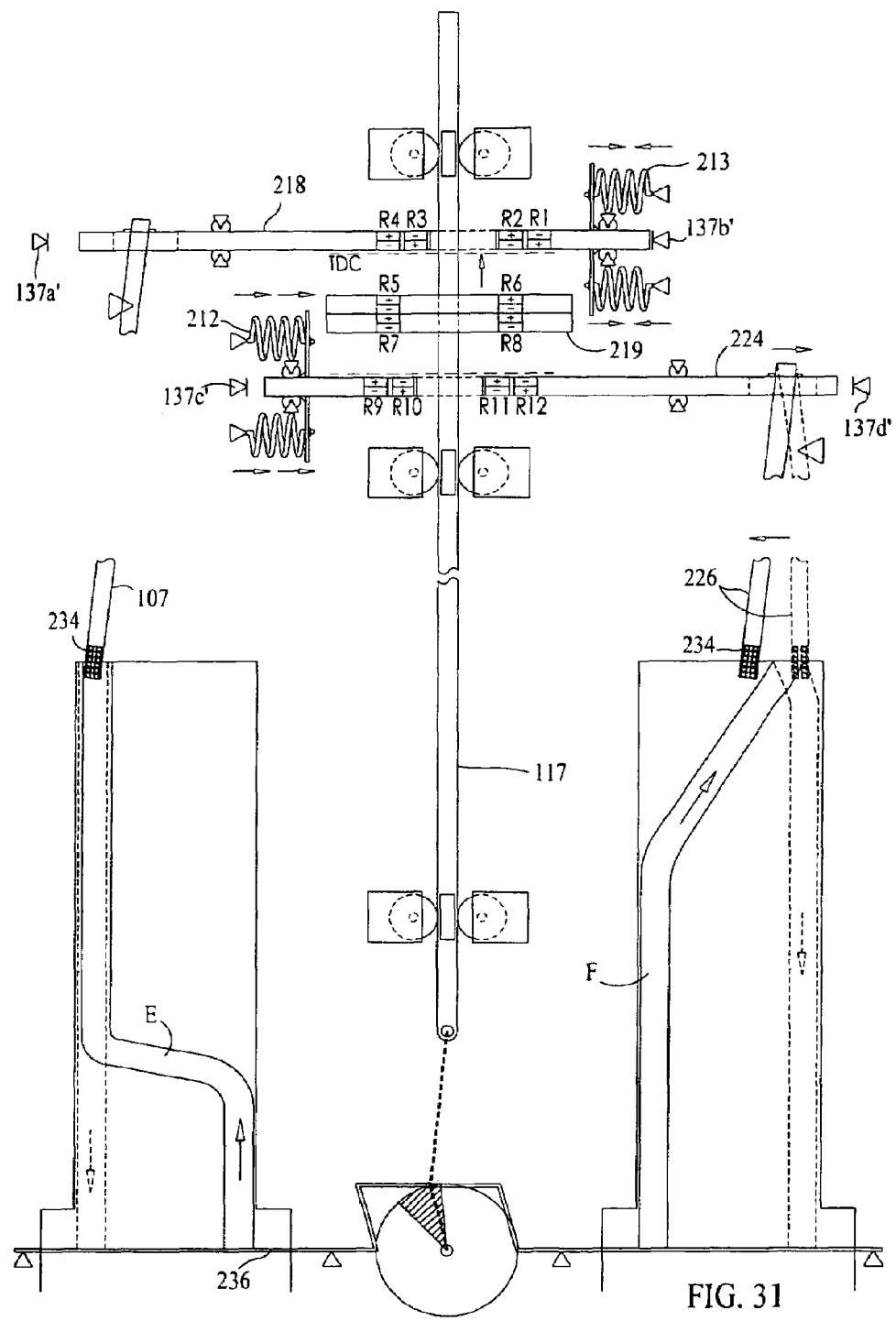

Referring now to FIG. 31, there is shown a sixth stage of operation of the present embodiment, which occurs from 316°-355° rotation of the crankshaft 236. In this stage, the piston plate 219 continues to be attracted upwards towards the upper plate 218 due to the "Second Permanent Magnet Power Action". Such attraction grows stronger with the upward movement of the piston plate and, correspondingly, every degree of crankshaft rotation. Because of designed instability of the system, the piston plate 219 will continue moving towards the upper plate 218, pulling the piston rod 117 and crankshaft 236, with it. As the magnetic field from the lower plate 224 no longer significantly affects the movement of the piston plate 219, the lower plate 224 is shifted from left to right, by the activating lever 126, one end of which follows the transitional portion of the cam groove F. The movement of the lower plate 224 charges the spring pair 213 by stretching the springs. Towards the end of this stage, the lower plate 224 will come to rest against the end stop pair 137d', and the cam follower portion of the lever 126 will be at the end of the transitional portion of the cam groove F.

Figure 32:
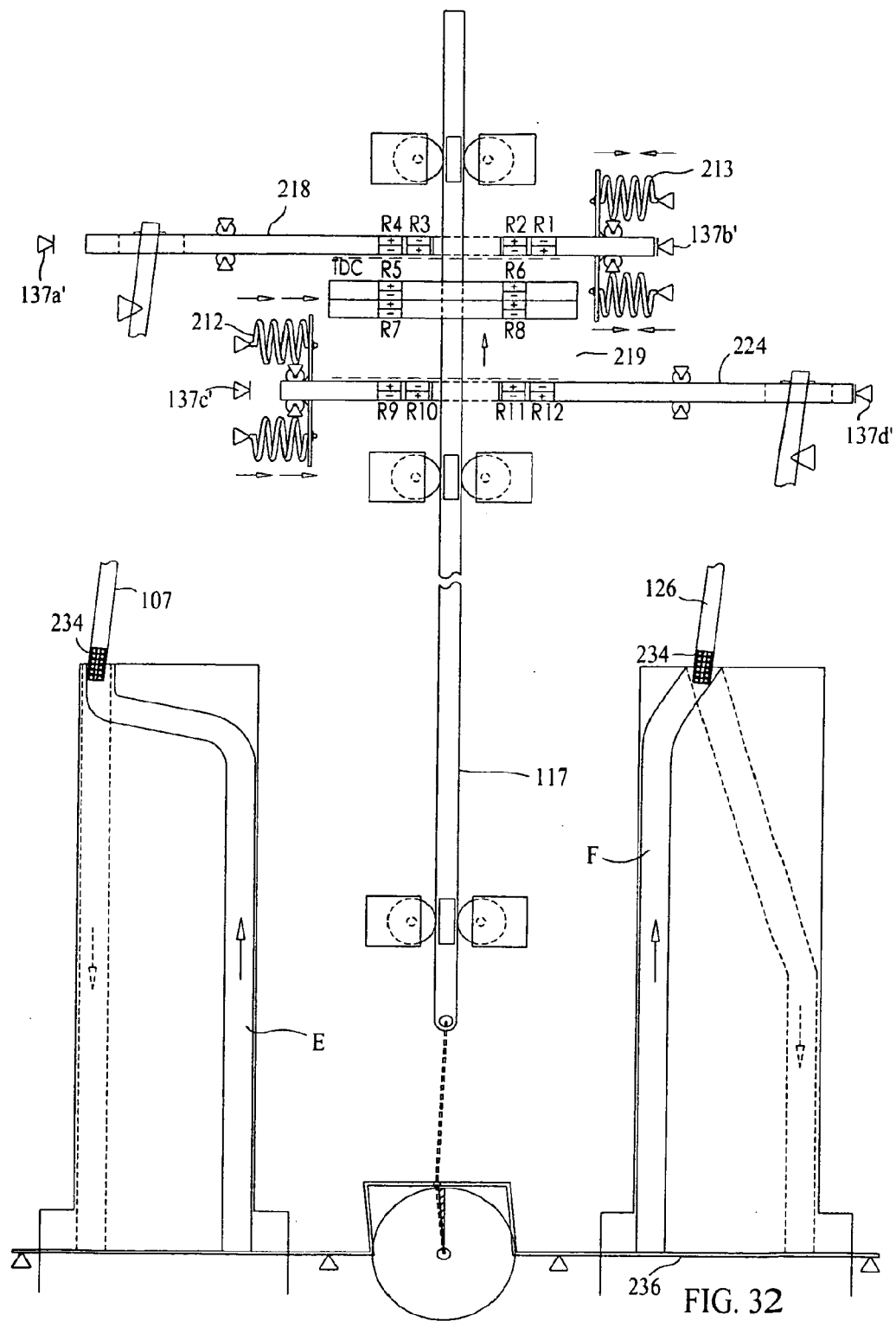

Referring now to FIG. 32, there is shown a seventh stage of operation of the present embodiment, which occurs from 356°-360° rotation of the crankshaft 236. In this stage, the piston plate 219 moves linearly to approach its "top dead center" (TDC), as a result of the attractive force between upper plate 218 and the piston plate 219 in the "Second Permanent Magnet Power Action". Due to the strong attraction and decreasing separation, the motion of the piston plate 219 accelerates as it approaches the upper plate 218. During this stage, neither of the upper or lower plates move, as the levers for each are in maintenance portions of the cam grooves E and F. However, at the end of this particular stage, the activating lever 107, will be at the beginning of a transitional period of the cam groove E.

Figure 33:
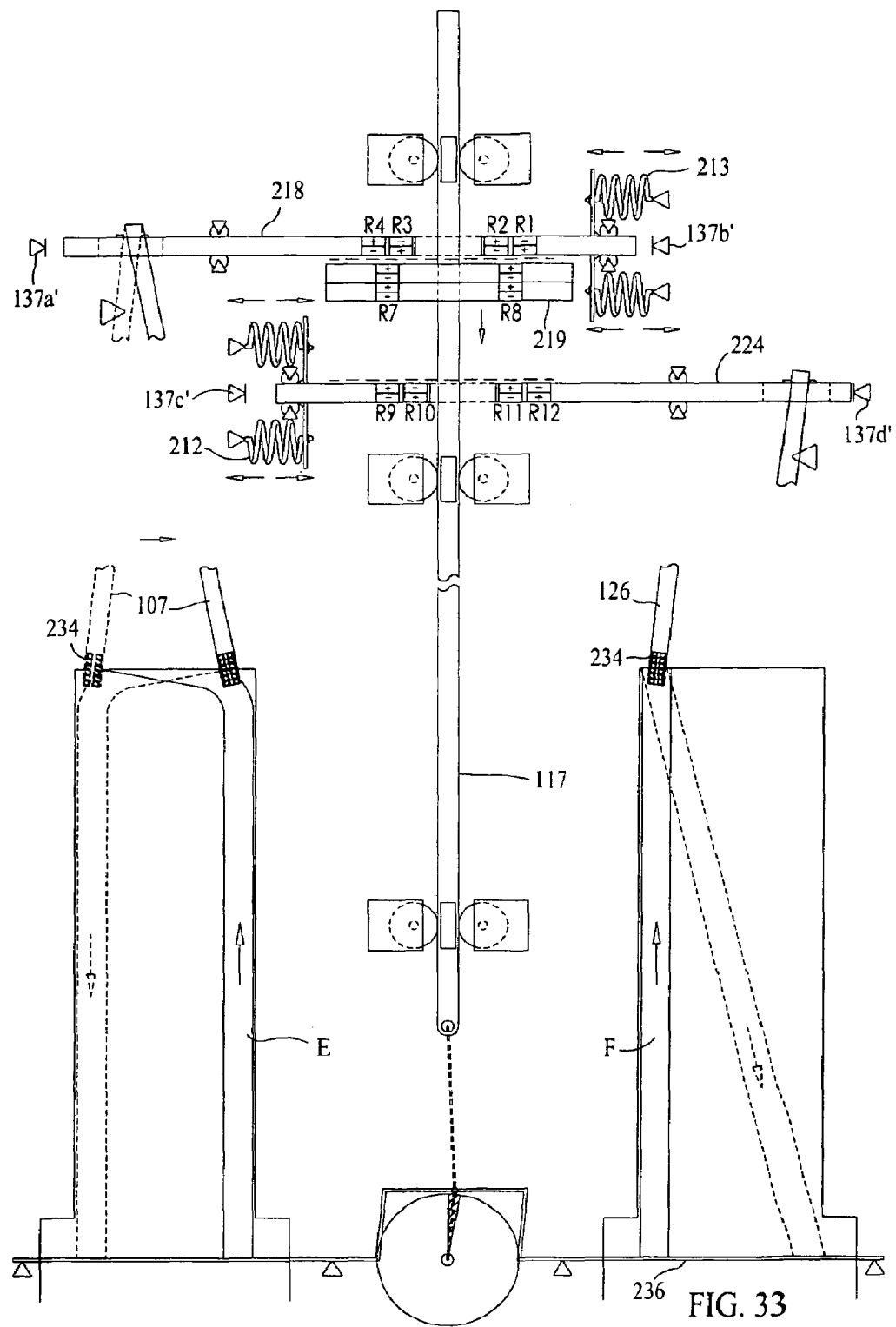

Referring now to FIG. 33, there is shown a eighth stage of operation of the present embodiment, which occurs from 001°-010° rotation of the crankshaft 236. This stage begins with the piston plate 219 nearing the TDC position. However, during this stage, the cam follower end of the activating lever 107 moves through a transition portion of the cam groove E, moving the upper plate from right to left, in this particular embodiment, about 32 mm. During this transitional period, it seems as though the piston plate 219 is hardly moving through almost 7-10 Degrees rotation, but it is. The charged compression spring pair helps move the upper plate 218 and to bias the cam follower end of the lever 107 into the cam grove E, helping the cam follower end follow the contour of the transitional portion of the groove. Additionally, the spring pair 212 helps to break off, in a fraction of a second, the magnetic field flux at the TDC. After the movement of the upper plate 218 has been completed, the spring pairs 212 will be discharged, and the left end of the upper plate 218 will abut the left end stop pair 137a'. Once in place, the upper plate 218 will be stopped with (+) polarity magnet rows R1, R3 being aligned with the (+) polarity magnet rows R5, R6 on the upper surface of the piston plate 219, which creates a repulsive force that thrusts (pushes) the piston plate 219 away from the upper plate 218.

Figure 34:
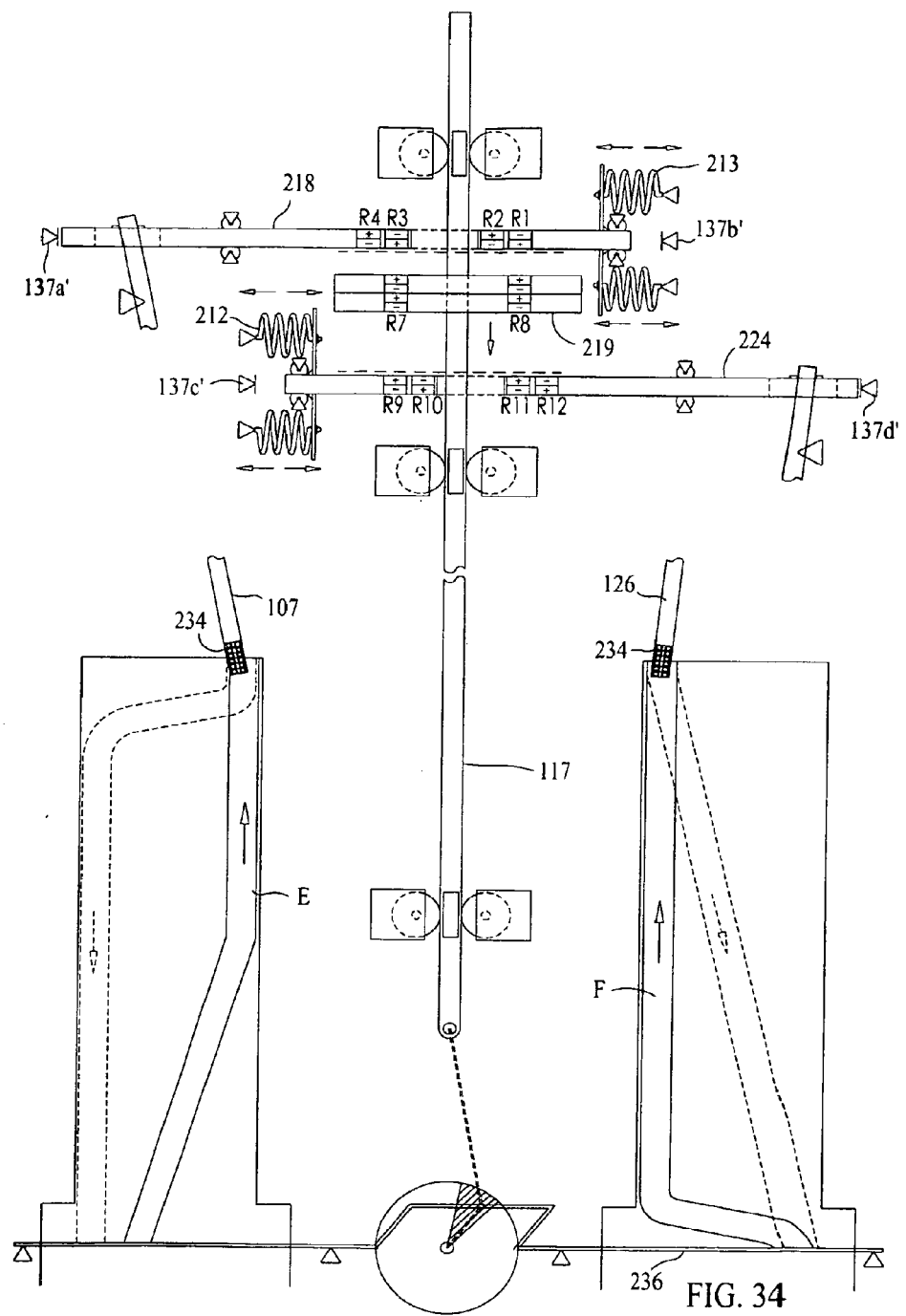

Referring now to FIG. 34, there is shown a ninth stage of operation of the present embodiment, which occurs from 011°-45° rotation of the crankshaft 236. The upper plate 218, which moved in the previous stage, is now in a maintenance stage, as demonstrated by the cam groove E. Similarly, the lower plate 224 remains in a maintenance stage. The repulsive force caused by the new position of the upper plate 218, thrusts the piston plate 219 downward from its TDC position, thus continuing the rotation of the crankshaft 236 via the piston rod 117. The powerful repulsive force from the upper plate 218 on the piston plate 219 in this "Third Permanent Magnet Power Action" will apply a downward force on the piston plate 219 for the next almost 100° of rotation of the crankshaft 326.

Figure 35:
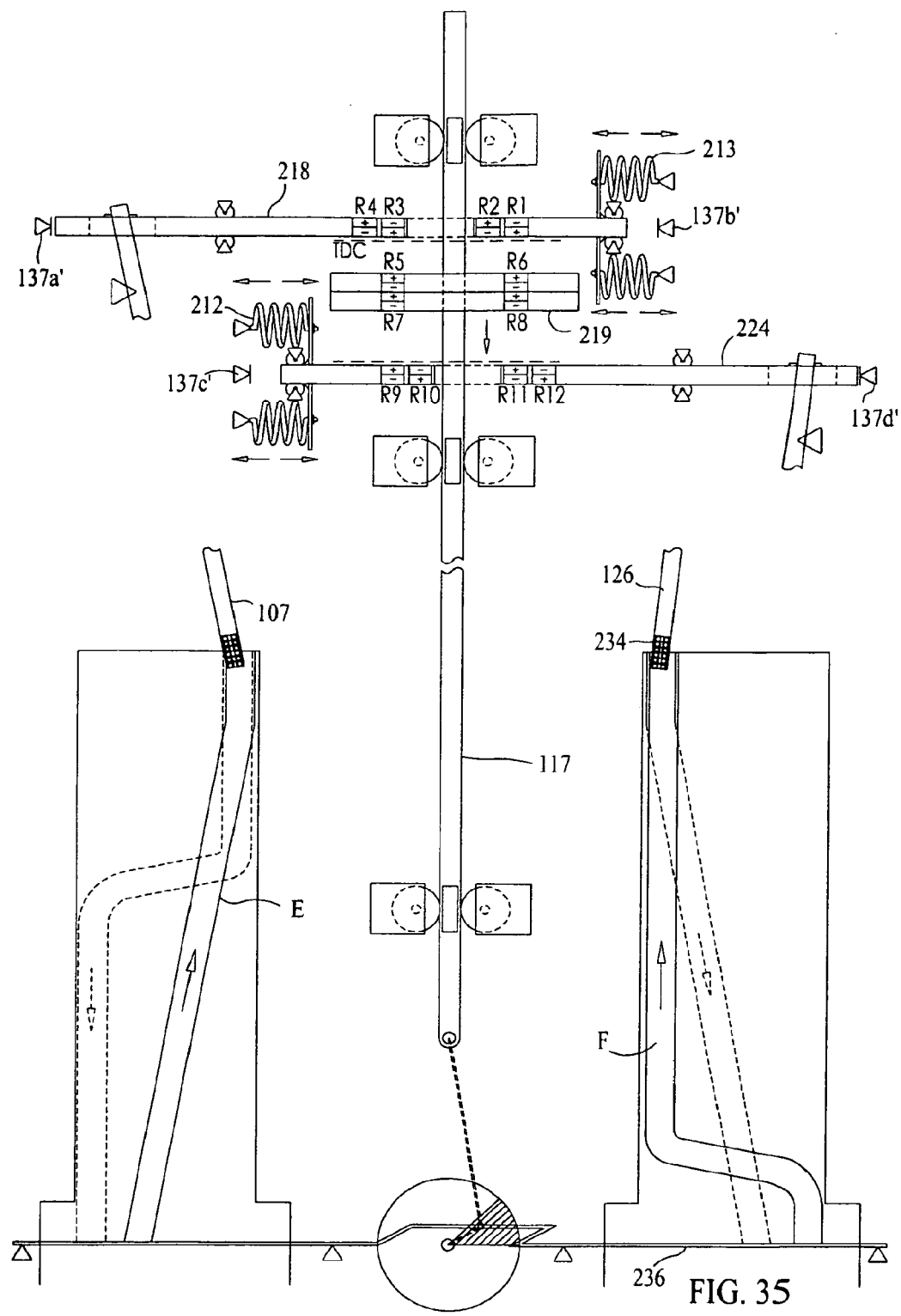

Referring now to FIG. 35, there is shown a tenth stage of operation of the present embodiment, which occurs from 46°-90° rotation of the crankshaft 236. In this stage, the thrust from the repulsion of the piston plate 219, by the upper plate 218 is strong enough to move the piston plate, and correspondingly the piston rod, to effectuate at least another 30° of rotation of the crankshaft 236. Both the upper and lower plates 218, 224 are maintained in their current positions throughout this stage (i.e., the cam grooves E, F are rotated through maintenance portions of the cam profiles). As rotation of the crankshaft 236 approaches 90°, due to the corresponding position of the piston plate 219, the repulsive forces from the upper plate 218 will become weaker, while attraction on the piston plate 219 from the pre-aligned lower plate 224, will grow stronger, thus accelerating the downward movement of the piston plate 219.

Figure 36:
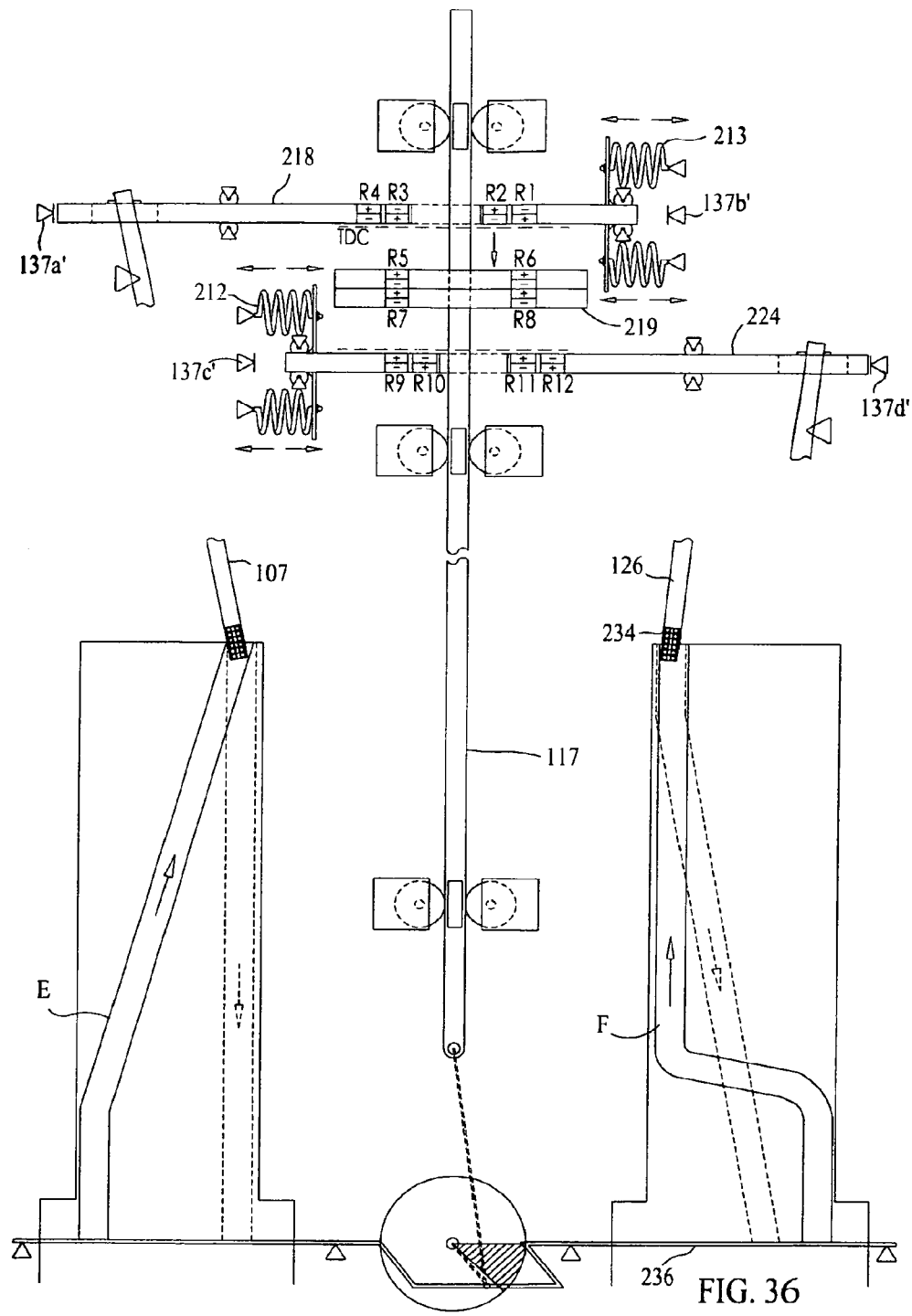

Referring now to FIG. 36, there is shown a eleventh stage of operation of the present embodiment, which occurs from 91°-135° rotation of the crankshaft 236. Inertial motion created in stage nine, above, is sufficient to drive the piston plate 219, and correspondingly the crankshaft 236, past the 90°-100° point. Past 100°, the repulsive force resulting from the upper plate 218, will not significantly affect the movement of the piston plate 219. However, the attractive forces between the (−) polarity magnet rows R7, R8 of the lower surface of the piston plate 219 and the (+) polarity magnet rows R9, R11 on the upper surface of the lower plate 224, will continue the downward movement of the piston plate 219, and correspondingly the rotation of the crankshaft 236. Further, since the upper plate 218 is no longer contributing to the downward movement of the piston plate 219, the activating lever 107 will enter a transitional period of the cam groove E, and the upper plate 218 will be moved from left to right, charging the spring pair 212.

Figure 37:
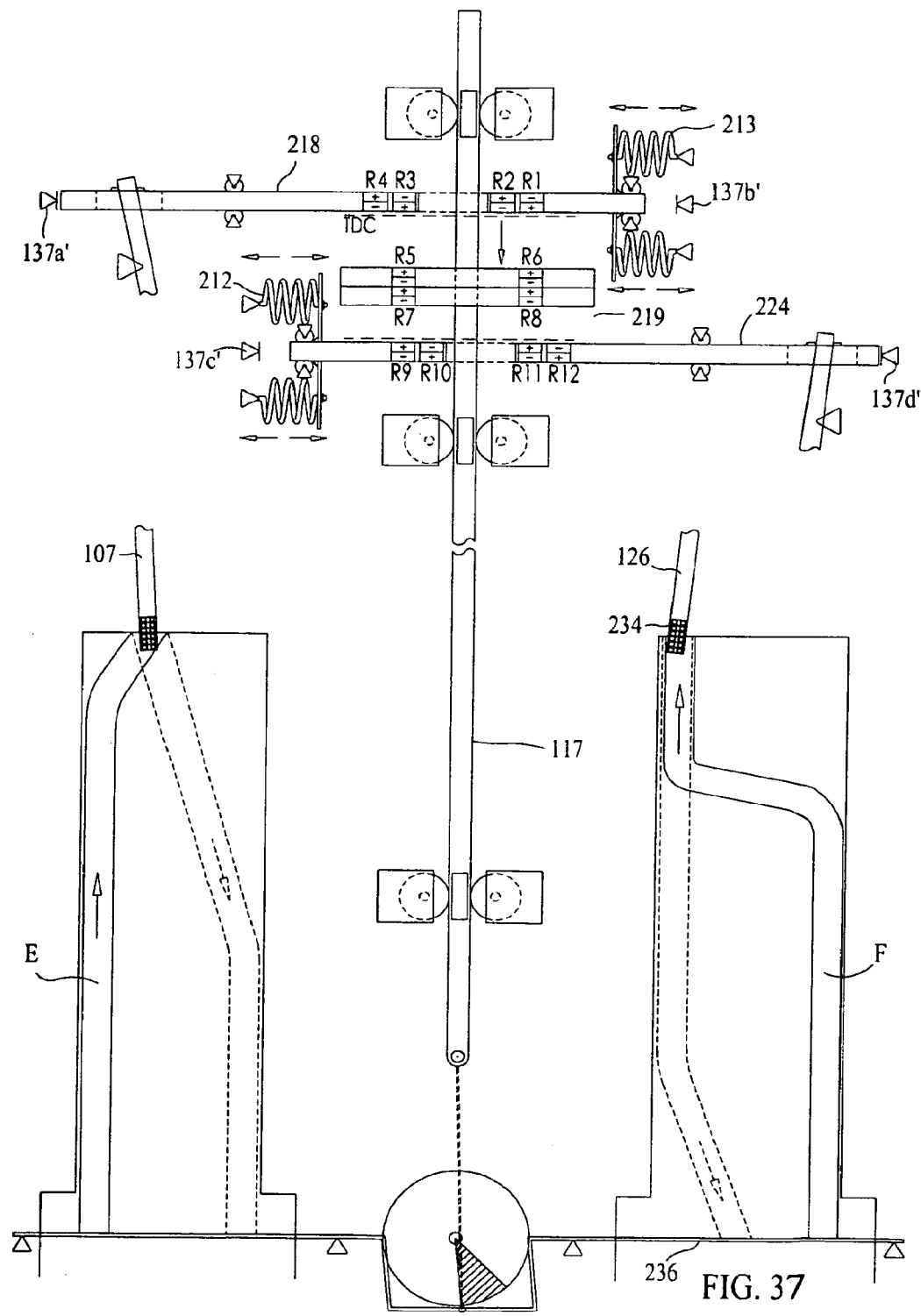

Referring now to FIG. 37, there is shown a twelfth stage of operation of the present embodiment, which occurs from 136°-175° rotation of the crankshaft 236. During this stage, as the piston plate 219 moves towards the lower plate 224, the attraction between the plates 219, 224 grows stronger, accelerating the piston plate 219 towards the lower plate 224, likewise accelerating the rotation of the crankshaft 236. At the end of this stage, the cycle repeats with the first stage.

Note that, in choosing the spring pairs 212, 213 for use in the instant embodiment, the springs are chosen so as to produce a forceful exchange of magnetic field flux in order to break/shear off the attraction between like polarities at the TDC and BDC points. Appropriate springs may be chosen by, first, calculating the size/length/stroke and than through experimenting to find appropriate springs that can move the plates, despite strong attractive forces. Note that, the stronger the field force of as individual magnet, the more tension on the spring is needed.

Additionally, in all embodiments of the invention, the permanent magnet field force clearance in the TDC and BDC positions is important and should be adjustable. For example, the bigger the clearance between the magnetic poles inside the flux fusion module 202, the lower the tension of the springs needed to break apart and/or fuse permanent magnet field forces together. One result of a weaker exchange in breaking apart the magnets, thus producing a lower efficiency of apparatus and weaker power output on the crankshaft. Alternatively, the smaller the clearance between the magnetic poles inside flux fusion module 202, the higher the tension of the springs needed, in order to break apart and/or fuse permanent magnet field forces together. As such, a smaller clearance with a higher tension spring provides a more forceful exchange of the plates, thus resulting in a higher efficiency of apparatus and stronger power output on the crankshaft.

Electric Servo Motor Rack Gear Actuation

Referring now to FIGS. 64-67 and 69, there is shown a permanent magnet driven reciprocating engine 300 in accordance with one particular embodiment of the present invention.

More particularly, the engine 300 of the instant embodiment is configured very similarly to the engine 100 of FIG. 1. However, in the instant embodiment, the upper and lower sliding magnetic field plates 318, 324 of the magnetic flux module 302 are driven by DC electric motor or servo pairs 305, 325, rather than by activating levers (107, 126 of FIG. 1). By replacing the activating levers the servo pairs, the overall size of the engine can be reduced from that of the engine 100. Compacting the engine in this way makes it more reasonably sized for adding further flux fusion modules, as will be described in connection with FIGS. 70 and 71.

Figure 66:
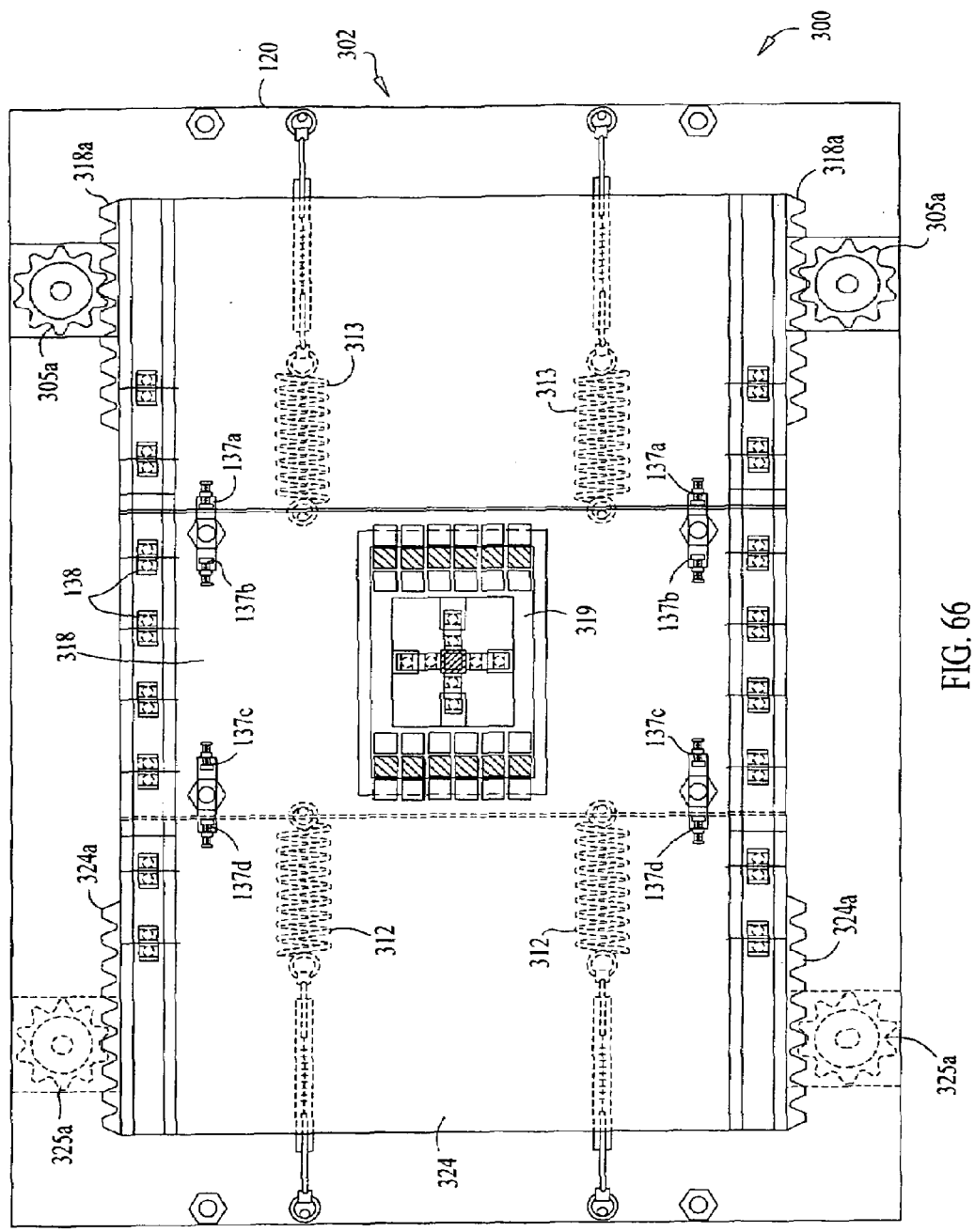
FIG. 66 is a representative view taken from the top of the sliding double acting module of the permanent magnet reciprocating engine of FIG. 64.
Figure 67:
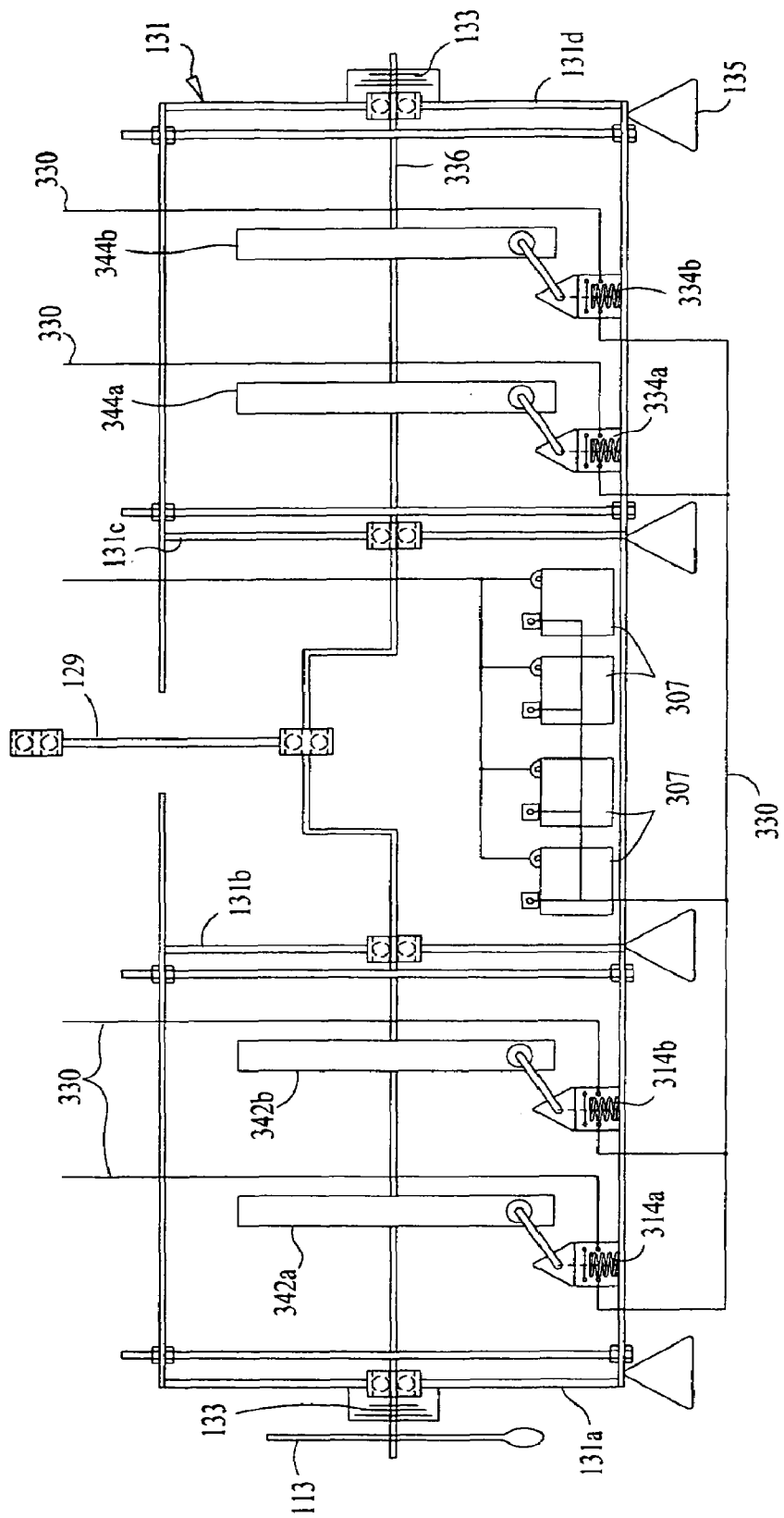
FIG. 67 is a partial cutaway schematic representation of the lower drive portion of a permanent magnet reciprocating engine in accordance with one particular embodiment of the present invention.

As shown more particularly in FIG. 66, the upper and lower sliding plates 318, 324 of the engine 300 include on the edges thereof, gear teeth portions 318a, 318b, 324a, 324b. Referring back to FIGS. 64-67 and 69, rack gear portions 318a, 324a, are engaged with spur gear portions 305a, 325a, on the rotating shafts of the electric motor pairs 305, 325. As such, the servo motor pairs 305, 325 operate so that, while energized, the corresponding upper and/or lower sliding magnetic field plates 318, 324 is advanced, but while not energized, the corresponding field plate 318, 324 is returned to its "natural" position, much like the energization of a relay. In the present embodiment, the motor pairs 305, 325, move the plates 318, 324, respectively, about 30-32 mm to the right and left, in order to reposition the magnet rows relative to magnet rows on the piston plate 319. Note that the magnet rows can be aligned such that the upper and lower plates are moved a smaller or greater amount, from side to side, in order to reposition the plates 318, 324. As with the embodiment of engine 200, spring pairs 312, 313 may, optionally, be provided to assist in the smooth movement of the upper and lower sliding magnetic field plates 318, 324. Although, each spring pair 312, 313 can be either a compression spring or a tension spring, as desired, in the instant embodiment, both spring pairs 312, 313 are tension springs. Note that in the present embodiment, the spring pairs 312, 313 are of secondary importance and merely help to maintain the fusion module 302 in a "natural" state. As such, the spring pairs 312, 313 should be tightened enough to keep the upper and lower sliding magnetic field plates 318, 319 in their natural end positions (i.e., the upper plate it its right end stop and the lower plate at its left end stop).

As with previous embodiment, a piston magnetic plate 319 is located between the upper and lower plates 318, 324 and interacts therewith to move the piston rod 117 and, resultantly, rotate the crankshaft 336, via the linkage 129. The piston rod 117 may be supported by roller bearings, such as the roller bearings 101, 106 and 110. Further, the crankshaft 336 is supported in a crankshaft housing 131. As with the engine 100, a series of cam pairs 342, 344 are fixedly mounted to the 336, such that rotation of the crankshaft 336 correspondingly rotates the cam pairs 342, 344, which, in timed sequence, actuate the switches 314A, 314B, 334A, 334B. Note that, in the instant embodiment, both switches of a switch pair 342, 344 will be energized together, in order to energize a respective motor pair 305, 325, respectively. Switches 314A, 314B, 334A, 334B include limit switches used to activate the electric motor pairs 305A, 305B, 305C, 305D. Additionally, at least one battery 307 is provided to power the electric motor pairs, upon closing at least one of the switches 314A, 314B, 334A, 334B. In one particular embodiment, the at least one battery 307 is configured as an arrangement of at least four batteries, connected in series/parallel, for an output of 24V DC, for use in powering the motor pairs 305, 325.

As shown more particularly in FIG. 69, the rotation of the cam pairs 342, 344 periodically connects the battery 307 to one or the other servo pairs 305, 325 to energize/deenergize the servo pairs 305, 325, in order to move the corresponding field plates 318, 324 left or right, as will be described more completely in connection with FIGS. 73-84. Electric cables 330 may be run from the battery 307 to each switch 314a, 314b, 334a, 334b, and from each switch 314a, 314b, 334a, 334b, to the servo motor pairs 305, 325. Additionally, electric wiring 330 can be provided for closing the circuit between the servo motor pairs 305, 325, and the battery 307.

Additionally, the engine 300 can be held together with INOX threaded rods 127, nuts, bolts, connectors etc.

Additionally, if desired, steel cables 315 may be provided from top to bottom, all around the engine, to stop any swinging motion of the engine 200, while in operation. In one particular embodiment, eight strands of steel cable are used. Further, shackles 309 can, optionally, be provided, for tightening the steel cables 315 and/or securing the spring pairs 212, 213 to the housing.

Figures 72A, 72B:
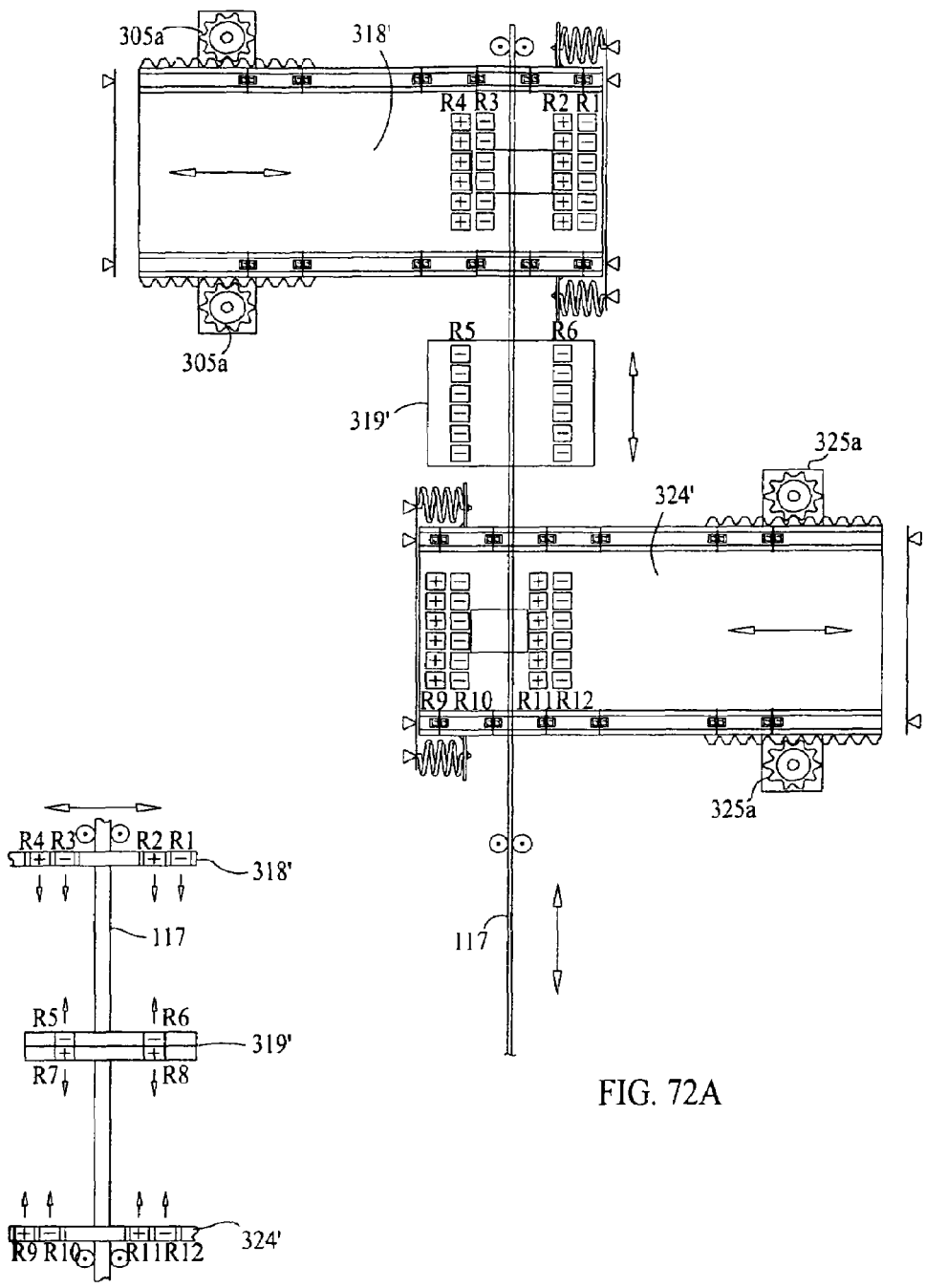
FIG. 72A is a partial exploded view of a reciprocating plate arrangement of a sliding double acting module in accordance with one particular embodiment of the instant invention.
FIG. 72B is a partial side plan view, in its operable arrangement, of the magnetically interacting portions of the reciprocating plate arrangement of FIG. 72A.

One exemplary full cycle of operation of the engine 300', illustrated through the resultant 360° of rotation of the crankshaft 336, will be described using FIGS. 73-84. The magnetic rows aligned on each field plate could be any configuration set forth in Table 2, above, or another configuration using a different number of magnets. For example, the plates 318', 319' and 324' of FIGS. 72A-72B, could be replaced by the plates 318", 319" and 324" of FIGS. 5C-D, 19C-D, 25C-D, 39C-D, 40C-D, 41C-D and 85A-97B. However, for purposes of explanation, the rows of permanent magnets aligned on the field plates are as shown in FIGS. 72A and 72B.

Figure 68:
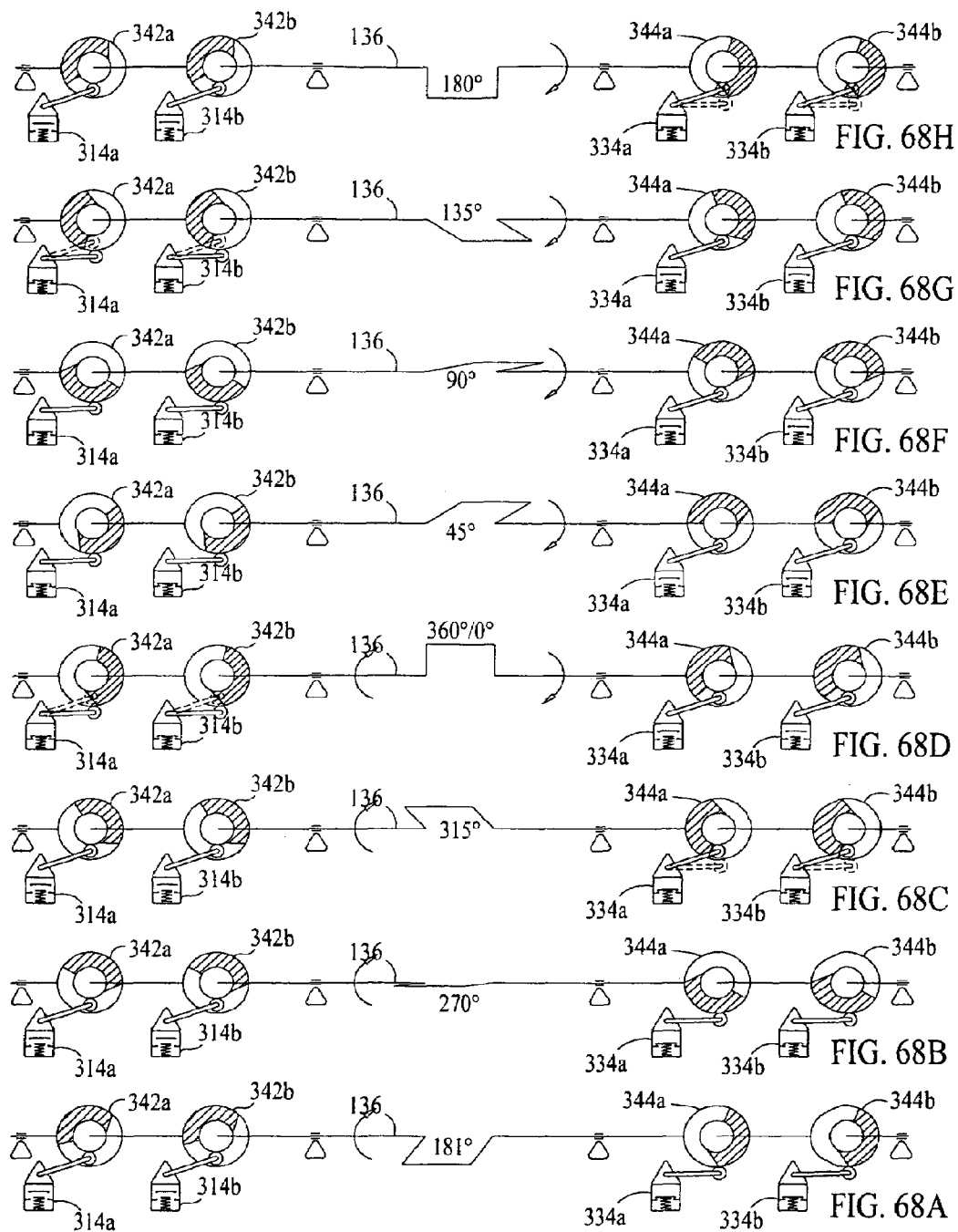
FIGS. 68A-68H are representative schematic drawings showing the interaction of a plurality of cams and switches at various points of rotation of a crankshaft, in connection with one particular embodiment of the instant invention.
Figure 73:
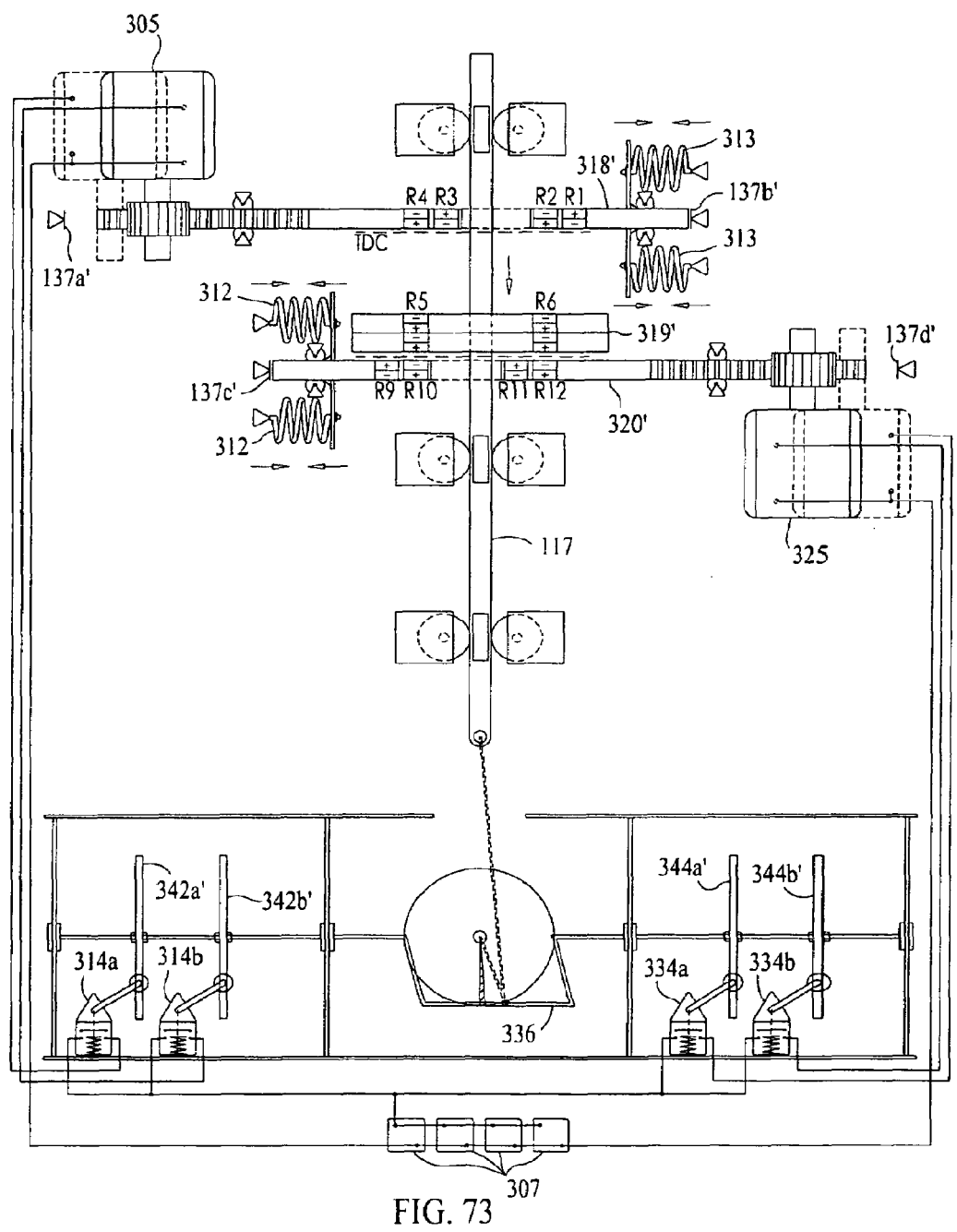
FIGS. 73-84 are simplified partial front schematic views of a permanent magnet reciprocating engine in accordance with one particular embodiment of the present invention shown at particular points of time during the cycle of operation through 360° rotation of a crankshaft.

Referring now to FIG. 73, there is shown a first stage of the cycle for the engine 300' which occurs between 176° and 180° rotation of the crankshaft 336. In this first stage, the magnetic piston plate 319' is in linear motion, approaching the BDC position of its stroke, which results in the crankshaft being at 180° rotation. Due to the attraction between the (+) polarity magnets in rows R7, R8 on the magnetic piston plate 319 and the (−) polarity magnet rows R10, R12 on the lower magnetic field plate 324 in this "Fourth Permanent Magnet Power Action", the downward linear motion of the piston plate 319 is accelerated towards the BDC. This downward motion rotates the crankshaft 336 and, additionally, rotates the cams 342a', 342b', 344a', 344b'. Note that, at BDC, the upper sliding magnetic field plate 118' is located against the right end stop pair 137b', while the lower magnetic field plate abuts the left end stop pair 137c'. As shown in FIG. 73, the upper plate 318 is biased against the right end stop pair 137b', while the lower plate 324 is biased against the left end stop pair 137c' and both spring pairs 312, 313 are discharged. Additionally, the cams 342a, 342b, 344a, 344b are in a portion of their cycle wherein the switches 314A, 314B, 334A, 334B are open-circuited and, resultantly, both DC servo motor pairs 305 and 325 are OFF. The relative positions of the cams, and corresponding switch states, at about 180° are shown in FIG. 68H.

Figure 74:
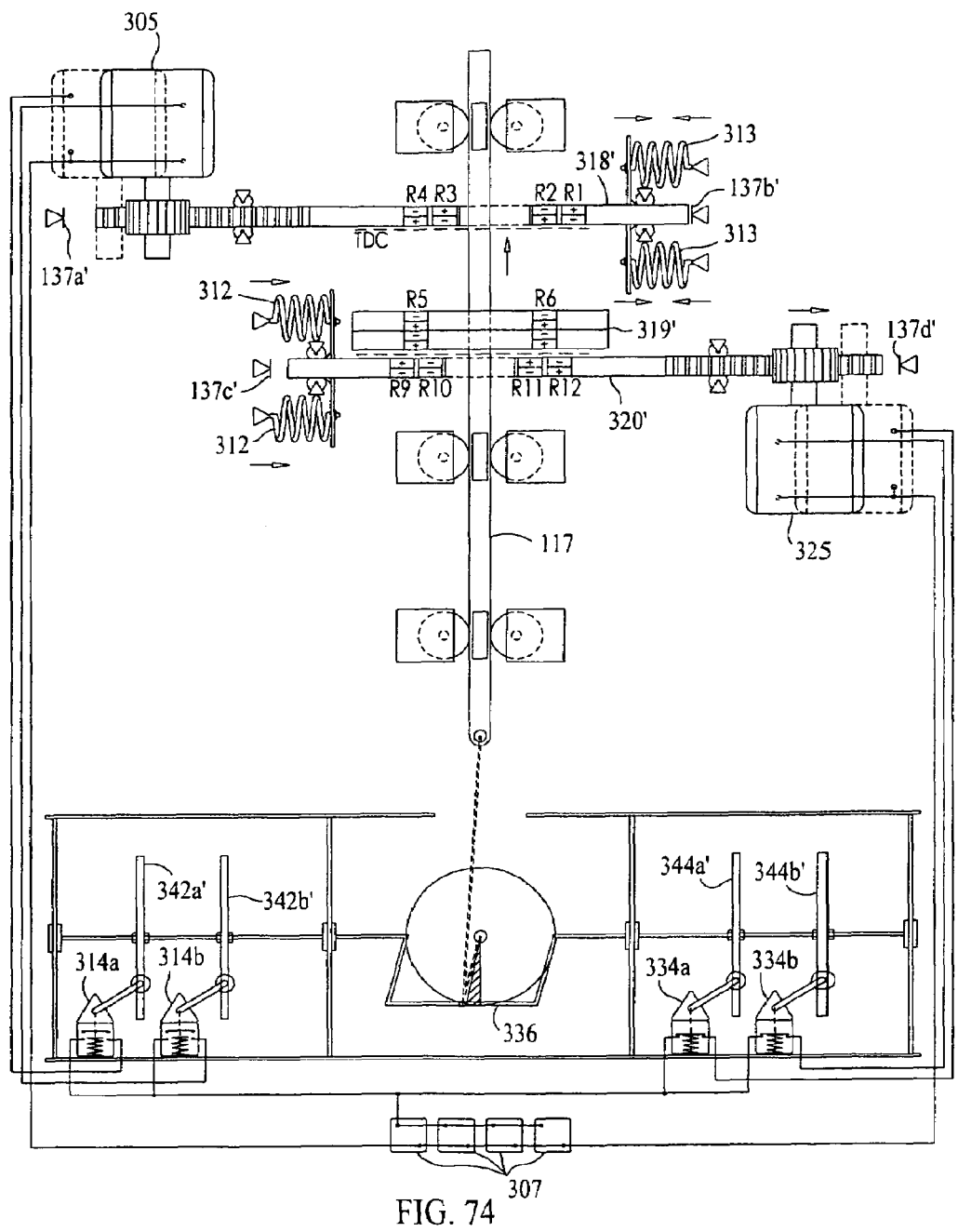

Referring now to FIG. 74, there is shown a second stage of operation of the present embodiment, which occurs from 181°-190° rotation of the crankshaft 336. During this stage, the magnetic piston plate 319' is starting from its BDC position. Due to profiles on the cam pairs 342a', 342b', 344a', 344b', at the BDC, the motor pair 305 is OFF (i.e., deenergized), while the motor servo pair 325 is turned ON (i.e., energized), in order to move the lower plate 324' from its far left position to the far right position against right end stop pair 137d', which, in one particular embodiment, is a move of about 32 mm. During the repositioning period, the piston plate 319', and correspondingly, the crankshaft 336 will move very slowly, hardly appearing to move at all. Prior to this stage, the upper plate 318' was positioned such that the (+) polarity magnet rows R2, R4 are aligned with the (−) polarity magnet rows R5, R6 on the magnetic piston plate 319'. However, the repositioning of the lower plate 324' in this stage, changes the interaction between the lower plate 324' and the piston plate 319' from attraction to repulsion. More particularly, the lower plate 324' is repositioned in this stage to align the (+) polarity magnet rows R9, R11 with the (+) polarity rows R7, R8 on the lower surface of the of the piston plate 319', causing the piston plate 319' to be repelled, moving linearly upwards away from the lower plate 324'.

Figure 75:
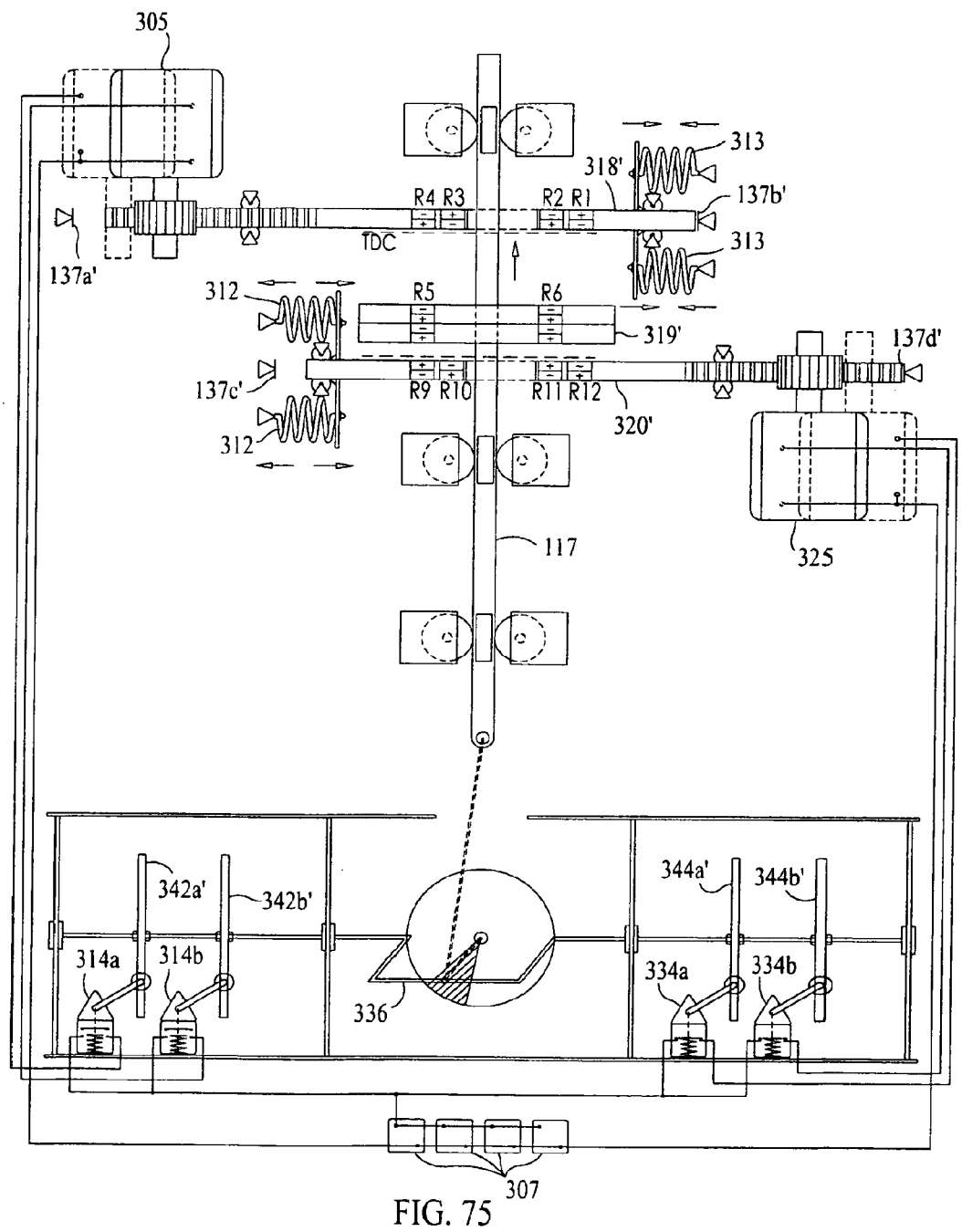

Referring now to FIG. 75, there is shown a third stage of operation of the present embodiment, which occurs from 191°-225° rotation of the crankshaft 336. As stated in connection with the second stage, the strong repulsive forces between the like polarity magnet rows R7, R8, R9, R11 in this "First Permanent Magnet Power Action", will thrust the magnetic piston plate 319' away from the lower plate 324', pushing it upwards and correspondingly, moving the piston rod 117, crankshaft 336 and cam pairs 114, 124. The thrust created in this stage is strong enough to move magnetic piston plate 319' further up with its attachments for almost another 100° of clockwise rotation of the crankshaft 336. The relative positions of the cams 342a', 342b', 344a', 344b', and corresponding switch states at about 225° are shown in FIG. 68G. Note that in the positions shown, the spring pair 313 is discharged and the cam pair 114 is in a portion of its cycle that maintains the electrical switch pair 314 OFF. However, note that additionally in the positions shown, the spring pair 312 is charged and the cam pair 114 is in a portion of its cycle that maintains the electrical switch pair 324 ON, thus energizing the servo pair 325 to maintain the lower plate 324 in its right end stop position 137d'.

Figure 76:
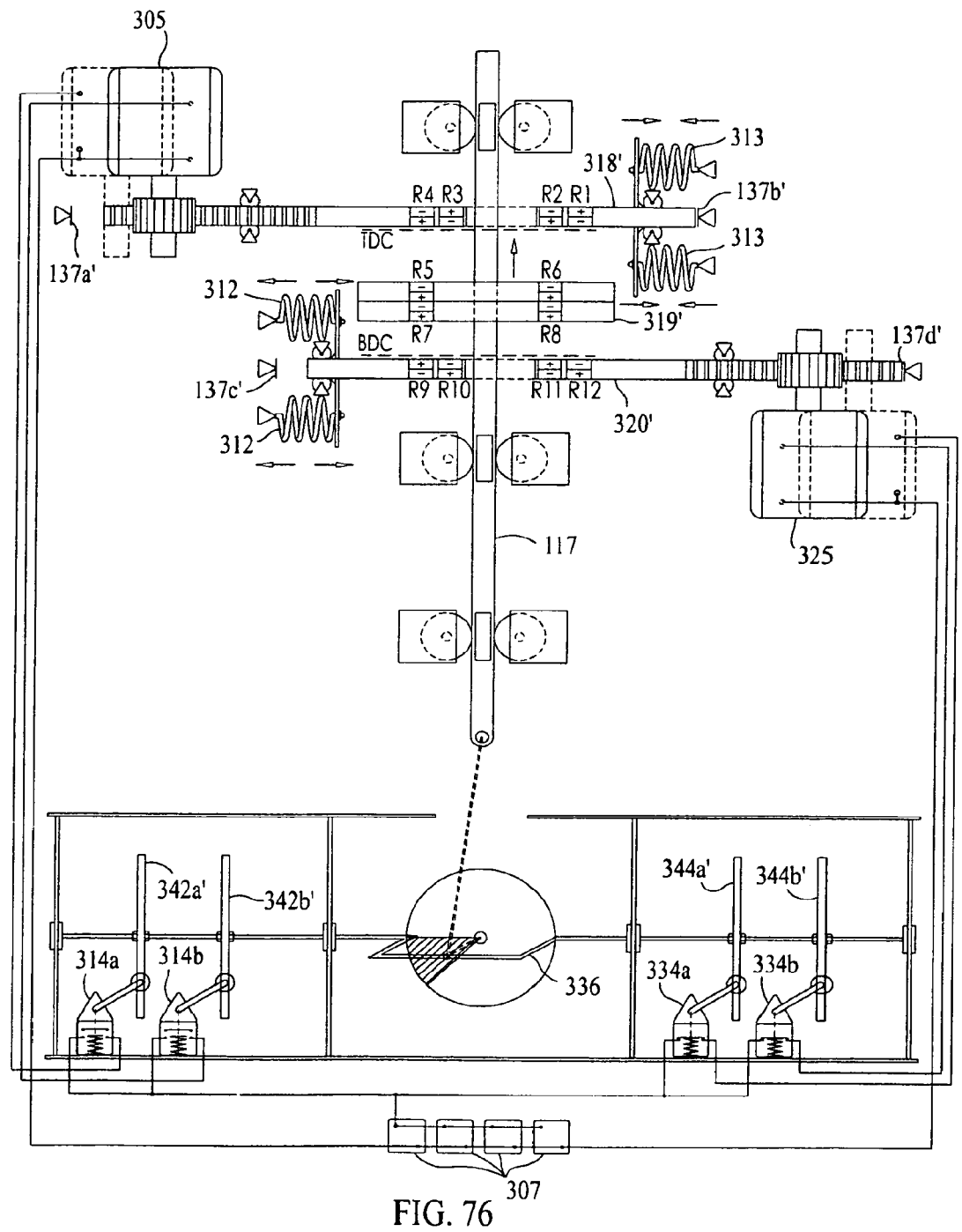

Referring now to FIG. 76, there is shown a fourth stage of operation of the present embodiment, which occurs from 226°-270° rotation of the crankshaft 336. In this stage, the thrust created in the second stage continues and causes the piston 319' to move upward and away from the lower magnetic field plate 324', correspondingly rotating the crankshaft 336 and attached cams 342a', 342b', 344a', 344b'. As the crankshaft approaches 270° of rotation, the thrust created in stage three will grow weaker, while the attractive forces created by the position of the upper sliding magnetic field plate 318' relative to the piston plate 319' will come into play and grow stronger, thus accelerating the movement of the magnetic piston plate 319' towards the upper sliding magnetic field plate 318'. The relative positions of the cams, and corresponding switch states at about 270° are shown in FIG. 68F. The switch states through this stage results in the servo pair 305 being ON, in order to maintain the lower plate 324' against the right stop 137d', while the servo pair 325 is OFF.

Figure 77:
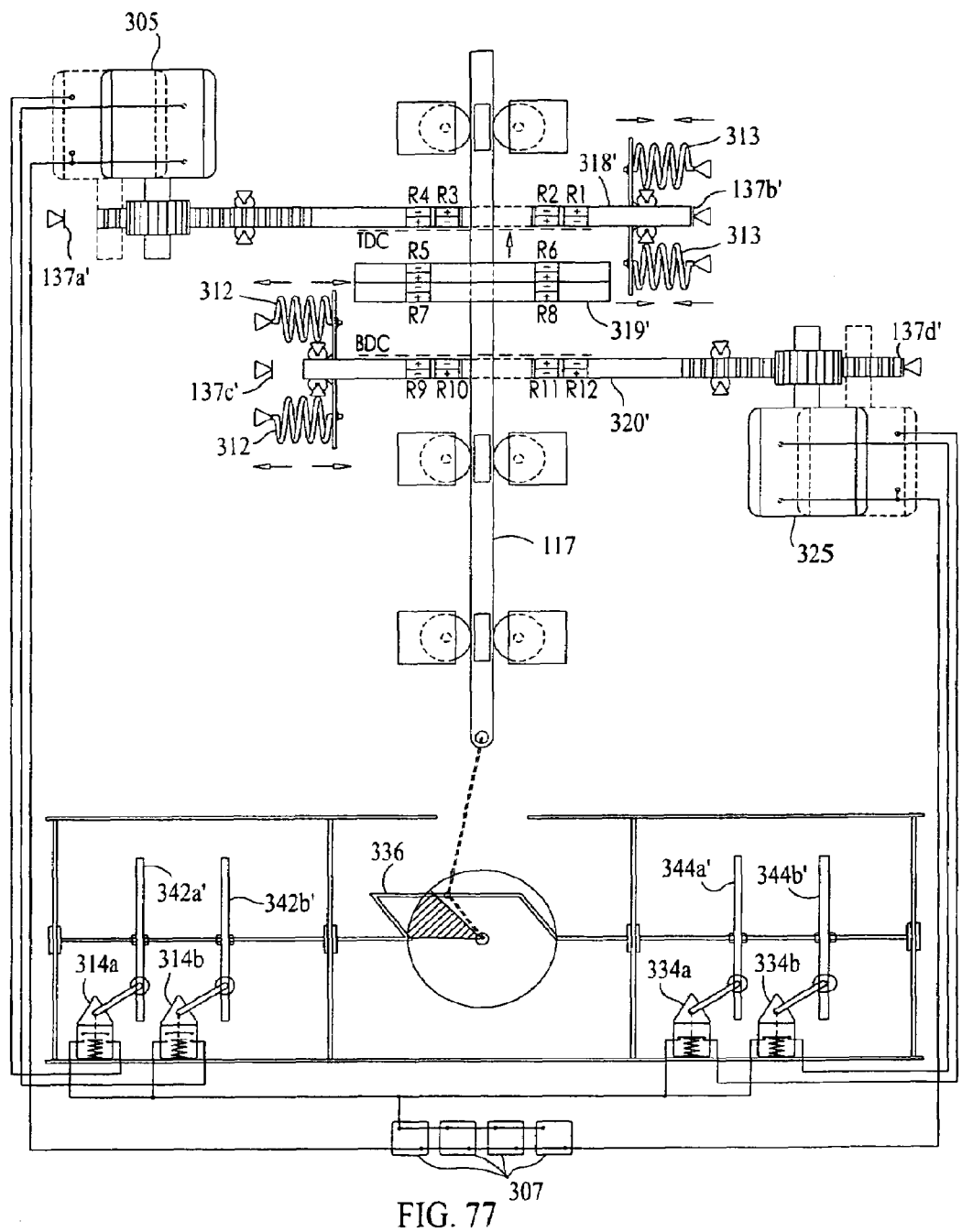

Referring now to FIG. 77, there is shown a fifth stage of operation of the present embodiment, which occurs from 271°-315° rotation of the crankshaft 336. The inertial movement created in stage four is sufficient to move the piston plate 319' past 270° of the crankshaft's rotation. Past 270°, the repulsive forces resulting from interaction between the lower sliding magnetic plate 324' and the magnetic piston plate 319' will no longer significantly influence the upwards linear movement of the piston rod 117, and at about 315° will lose its influence completely. Instead, powerful attractive forces between the (−) polarity magnet rows R5, R6 on the upper surface of the piston plate 319' with the (+) magnet rows R2, R4 on the lower surface of the upper sliding magnetic field plate 318' will take over, and continue to accelerate the movement of the piston plate 319' toward the upper sliding magnetic plate 318', correspondingly rotating the crankshaft 336. The relative positions of the cams, and corresponding switch states at about 315° are shown in FIG. 68E. The switch states through this stage results in the servo pair 305 being maintained ON, in order to maintain the lower plate 324' against the right stop 137d', while the servo pair 325 is OFF.

Figure 78:
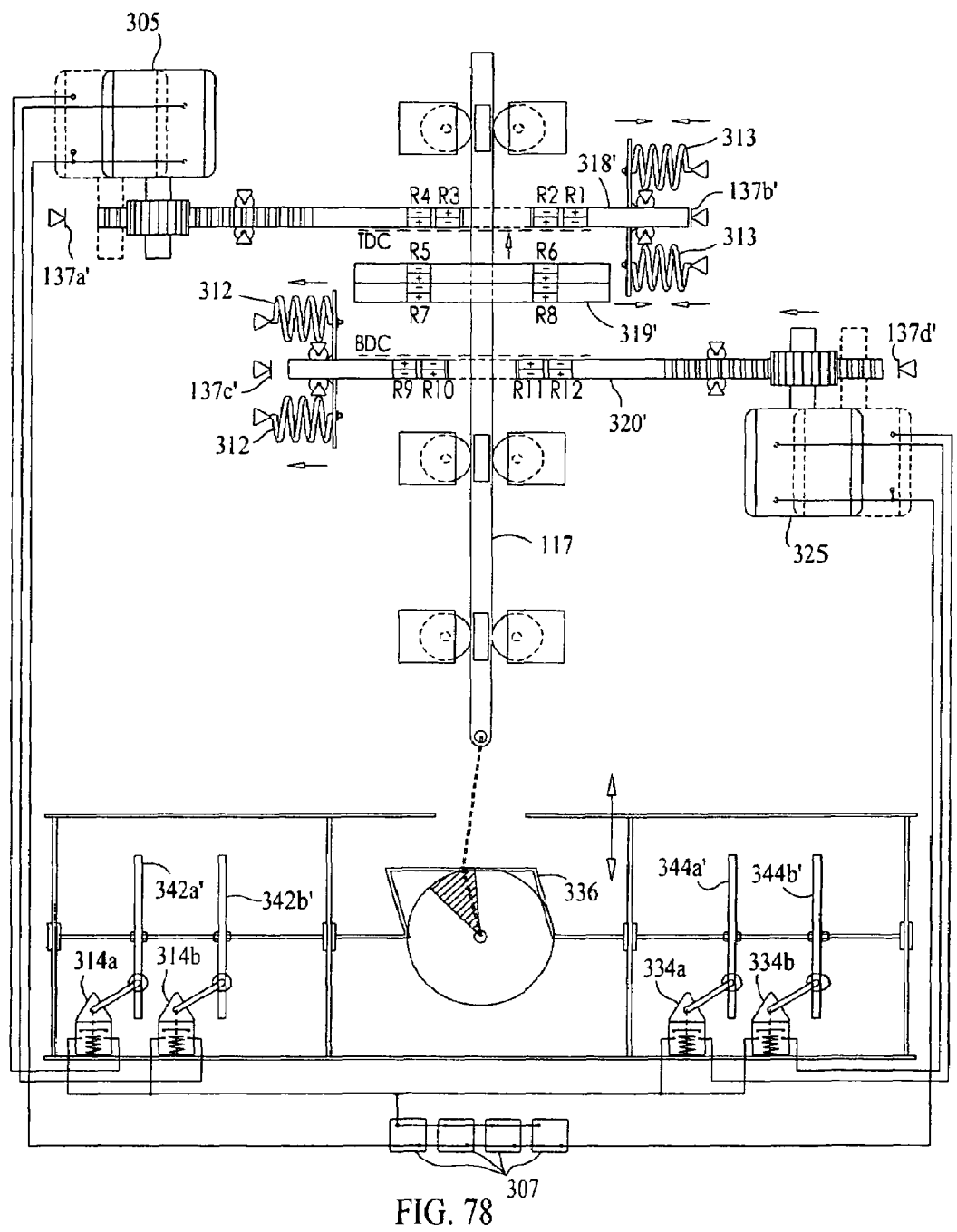

Referring now to FIG. 78, there is shown a sixth stage of operation of the present embodiment, which occurs from 316°-355° rotation of the crankshaft 336. In this stage, the attraction between the plates 318', 319' grows stronger as the piston plate 319' approaches the upper plate 318', due to the "Second Permanent Magnet Power Action". This attraction will continue to pull the piston plate 319' upward, moving attached piston rod 117 and rotating the crankshaft 336. Since the lower plate 324' has lost all of its magnetic influence over the piston plate 319', the lower plate 324' can be pre-positioned in its next useful position (i.e., against the left end stop pair 137c'). As such, the cams 342a', 342b' will enter a stage wherein the cam profiles of the cams 344a', 344b' no longer close the switch pair 314, thus deenergizing the servo pair 325. Turning off the servo pair 325 and the resultant discharging of the spring pair 312 permits the lower plate 324' to slide from right to left, returning it to "natural" position against the left end stop pair 137c'. Note that the switch pairs 314 and 324 are both open and, correspondingly, the servo pairs 305, 325 are deenergized. Additionally, both spring pairs 312, 313 are discharged with the upper and lower plates 318', 324' in their "natural" positions.

Figure 79:
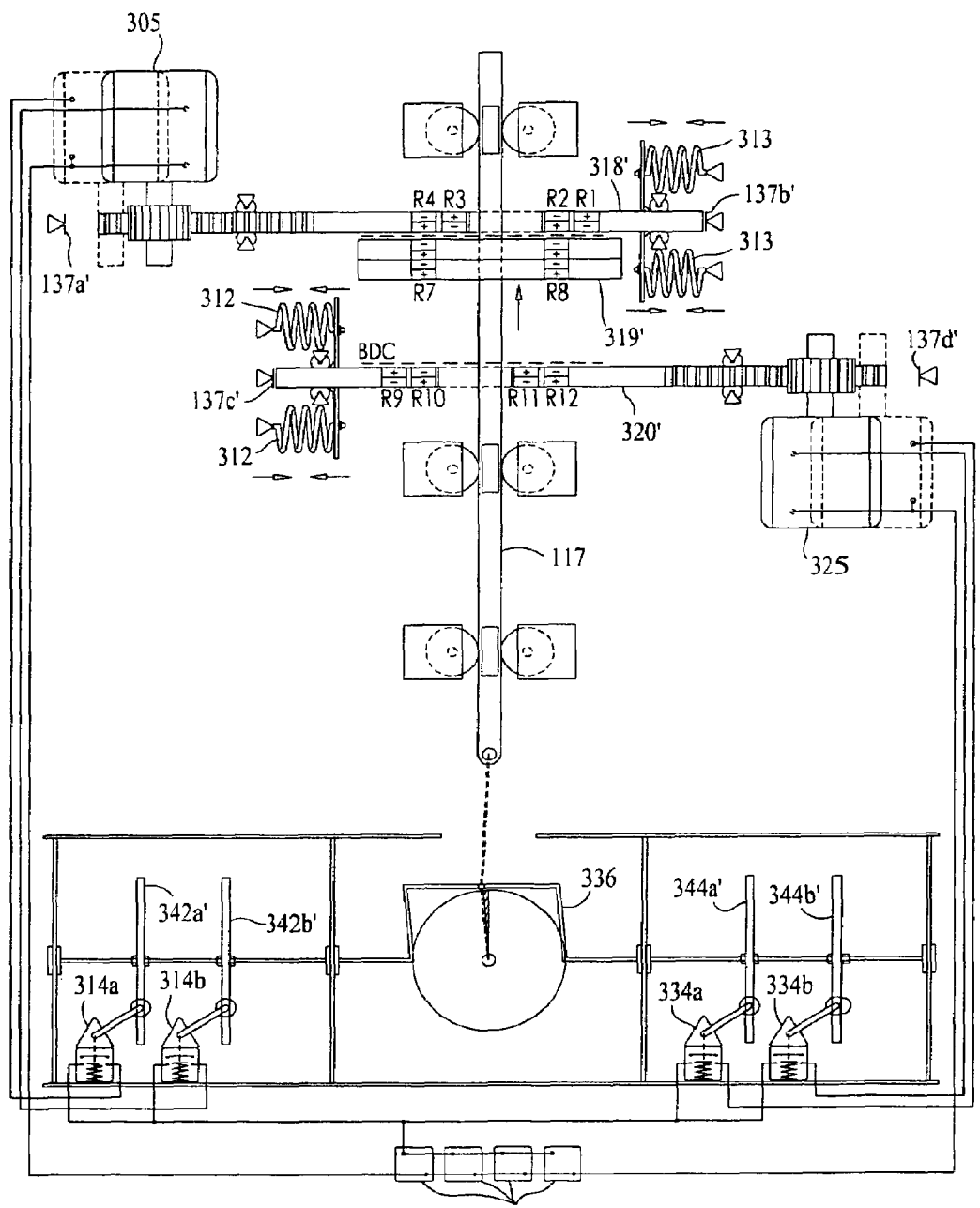

Referring now to FIG. 79, there is shown a seventh stage of operation of the present embodiment, which occurs from 356°-360° rotation of the crankshaft 336. During this cycle, the piston plate 319' reaches its TDC position, at the top of the stroke. During the final portion of its linear travel to the TDC (corresponding to, about, the final 4-5 degrees of rotation of the crankshaft), the attractive forces still resulting from the "Second Permanent Magnet Power Action" between the (−) polarity magnet rows R5, R6 on the piston plate 319' and the (+) polarity magnet rows R2, R4 of the upper plate 318', draw the piston plate to the TDC. The relative positions of the cams, and corresponding switch states at about 0° are shown in FIG. 68D.

Figure 80:
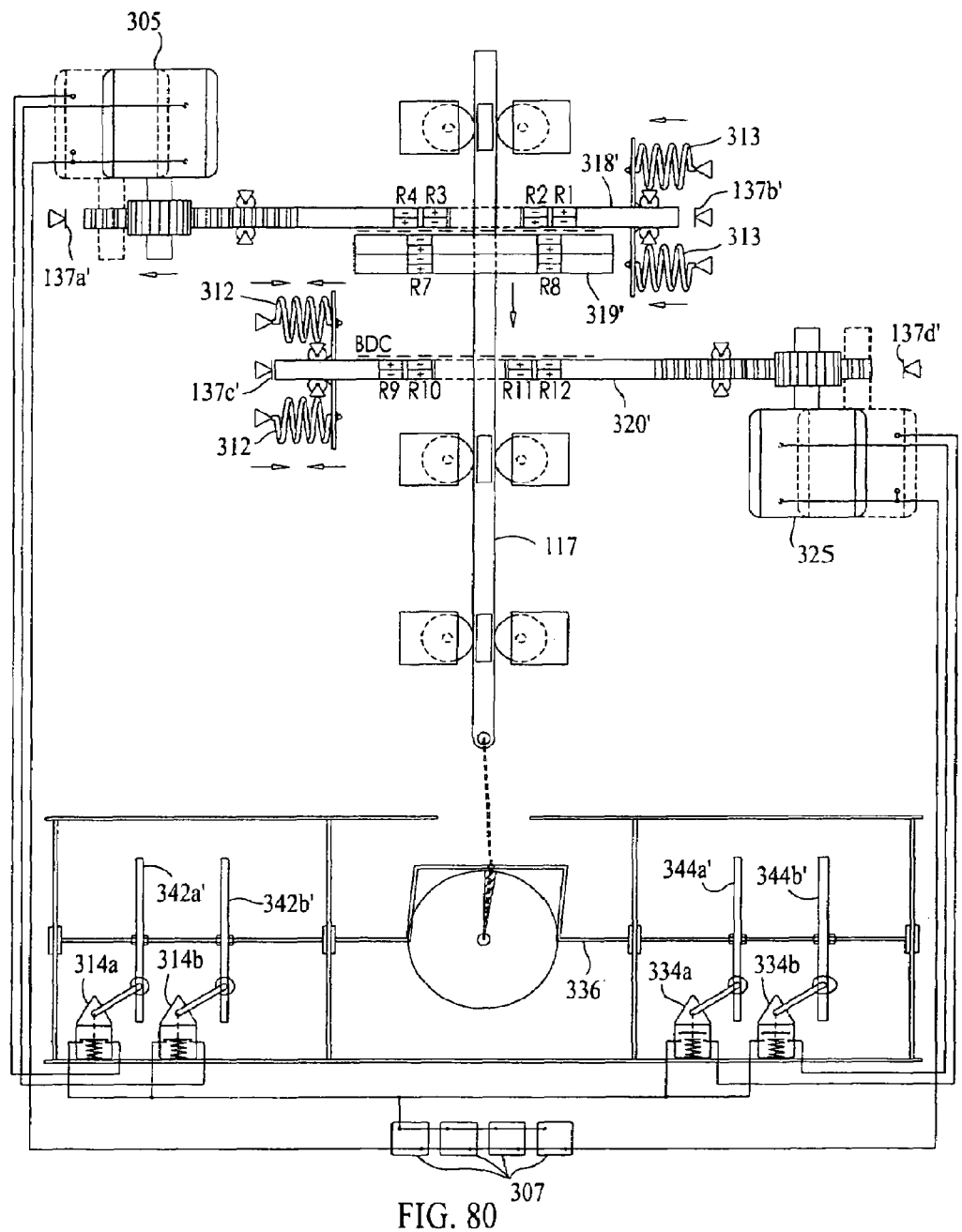

Referring now to FIG. 80, there is shown a eighth stage of operation of the present embodiment, which occurs from 001°-010° rotation of the crankshaft 336. This stage starts with the piston plate 319' at its TDC position, after which, the cams 342a', 342b', actuate the switch pair 314 in order to energize the servo pair 305, turning the servo pair 305 ON. Energizing the servo pair 305 causes the upper plate 318' to slide to its left end stop pair 137a', in the instant embodiment, about 32 mm, thus charging the spring pair 313. At this time, the servo pair 325 is OFF, and the lower plate 324' is maintained in its "natural" position.

With the change in position of the upper plate 318', the (−) polarity magnet rows R1, R3 on the upper plate 318' will repel the (−) polarity magnet rows R5, R6, on the piston plate 319', resulting in a strongly repulsive magnetic field forces that thrust the piston plate 119' downward and away from the upper plate 318'.

Figure 81:
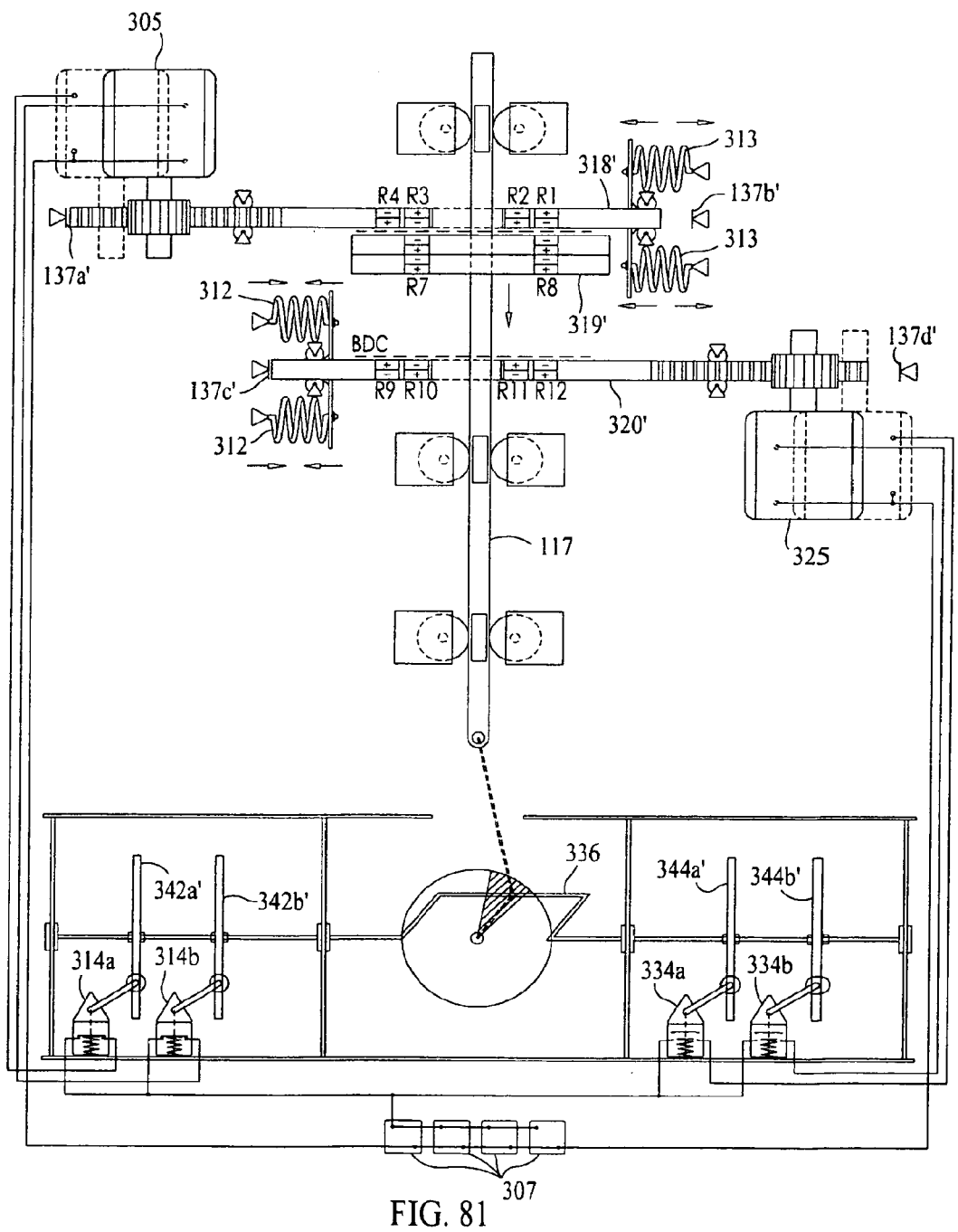

Referring now to FIG. 81, there is shown a ninth stage of operation of the present embodiment, which occurs from 011°-045° rotation of the crankshaft 336. In this stage, with the servo pair 305 still energized, the strong repulsion created by the "Third Permanent Magnet Power Action" will thrust the piston plate 319' downwards, correspondingly moving the piston rod 117 and crankshaft 336. The relative positions of the cams, and corresponding air switch states at about 45° are shown in FIG. 68C.

Figure 82:
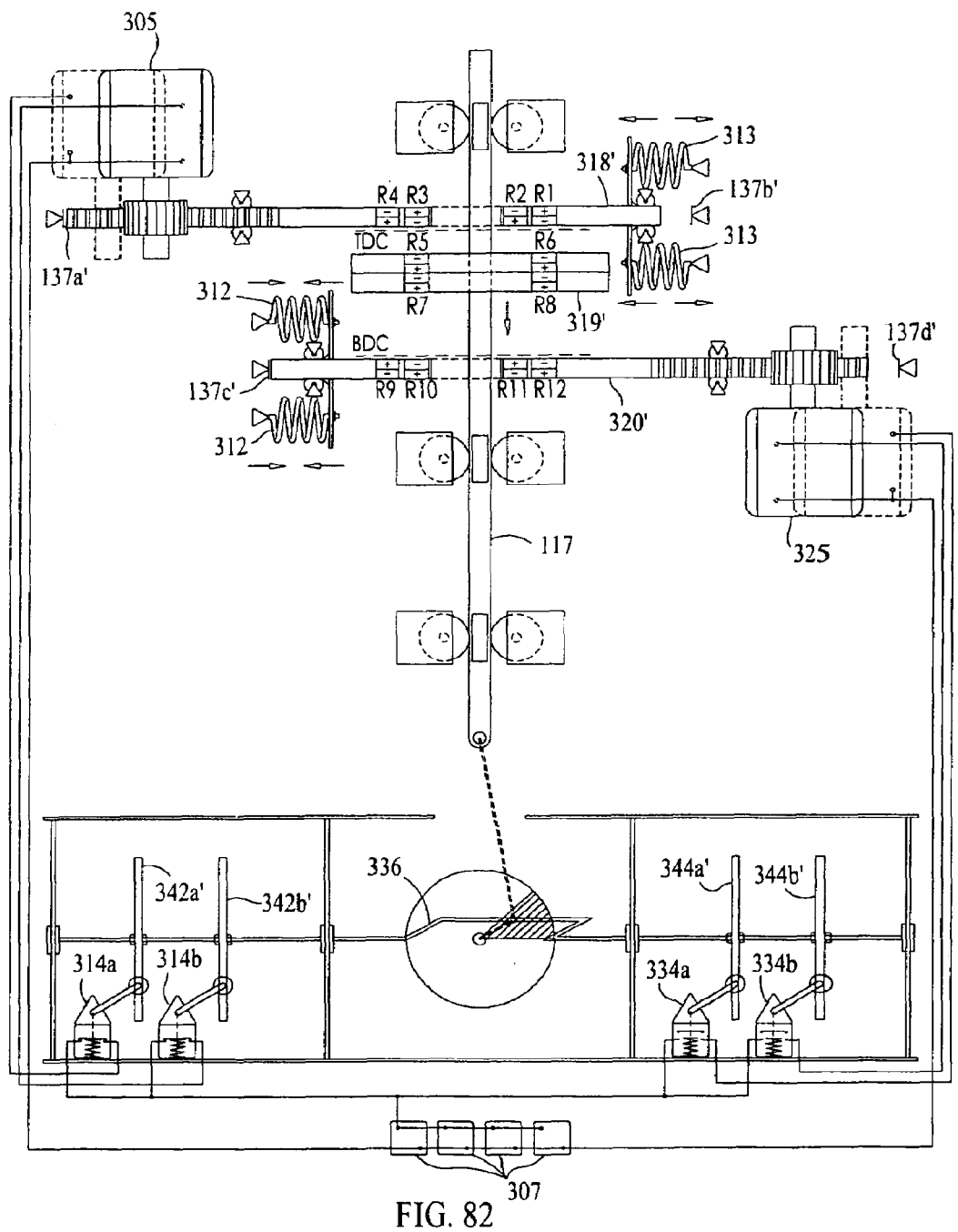

Referring now to FIG. 82, there is shown a tenth stage of operation of the present embodiment, which occurs from 46°-90° rotation of the crankshaft 336. With the servo pair 205 still energized, the downward thrust created in the eighth and ninth stages, will translate through the 90° period of crankshaft 336. Approaching 90°, however, the repulsive force on the piston plate 319' from the upper plate 318' will grow weaker, while an attractive force from the lower plate 324' will begin to take hold on the piston plate 319', forcing the piston plate 319' downward. The relative positions of the cams, and corresponding switch states through this stage at about 90° are shown in FIG. 68B.

Figure 83:
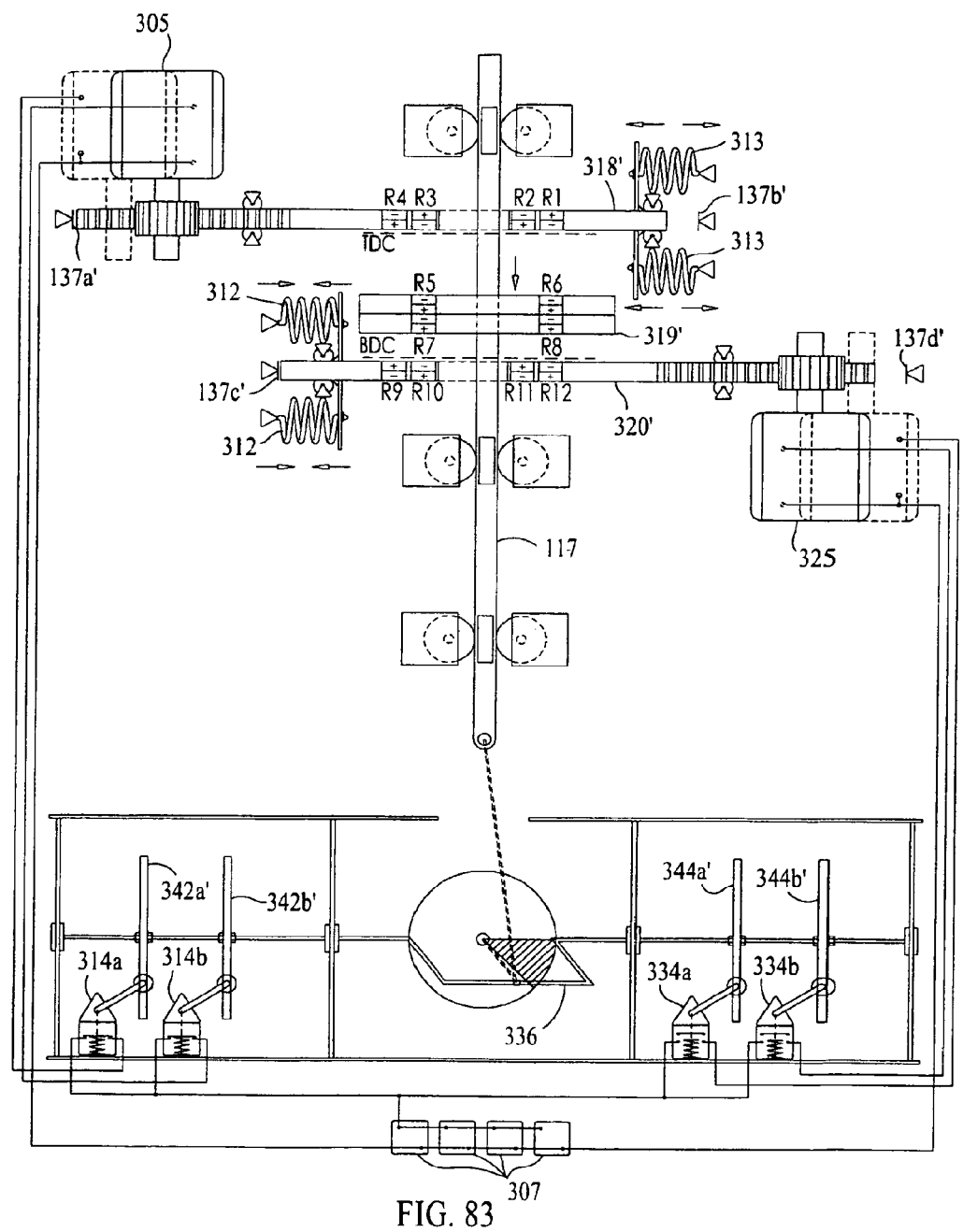

Referring now to FIG. 83, there is shown a eleventh stage of operation of the present embodiment, which occurs from 91°-135° rotation of the crankshaft 336. The inertial movement created in the ninth stage is sufficient to force the piston plate past the 90°-100° point of clockwise rotation the crankshaft 336. Past 100°, the repulsive effect from the upper plate 318' exerted on the piston plate 319' will be negligent, and will completely lose dominance at about 135°. However, the attractive forces between the (+) polarity magnet rows R7, R8 of the piston plate 319' and the (−) polarity magnet rows R10, R12 of the lower plate 324' will take over, pulling the piston plate 319' downward towards the lower plate 324'. The attractive forces from the lower plate 324' will grow stronger with the approach of the piston plate 319'. Additionally, the relative positions of the cams, and corresponding switch states through this stage at about 135° are shown in FIG. 68A.

Figure 84:
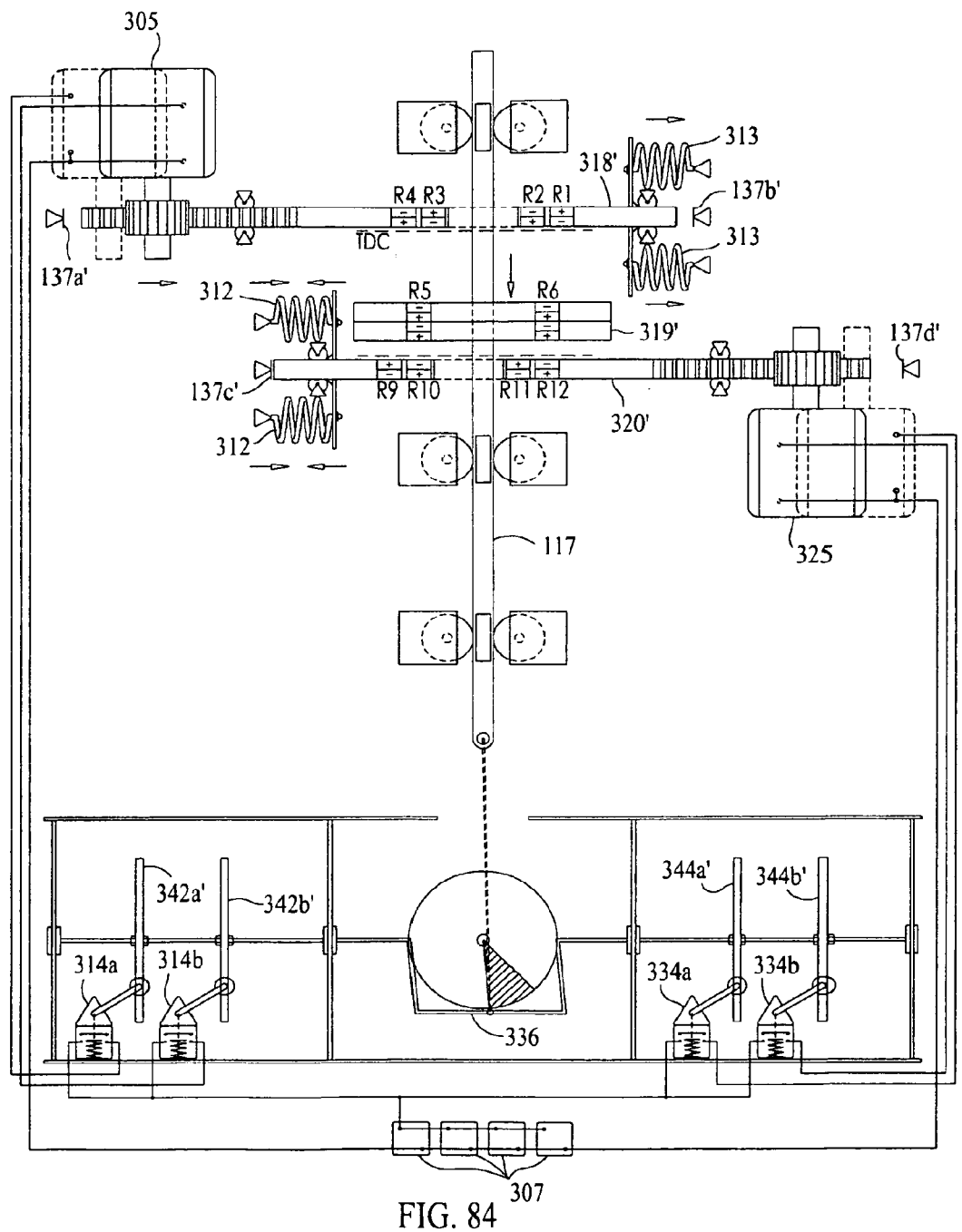

Referring now to FIG. 84, there is shown a twelfth stage of operation of the present embodiment, which occurs from 336°-175° rotation of the crankshaft 336. As the piston 319' approaches, the lower plate 324' is in the correct attractive position for the "Fourth Permanent Magnet Power Action". As the piston plate 319' gets closer to the lower plate 324', the attraction between the two plates 319', 324' is great, further forcing the piston plate 319' downwards, and correspondingly moving the piston rod 117 and rotating the crankshaft 336. At the same time, since the upper plate 318' has lost all magnetic dominance over the piston plate 319' the cams 342a', 342b' enters a portion of its cycle where it opens the switch pair 314, deenergizing the servo pair 305. The deenergization of the servo pair 305 and the discharging of the spring pair 313 moves the upper plate 324' to its "natural" position. Thus, the upper plate 318' is slowly moved from its left end stop pair 137a' to the right end stop pair 137b'.

Figure 69:
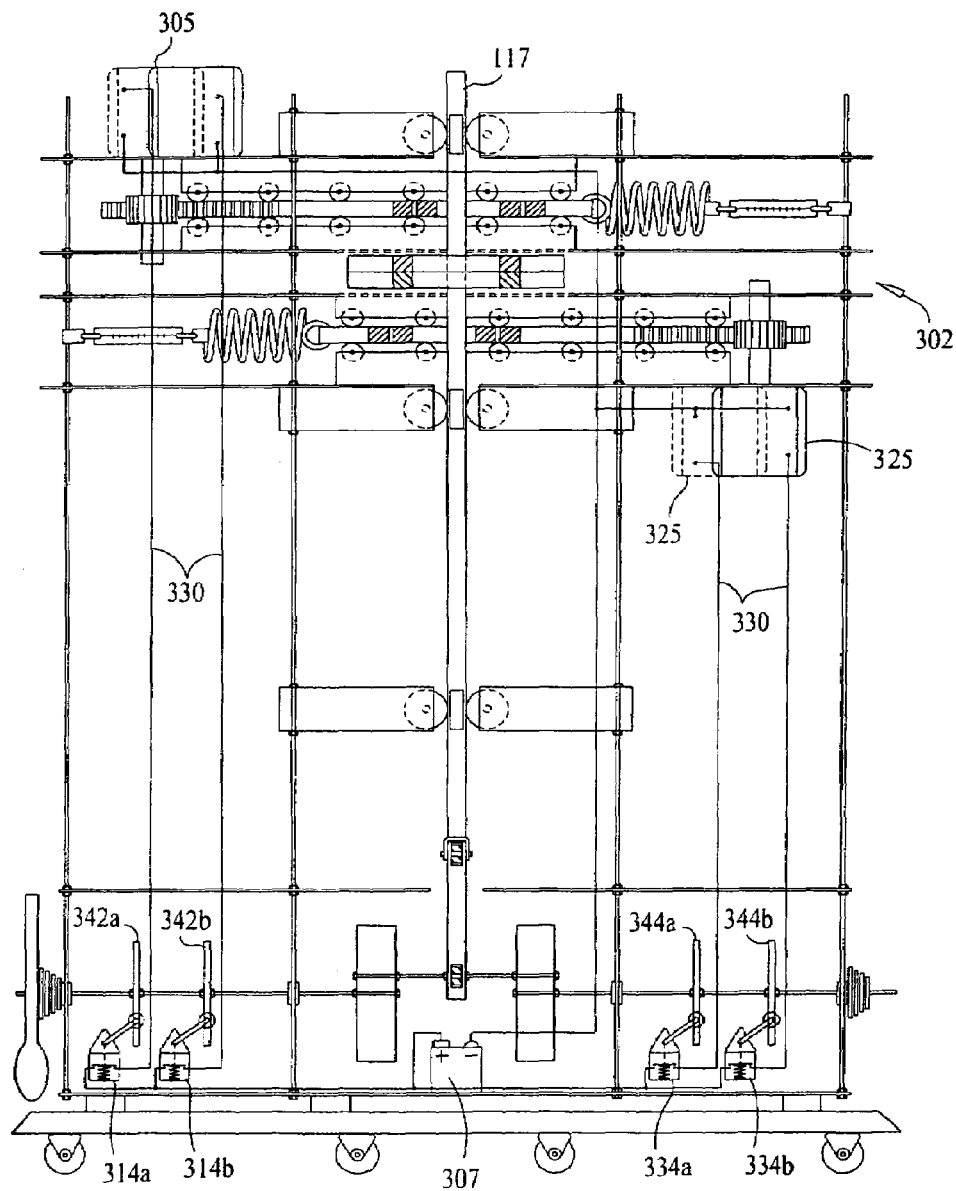
FIG. 69 is a partial front schematic view of a permanent magnet reciprocating engine including one sliding double acting module and showing its electrical connections, in accordance with one particular embodiment of the present invention.
Figure 70:
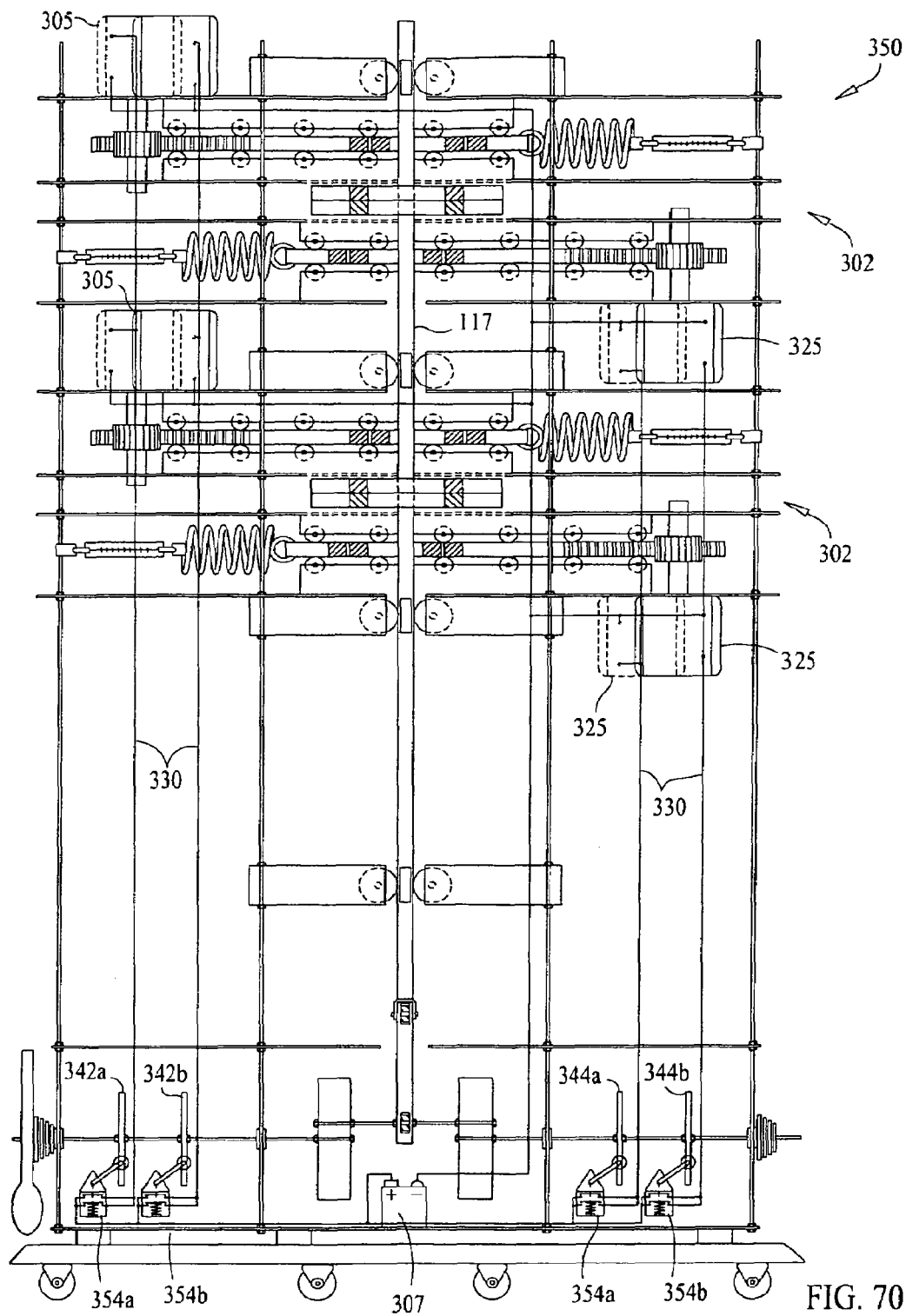
FIG. 70 is a partial front schematic view of a permanent magnet reciprocating engine including two sliding double acting modules and showing its electrical connections, in accordance with one particular embodiment of the present invention.
Figure 71:
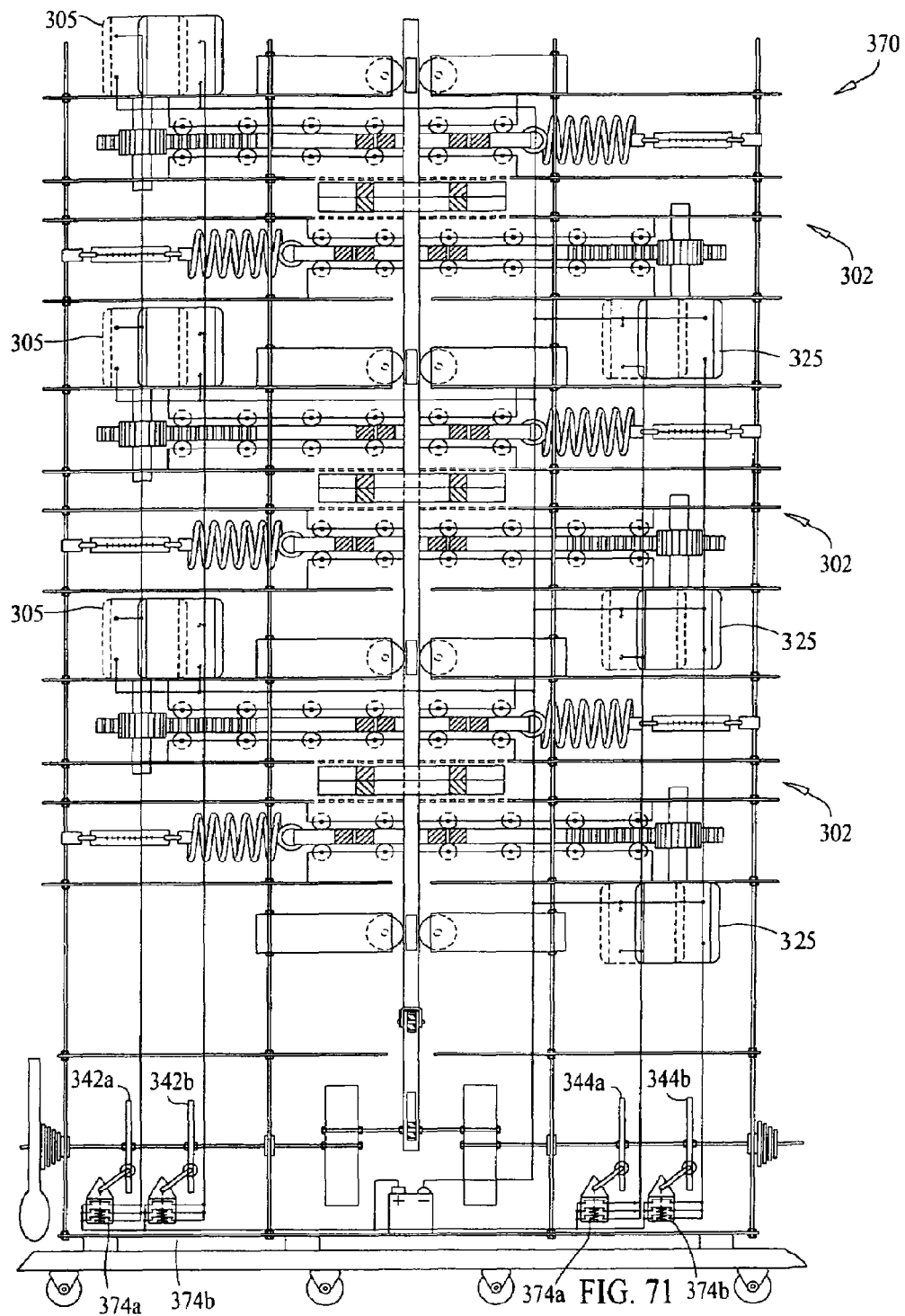
FIG. 71 is a partial front schematic view of a permanent magnet reciprocating engine including three sliding double acting modules and showing its electrical connections, in accordance with one particular embodiment of the present invention.

Referring now to FIGS. 69-71, there is shown the engine 300 and two variations. More particularly, in FIG. 69 there is shown the engine 300 including a single permanent magnet flux fusion module 302 which, as described herein, includes two sliding magnetic field plates with a reciprocating piston plate located therebetween. In the embodiment of FIG. 69, a single phase limit switch can be used as each of the switches 314a, 314b, 334a, 334b. Electrical wires 330 carry current to the appropriate DC servo motor pairs from the battery or battery bank 307. However, from the discussion herein, it can be seen that the engine 300 can be adapted, as shown in FIGS. 70 and 71 to include more than one permanent magnet flux fusion module 302. For example, the engine 350 of FIG. 70 includes two separate flux fusion modules 302 in combination with the single drive mechanism of the engine 300. Note however that the switches 354a, 354b, 354c, 354d of FIG. 70, can be double-phase limit switches (i.e., including two sets of switch contacts), so as to each power two motor pairs. Alternately, a single switch can power two motor pairs. In this way the engine 350 can include four motor pairs, wherein two motor pairs operate each of the two modules 302. Note that this is not meant to be limiting, as the engine 350 could additionally be made using single limit switches 314a, 314b, 334a, 334b, as described in connection with the engine 300 of FIG. 69. However, the servo pairs of the embodiment of FIG. 70 can be adapted to have a long shaft including two spur gear sections, such that a single motor pair can be used to move each of the upper and lower plates in each of the modules 302 of engine 350.

Further, more than two magnetic flux fusion modules can be used on a single engine. For example the engine 370 of FIG. 71 can be modified to include a plurality of flux fusion modules, such as three flux fusion modules 302, each of which including two motor pairs 305, 325 to move the upper and lower field plates, and switches 374a, 374b, 374c, 374d, such as a triple-phase limit switch (i.e., including three sets of switch contacts), to periodically energize the motor pairs. Alternately, a single switch can power three motor pairs. Alternately, as described in connection with FIG. 71, two motor pairs, total, can be used to move all of the upper and lower plates in a plurality of modules 302.

Electric Servo Motor With Worm or Spur Gear Actuation

Referring now to FIGS. 42-45, there is shown a permanent magnet driven reciprocating engine 400 in accordance with one particular embodiment of the present invention, wherein the magnetic flux module 402 includes upper and lower rotating magnetic field plates 418, 424, instead of sliding plates.

The engine 400 shares many elements in common with the engines of the previous embodiments, with like reference numerals referring to like elements. For example, the engine 400 includes a crankshaft housing 131, containing the crankshaft 436 and bearing plates 131a, 131b, 131c, 131d. However, the magnetic flux fusion module 402 of the engine 400, has been modified to accommodate the use of rotating upper and lower magnetic field plates 418, 424. More particularly, referring now to FIGS. 42-44, in an effort to further compact and simplify the engine of the instant invention, it can be seen that the magnetic flux module 402 includes an upper rotating module 403 and a lower rotating module 404.

Figure 50A:
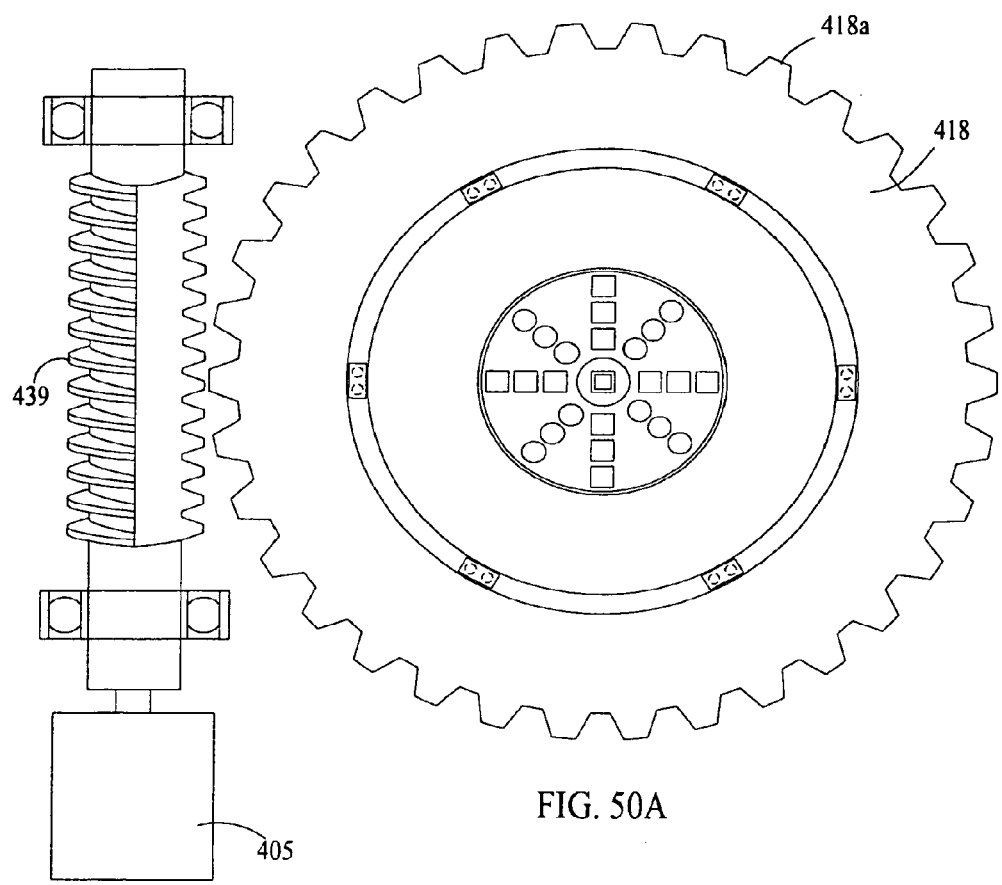
FIGS. 50A and 50B show a partial top plan view and a side view, respectively, of a worm gear actuated rotating plate in accordance with one particular embodiment of the instant invention.
Figure 50B:
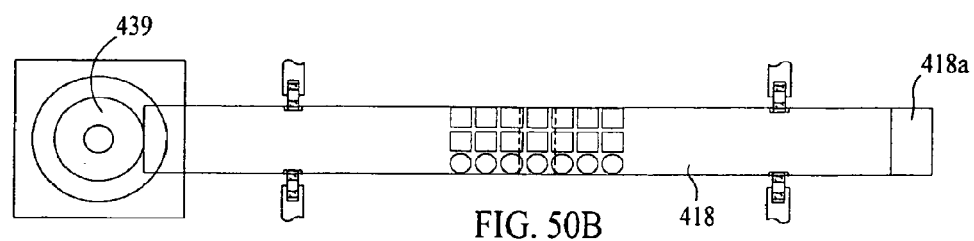
Figure 51A:
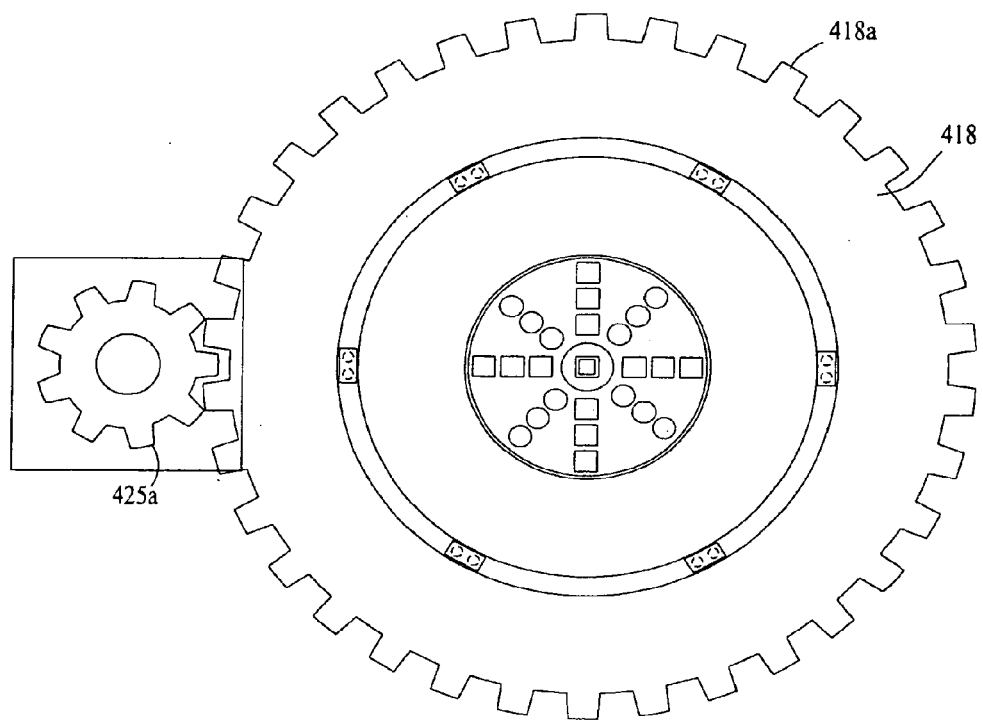
FIGS. 51A and 51B show a partial top plan view and a side view, respectively, of a spur gear actuated rotating plate in accordance with one particular embodiment of the instant invention.
Figure 51B:
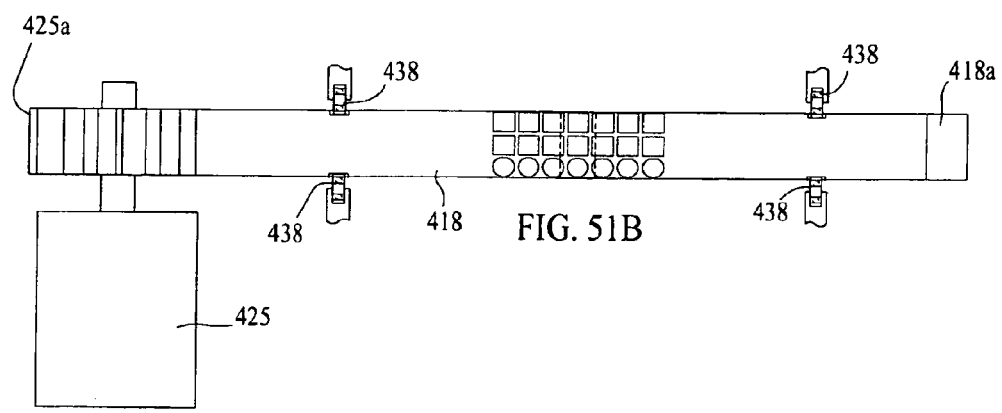

Upper and lower rotating modules 403 and 404 each include a holder plate 420, 423, respectively, each holder plate including a square cross-sectional opening through which the piston rod 117 passes, and an opening through which the shaft and spur gear 405a, 425a of the DC servo motors 405, 425 pass. This is shown more particularly in FIG. 51 with regard to the plate 418 and the motor 405. However, the use of a spur gear is not meant to be limiting, as, alternatively, the servo motors 405, 425 can operate some other type of gear engaged with the plates 418, 424, such as a motor driven worm gear 439, as shown in FIG. 50. The servo motors 405, 425 may be mounted to the holder plates 420, 423, respectively.

Additionally, the upper and lower rotating modules 403 and 404 each include a second holder plate 421, 422, respectively. Each second holder plate 421, 422 includes a cutout portion, sized to permit the piston plate 419 to pass. In the present embodiment, the piston plate is made to be circular, and as such, the cutout portions through the second holder plates 421, 422 are designed to be circular, as well. Note that this is not meant to be limiting, as it can be seen that the piston plate 419 does not need to be circular, nor do the cutouts in the holder plates 421, 422, so long as the piston plate can pass through.

Each of the upper and lower rotating magnetic field plates 418, 424 in the instant embodiment are additionally implemented using a round plate and include a center hole therethrough, for passage of the piston rod 117. The upper and lower plates 418, 424 are configured to be periodically rotated in increments of 45° through a total rotation of 360° degrees by the DC servo motors 405, 425, respectively. Note that it is not important whether the field plates 418, 424 are rotated in the clockwise or counter-clockwise direction. To facilitate such rotation through the full 360°, each field plate 418, 424 includes a spur gear 418a, 424a around its circumference, in order to interact with the spur gears 405a, 425a on the motors 405, 425, in order to smoothly rotate the plates 418, 424.

Alternatively, the engine 400 could be modified such that the servo motors 405, 425, while energized, rotate the plates 418, 424, 45° degrees clockwise, and at the end of such energization, rotate the plates 418, 424, 45° counter-clockwise, back to the plate's "natural" position. As such, the plates 418, 424 are periodically rotate back and forth between 0° and 45° and not, ultimately 360°, as described above, while still alternately bringing different rows, having different polarities, into alignment with corresponding rows on the piston plate 419, as appropriate for the different attraction and repulsion stages set forth in the description of a cycle of operation. Note that in such an embodiment, each plate 418, 424 would only need to contain gear teeth around 50° of its circumference. An adjustable spring can be provided to assist the plate's return to its "natural" position, once the servo is deenergized.

Referring back to FIGS., 42-45, each plate is made from a suitable non-magnetic material having the magnets embedded therein in a single-pole orientation (i.e., such that only one pole of each magnet comes into play). Additionally, each field plate 418, 424 is held in place by roller bearings 438, which help restrict the movement of the magnetic field plate to a smooth, rotating motion about the piston rod 117.

As shown more particularly in FIGS. 52-59, the piston plate 419 includes on each face thereof, two rows of magnets arranged in a cross pattern centered around the piston rod 117. In the instant embodiment, the magnets on each side of the piston plate 418 are of like polarity, with each row containing six magnets. Correspondingly, each of the upper an lower rotating magnetic field plates 418, 424 includes thereon, four rows of magnets, intersecting at the piston rod hole, and forming two crosses centered around the hole for the piston rod 117, each cross being offset relative to the other cross by 45°. An example of such a configuration is shown in FIGS. 52-59. Note that, on each of the upper and lower field plates 418, 424, a first row X1 contains magnets of a like polarity (i.e., in one particular embodiment, all (+) polarity magnets), while the second row X2 contains magnets of a like polarity to each other, but different from the polarity of the magnets in row X1 .(i.e., in one particular embodiment, all (−) polarity magnets). In the particular embodiment, each cross is made up of twelve permanently-charged, rare-earth magnets (i.e., with six magnets per row), however, this is not meant to be limiting as more or fewer magnets may be used, as desired, depending on the calculations for the desired power output of the crankshaft.

In operation, each of the upper and lower plates 418, 424 are advanced 45° by the respective motor 405, 425, to bring a different cross pattern of magnets (i.e., one of cross pattern X1 or X2 and one of cross pattern X5 or X6) into alignment with the cross patterns of magnets on the piston plate 419 (i.e., crosses X3, X4). By alternating between the (+) and (−) polarity cross patterns on the faces of the upper and lower plates 418, 424, the magnets on the plates 418, 424, alternate between attractive and repulsive modes of interaction with the piston plate 419.

Table 3 outlines the four magnetic configurations illustrated in the figures, for each of the cross patterns of magnets X1-X6, by polarity.

TABLE 3

| FIG. No(s). | Upper Sliding Plate, Lower Surface | Piston Plate, Upper Surface | Piston Plate, Lower Surface | Lower Sliding Plate, Upper Surface | | |
|---|---|---|---|---|---|---|
| | X1 | X2 | X3 | X4 | X5 | X6 |
| FIG. 52 | + | − | + | − | + | − |
| FIG. 61 | + | − | − | + | + | − |
| FIG. 62 | + | − | + | + | + | − |
| FIG. 63 | + | − | − | − | + | − |

Note that other arrangements of magnets and rows are possible, and would be encompassed by the present invention. Further, due to the localization of the magnetic field from each magnet, it can be seen that other patterns of magnets can be placed on the plates that will work with the instant invention.

Further, the crankshaft housing 131 includes cams 412, 432 and electrical switches 414, 434, in order to operate the motors 405, 425 that rotate the plates 418, 424. As in the previous embodiments, rotation of the crankshaft 436 causes rotation of the cams 412,432 fixedly mounted thereto. Profiles on the cams have been designed to actuate each of the switches 414, 434 at specific periods during the cycle of rotation of the crankshaft 436. When actuated, the switches 414, 434 close a circuit between the motors 405, 425 and the battery or battery bank 407 in order to power the appropriate DC servo motor 405, 425. As noted above the motors 405, 425 serve to advance the rotation of the plates 418, 424, in 45° increments throughout a 360° cycle of operation. As described in connection with an alternate embodiment (not shown) alternatively, the cams 412, 432 could be predesigned to actuate the switches 414, 434 in order to periodically energize and deenergize the DC servo motors to rotate the plates 418, 424 back and forth between 0 and 45°. The switches 414, 434 are connected between the motors 405, 425 and the battery 407 by electrical wiring, as shown more particularly in connection with FIG. 47.

One exemplary full cycle of operation of the engine 400', illustrated through the resultant 360° of rotation of the crankshaft 436, will be described using FIGS. 46 and 52-60. The magnetic rows aligned on each field plate could be any configuration set forth in Table 3, above, or another configuration, including a configuration using a different number of magnets. However, for purposes of explanation, the rows of permanent magnets aligned on the field plates are as shown in FIG. 52.

Referring now to FIG. 53, there is shown a first stage of the cycle for the engine 300' which occurs between 100° and 175° rotation of the crankshaft 436'. In this first stage, the DC electric servo motors 405 are both OFF, and each of the upper and lower rotating magnetic field plates 418', 424' are aligned with the piston plate 419', as shown. In this alignment, the piston plate 419' is approaching BDC position, as a result of attractive force between the (−) polarity magnet cross pattern X4 on the lower surface of the piston plate 419' and the (+) polarity magnet cross pattern X5 on the upper surface of the lower plate 424'. Due to strong permanent magnets field forces of attraction created by the opposing polarities, the downward motion of the piston plate 419' is accelerated as it approaches BDC. The present portion of the stroke is referred to herein as the "Fourth Permanent Magnet Power Action Between X4-X5". Note that the positions of the cams 412' and 432', and the corresponding states of the switches 414' and 434', at about 135° of rotation of the crankshaft are shown in FIG. 46D.

Referring now to FIG. 54, there is shown a second stage of the cycle for the engine 400' which occurs between 176° and 181° of rotation of the crankshaft 436'. During this second stage, the particular moment of attraction force between X4 and X5 is still present and growing. Between about 176°-178° of crankshaft 436' rotation, just before the piston plate 419' reaches BDC the motor (425 of FIG. 42) will be energized, when the cam 432' closes the switch 434'. The motor will then rotate the lower plate 424' by 45°. Note that at about 22.5° of rotation, neither of the magnet cross patterns X5 and X6 on the lower plate 424' are in alignment with the magnet cross pattern X4 on the piston plate, thus having no magnetic interaction between the two plates 424' and 419. This, however, only lasts for a fraction of a second, until the motor further rotates the lower plate 424' and the field from the (−) polarity magnet cross pattern X6 interacts with the field from the (−) polarity cross pattern X4 on the piston plate 419', thus starting with a reduced repulsive force, which grows stronger as the plates 419', 424' approach full alignment. The positions of the cams 412' and 432', and the corresponding states of the switches 414' and 434', at 180° rotation of the crankshaft are shown in FIG. 46E.

Referring now to FIG. 55, there is shown a third stage of the cycle for the engine 400' which occurs between 182° and 260° of rotation of the crankshaft 436'. This third stage begins after the piston plate has passed its BDC position and while the motor is still rotating the lower field plate through its final 40°-45° of rotation, and the cam 432' opens the switch 434', thus turning off the motor (425 of FIG. 42). Once fully aligned, the field from the (−) polarity magnet cross pattern X6 interacts with the field from the (−) polarity cross pattern X4 on the piston plate 419' to create a very strong repulsive force between the two plates 419', 424'. As a consequence of this strong repulsive force, the piston plate 419' is thrust upwards towards the upper plate 418', correspondingly rotating the crankshaft 436'. This portion of the stroke is referred to herein as the "First Permanent Magnet Power Action Between X6-X4". In addition to the upward thrust from the lower plate 424', as the crankshaft 436' approaches 260° of rotation, an attractive force between the (−) polarity cross pattern X2 on the upper plate 418' and the (+) polarity cross pattern X3 on the piston plate 419', contributes to the upwards movement of the piston plate 419'. The positions of the cams 412' and 432', and the corresponding states of the switches 414' and 434', at 225° rotation of the crankshaft are shown in FIG. 46F.

Referring now to FIG. 56, there is shown a fourth stage of the cycle for the engine 400' which occurs between 261° and 279° of rotation of the crankshaft 436'. In this fourth stage, the thrust that was created between the lower plate 424' and the piston plate 419' continues to influence the motion of the piston plate 419' and rotate the crankshaft 436' past 279°. Simultaneously, the influence from the attractive created by interaction with the upper plate 418' is growing. After about 279°, the attractive force created by the upper plate 418' is the primary mechanism for moving the piston plate 49' upwards. Once the lower plate 424' is no longer significantly contributing to the upwards motion of the piston plate 419' (i.e., at about 270°), the cam 432' is timed to close the switch 434' in order to energize the motor 425° and rotate the lower plate

424' 45°. The positions of the cams 412' and 432', and the corresponding states of the switches 414' and 434', at 270° rotation of the crankshaft are shown in FIG. 46G.

Figure 57A:
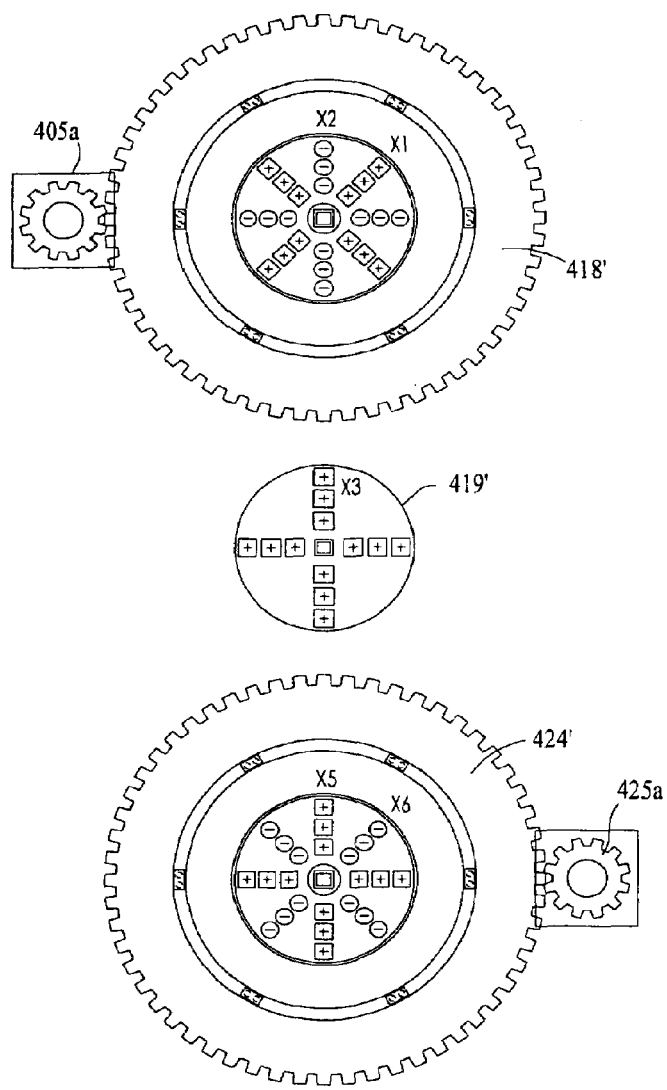
Figure 57B:
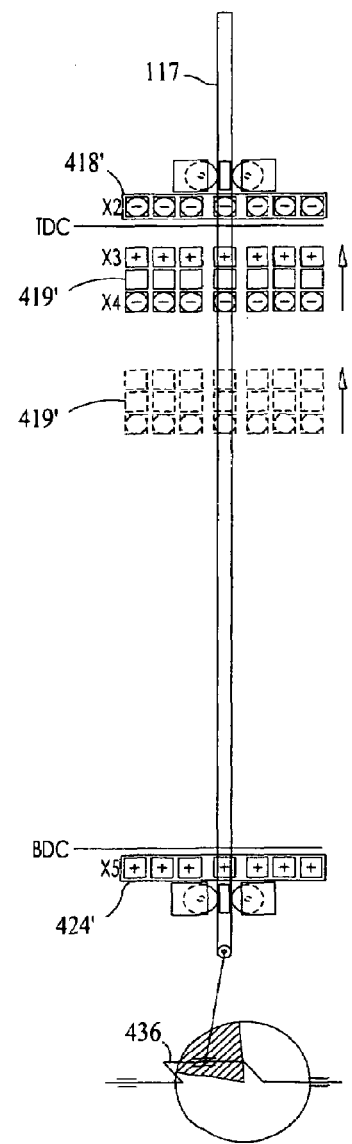

Referring now to FIG. 57, there is shown a fifth stage of the cycle for the engine 400' which occurs between 280° and 355° of rotation of the crankshaft 436'. During this fifth stage, the piston plate 419' is approaching its TDC position. Additionally, the piston plate 419' continues its upward motion towards the upper plate 418', now fueled almost exclusively by the attraction between the (−) polarity magnets in cross pattern X2 on the upper plate 418' and the (+) polarity magnets in cross pattern X3 on the upper surface of the piston plate 419'. As the two plates 418', 419' get closer, the growing attractive forces further accelerate the motion of the piston plate 419' and, resultantly, the rotation of the crankshaft 436. This portion of the cycle is referred to herein as the "Second Permanent Magnet Power Action Between X2-X3". The positions of the cams 412' and 432', and the corresponding states of the switches 414' and 434', at 315° rotation of the crankshaft are shown in FIG. 46H.

Figure 58A:
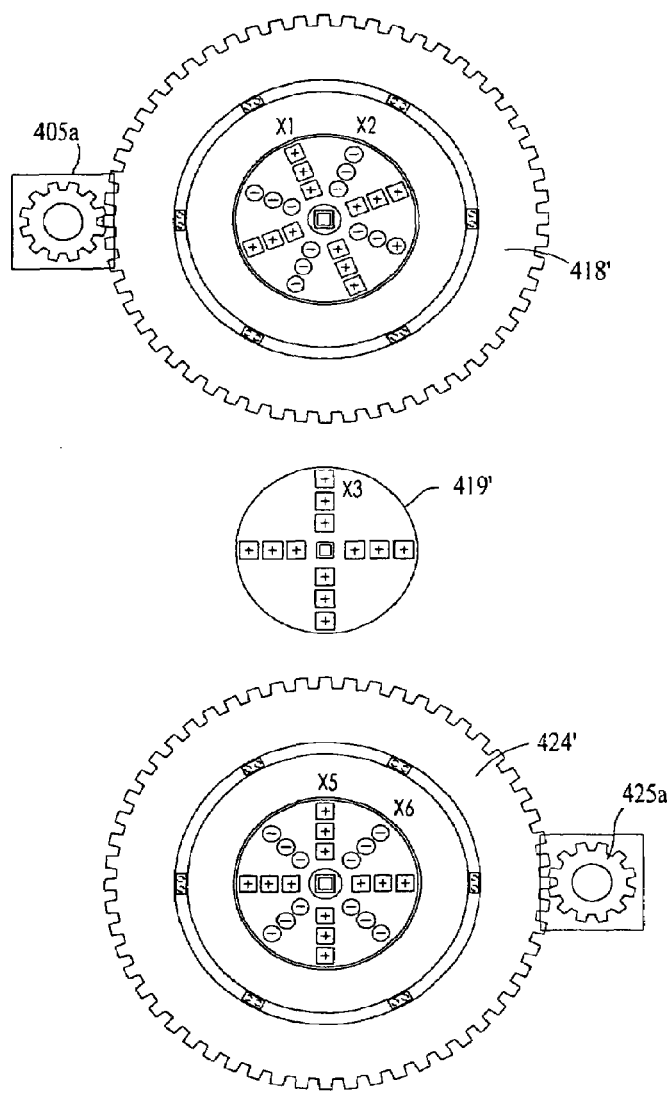
Figure 58B:
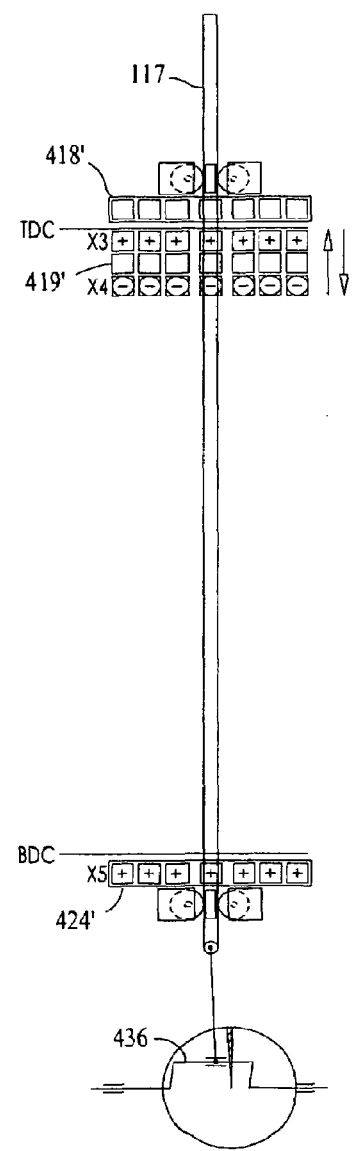
Figure 60A:
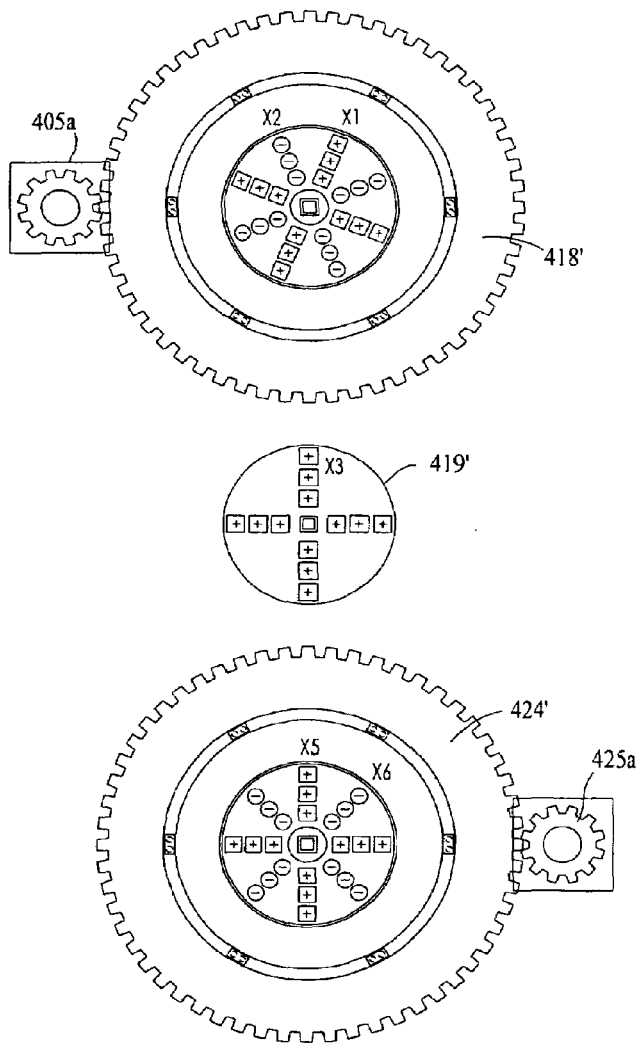
Figure 60B:
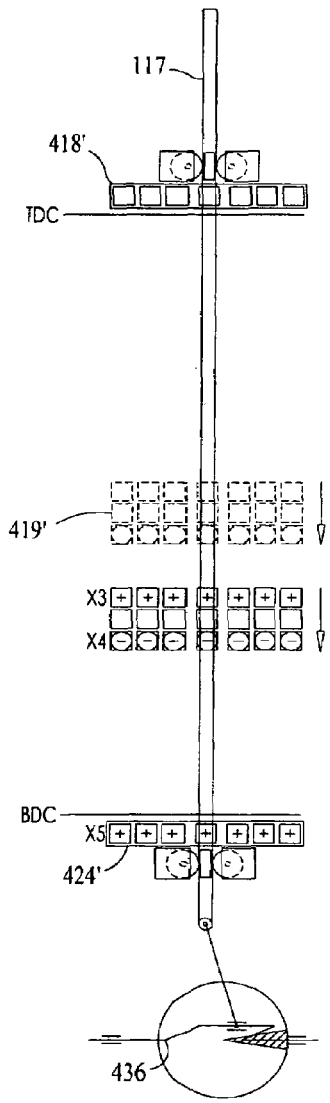
Figure 64:
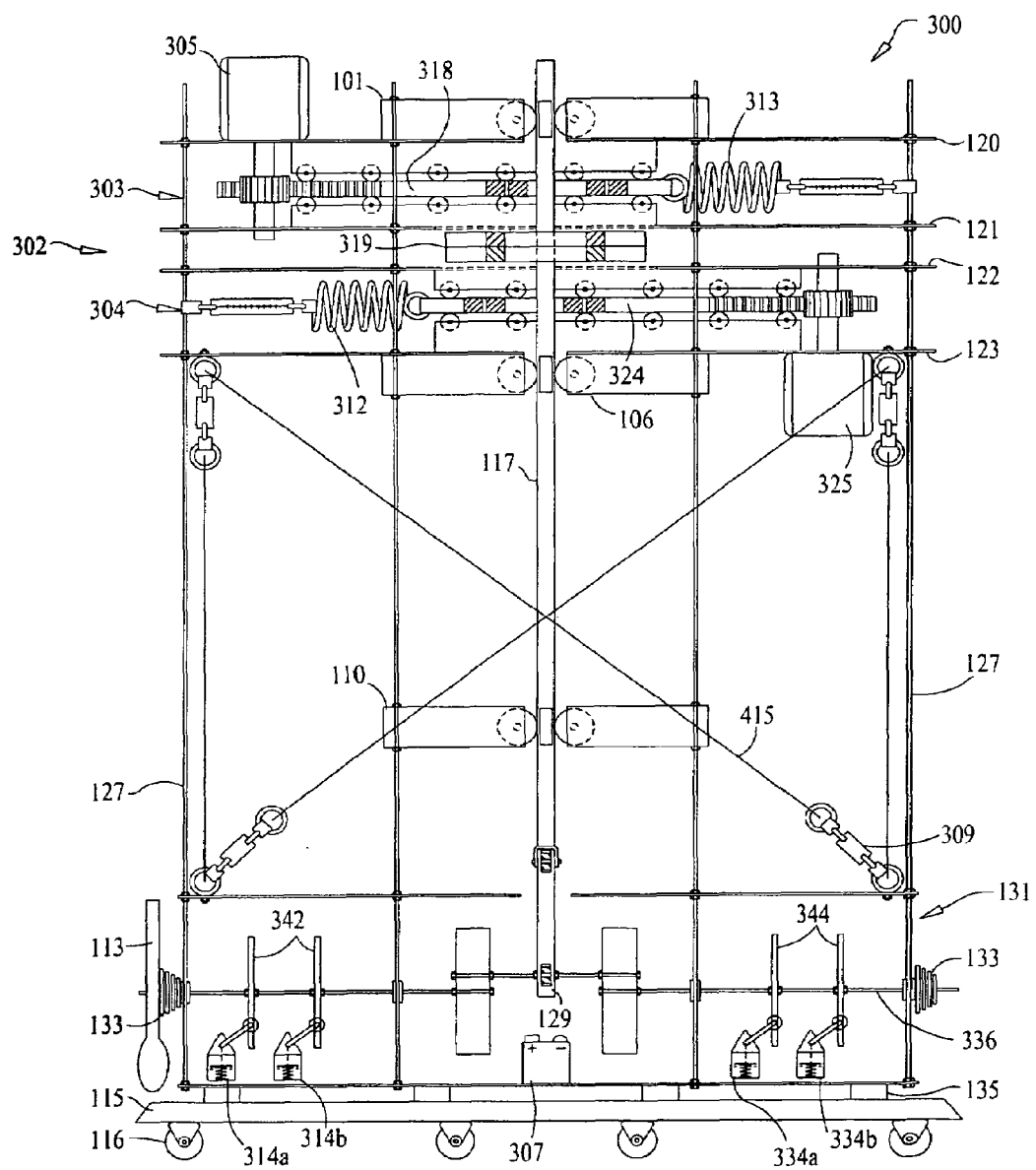
FIGS. 64 and 65 are partial schematic views of a permanent magnet reciprocating engine, taken from the front and side, respectively, in accordance with another particular embodiment of the present invention.
Figure 65:
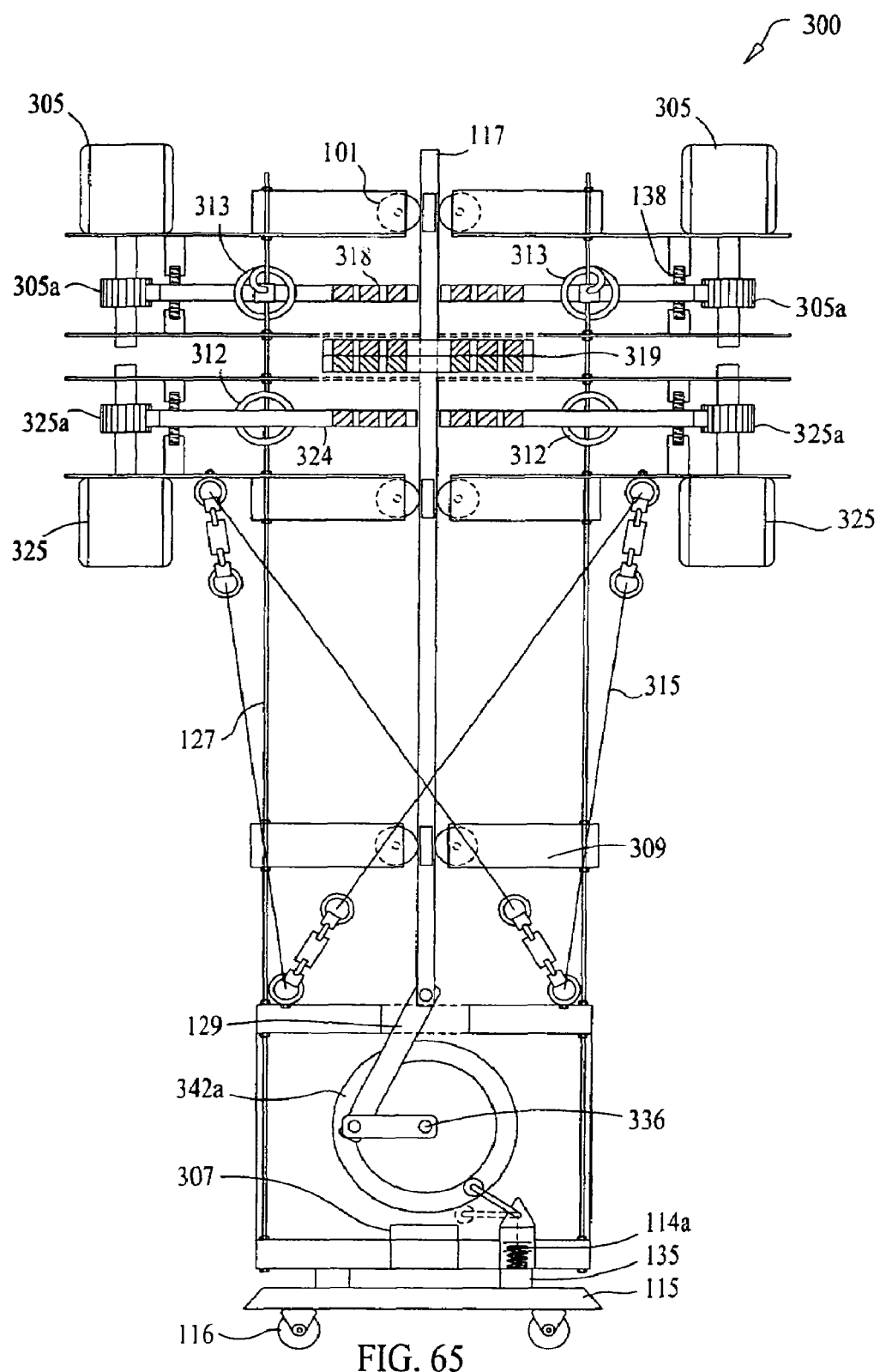

Referring now to FIG. 58, there is shown a sixth stage of the cycle for the engine 400' which occurs between 356° and 1° of rotation of the crankshaft 436'. At the beginning of the sixth stage, the moment of attraction force between the (−) polarity cross pattern X2 on the upper plate and the (+) polarity cross pattern X3 on the piston plate continues to grow. Between about 356°-358° rotation of the crankshaft 436', just before the piston plate 419' reaches its TDC position, the left cam 412' closes the switch 414' and energizes the motor 405', which initiates a 45° rotation of the upper plate 418'. During this rotation, as shown in FIG. 58, at about 22.5° neither the cross patterns X1 or X3 are quite aligned with the cross pattern X3 on the piston plate resulting momentarily in no work action performed between the magnetic cross patterns X1, X2 and X3. This condition only lasts for a fraction of a second, as the motor 405' cycles the upper plate 418' past this position. As the (+) polarity cross pattern X1 is rotated into position, and the edges of its magnetic field begin to interact with the magnetic field from the (+) polarity cross pattern X3, there is a reduced (i.e., not yet up to maximum, due to the not yet full alignment) repulsive field force between the upper plate 418' and the piston plate 419'. The positions of the cams 412' and 432', and the corresponding states of the switches 414' and 434', at 360°/0° rotation of the crankshaft are shown in FIG. 46A.

Referring now to FIG. 59, there is shown a seventh stage of the cycle for the engine 400' which occurs between 2° and 79° of rotation of the crankshaft 436'. At the beginning of this seventh stage, the motor 405' is still rotating the upper plate 418' through its final 40°-45° of rotation, after which the motor 405' is turned off as a result of the timing on the cam profile 412'. At about 2° of rotation of the crankshaft 436', the piston plate 419' reaches its TDC position, as the (+) polarity magnet cross pattern X1 of the upper plate 418' is locked into alignment with the (+) polarity magnet cross row X3 of the piston plate 419'. The strong repulsive force created between magnet the like polarity cross rows X1 and X3, will strongly thrust the piston plate 419' downward, resultantly rotating the crankshaft 436'. This portion of the cycle has been referred to herein as the "Third Permanent Magnet Power Action Between X1-X3". Note that, towards the end of this seventh stage, an attractive force between the (+) polarity magnet cross pattern X5 on the lower plate 424' and the (−) polarity magnet cross pattern X4 on the lower surface of the piston plate 419' contributes to the downward movement of the piston plate 419' and the corresponding rotation of the crankshaft. The positions of the cams 412' and 432', and the corresponding states of the switches 414' and 434', at 45° rotation of the crankshaft are shown in FIG. 46B.

Referring now to FIG. 60, there is shown an eighth stage of the cycle for the engine 400' which occurs between 80° and 99° of rotation of the crankshaft 436'. The thrust that was created between the upper plate 418' and the piston plate 419' is still strong enough to move the piston plate 419' through this eighth stage. Simultaneously, the attraction between the lower plate 424' and the piston plate 419' is growing stronger and contributing to the downward movement of the piston plate 419'. Note that towards the end of this cycle, once the magnetic contribution from the upper plate is no longer significant for the movement of the piston plate 419', the cam closes the switch 414' to energize the motor 405', thus rotating the upper plate 45°, in anticipation of its forthcoming attraction mode. The positions of the cams 412' and 432', and the corresponding states of the switches 414' and 434', at 90° rotation of the crankshaft are shown in FIG. 46C. After this eighth stage of operation, the cycle begins again at the first stage.

Note that other configurations of the rotating plates can be made. For example, although not illustrated in a figure, the instant invention can additionally be made up of a single pattern on each of the upper and lower rotating magnetic field plates 418, 424, wherein the magnets in each row are of like polarity to each other, but of different polarity from the other row making up the cross pattern. For example, the cross patterns on each of the upper and lower field plates would each include a (+) row and a (−) row intersecting at the piston rod 117. Correspondingly, each of the upper and lower surfaces of the piston plate 419 would include a cross pattern including one (+) polarity row and one (−) polarity row. In operation, the upper and lower field plates would each be rotated 90°, to alternate between attractive and repulsive modes.

Further, the patterns shown on plates 418", 419" and 424" of FIGS. 60A-60B, 61A-61B and 62A-62B, can be substituted for the plates 418', 419', 424', above, and the operation described can be adapted for use with those plates 418", 419" and 424".

Figure 47:
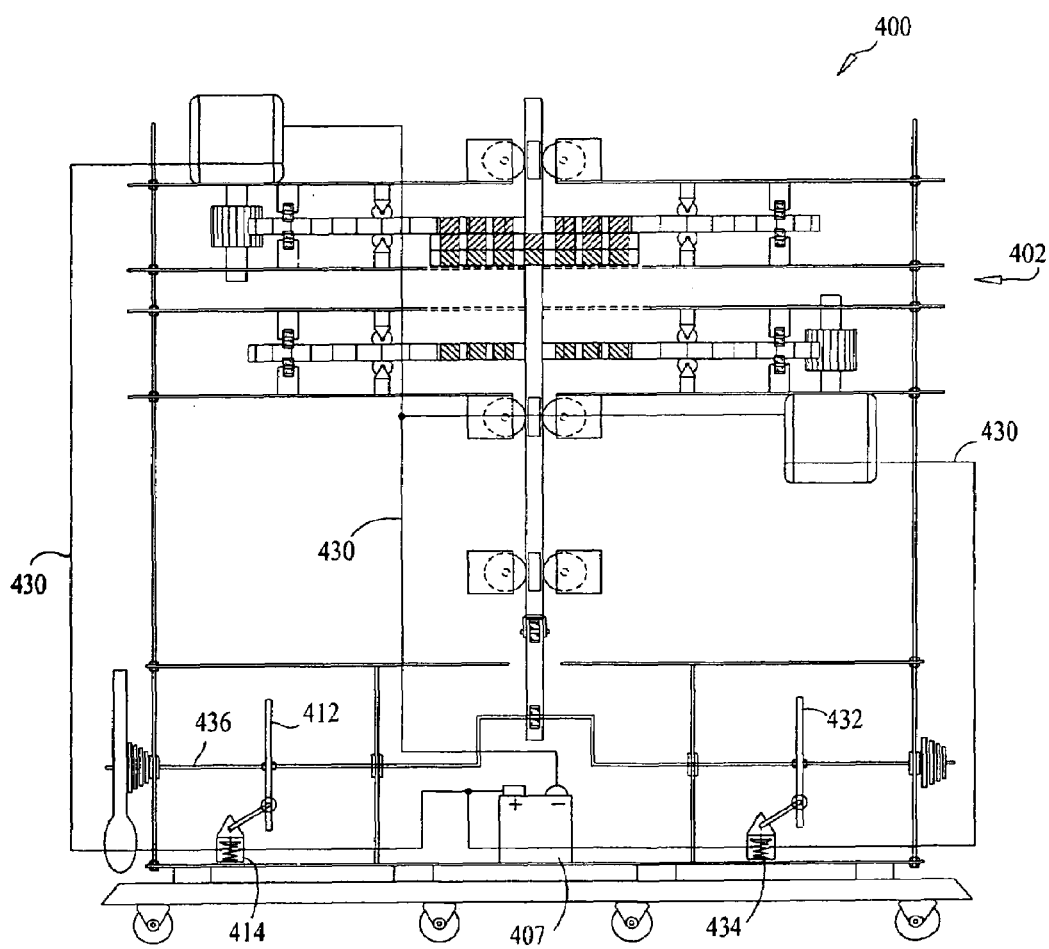
FIG. 47 is a partial front schematic view of a permanent magnet reciprocating engine including one rotating double acting module and showing its electrical connections, in accordance with one particular embodiment of the present invention.
Figure 48:
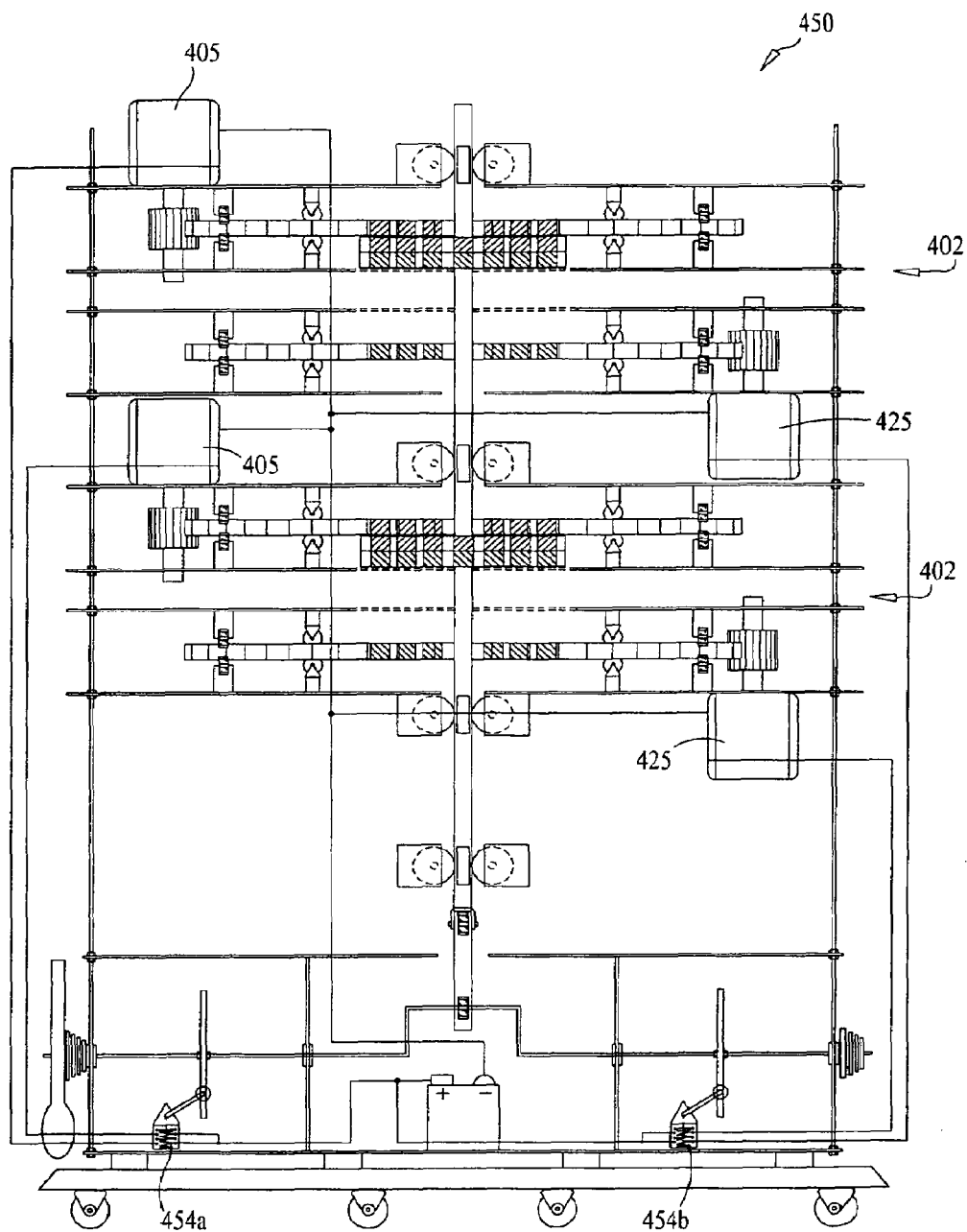
FIG. 48 is a partial front schematic view of a permanent magnet reciprocating engine including two rotating double acting modules and showing its electrical connections, in accordance with one particular embodiment of the present invention.
Figure 49:
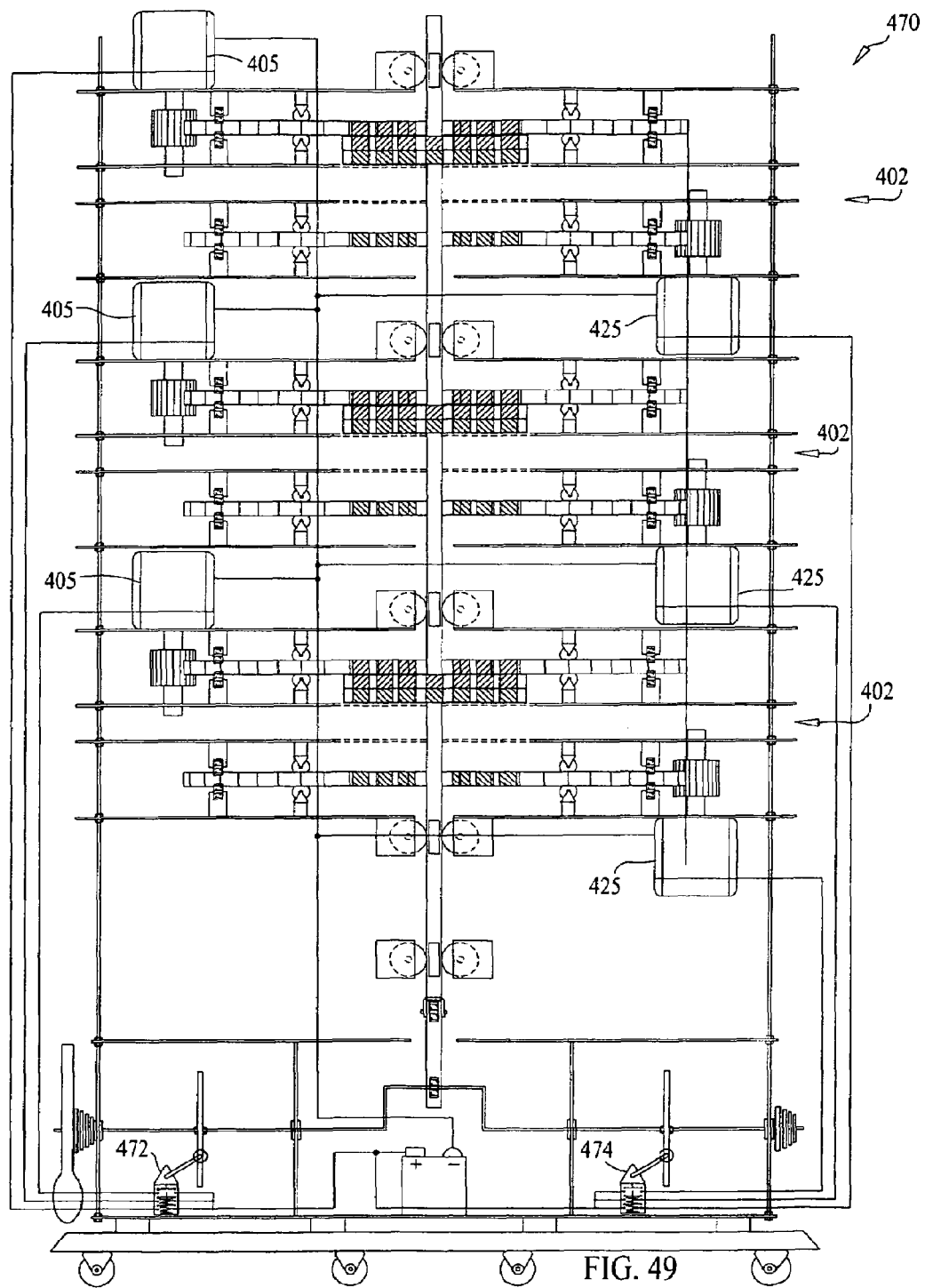
FIG. 49 is a partial front schematic view of a permanent magnet reciprocating engine including three rotating double acting modules and showing its electrical connections, in accordance with one particular embodiment of the present invention.

Referring now to FIGS. 47-49, there is shown the engine 400 and two variations. More particularly, in FIG. 47 there is shown the engine 400 including a single permanent magnet flux fusion module 402 which, as described herein, includes two rotating magnetic field plates with a reciprocating piston plate located therebetween. In the embodiment of FIG. 47, a single phase limit switch can be used as each of the switches 414a, 414b, 434a, 434b. Electrical wires 430 carry current to the appropriate DC servo motors 405, 425 from the battery or battery bank 407. However, from the discussion herein, it can be seen that the engine 400 can be adapted, as shown in FIGS. 48 and 49 to include more than one permanent magnet flux fusion module 402. For example, the engine 450 of FIG. 48 includes two separate flux fusion modules 402 in combination with the single drive mechanism of the engine 400. Note however that the switches 454a, 454b of FIG. 48, can be double-phase limit switches (i.e., including two sets of switch contacts), so as to each power two motors. Alternately, a single switch can power two motors. In this way the engine 450 can include four motors, wherein two motors operate each of the two modules 402. Note that this is not meant to be limiting, as the engine 450 could additionally be made using single limit switches 414, 434 as described in connection with the engine 400 of FIG. 47. However, the servo pairs of the embodiment of FIG. 48 can be adapted to have a long shaft including two spur gear sections, such that a single motor pair can be used to move each of the upper and lower plates in each of the modules 402 of engine 450.

Further, more than two magnetic flux fusion modules can be used on a single engine. For example the engine 470 of FIG. 49 can be modified to include a plurality of flux fusion modules, such as three flux fusion modules 402, each of which including two motors 405, 425 to move the upper and lower field plates, and switches 472, 474, such as a triple-phase limit switch (i.e., including three sets of switch contacts), to periodically energize the motors 405, 425. Alternately, a single switch can power the three sets of motors 405, 425. Alternately, as described in connection with FIG. 48, two motors with a sufficiently long motor shaft, total, can be used to move all of the upper and lower plates in a plurality of modules 402.

Electro-Magnet Flux Module

It can be seen that, in the above embodiments, the engines 100, 200, 300, 400, can be made to produce suitable power without the use of electromagnets. However, in a further embodiment of the present invention it is proposed that the above embodiments of the invention can be made using an electromagnet flux module, instead of the permanent magnet flux modules described. In such embodiments, electromagnets would be substituted for the permanent magnets in the flux modules. For example, one embodiment of an electro-magnet sliding double acting module would include first and second sliding field plates, with a third or piston field plate disposed therebetween. As with the permanent magnet flux module, the upper sliding field plate of the electro-magnet flux module includes at least one electro-magnet on its lower surface, while a lower sliding filed plate includes at least one electro-magnet on its upper surface. A third or piston field plate would then, correspondingly, include at least one electro-magnet on each of its surfaces facing the magnetic surfaces of the upper and lower field plates. In this embodiment, and all of the embodiments to follow, the at least one magnet can include one or more double-pole, electro-magnet(s) including both a (+) North and a (−) South pole, or two or more single-pole oriented electro-magnets, having at least one with a (+) North pole and one with a (−) South pole, and/or combinations thereof. As with the other embodiments, the piston field plate only moves up and down, along an axis 'A' through the sliding field plates perpendicular to the plane in which the plates slide.

Another embodiment of an electro-magnet flux module which can be used with the engines described above, is a sliding single acting module including only one sliding field plate (i.e., either the upper sliding field plate or the lower sliding field plate) including at least one electro-magnet interacting with the piston field plate including at least one magnet, on the surface facing the magnetic surface of the one sliding field plate. As with the previous embodiments, the piston field plate would move up and down along an axis perpendicular to the surface of the sliding magnetic field plate, but would not rotate about that axis.

A further possible electro-magnet flux module that can be used with the instant invention could be a rotating sliding double acting module including two rotating (rather than sliding) field plates with a non-rotating piston field plate located therebetween. The upper rotating field plate of the electro-magnet flux module includes at least one permanent magnet on its lower surface, while a lower rotating filed plate includes at least one permanent magnet on its upper surface. A third or piston field plate would then, correspondingly, include at least one electro-magnet on each of its surfaces facing the magnetic surfaces of the upper and lower rotating field plates. The piston field plate would move up and down along an axis perpendicular to the surfaces of the rotating field plates.

A further embodiment of an electromagnet flux module that can be used in place of the permanent magnet flux module 102 described in connection with FIG. 1, uses a rotating single acting module including only one rotating field plate (i.e., either the upper rotating field plate or the lower rotating field plate) interacting with a piston field plate that moves along an axis perpendicular to the surface of the rotating field plate, but does not rotate around that axis. As in the above-described module, one surface of the rotating magnetic field plate would include at least one electromagnet and the piston field plate would include at least one electro-magnet on the surface facing the magnetic surface of the rotating field plate.

Note that, even in the above embodiment including electromagnets, the field plates move in order to bring magnets of the desired polarity into alignment with magnets on the piston plate in order to create the desired magnetic power actions.

Magnetic Crankshaft

As an alternative to the crankshaft housings 131, 231 and crankshafts 136, 236, 436 described herein, can be replaced by a magnetic crankshaft arrangement. More particularly, since the engines 100, 200, 300, 400 do not need a sump filled with lubrication oil, or oil as a coolant of some sort (i.e., as is used in standard diesel/Otto process engines) there is a lot of free space around the crankshaft of the drive mechanism. This free space around the crankshaft can be utilized in many different ways. For example, it would be possible in any of the above embodiments showing a single crankshaft, to replace that crankshaft with a single magnetic crankshaft and a corresponding magnetic housing, which housing creates a thrust bearing or centering device for assisting the axial movement of the crankshaft during operation.

Alternately, the drive mechanisms of any of the above embodiments could be replaced by a crankshaft having mounted thereon permanent magnets, that would rotate with the crankshaft housing, and interact with blocks of coil windings located within the crankshaft, thus creating a DC dynamo. Further, the drive mechanisms of any of the above embodiments could be replaced by a crankshaft having mounted thereon permanent magnets, that would rotate with the crankshaft, and interact with blocks of coil windings located within the crankshaft housing, in order to create an AC alternator.

Referring now to FIGS. 98A-98C, there is shown a crankshaft housing 500 including a magnetic portion, so as to exert a force of the crankshaft arm 11 through periods of transition at the BDC and TDC positions. The crankshaft housing 500 includes therein the lower portion of the drive mechanism. For example, contained within the housing 500 are cams and switches similar to those described above in connection with the engine 400. This is not meant to be limiting, as any of the drive mechanisms of the engines 100, 200, 300, 400 could be supplemented using a magnetically enhanced crankshaft assembly.

The crankshaft housing 500 includes the lower portions of the INOX rods 127 used to frame the engines of the instant embodiments. Additionally, the crankshaft housing 500 includes the bearing plates 500a and 500f, which support the crankshaft 502. The bearing plates 500a, 500f include roller bearings in the center thereof, to support and permit rotation of the crankshaft 502. Further, the housing 500 additionally includes magnetic bearing plates 500b and 500e, which include magnet portions 506a, 506d, 508a, 508d arranged only at the BDC and TDC positions (i.e., proximal to the 0° and 180° points of rotation of the crankshaft 502). The bearing plates 500b, 500e additionally include roller bearings in the center thereof, to support and permit rotation of the crankshaft 502. The roller bearings located in bearing support plates 500a, 500b, 500e, 500f additionally help to center the operation of the reciprocating mechanism of a magnetic crankshaft 502.

Further, magnetic plates 500c and 500d, including magnet portions 506b, 506c, 508b, 508c, are included within the crankshaft housing 500. The magnetic plates 500c and 500d include open portions therethrough, through which the crankpin portion of the crankshaft 502 can rotate. The plates 500a-500f are arranged within the crankshaft housing 500, as shown in FIG. 98B. In one particular example shown, only four single-pole oriented magnets are located at each of the top and bottom positions of the plates 500B-500E. However, this is not meant to be limiting, as more or fewer magnets may be used at these positions.

In order to add a pushing force to the rotation of the crankshaft in the BDC and TDC positions, the crankshaft has mounted thereto, magnetic disks 502a, 502b, 502c and 502d proximal to the crank pins. More particularly, as shown in FIG. 98B, the magnetic disks are mounted in pairs 502a, 502b and 502c, 502d, between the magnetic plate pairs 500b, 500c and 500d, 500e, respectively. Magnetic disks 502a, 502b, 502c, 502d each include one section of magnets 510a-d mounted thereto. The magnets 510a-d mounted thereto are located so as to interact with the magnet portions 506a-d, 508a-d, on the plates 500b-500e proximal to the BDC and TDC positions (but not, simultaneously, at both). As no magnets are located on the plates 500b-500e in positions other than the BDC and TDC positions, the magnets 510a-d only interact magnetically at those positions. In a preferred embodiment, the magnets 506a-d, 508a-d, 510a-d are mounted at an angle of between 10° and 30° relative to the surface that supports them. In a more preferred embodiment, the faces of the magnets are mounted at an angle of 30 degrees relative to the surface that supports them. The field created by this mounting offset is more particularly shown in the direction of the arrows from the magnet surfaces in FIG. 98B. The magnets on the crankshaft plates 502a-d interact with the magnets on the housing plates 500b-e, to add a magnetic thrust or push to the momentum crankshaft at the BDC and TDC positions.

Further, the magnets may be mounted so as to initially exert attraction between the plates and then repulsion. For example, if four magnets 506a are arranged on the plate 500b, magnets may be arranged such that a pair (+) polarity magnets are next to a pair of (−) polarity magnets. Then the four magnets on the plate 502a would be arranged to include a pair of (−) polarity magnets and a pair of (+) polarity magnets, such that when the disk 502a approaches towards the TDC position, (+) polarity magnets on one of the disks 500b, 502a interacts in the attraction mode with (−) polarity magnets on the other of the disks 500b, 502a. As the disk 502a reaches the TDC position, the like polarity magnets on the two disks 500b, 502b would be aligned, so as to exert a repulsive force and push away the disk 502a, rendering the system even more unstable at the TDC position. Similar interactions occur between the other disks, and at the BDC position. The rotation of the crankshaft at the BDC and TDC positions is resultantly elastic and extremely smooth and, once in motion, rotates more easily.

Additionally, the magnetic crankshaft assembly shown in FIG. 98, if modified to include a complete ring of magnets on each of the plates 500b-e and opposing magnets on each of the crankshaft plates 502a-d, can be used to create a thrust bearing, that limits axial movement of the crankshaft 502, in operation.

Referring now to FIGS. 99 and 100, there are shown two embodiments of an engine drive portion contained in the crankshaft housings 520, 540, wherein the drive portions, themselves, are used to generate electricity, such as by forming electric dynamos. More particularly, the crankshafts 530, 550 include mounted thereto the cylinders 532, 542, respectively. Inside the crankshaft housing 520, 540 are additionally coil portions 534, 544, respectively. Coil portions 534 depict standard wrapped coils, while coil portion 544 depicts a three-phase inductance coil. The cylinders 532, 542 have embedded therein three regions of magnets located about 120° apart. More particularly, the two rows have opposing polarities, as shown more particularly, FIGS. 99B and 100B. Rotation of the cylinders 532, 542 in close proximity to the coils 534, 544 produce an alternating current, as a result of the alternating polarities of the magnetic cylinders 532, 542. The produced current can be used in the system or stored. The housings 520, 540 additionally include roller bearing plates 520a-f, 540a-f, respectively, to support the crankshafts 530, 550.

Further Embodiments

Note that, although the above embodiments describe either magnetic flux modules including permanent magnets or magnetic flux modules including electromagnets, note that it would be within the scope of the instant invention to make an embodiment that uses combinations of both permanent magnets and electromagnets. For example, in an embodiment using two sliding and/or rotating field plates and a piston field plate located therebetween, the magnets on the sliding and/or rotating field plates may be electro-magnets, while the magnets on the piston field plate may be permanent magnets, or vice-versa.

Additionally, although the majority of the above embodiments were described as including a single piston rod, it is noted that the invention uses a minimum of one piston rod attached to a single crank pin. It is further noted that any of the above-described engines could be produced using two or more piston rods attached to a single crank pin, as formerly done in V/STAR engines. Additionally, with more piston rods, modular expansion can be achieved using multi-directional piston rods.

Further, although the majority of the above embodiments were described as including a simple crankshaft having a single crank pin, this is not meant to be limiting. It is envisioned that a single complex crankshaft including multiple crank pins (i.e., 1, 2, 3, 4, 5, . . . , n), as shown in FIG. 20B, can be used for high power output applications. Further, multiple crank pins and/or multiple pistons permit the multi-directional expansion of the instant invention.

Further still, although the majority of the above embodiments were described as including a single, simple crankshaft operation, this is not meant to be limiting. Rather, a single simple crankshaft with one crank pin was been used to describe the basic operation of the above invention. However, certain engine systems utilize multiple crankshafts, and it can be seen from the description of the instant invention contained herein, that multiple crankshafts could also be utilized, in accordance with the instant invention.

Additionally, it can be seen that, if multiple permanent magnet flux fusion modules are to be used in a single engine, such as is shown in connection with FIGS. 48, 49, 70 and 71, that the sliding/rotating plates could include magnet on both the upper and lower surfaces thereof, to interact with multiple piston plates. For example, in such an embodiment, the top planar surface of, for example, an upper sliding field plate would act as the lower field plate of an adjacent module. It can be seen that the repositioning of such plates (in anticipation of the next power action) could occur at the TDC and BDC positions. In such a case, using a plate that is both the upper plate of one module and the lower plate of another, when the plate is repositioned to switch from attractive to repulsive mode at the TDC position in the lower module, the upper side of the plate (i.e., which is the lower plate of the upper module) becomes repositioned in anticipation of its alignment for the attractive mode in the BDC position of that module. In this way, additional force is created without adding additional field plates, by the use of additional magnets and piston plates. It can be seen that the rotating field plates could be substituted in the example illustrated above for the sliding plates.

Note that other types of drive mechanisms may be used. For example, the crankpin may have a magnet mounted thereon, and Hall Effect and/or other types of sensors may be mounted at particular critical points in the cycle of crankshaft rotation. The sensors could send signals to an electronic controller, including control logic, a PLC and/or software that would trigger the drive mechanism (i.e., the pneumatic cylinders 109, 128, and/or the motors 305, 405, 325, 425).

It is envisioned that all control circuits, timing operation, operation management, power management, monitoring, starting, stopping and variable speed control of the magnetic flux engine can be supervised by computerized monitoring and control systems known today for operation of one sophisticated power plant. In such an embodiment, the cams may be omitted, as their function is accomplished using programming and/or controller logic.

Additionally a single mechanism, electronic or mechanical, can be used to move both plates of a sliding/rotating double acting module simultaneously, for example, when the piston plate reaches its BDC and TDC positions.

Further, it is envisioned that the magnetic engines described herein could be implemented utilizing technologies of today, as well as the future, wherein the scale of the engine could range from the micro and mini sizes to the maxi and macro sizes, depending upon the application for which the engine would be specifically designed.

Note that, in view of the foregoing, it can be seen that the flux fusion modules of the instant invention are actually magnetic flux fusion "reactors" that can be used alone, or in various modular combinations forming a mechanical flux fusion power plant.

I claim:

1. A permanent magnet reciprocating engine, comprising:
    a first magnetic field plate including a first surface from which at least first and second field plate magnetic fields emanate, said first and second field plate magnetic fields being of different polarity from each other;
    a magnetic piston plate including a first surface from which at least a first piston plate magnetic field emanates, said first surface of said magnetic piston plate being disposed towards said first surface of said first magnetic field plate;
    a first magnetic field plate orientation mechanism to move said first magnetic field plate at specific intervals, to alternately align said first field plate magnetic field and said second field plate magnetic field with said at least a first piston plate magnetic field, in order to alternately attract said magnetic piston plate to said first magnetic field plate and repel said magnetic piston plate from said first magnetic field plate;
    a piston rod in communication with said magnetic piston plate;
    a translation mechanism in communication with said piston rod, said translation mechanism spaced apart on said piston rod from said magnetic piston plate;
    said piston rod moving along an axis in a first direction when said first magnetic field plate attracts said magnetic piston plate, said piston rod moving along the axis in a second direction when said first magnetic field plate repels said magnetic piston plate; and
    said translation mechanism translating linear motion of said piston rod along said axis into rotary motion.

2. The permanent magnet reciprocating engine of claim 1, wherein, said first magnetic field plate orientation mechanism rotates said first magnetic field plate from a first position to a second position.

3. The permanent magnet reciprocating engine of claim 2, wherein said first magnetic field plate orientation mechanism includes a motor.

4. The permanent magnet reciprocating engine of claim 3, wherein said motor drives a spur gear and at least a portion of said first magnetic field plate is circular and includes gear teeth around at least a portion of the circumference of said first magnetic field plate, said spur gear being engaged with said gear teeth to rotate said first magnetic field plate.

5. The permanent magnet reciprocating engine of claim 3, wherein said motor drives a worm gear and at least a portion of said first magnetic field plate is circular and includes gear teeth around at least a portion of the circumference of said first magnetic field plate, said worm gear being engaged with said gear teeth to rotate said first magnetic field plate.

6. The permanent magnet reciprocating engine of claim 1, wherein, said first magnetic field plate orientation mechanism slides said first magnetic field plate between a first position and a second position.

7. The permanent magnet reciprocating engine of claim 6, wherein said first magnetic field plate orientation mechanism includes an electric motor.

8. The permanent magnet reciprocating engine of claim 7, wherein said first magnetic field plate includes gear teeth on at least a portion of its periphery, said electric motor driving a motor shaft having a spur gear mounted thereon, said spur gear being engaged with said gear teeth.

9. The permanent magnet reciprocating engine of claim 7, wherein said first magnetic field plate includes gear teeth on at least a portion of two opposing edges, said two opposing edges being located perpendicular to the first surface of said first magnetic field plate, said first magnetic field plate orientation mechanism including a pair of electric motors, each motor of said pair being engaged with gear teeth on one of the two opposing edges.

10. The permanent magnet reciprocating engine of claim 6, wherein said first magnetic field plate orientation mechanism includes at least one pneumatic cylinder.

11. The permanent magnet reciprocating engine of claim 10, wherein said first magnetic field plate orientation mechanism includes at least one actuating lever connected between said first magnetic field plate and said at least one pneumatic cylinder, for driving said first magnetic field plate based on the actuation of said pneumatic cylinder, said at least one actuating lever being fixed to the engine at a pivot point.

12. The permanent magnet reciprocating engine of claim 6, wherein said translation mechanism includes a crankshaft, and wherein said first magnetic field plate orientation mechanism includes at least one cam fixedly mounted on said crankshaft.

13. The permanent magnet reciprocating engine of claim 12, wherein said first magnetic field plate orientation mechanism includes at least one actuating lever connected between said first magnetic field plate and said at least one cam, such that one end of said actuating lever is biased to follow a groove in said at least one cam, said at least one actuating lever being fixed to the engine at a pivot point.

14. The permanent magnet reciprocating engine of claim 13, wherein said first magnetic field plate orientation mechanism further includes a spring to assist in the movement of said first plate.

15. The permanent magnet reciprocating engine of claim 12, wherein said engine further includes at least one switch, said at least one cam periodically closing said at least one switch.

16. The permanent magnet reciprocating engine of claim 15, wherein said switch actuates at least one pneumatic cylinder.

17. The permanent magnet reciprocating engine of claim 15, wherein said switch actuates at least one motor.

18. A reciprocating engine, comprising:
   a first field plate including at least a first magnet of a first polarity and at least a second magnet of a second polarity at a first surface thereof;
   a piston plate including at least a third magnet having a fixed polarity at a first surface thereof, said first surface of said piston plate being disposed towards said first surface of said first field plate;
   a first field plate orientation mechanism to move said first field plate at specific intervals, to alternately align said at least a first magnet and said at least a second magnet with said at least a third magnet, in order to alternately attract said piston plate to said first field plate and repel said piston plate from said first field plate;
   a piston rod in communication with said piston plate;
   a translation mechanism in communication with said piston rod, distal from said piston plate;
   said piston rod moving along an axis in a first direction when said first field plate attracts said piston plate, said piston rod moving along the axis in a second direction when said first field plate repels said piston plate; and
   said translation mechanism translating linear motion of said piston rod along said axis into rotary motion.

19. The reciprocating engine of claim 18, wherein said at least a first magnet includes a plurality of magnets of like polarity, aligned in a row, said at least a second magnet includes a plurality of magnets of like polarity aligned in a row, and said at least a third magnet includes a plurality of magnets of like polarity aligned in a row.

20. The reciprocating engine of claim 19, wherein said magnets are permanent magnets.

21. The reciprocating engine of claim 18, wherein the reciprocating engine further includes:
   a second field plate, said second field plate including at least a fourth magnet of a first polarity and at least a fifth magnet of a second polarity different from said first polarity at a first surface thereof;
   said piston plate including at least a sixth magnet of a fixed polarity at a second surface thereof, said first surface of said second plate being disposed towards said second surface of said piston plate; and
   a second field plate orientation mechanism to move said second field plate at specific intervals, to alternately align said at least a fourth magnet and said at least a fifth magnet with said at least a sixth magnet.

22. The reciprocating engine of claim 21, wherein said first field plate, said second field plate and said piston plate are part of a module.

23. The reciprocating engine of claim 22, further comprising:
   a second module, including:
      a third field plate including at least a seventh magnet of a first polarity and at least an eighth magnet of a second polarity different from said first polarity at a first surface thereof;
      a fourth field plate including at least a ninth magnet of a first polarity and at least a tenth magnet of a second polarity different from said first polarity at a first surface thereof;
      a second piston plate in communication with said piston rod, said second piston plate including at least an eleventh magnet having a fixed polarity at a first surface thereof, said first surface of said second piston plate being disposed towards said first surface of said third field plate, and a twelfth magnet at a second surface of the second piston plate, said second surface of said second piston plate being disposed towards said first surface of said fourth field plate;

24. The reciprocating engine of claim 23, further including:
   a third field plate orientation mechanism to move said third field plate at specific intervals, to alternately align said at least a seventh magnet and said at least an eighth magnet with said at least an eleventh magnet, in order to alternately attract said piston plate to said first field plate and repel said piston plate from said first field plate;
   a fourth field plate orientation mechanism to move said fourth field plate at specific intervals, to alternately align said at least a ninth magnet and said at least a tenth magnet with said at least a twelfth magnet.

25. The reciprocating engine of claim 21, wherein, said first field plate orientation mechanism rotates said first field plate from a first position to a second position and said second field plate orientation mechanism rotates said second field plate from a first position to a second position.

26. The permanent magnet reciprocating engine of claim 21, wherein, said first field plate orientation mechanism slides said first field plate between a first position and a second position and said second field plate orientation mechanism slides said second field plate between a first position and a second position.

27. A reciprocating engine module, comprising:
   a first field plate including at least a first magnet of a first polarity and at least a second magnet of a second polarity different from said first polarity at a first surface thereof;
   a second field plate including at least a third magnet of a first polarity and at least a fourth magnet of a second polarity different from said first polarity at a first surface thereof;
   a piston plate including at least a fifth magnet having a fixed polarity at a first surface thereof, said first surface of said piston plate being disposed towards said first surface of said first field plate, and a sixth magnet at a second surface of the piston plate, said second surface of said piston plate being disposed towards said first surface of said second field plate;
   a first field plate orientation mechanism to move said first field plate at specific intervals, to alternately align said at least a first magnet and said at least a second magnet with said at least a fifth magnet, in order to alternately attract said piston plate to said first field plate and repel said piston plate from said first field plate; and a second field plate orientation mechanism to move said second field plate at specific intervals, to alternately align said at least a third magnet and said at least a fourth magnet with said at least a sixth magnet.

28. The reciprocating engine module of claim 27, wherein each of said at least a first magnet, said at least a second magnet, said at least a third magnet, said at least a fourth magnet, said at least a fifth magnet and said at least a sixth magnet include a plurality of magnets of like polarities.

29. The reciprocating engine module of claim 28, wherein each plurality of magnets of like polarity is arranged in a row.

30. The reciprocating engine module of claim 28, wherein each plurality of magnets of like polarity is arranged in a cross pattern.

31. A method of converting linear motion to rotary motion in a reciprocating magnet engine, comprising the steps of:

providing a reciprocating engine, including:
- a first magnetic field plate including at a first surface thereof at least a first magnetic field of a first polarity and at least a second magnetic field of a second polarity different from the first polarity;
- a piston plate including at a first surface thereof at least a third magnet field of a fixed polarity, the first surface of the piston plate being disposed towards the first surface of the first field plate;

alternately aligning the at least a first magnetic field and the at least a second magnetic field with the at least a third magnetic field, in order to alternately attract the piston plate to the first field plate and repel the piston plate from the first field plate, in order to alternately move the piston plate forward and back along an axis; and translating linear motion of the piston plate along the axis into rotary motion.

32. The method of claim 31, wherein the reciprocating engine further includes:
- a second magnetic field plate including at a first surface thereof, at least a fourth magnetic field of a first polarity and at least a fifth magnetic field of a second polarity different from the fourth polarity;
- the piston plate including at a second surface thereof at least a sixth magnet field of a fixed polarity, the second surface of the piston plate being disposed towards the first surface of the first field plate;

33. The method of claim 32, further comprising the step of:
alternately aligning the at least a fourth magnetic field and the at least a fifth magnetic field with the at least a sixth magnetic field, in order to alternately attract the piston plate to the second field plate and repel the piston plate from the second field plate.

34. The reciprocating engine of claim 33, wherein, the aligning step includes rotating the first field plate from a first position to a second position.

35. The permanent magnet reciprocating engine of claim 1, wherein, the aligning step includes sliding the first field plate from a first position to a second position.

* * * * *